United States Patent [19]

Brown et al.

[11] Patent Number: 5,805,832

[45] Date of Patent: Sep. 8, 1998

[54] SYSTEM FOR PARAMETRIC TEXT TO TEXT LANGUAGE TRANSLATION

[75] Inventors: Peter Fitzhugh Brown, New York; John Cocke, Bedford; Stephen Andrew Della Pietra, Pearl River; Vincent Joseph Della Pietra, Blauvelt; Frederick Jelinek, Briarcliff Manor; Jennifer Ceil Lai, Garrison; Robert Leroy Mercer, Yorktown Heights, all of N.Y.

[73] Assignee: International Business Machines Corporation, Armonk, N.Y.

[21] Appl. No.: 459,454

[22] Filed: Jun. 2, 1995

Related U.S. Application Data

[63] Continuation of Ser. No. 736,278, Jul. 25, 1991, Pat. No. 5,477,451.

[51] Int. Cl.$^6$ .................................................... G06F 17/28
[52] U.S. Cl. ........................... 395/752; 395/751; 395/759
[58] Field of Search ............................ 364/419.02, 419.1, 364/419.01, 419.08; 395/2.49, 2.86, 751, 752, 759

[56] References Cited

U.S. PATENT DOCUMENTS

| | | |
|---|---|---|
| 4,754,489 | 6/1988 | Bukser . |
| 4,852,173 | 7/1989 | Bahl et al. . |
| 4,879,580 | 11/1989 | Church . |
| 4,882,759 | 11/1989 | Bahl et al. . |
| 4,984,178 | 1/1991 | Hemphill et al. . |
| 4,991,094 | 2/1991 | Fagen et al. . |
| 5,033,087 | 7/1991 | Bahl et al. . |
| 5,068,789 | 11/1991 | Van Vliembergen . |
| 5,109,509 | 4/1992 | Katayana et al. . |
| 5,146,405 | 9/1992 | Church . |
| 5,200,893 | 4/1993 | Ozawa et al. . |

FOREIGN PATENT DOCUMENTS

| | | |
|---|---|---|
| 327266 | 8/1989 | European Pat. Off. . |
| 357344 | 3/1990 | European Pat. Off. . |
| 399533 | 11/1990 | European Pat. Off. . |
| WO 90/10911 | 9/1990 | WIPO . |

OTHER PUBLICATIONS

Information System & Electronic Development Laboratory Mitsubishi Electr. Corp. "Training of Lexical Models Based on DTW–Based Parameter Reestimation Algorithm" Y. Abe et al, 1988, pp. 623–626.

(List continued on next page.)

*Primary Examiner*—Gail O. Hayes
*Assistant Examiner*—William Hughet
*Attorney, Agent, or Firm*—Robert P. Tassinari, Esq.; Sterne, Kessler, Goldstein & Fox P.L.L.C.

[57] ABSTRACT

The present invention is a system for translating text from a first source language into a second target language. The system assigns probabilities or scores to various target-language translations and then displays or makes otherwise available the highest scoring translations. The source text is first transduced into one or more intermediate structural representations. From these intermediate source structures a set of intermediate target-structure hypotheses is generated. These hypotheses are scored by two different models: a language model which assigns a probability or score to an intermediate target structure, and a translation model which assigns a probability or score to the event that an intermediate target structure is translated into an intermediate source structure. Scores from the translation model and language model are combined into a combined score for each intermediate target-structure hypothesis. Finally, a set of target-text hypotheses is produced by transducing the highest scoring target-structure hypotheses into portions of text in the target language. The system can either run in batch mode, in which case it translates source-language text into a target language without human assistance, or it can function as an aid to a human translator. When functioning as an aid to a human translator, the human may simply select from the various translation hypotheses provided by the system, or he may optionally provide hints or constraints on how to perform one or more of the stages of source transduction, hypothesis generation and target transduction.

24 Claims, 54 Drawing Sheets

OTHER PUBLICATIONS

CIIAM 86, Proceedings of the 2nd International Conference on Artificial Intelligence, "Logic Programming for Speech Understanding," pp. 487–497, Abstract of Article, Snyers D. et al.

J. Baker, "Trainable Grammars For Speech Recognition", *Speech Communications Papers Presented at the 97th Meeting of the Acoustic Society of America*, 1979, pp. 547–550.

M.E. Lesk, "Lex–A Lexical Analyzer Generator", *Computer Science Technical Report,* No. 39, Bell Laboratories, Oct. 1975.

L. Baum, "An Inequality and Associated Maximation Technique in Statistical Estimation for Probalistic Functions of Markov Processes", *Inequalities,* vol. 3, 1972, pp. 1–8.

F. Jelinek, "Self Organized Language Modeling For Speech Recognition", *Language Processing For Speech Recognition,* pp. 450–506.

Catizone et al., "Deriving Translation Data From Bilingual Texts", *Proceedings of the First International Acquisition Workshop,* Detroit, Michigan, 1989.

J. Spohrer et al., "Partial Traceback in Continuous Speech Recognition", *Proceedings of the IEEE International Conference on Acoustics, Speech and Signal Processing,* Paris, France, 1982.

F. Jelinek, R. Mercer, "Interpolated Estimated of Markov Source Parameters From Sparse Data", *Workshop on Pattern Recognition in Practice,* Amsterdam (Netherland), North Holland, May 21–23, 1980.

M. Kay, "Making Connections", *ACH/ALLC '91,* Tempe, Arizona, 1991, p. 1.

"Method For Inferring Lexical Associations From Textual Co–Occurrences", IBM Technical Disclosure Bulletin, vol. 33, Jun. 1990.

L. Bahl et al., "A Tree–Based Statistical Language Model For Natural Language Speech Recognition", *IEEE Transactions of Acoustics,* vol. 37, No. 7, Jul. 1989, pp. 1001–1008.

P. Brown, "Word–Sense Disambiguation Using Statistical Methods", *Proceedings of the 29th Annual Meeting of the Association for Computational Linguistics,* Jun. 1991, pp. 264–270.

P. Brown et al., "Aligning Sentences in Parallel Corpora", *Proceedings of the 29th Annual Meeting of the Association for Computational Linguistics,* Jun. 1991, pp. 169–176.

B. Merialdo, "Tagging Text With A Probalistic Model", *Proceedings of the International Conference on Acoustics, Speech and Signal Processing,* Paris, France, May 14–17, 1991.

FIG.17

```
begin patterns and actions;
WH_NP?.[1].DO_SET.'not'?.[2].SUBJECT_NP.[3].ADVERB*.[4].
   ,BARE_INF_TAG.(#)*.'?'
   -> english_question_inversion;
(#)+
   -> default_action;
end patterns and actions;

begin auxiliary patterns;
ADVERB     = ,ADV_TAG | 'most','RR!' | 'more','RR!';
BARE_NP    = ((ADVERB)*.,ADJ_TAG)*.,COMMON_NOUN_TAG;
SUBJECT_NP = (,SUBJECT_TAG) | (,DETERMINER_TAG)?.BARE_NP;
WH_NP      = WH_WORD | (( 'which' | 'what' | 'how'.'many').BARE_NP);
end auxiliary patterns;

begin sets of words;
DO_SET   = {do does did};
WH_WORD  = {what who where why whom how when which};
end sets of words;

begin sets of tags;
PROPER_NOUN_TAG = {NP NP1 NP2};
PRONOUN_TAG     = {PN PN1 PNQS};
SUBJECT_TAG     = {PROPER_NOUN_TAG PRONOUN_TAG};
BARE_INF_TAG    = {VV0 VH0 VB0 VD0};
COMMON_NOUN_TAG = {ND1 NN NN1 NN2 NNJ NNJ1 NNJ2 NNL NNL1 NNL2
                   NO NNO2 NNS1 NNS2 NNSA1 NNSB NNSB1
                   NNSB2 NNT1 NNT2 NNU NNU1 NNU2 NPD1 NPD2 NPM1};
ADV_TAG         = {RA REX RG RGA RGR RGT RP RPK RR RRR RRT RT};
ADJ_TAG         = {JA JB JBR JBT JJ JJR JJT JK};
DETERMINER_TAG  = {AT AT1 DA DA1 DA2 DA2R DA2T DAR DAT DB DB2 DD
                   DD1 DD2 DDQ DDQ$ DDQV};
end sets of tags;
```

FIG. 18

```
1    english_question_inversion: procedure;
2       /* This procedure is invoked when the pattern:
3          WH_NP?.[1].DO_SET.'not'?.[2].SUBJECT_NP.[3].ADVERB*.[4]
4          .#,BARE_INF_TAG.(#)*.'?' is matched */
5
6       set the output sequence to null;
7
8       append tuples the beginning of the input sequence
9          to position @reg(1)-1 to output;
10
11      append tuples from input positions
12         @reg(2) to @reg(3)-1 to output;
13
14      if @reg(2) = @reg(1) + 2 then do;
15         append tuples from input positions @reg(1) to
16            @reg(1)+1 to output;
17         append tuples from input in positions
18            @reg(3) to @reg(4) to output;
19         end;
20
21      else do;
22         append tuples from input in positions
23            @reg(3) to @reg(4)-1 to output;
24
25         if the word at postion @reg(1) is 'does' then do;
26            append the input word at position @reg(4) and the
27               tag for 'does' to output;
28            end;
29
30         else if the word at postion @reg(1) is 'do' then do;
31            append tuple at input position @reg(4)
32            end;
33
34         else if the word at postion @reg(1) is 'did' then do;
35            append the input word at position @reg(4)
36               and the tag for 'did' to output;
37            end;
38
39         else there is an error;
40
41         end;
42
43      append the tuples from input positions @reg(4)+1 to
44         one less than the last position to output;
45
46      append the word 'QINV' and the tag 'QINV' to output;
47
48      end english_question_inversion;
```

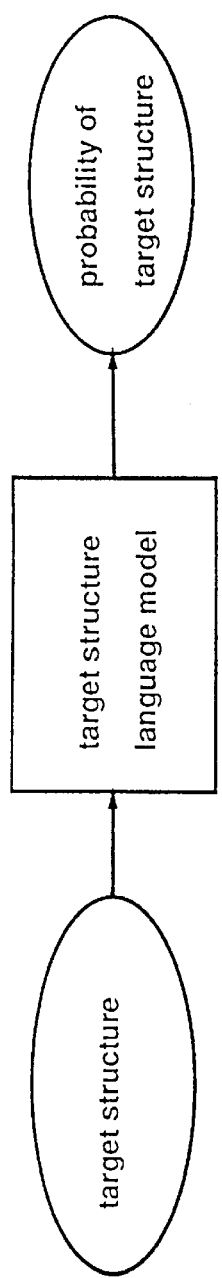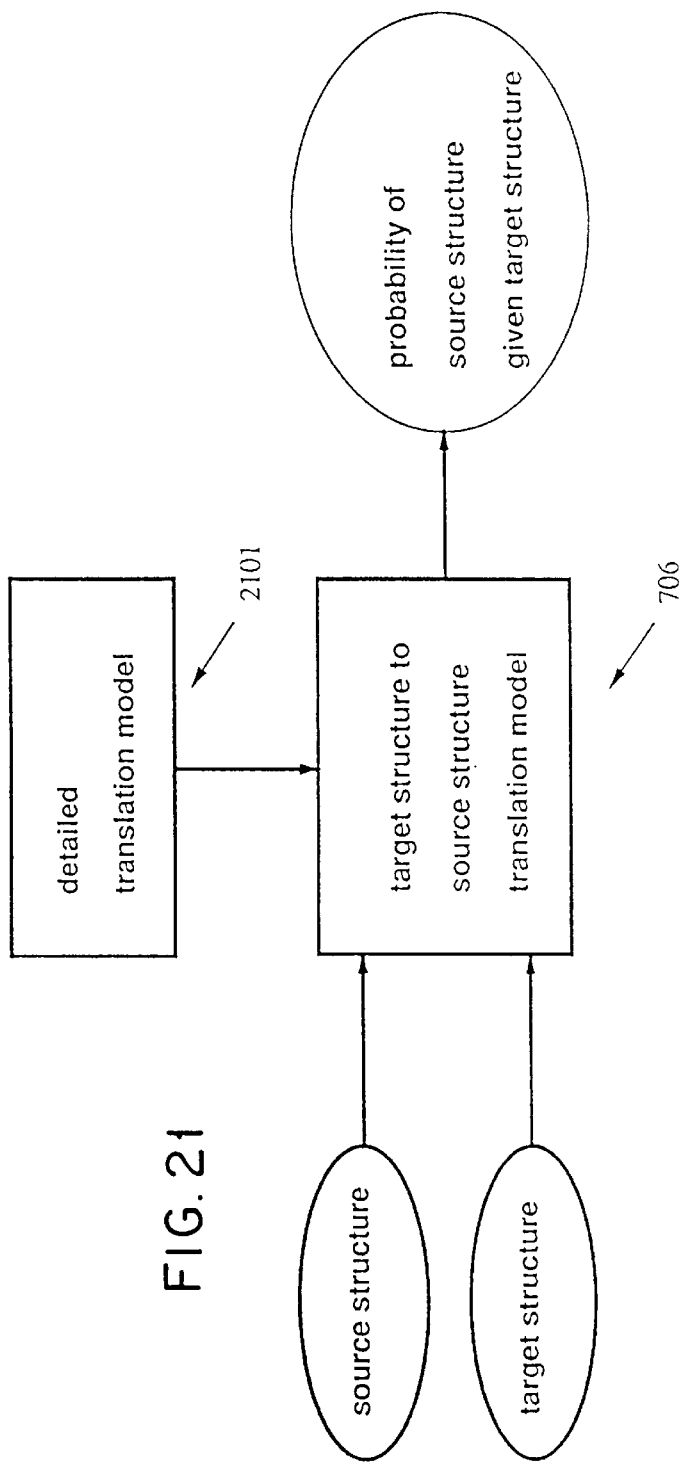
FIG. 20
FIG. 21

FIG. 38

| English | | French |
|---|---|---|
| The$_1$ | | Le$_1$ |
| secretary$_2$ | | secrétaire$_2$ |
| of$_3$ | | de$_3$ |
| state$_4$ | | État$_4$ |
| for$_5$ | | à$_5$ |
| external$_6$ | | les$_6$ |
| affairs$_7$ | | Affaires$_7$ |
| comes$_8$ | | extérieur$_8$ |
| in$_9$ | | se$_9$ |
| as$_{10}$ | | présente$_{10}$ |
| the$_{11}$ | | comme$_{11}$ |
| one$_{12}$ | | le$_{12}$ |
| supporter$_{13}$ | | seul$_{13}$ |
| of$_{14}$ | | défenseur$_{14}$ |
| the$_{15}$ | | de$_{15}$ |
| embattled$_{16}$ | | le$_{16}$ |
| minister$_{17}$ | | ministre$_{17}$ |
| of$_{18}$ | | qui$_{18}$ |
| yesterday$_{19}$ | | se$_{19}$ |
| | | est$_{20}$ |
| | | fait$_{21}$ |
| | | bousculer$_{22}$ |
| | | hier$_{23}$ | vocabulary word: prendre informant site: first noun to the right informant word:

first sequence: décision second sequence: voiture

FIG. 48A

```
/*START_COMMENT* Beginning file = 048
101 H002-108 script A *END_COMMENT*/
.TB 029 060 090 099
.PL 060
.LL 120
.NF
The House met at 2 p.m.
.SP
*boMr. Donald MacInnis (Cape Breton
-East Richmond):*ro Mr. Speaker,
I rise on a question of privilege af-
fecting the rights and prerogatives
of parliamentary committees and one
which reflects on the word of two
ministers.
.SP
*boMr. Speaker: *roThe hon. member's
motion is proposed to the
House under the terms of Standing
Order 43. Is there unanimous consent?
.SP
*boSome hon. Members: *roAgreed.
s*itText*ro)
Question No. 17--*boMr. Mazankowski:
*ro
```

1. \SCM{} Document = 048 101 H002-108
   script A \ECM{}

2. The House met at 2 p.m.
3. \SCM{} Paragraph \ECM{}
4. \SCM{} Author = Mr. Donald MacInnis
   (Cape Breton-East Richmond) \ECM{}
5. Mr. Speaker, I rise on a question of
   privilege affecting the rights and
   prerogatives of parliamentary
   committees and one which reflects on
   the word of two ministers.
21. \SCM{} Paragraph \ECM{}
22. \SCM{} Author = Mr. Speaker \ECM{}
23. The hon. member's motion is proposed
    to the House under the terms of
    Standing Order 43.
44. Is there unanimous consent?
45. \SCM{} Paragraph \ECM{}
46. \SCM{} Author = Some hon. Members
    \ECM{}
47. Agreed.

```
1. For the period April 1, 1973 to      61. \SCM{} Source = Text  \ECM{}
   January 31, 1974, what amount of     62. \SCM{} Question = 17 \ECM{}
   money was expended on the operation  63. \SCM{} Author = Mr. Mazankowski
   and maintenance of the Prime             \ECM{}
   Minister's residence at Harrington   64. 1.
   Lake, Quebec?                        65. For the period April 1, 1973 to
   .SP                                      January 31, 1974, what amount of
   (1415)                                   money was expended on the operation
   s*itLater:*ro)                           and maintenance of the Prime
   .SP                                      Minister's residence at Harrington
   *boMr. Cossitt:*ro Mr. Speaker, I rise   Lake, Quebec?
   on a point of order to ask for       66. \SCM{} Paragraph \ECM{}
   clarification by the parliamentary   81. \SCM{} Time = (1415) \ECM{}
   secretary.                           82. \SCM{} Time = Later \ECM{}
                                        83. \SCM{} Paragraph \ECM{}
                                        84. \SCM{} Author = Mr. Cossitt \ECM{}
                                        85. Mr. Speaker, I rise on a point of
                                            order to ask for clarification by
                                            the parliamentary secretary.
```

FIG. 48B

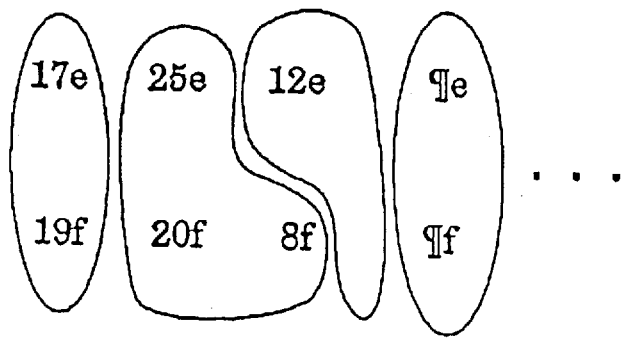
FIG. 49
FIG. 50
| Bead | Text |
|---|---|
| e | one English sentence |
| f | one French sentence |
| ef | one English and one French sentence |
| eef | two English and one French sentence |
| eff | one English and two French sentences |
| ¶e | one English paragraph |
| ¶f | one French paragraph |
| ¶e¶f | one English and one French paragraph |
FIG. 51

FIG. 68

```
1   procedure: extend_partial_hypotheses_on_list;
2     do for i = 1 to the number of partial hypotheses on list;
3       let h be the i-th partial hypothesis to be extended;
4       do for p = 1 to the number of positions in the source structure.
5         if p is not already aligned in h then
6           extend_h_by_accounting_for_source_morpheme_in_position_p;
7       end of do for p;
8     end of do for i;
9   end of procedure extend_partial_hypotheses_on_list;

10  procedure: extend_h_by_accounting_for_source_morpheme_in_position_p;
11    if h is an open partial hypothesis then do;
12      let q be the position of the open target morpheme in h;
13      extend_open_h_by_connecting_p_to_q_and_keep_h_open;
14      extend_open_h_by_connecting_p_to_q_and_close_h;
15    end of if h;
16    if h is not an open partial hypothesis then do;
17      let s be the source morpheme in position p;
18      do j = 1 to the number of target morpheme translations of s;
19        let t be the j-th target morpheme translation of s;
20        create_open_extension_of_h_by_connecting_p_to_t;
21        create_closed_extension_of_h_by_connecting_p_to_t;
22        create_extension_of_h_by_connecting_p_to_null_target_morpheme;
23        create_list_of_target_morphemes_to_be_inserted_before_t;
24        do k = 1 to number of target morphemes on listed to be inserted;
25          let t1 be the k-th target morpheme to be inserted;
26          create_open_extenstion_of_by_connecting_p_to_t1_t;
27          create_closed_extenstion_of_by_connecting_p_to_t1_t;
28        end of do k;
29      end of do j;
30    end of if h;
31  end of procedure extend_h_by_accounting_for_source_morpheme_in_position_p;
```

SYSTEM FOR PARAMETRIC TEXT TO TEXT LANGUAGE TRANSLATION

This application is a continuation of application Ser. No. 07/736,278, filed Jul. 25, 1991, now U.S. Pat. No. 5,477,451.

TECHNICAL FIELD

The present invention relates to machine translation in general, and, in particular to methods of performing machine translation which use statistical models of the translation process.

BACKGROUND ART

There has long been a desire to have machines capable of translating text from one language into text in another language. Such machines would make it much easier for humans who speak different languages to communicate with one another. The present invention uses statistical techniques to attack the problem of machine translation. Related statistical techniques have long been used in the field of automatic speech recognition. The background for the invention is thus in two different fields: automatic speech recognition and machine translation.

The central problem in speech recognition is to recover from an acoustic signal the word sequence which gave rise to it. Prior to 1970, most speech recognition systems were built around a set of hand-written rules of syntax, semantics and acoustic-phonetics. To construct such a system it is necessary to firstly discover a set of linguistic rules that can account for the complexity of language, and, secondly to construct a coherent framework in which these rules can be assembled to recognize speech. Both of these problems proved insurmountable. It proved too difficult to write down by hand a set of rules that adequately covered the vast scope of natural language and to construct by hand a set of weights, priorities and if-then statements that can regulate interactions among its many facets.

This impasse was overcome in the early 1970's with the introduction of statistical techniques to speech recognition. In the statistical approach, linguistic rules are extracted automatically using statistical techniques from large databases of speech and text. Different types of linguistic information are combined via the formal laws of probability theory. Today, almost all speech recognition systems are based on statistical techniques.

Speech recognition has benefited by using statistical language models which exploit the fact that not all word sequences occur naturally with equal probability. One simple model is the trigram model of English, in which it is assumed that the probability that a word will be spoken depends only on the previous two words that have been spoken. Although trigram models are simple-minded, they have proven extremely powerful in their ability to predict words as they occur in natural language, and in their ability to improve the performance of natural-language speech recognition. In recent years more sophisticated language models based on probabilistic decision-trees, stochastic context-free grammars and automatically discovered classes of words have also been used.

In the early days of speech recognition, acoustic models were created by linguistic experts, who expressed their knowledge of acoustic-phonetic rules in programs which analyzed an input speech signal and produced as output a sequence of phonemes. It was thought to be a simple matter to decode a word sequence from a sequence of phonemes. It turns out, however, to be a very difficult job to determine an accurate phoneme sequence from a speech signal. Although human experts certainly do exist, it has proven extremely difficult to formalize their knowledge. In the alternative statistical approach, statistical models, most predominantly hidden Markov models, capable of learning acoustic-phonetic knowledge from samples of speech are employed.

The present approaches to machine translation are similar in their reliance on hand-written rules to the approaches to speech recognition twenty years ago. Roughly speaking, the present approaches to machine translation can be classified into one of three categories: direct, interlingual, and transfer. In the direct approach a series of deterministic linguistic transformations is performed. These transformations directly convert a passage of source text into a passage of target text. In the transfer approach, translation is performed in three stages: analysis, transfer, and synthesis. The analysis stage produces a structural representation which captures various relationships between syntactic and semantic aspects of the source text. In the transfer stage, this structural representation of the source text is then transferred by a series of deterministic rules into a structural representation of the target text. Finally, in the synthesis stage, target text is synthesized from the structural representation of the target text. The interlingual approach to translation is similar to the transfer approach except that in the interlingual approach an internal structural representation that is language independent is used. Translation in the interlingual approach takes place in two stages, the first analyzes the source text into this language-independent interlingual representation, the second synthesizes the target text from the interlingual representation. All these approaches use hand-written deterministic rules.

Statistical techniques in speech recognition provide two advantages over the rule-based approach. First, they provide means for automatically extracting information from large bodies of acoustic and textual data, and second, they provide, via the formal rules of probability theory, a systematic way of combining information acquired from different sources. The problem of machine translation between natural languages is an entirely different problem than that of speech recognition. In particular, the main area of research in speech recognition, acoustic modeling, has no place in machine translation. Machine translation does face the difficult problem of coping with the complexities of natural language. It is natural to wonder whether this problem won't also yield to an attack by statistical methods, much as the problem of coping with the complexities of natural speech has been yielding to such an attack. Although the statistical models needed would be of a very different nature, the principles of acquiring rules automatically and combining them in a mathematically principled fashion might apply as well to machine translation as they have to speech recognition.

DISCLOSURE OF THE INVENTION

The present invention is directed to a system and method for translating source text from a first language to target text in a second language different from the first language. The source text is first received and stored in a first memory buffer. Zero or more user defined criteria pertaining to the source text are also received and stored by the system. The user defined criteria are used by various subsystems to bound the target text.

The source text is then transduced into one or more intermediate source structures which may be constrained by any of the user defined criteria. One or more target hypotheses are then generated. Each of the target hypotheses comprise a intermediate target structure of text selected from the second language. The intermediate target structures may also be constrained by any of the user defined criteria.

A target-structure language model is used to estimate a first score which is proportional to the probability of occurrence of each intermediate target-structure of text associated with the target hypotheses. A target structure-to- source-structure translation model is used to estimate a second score which is proportional to the probability that the intermediate target-structure of text associated with the target hypotheses wvill translate into the intermediate source-structure of text. For each target hypothesis, the first and second scores are combined to produce a target hypothesis match score.

The intermediate target-structures of text are then transduced into one or more transformed target hypothesis of text in the second language. This transduction step may also be constrained by any of the user defined criteria.

Finally, one or more of the transformed target hypotheses is displayed to the user according to its associated match score and the user defined criteria. Alternatively, one or more of the transformed target hypotheses may be stored in memory or otherwise made available for future access.

The intermediate source and target structures are transduced by arranging and rearranging, respectively, elements of the source and target text according to one or more of a lexical substitution, part-of-speech assignment, a morphological analysis, and a syntactic analysis.

The intermediate target structures may be expressed as an ordered sequence of morphological units, and the first score probability may be obtained by multiplying the conditional probabilities of each morphological unit within an intermediate target structure given the occurrence of previous morphological units within the intermediate target structure. In another embodiment, the conditional probability of each unit of each of the intermediate target structure may depend only on a fixed number of preceding units within the intermediate target structure.

The intermediate source structure transducing step may further comprise the step of tokenizing the source text by identifying individual words and word separators and arranging the words and the word separators in a sequence. Moreover, the intermediate source structure transducing step may further comprise the step of determining the case of the words using a case transducer, wherein the case transducer assigns each word a tolken and a case pattern. The case pattern specifies the case of each letter of the word. Each case pattern is evaluated to determine the true case pattern of the word.

BRIEF DESCRIPTION OF DRAWINGS

The above stated and other aspects of the present invention will become more evident upon reading the following description of preferred embodiments in conjunction with the accompanying drawings, in which:

FIG. 17 is a Table of Patterns for a finite-state pattern matcher employed in some source and target transducers;

FIG. 18 is a Table of Actions for an action processing module employed in some source and target transducers.

FIG. 20 is a schematic block diagram of a target structure language model;

FIG. 21 is a schematic block diagram of a target structure to source structure translation model;

FIG. 38 shows the best of $8.4 \times 10^{29}$ possible alignments;

FIG. 48 depicts a sample of text before and after textual cleanup and sentence detection;

FIG. 49 shows an example of a division of aligned copora into beads;

FIG. 50 shows a finite state model for generating beads;

FIG. 51 shows the beads that are allowed by the model;

FIG. 56 is an example of a partial hypothesis which results from an extension by the target morpheme the;

FIG. 68 contains pseudocode describing the method for extending hypotheses

BEST MODE FOR CARRYING OUT THE INVENTION

Figure 1:
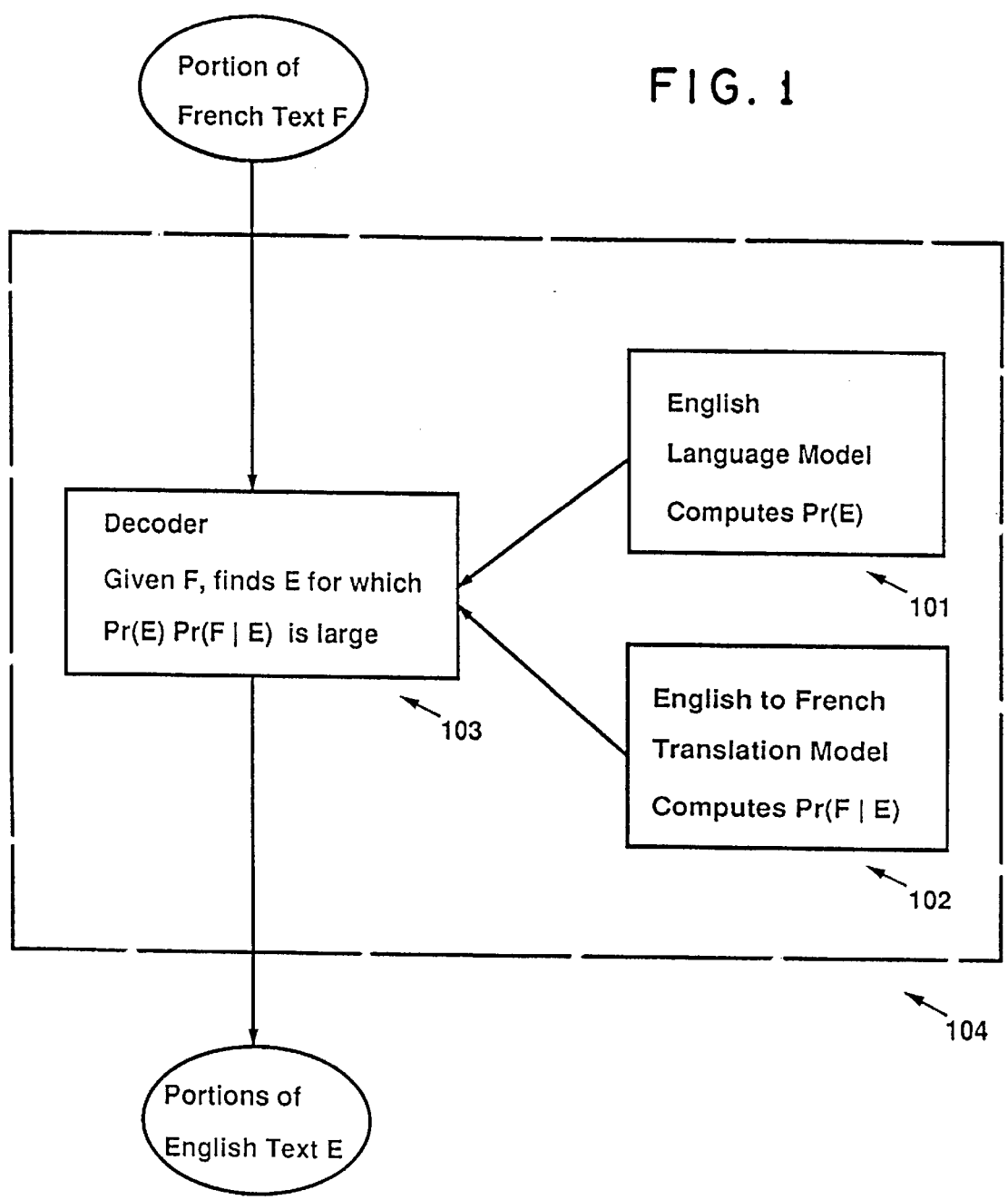
FIG. 1 is a schematic block diagram of a simplified French to English translation system.

Contents
1 Introduction
2 Translation Systems
3 Source Transducers
   3.1 Overview
   3.2 Components
   3.2.1 Tokenizing Transducers
   3.2.2 Token-Word Transducers
   3.2.3 True-Case Transducers
   3.2.4 Specialized Transformation Transducers
   3.2.5 Part-of-Speech Labeling Transducers
   3.2.6 Syntactic Transformation Transducers
   3.2.7 Syntactic Transducers for English
   3.2.8 Syntactic Transducers for French
   3.2.9 Morphological Transducers
   3.2.10 Sense-Labelling Transducers
   3.3 Source-Transducers with Constraints
4 Finite-State Transducers
5 Target Transducers
   5.1 Overview
   5.2 Components
   5.3 Target Transducers with Constraints
6 Target Language Model
   6.1 Perplexity
   6.2 n-gram Language models
   6.3 Simple n-gram models
   6.4 Smoothing
   6.5 n-gram Class Models
7 Classes
   7.1 Maximum Mutual Information Clustering
   7.2 A Clustering Method
   7.3 An Alternate Clustering Method
   7.4 Improving Classes
   7.5 Examples
   7.6 A Method for Constructing Similarity Trees
8 Overview of Translation Models and Parameter Estimation
   8.1 Translation Models
   8.1.1 Training
   8.1.2 Hidden Alignment Models
   8.2 An example of a detailed translation model
   8.3 Iterative Improvement
   8.3.1 Relative Objective Function
   8.3.2 Improving Parameter Values
   8.3.3 Going From One Model to Another
   8.3.4 Parameter Reestimation Formulae
   8.3.5 Approximate and Viterbi Parameter Estimation
   8.4 Five Models
9 Detailed Description of Translation Models and Parameter Estimation
   9.1 Notation
   9.2 Translations
   9.3 Alignments
   9.4 Model 1
   9.5 Model 2
   9.6 Intermodel interlude
   9.7 Model 3
   9.8 Deficiency
   9.9 Model 4
   9.10 Model 5
   9.11 Results
   9.12 Better Translation Models

7

9.12.1 Deficiency
9.12.2 Multi-word Notions
10 Mathematical Summary of Translation Models
10.1 Summary of Notation
10.2 Model 1
10.3 Model 2
10.4 Model 3
10.5 Model 4
10.6 Model 5
11 Sense Disambiguation
11.1 Introduction
11.2 Design of a Sense-Labeling Transducer
11.3 Constructing a table of informants and questions
11.4 Mathematics of Constructing Questions
11.4.1 Statistical Translation with Transductions
11.4.2 Sense-Labeling in Statistical Translation
11.4.3 The Viterbi Approximation
11.4.4 Cross Entropy
11.5 Selecting Questions
11.5.1 Source Questions
11.5.2 Target Questions
11.6 Generalizations
12 Aligning Sentences
12.1 Overview
12.2 Tokenization and Sentence Detection
12.3 Selecting Anchor Points
12.4 Aligning Major Anchors
12.5 Discarding Sections
12.6 Aligning Sentences
12.7 Ignoring Anchors
12.8 Results for the Hansard Example
13 Aligning Bilingual Corpora
14 Hypothesis Search—Steps 702 and 902
14.1 Overview of Hypothesis Search
14.2 Hypothesis Extension 5404
14.2.1 Types of Hypothesis Extension
14.3 Selection of Hypotheses to Extend 5402

1 Introduction

The inventions described in this specification include apparatuses for translating text in a source language to text in a target language. The inventions employ a number of different components. There are various embodiments of each component, and various embodiments of the apparatuses in which the components are connected together in different ways.

To introduce some of the components, a number of simplified embodiments of a translation apparatus will be described in this introductory section. The components themselves will be described in detail in subsequent sections. More sophisticated embodiments of the apparatuses, including the preferred embodiments, will also be described in subsequent sections.

The simplified embodiments translate from French to English. These languages are chosen only for the purpose of example. The simplified embodiments, as well as the preferred embodiments, can easily be adapted to other natural languages, including but not limited to, Chinese, Danish, Dutch, English, French, German, Greek, Italian, Japanese, Portuguese, and Spanish, as well as to artificial languages including but not limited to data-base query languages such as SQL, and the programming languages such as LISP. For example, in one embodiment queries in English might be translated into an artificial database query language.

A simplified embodiment 104 is depicted in FIG. 1. It includes three components:

8

1. A language model 101 which assigns a probability or score P(E) to any portion of English text E;
2. A translation model 102 which assigns a conditional probability or score P(F|E) to any portion of French text F given a.ny portion of English text E; and
3. A drcoder 103 which given a portion of French text F finds a number of portions of English text E, each of which has a large combined probability or score $$P(E,F) \equiv P(E)\, P(F|E). \tag{1}$$

Language models are described in Section 6, and translation models are described in Sections 8, 9, and 10. An embodiment of the decoder 103 is described in detail in Section 14.

A shortcoming of the simplified architecture depicted in FIG. 1 is that the language model 101 and the translation model 102 deal directly with unanalyzed text. The linguistic information in a portion of text and the relationships between translated portions of text is complex, involving linguistic phenomena of a global nature. However, the models 101 and 102 must be relatively simple so that their parameters can be reliably estimated from a manageable amount of training data. In particular, they are restricted to the description of local structure.

This difficulty is addressed by integrating the architecture of FIG. 1 with the traditional machine translation arclitecture of analysis, transfer, and synthesis. The result is the simplified embodiment depicted in FIG. 2. It includes six components:

1. a French transduction component 201 in which a portion of French text F is encoded into an intermediate structure F';
2. a statistical transfer component 202 in which F' is translated to a corresponding intermediate English structure E';
3. an Entglish transduction component 203 in which a portion of English text E is reconstructed from E'.

This statistical transfer component 202 is similar in function to the whole of the simplified embodiment 104, except that it translates between intermedliate structures instead of translating directly between portions of text. The building blocks of these intermediate structures may be words, morphemes, syntactic markers, semantic markers, or other units of linguistic structure. In descriptions of aspects of the statistical transfer component, for reasons of exposition, these building blocks will sometimes be referred to as words or morphemes, morphs, or morphological units. It should be understood, however, that the unless stated otherwise the same descriptions of the transfer component apply also to other units of linguistic structure.

The statistical transfer component incorporates 4. an English structure language mnodel 204 which assigns a probability or score P(E') to any intermediate structure E';
5. an English structure to French structure transslation model 205 which assigns a conditional probability or score P(F'|E') to any intermediate structure F' given any intermediate structure E'; and
6. a decoder 206 which given a French structure F' finds a number of English structures E', each of which has a large combined probability or score $$P(E',F') \equiv P(E')\, P(F'|E'). \tag{2}$$

The role of the French transduction component 201 and the English transduction component 203 is to facilitate the task of the statistical transfer component 202. The intermediate structures E' and F' encode global linguistic facts about E and F in a local form. As a result, the language and translation models 204 and 205 for E' and F' will be more accurate than the corresponding models for E and F.

The French transduction component 201 and the English transduction component 203 can be composed of a sequence of successive transformations in which F' is incrementally constructed from F, and E is incrementally recovered from E'. For example, one transformation of the French transduction component 201 might label each word of F with the part of speech, e.g. noun, verb, or adjective, that it assumes in F. The part of speech assumed by a word depends on other words of F, but in F' it is encoded locally in the label. Another transformation might label each word of F with a cross-linqual sense label. The label of a word is designed to elucidate the English translation of the word.

Various embodiments of French transduction components are described in Section 3, and various embodiments of English transduction components are described in Section 5.

Embodiments of a cross-lingtial sense labeler and methods for sense-labeling are described in Section 11.

Figure 2:
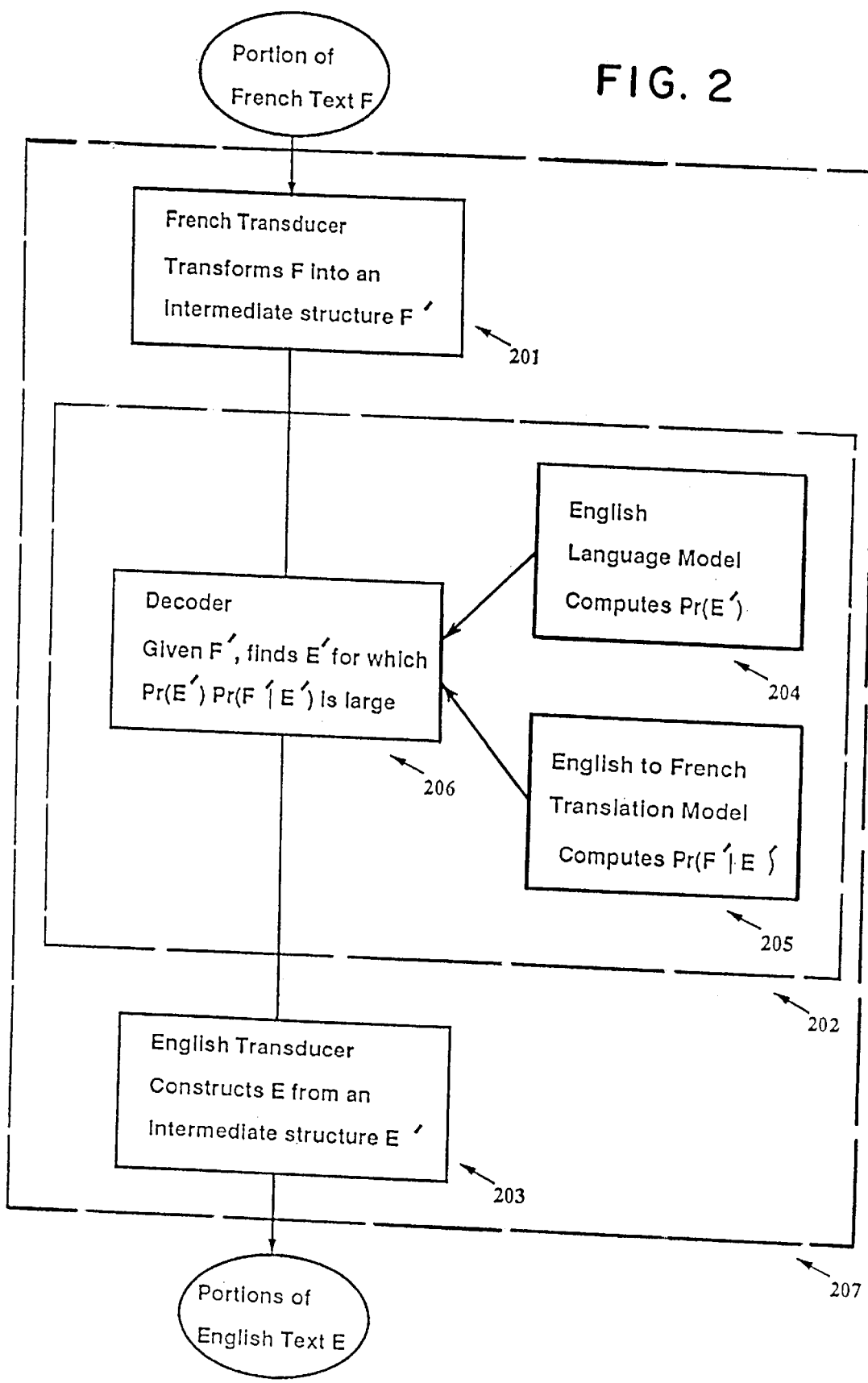
FIG. 2 is a schematic block diagram of a simplified French to English translation system which incorporates analysis and synthesis.
Figure 3:
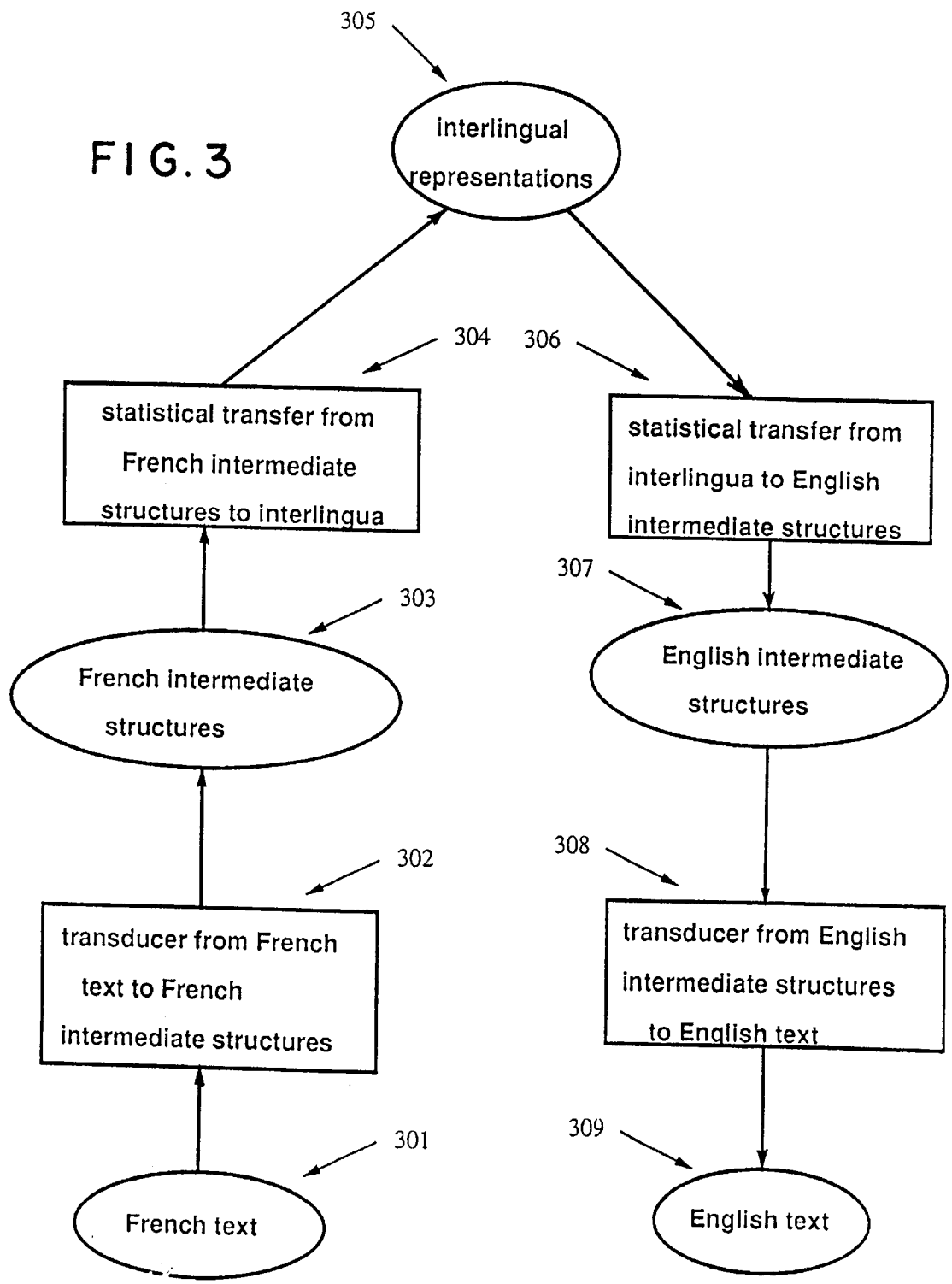
FIG. 3 is a schematic block diagram illustrating a manner in which statistical transfer can be incorporated into a translation system based on an interlingua.

FIG. 2 illustrates the manner by which statistical transfer is incorporated into the traditional architecture of analysis, transfer, and synthesis. However, in other embodiments statistical transfer can be incoporated into other architectures. FIG. 3, for example, shows how two separate statistical transfer components can be incorporated into a French-to-English translation system which uses an interlingna. The French transducer 302 together with the statistical transfer module 304 translate French text 301 into an interlingial representations 305. The other statistical transfer module 306 together with the English transduction module 308 translate the interlingulal representations 305 into English text 309.

The language models and translation models are statistical models with a large number of parameters. The values for these parameters are determined in a process called training from a large bilingual corpus consisting of parallel English-French text. For the training of the translation model, the English and French text is first aligned on a sentence by sentence basis. The process of aligning sentences is described in Sections 12 and 13.

2 Translation Systems

Figure 4:
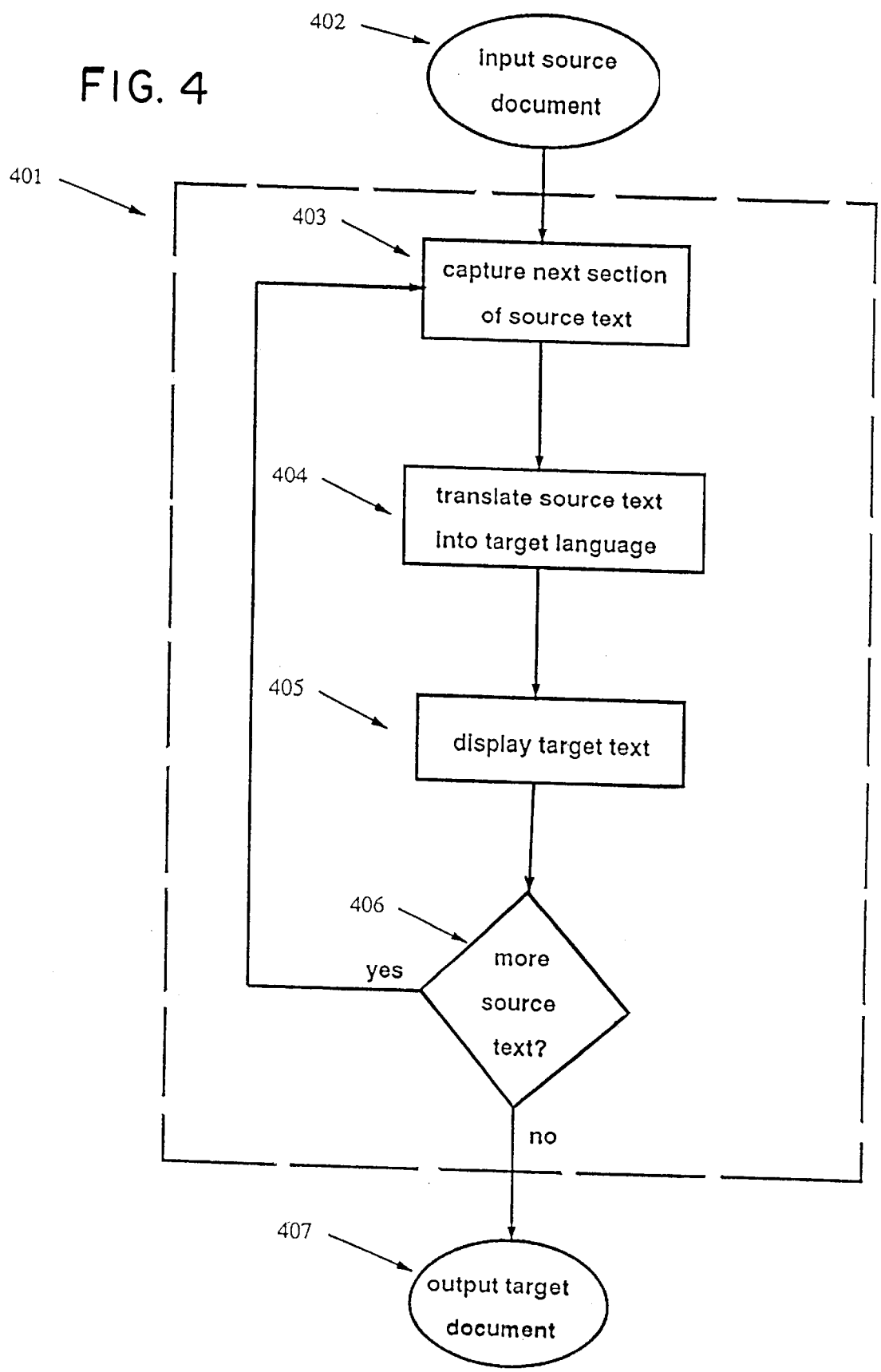
FIG. 4 is a schematic flow diagram of a basic system operating in batch mode.

FIG. 4 depicts schematically a preferred embodiment of a batch translation system 401 which translates text without user assistance. The operation of the system involves three basic steps. In the first step 403 a portion of source text is captured from the input source document to be translated. In the second step 404, the portion of source text captured in step 403 is translated into the target language. In the third step 405, the translated target text is displayed, made available to at least one of a listen and viewing operation, or otherwise made available. If at the end of these three steps the source document has not been fully translated, the system returns to step 403 to capture the next untranslated portion of source text.

Figure 5:
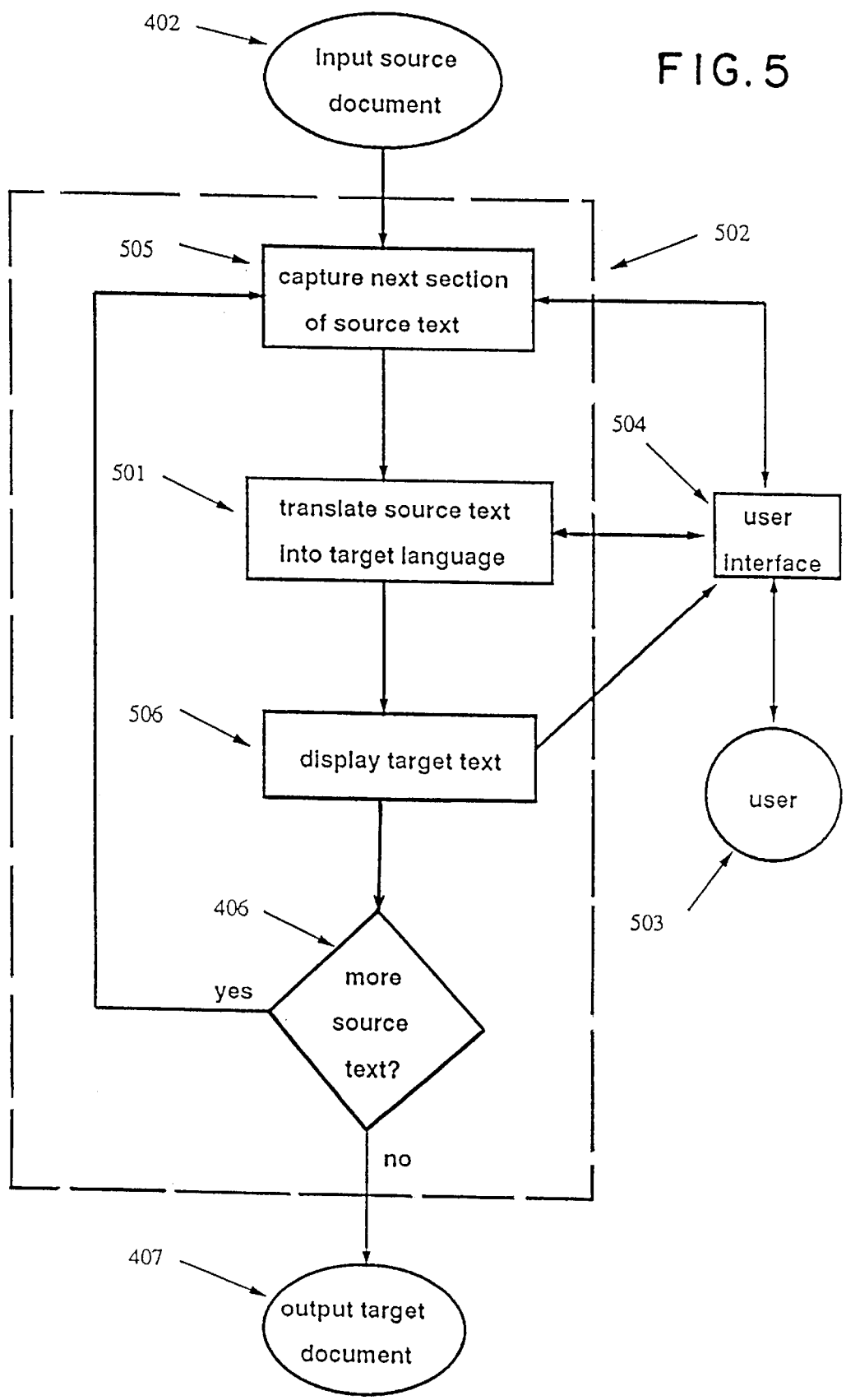
FIG. 5 is a schematic flow diagram of a basic system operating in user-aided mode.

FIG. 5 depicts schematically a preferred embodiment of a user-aided translation system 502 which assists a user 503 in the translation of text. The system is similar to the batch translation system 401 depicted FIG. 4. Step 505 measures, receives, or otherwise captures a portion of source text with possible input from the user. Step 506 displacs the text directly to the user and may also output it to an electric media, made available to at least one of a listening and viewing operation or elsewhere. In the user-aided system 502 the step 404 of the batch system 401 is replaced by step 501 in which source text is translated into the target language with input from the user 503. In the embodiment depicted in FIG. 5, the system 502 is accompanied by a user-interface 504 which includes a text editor or the like, and which makes available to the user translation dictionaries, thesauruses, and other information that may assist the user 503 in selecting translations and specifying constraints. The user can select and further edit the translations produced by the system.

In step 505 in FIG. 5, the user-aided system, portions of source text may be selected by the user. The user might, for example, select a whole document, a sentence, or a single word. The system might then show the users possible translations of the selected portion of text. For example, if the user selected only a single word the system might show a ranked list of possible translations of that word. The ranks being determined by statisical models that would be used to estimate the probabilities that the source word translates in various manners in the source context in which the source word appears.

In step 506 in FIG. 5 the text may be displayed for the user in a variety of fashions. A list of possible translations may be displayed in a window on a screen, for example. Another possibility is that possible target translations of source words may be positioned above or under the source words as they appear in the context of the source text. In this way the source text could be annotated with possible target translations The user could then read the source text with the help of the possible translations as well as pick and choose various translations.

Figure 6:
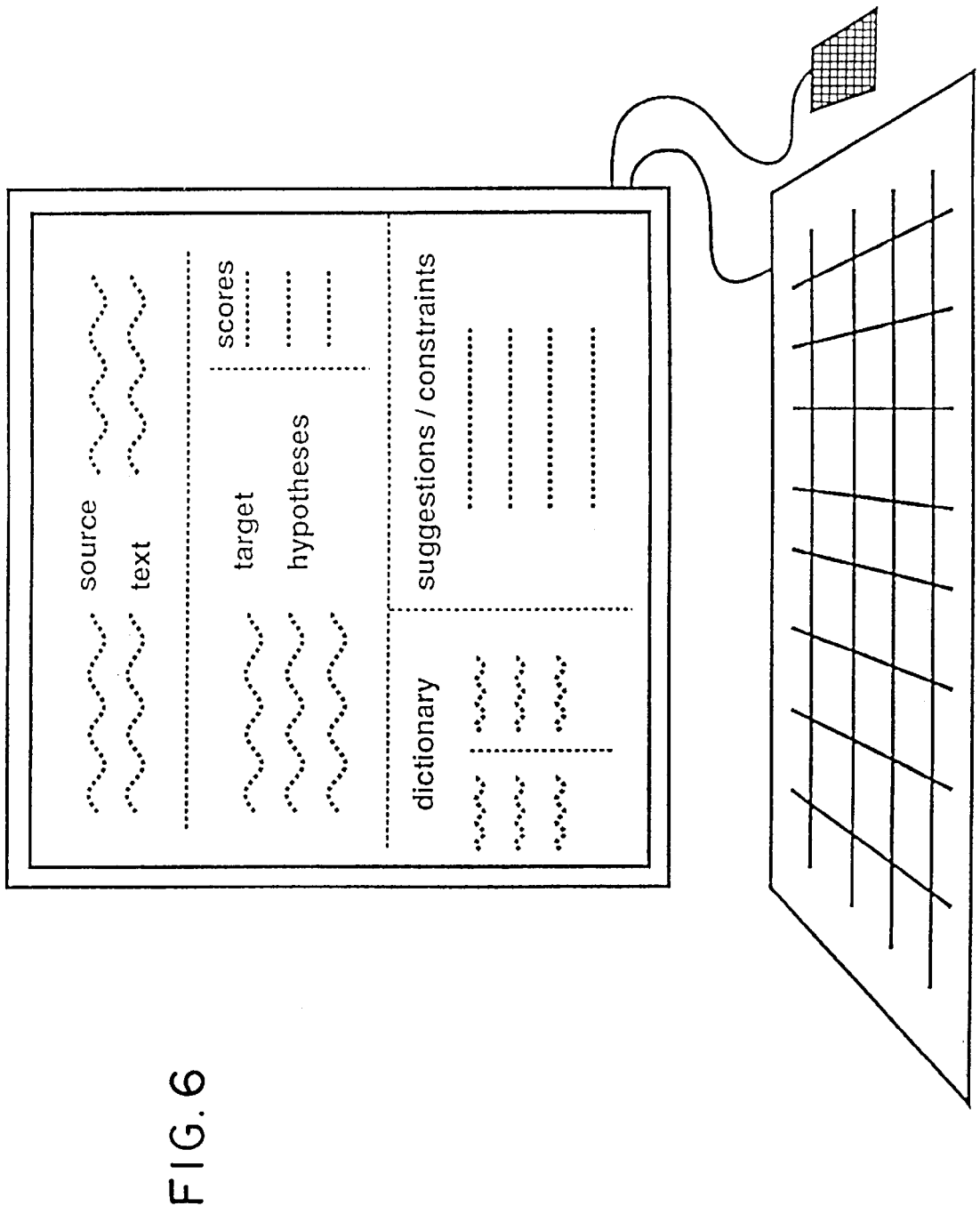
FIG. 6 is a schematic representation of a work station environment through which a user interfaces with a user-aided system.

A schematic representation of a work station environment, through which the a interfaces with a user-aided system is shown in FIG. 6.

Figure 7:
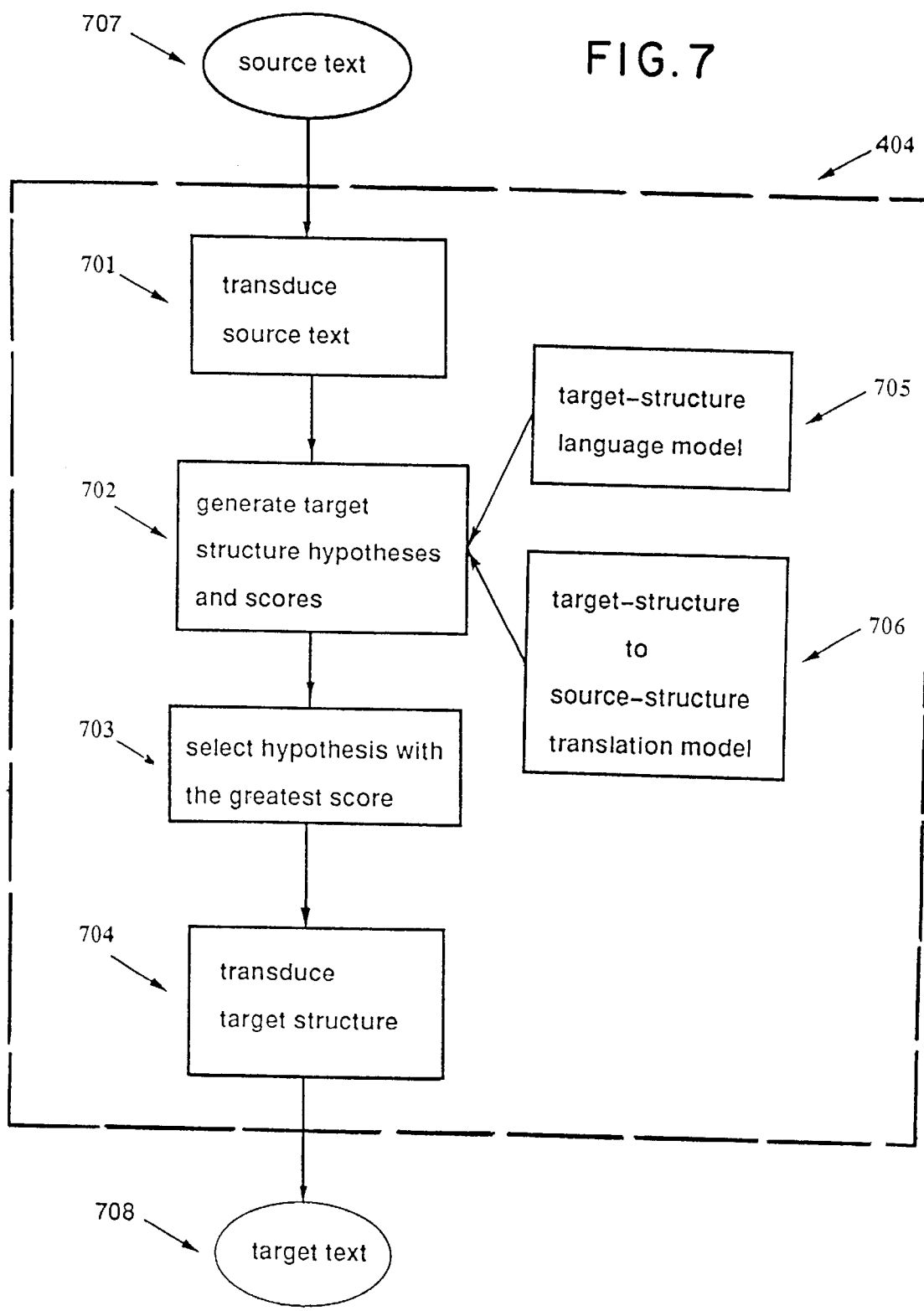
FIG. 7 is a schematic flow diagram of a translation component of a batch system.

FIG. 7 depicts in more detail the step 404 of the batch translation system 401 depicted in FIG. 4. The step 404 is expanded into four steps. In the first step 701 the input source text 707 is transduced to one or more intermediate source structures. In the second step 702 a set of one or more hypothesized target structures are generated. This step 702 makes use of a language model 705 which assigns probabilities or scores to target structures and a translation model 706 which assigns probabilities or scores to source structures given target structures. In the third step 703 the highest scoring hypothesis is selected. In the fourth step 704 the hypothesis selected in step 703 is transduced into text in the target language 708.

Figure 8:
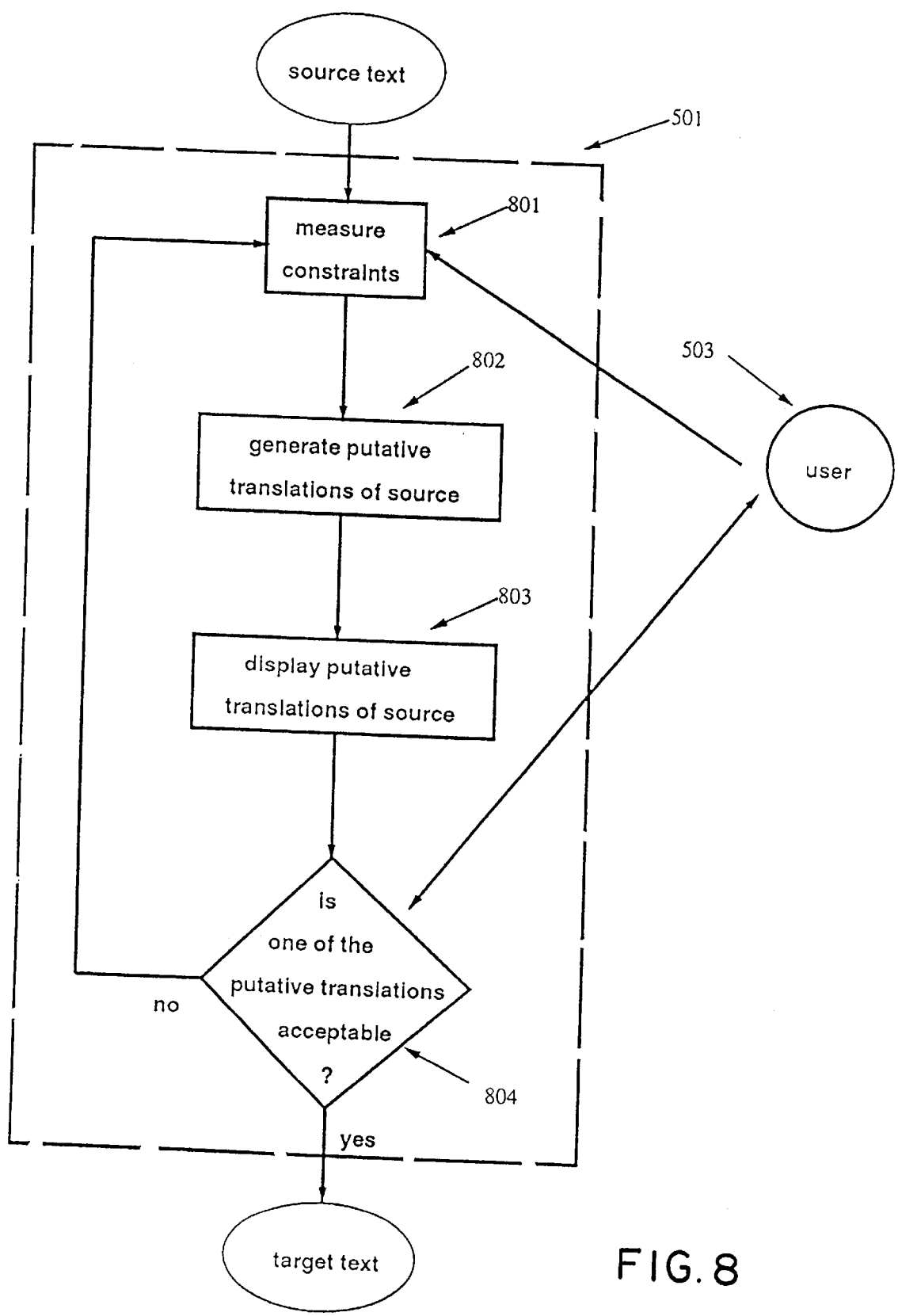
FIG. 8 is a schematic flow diagram illustrating a user's interaction with a human-aided system.

FIG. 8 depicts in more detail the step 501 of the user-aided translation system 502 depicted in FIG. 5 (the user interface has been omitted for simplification). The step 501 is expanded into four steps. In the first step 801 the user 503 is asked to supply zero or more translation constraints or hints. These constraints are used in subsequent steps of the translation process.

In the second step 802 a set of putative translations of the source text is produced. The word putative is used here, because the system will produce a number of possible translations of a given portion of text. Some of these will be legitimate translations only in particular circumstances or domains, and others may simply be erroneous. In the third step these translations are displayed or otherwise made available to the user. In the fourth step 804, the user 503 is asked either to select one of the putative translations produced in step 803, or to specify further constraints. If the user 503 chooses to specify further constraints the system returns to the first step 801. Otherwise the translation selected by the user 503 is displayed or otherwise made available for viewing or the like.

Figure 9:
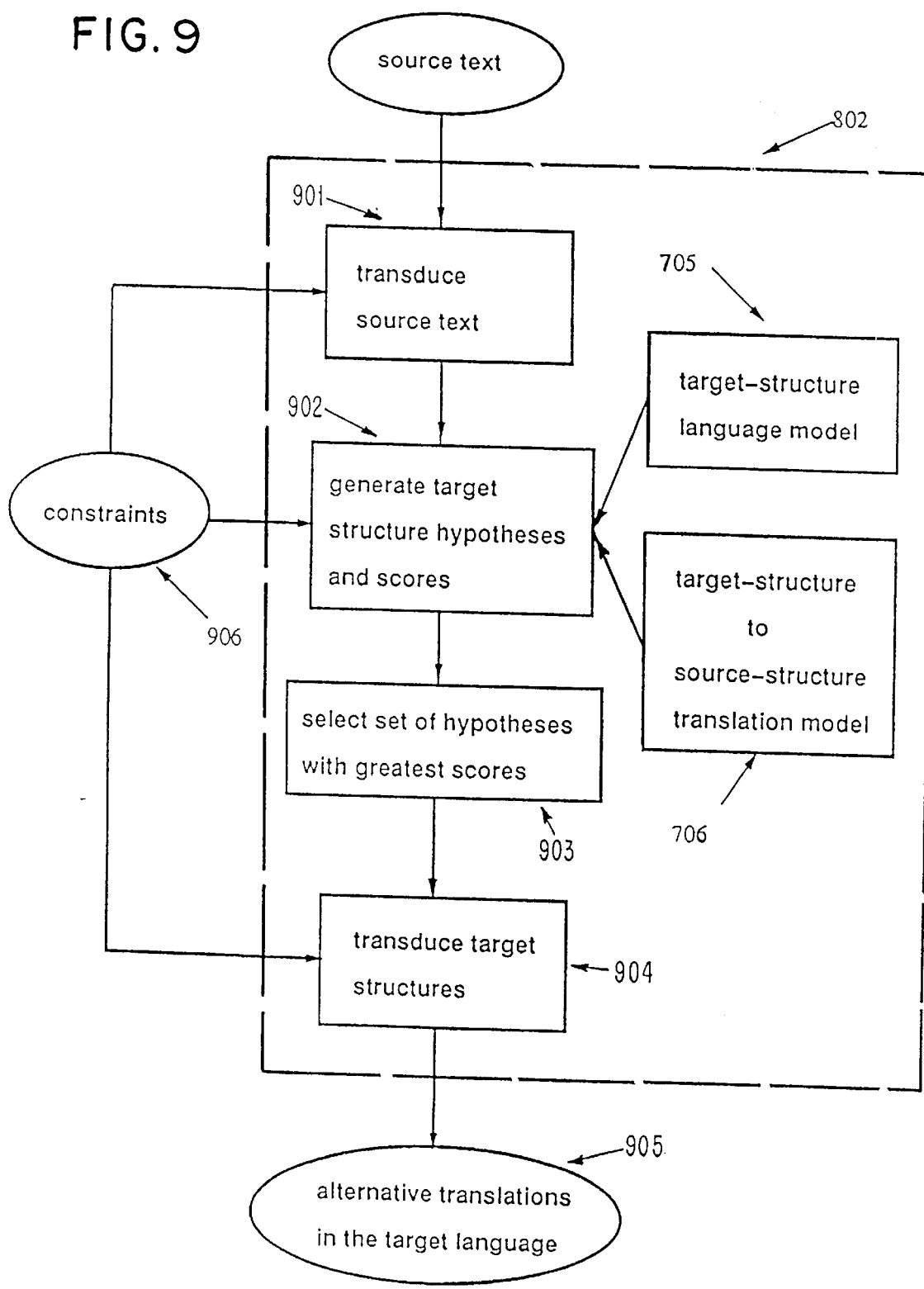
FIG. 9 is a schematic flow diagram of a translation component of a human-aided system.

FIG. 9 depicts in more detail the step 802 of FIG. 8 in which a set of putative translations is generated. The step 802 is expanded into four steps. In the first step 901, the input source text is transduced to one or more intermediate target structures. This step is similar to step 701 of FIG. 7 except that here the transduction takes place in a manner which is consistent with the constraints 906 which have been provided by the user 503. In the second step 902, a set of one or more hypotheses of target structures is generated. This step is similar to step 702 except that here only hypotheses consistent with the constraints 906 axe generated. In the third step 903 a set of the highest scoring hypotheses is selected. In the fourth step 904 each of the hypotheses selected in step 903 is transduced into text in the target language. The sections of text in the target language which result from this step are the output of this module.

A wide variety of constraints may be specified in step 801 of FIG. 8 and used in the method depicted in FIG. 9. For example, the user 503 may provide a constraint which affects the generation of target hypotheses in step 902 by insisting that a certain source word be translated in a particular fashion. As another example, he may provide a constraint which affects the transduction of source text into an intermediate structure in step 901 by hinting that a particular ambiguous source word should be assigned a particular part of speech. As other examples, the user 503 may a) insist that the word 'transaction' appear in the target text; b) insist that the word 'transaction' not appear in the target text; c) insist that the target text be expressed as a question, or d) insist that the source word 'avoir' be translated differently from the way it was translated in the fifth putative translation produced by the system. In other embodiments which transduce source text into parse trees, the user 503 may insist that a particular sequence of source words be syntactically analyzed as a noun phrase. These are just a few of many similar types of examples. In embodiments in which case frames are used in the intermediate source representation, the user 503 may insist that a particular noun phrase fill the donor slot of the verb 'to give'. These constraints can be obtained from a simple user interface, which someone skilled in the art of developing interfaces between users and computers can easily develop.

Steps 702 of FIG. 7 and 902 of FIG. 9 both hypothesize intermediate target structures from intermediate source structures produced in previous steps.

In the embodiments described here, the intermediate source and target structures are sequences of morphological units, such as roots of verbs, tense markers, prepositions and so forth. In other embodiments these structures may be more complicated. For example, they may comprise parse trees or case-frame representations.structures. In a default condition, these structures may be identical to the original texts. In such a default condition, the transductions steps are not necessary and can be omitted.

In the embodiments described here, text in the target language is obtained by transducing intermediate target structures that have been hypothesized in previous steps. In other embodiments, text in the target language can be hypothesized directly from source structures. In these other embodiments steps 704 and 904 are not necessary and can be omitted.

Figure 10:
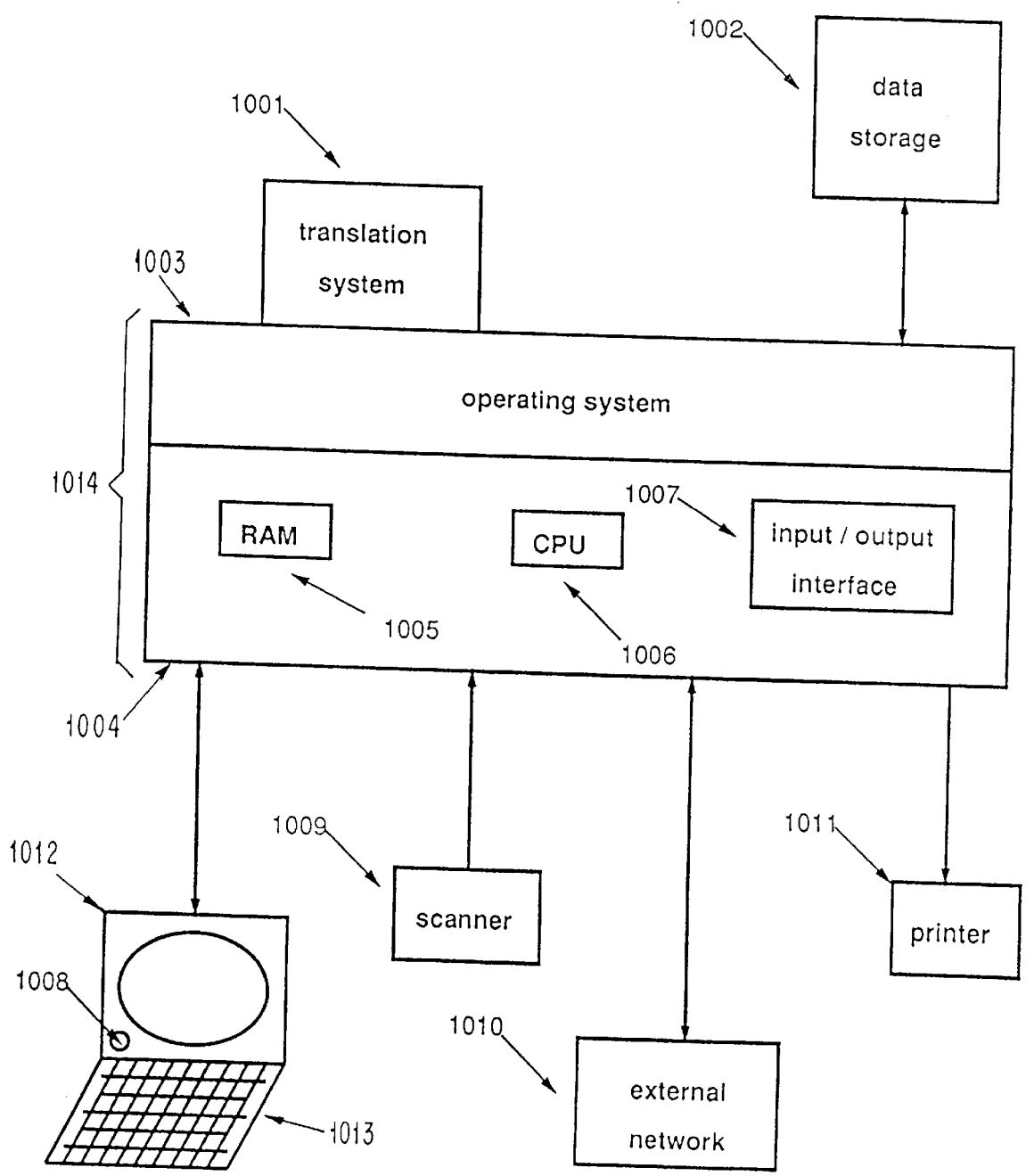
FIG. 10 is a schematic block diagram of a basic hardward components used in a preferred embodiment of the present invention.

An example of a workstation environment depicting a hardware implementation using the translation system (application) in connection wnith the present invention is shown in FIG. 10. A computer platform 1014 includes a hardware unit 1004, which includes a central processing unit (CPU) 1006, a random access memory (RAM) 1005, and an input/output interface 1007. The RAM 1005 is also called main memory.

The computer platform 1014 typically includes an operating system 1003. A data storage device 1002 is also called a secondary storage and may include hard disks and/or tape drives and their equivalents. The data storage device 1002 represents non-volatile storage. The data storage 1002 may be used to store data for the language and translation models components of the translation system 1001.

Various peripheral components may be connected to the computer platform 1014, such as a terminal 1012, a microphone 1008, a keyboard 1013, a scanning device 1009, an external network 1010, and a printing device 1011. A user 503 may interact with the translation system 1001 using the terminal 1012 and the keyboard 1013, or the microphone 1008, for example. As another example, the user 503 might receive a document from the external network 1010, translate it into another language using the translation system 1001, and then send the translation out on the external network 1010.

In a preferred embodiment of the present invention, the computer platform 1014 includes an IBM System RS/6000 Model 550 workstation with at least 128 Megabytes of RAM. The operating system 1003 which runs thereon is IBM AIX (Advanced Interactive Executive) 3.1. Many equivalents to the this structure will readily become apparent to those skilled in the art.

The translation system can receive source text in a variety of known manners. The following are only a few examples of how the translation system receives source text (e.g. data), to be translated. Source text to be translated may be directly entered into the computer system via the keyboard 1013. Alternatively, the source text could be scanned in using the scanner 1009. The scanned data could be passed through a character recognizer in a known manner and then passed on to the translation system for translation. Alernatively, the user 503 could identify the location of the source text in main or secondary storage, or perhaps on, removable secondary storage (such as on a floppy disk), the computer system could retrieve, and then translate the text accordingly. As a final example, with the addition of a speech. recognition component, it would also be possible to speak into the microphone 1008, have the speech converted into source text by the speech recognition component.

Translated target text produced by the translation application running on the computer system may be output by the system in a variety of known manners. For example, it may be displayed on the terminal 1012, stored in RAM 1005, stored data storage 1002, printed on the printer 1011, or perhaps transmitted out over the external network 1010. With the addition of a speech synthesizer it would also be possible to convert translated target text into speech in target language.

Step 403 in FIG. 4 and step 505 in FIG. 5 measure, receive or otherwise capture a portion of source text to be translated. In the context of this invention, text is used to refer to sequences of characters, formatting codes, and typographical marks. It can be provided to the system in a number of different fashions, such as on a magnetic disk, via a computer network, as the output of an optical scanner, or of a speech recognition system. In some preferred embodiments, the source text is captured a sentence ant a time. Source text is parsed into sentences using a finite-state machine which examines the text for such things as upper and lower case characters and sentence terminal punctuation. Such a machine can easily be constructed by someone skilled in the art. In other embodiments, text may be parsed into units such as phrases or paragraphs which are either smaller or larger than individual sentences.

3 Source Transducers

In this section, some embodiments of the the source-transducer 701 will be explained. The role of this transducer is to produce one or more intermediate source-structure representations from a portion of text in the source language.

3.1 Overview

Figure 11:
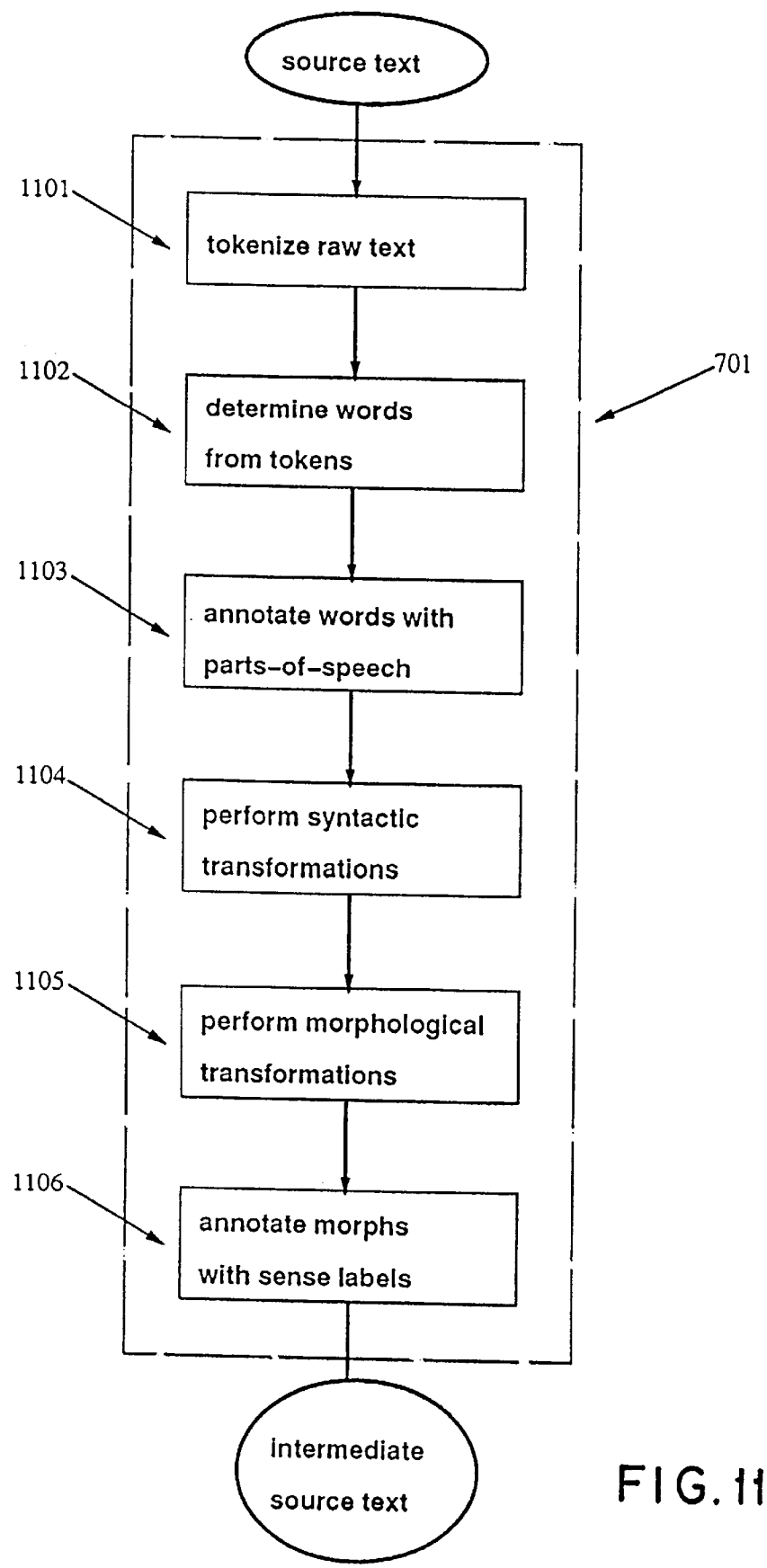
FIG. 11 is a schematic flow diagram of a source transducer.

An embodiment of the source-transducer 701 is shown in FIG. 11. In this embodiment, the transducer takes as input a sentence in the source language and produces a single intermediate source-structure consisting of a sequence of linguistic morphs. This embodiment of the source-transducer 701 comprises transducers that:

tokenize raw text 1101;

determine words from tokens 1102;

annotate words with parts of speech 1103;

perform syntactic transformations 1104;

perform morphological transformations 1105;

annotate morphs with sense labels 1106.

It should be understood that FIG. 11 represents only one embodiment of the source-transducer 701. Many variations are possible. For example, the transducers 1101, 1102, 1103, 1104, 1105, 1106 may be augmented and/or replaced by other transducers. Other embodiments of the source-transducer 701 may include a transducer that groups words into compound words or identifies idioms. In other embodiments, rather than a single intermediate source-structure being produced for each source sentence, a set of several intermediate source-structures together with probabilities or scores may be produced. In such embodiments the transducers depicted in FIG. 11 can be replaced by transducers which produce at each stage intermediate structures with probabilities or scores. In addition, the intermediate source-structures produced may be different. For example, the intermediate structures ma; be entire parse trees, or case frames for the sentence, rather than a sequence of morphological units. In these cases, there may be more than one intermediate source-structure for each sentence with scores, or there may be only a single intermediate source-structure.

3.2 Components

Referring still to FIG. 11, the transducers comprising the source-transducer 701 will be explained. For concreteness, these transducers will be discussed in cases in which the source language is either English or French.

3.2.1 Tokenizing Transducers

The purpose of the first transducer 1101, which tokenizes raw text, is well illustrated by the following Socratic dialogue:

How do you find words in text?

Words occur between spaces.

What about "however,"? Is that one word or two?

Oh well, you have to separate out the commas.

Periods too?

Of course.

What about "Mr."?

Certain abbreviations have to be handled separately.

How about "shouldn't"? One word or two?

One.

So "shouldn't" is different from "should not"?

Yes.

And "Gauss-Bonnet", as in the "Gauss-Bonnnet Theorem"?

Two names, two words.

So if you split words at hyphens, what do you do with "vis-à-vis"? One word, and don't ask me why.

How about "stingray"?

One word, of course.

And "manta ray"?

One word: it's just like stingray.

But there's a space.

Too bad.

How about "inasmuch as"?

Two.

Are you sure?

No.

This dialogue illustrates that there is no canonical way of breaking a sequence of characters into tokens. The purpose of the transducer 1101, that tokenizes raw text, is to make some choice.

In an embodiment in which the source-language is English, this tokenizing transducer 1101 uses a table of a few thousand special character sequences which are parsed as single tokens and otherwise treat spaces and hyphens as word separators. Punctuation marks and digits are separated off and treated as individual words. For example, 87, is tokenized as the three words 8 7 and,.

In another embodiment in which the source-language is French, the tokenizing transducer 1101 operates in a similar way. In addition to space and hyphen, the symbol -t- is treated as a separator when tokenizing French text.

3.2.2 Token-Word Transducers

Figure 12:
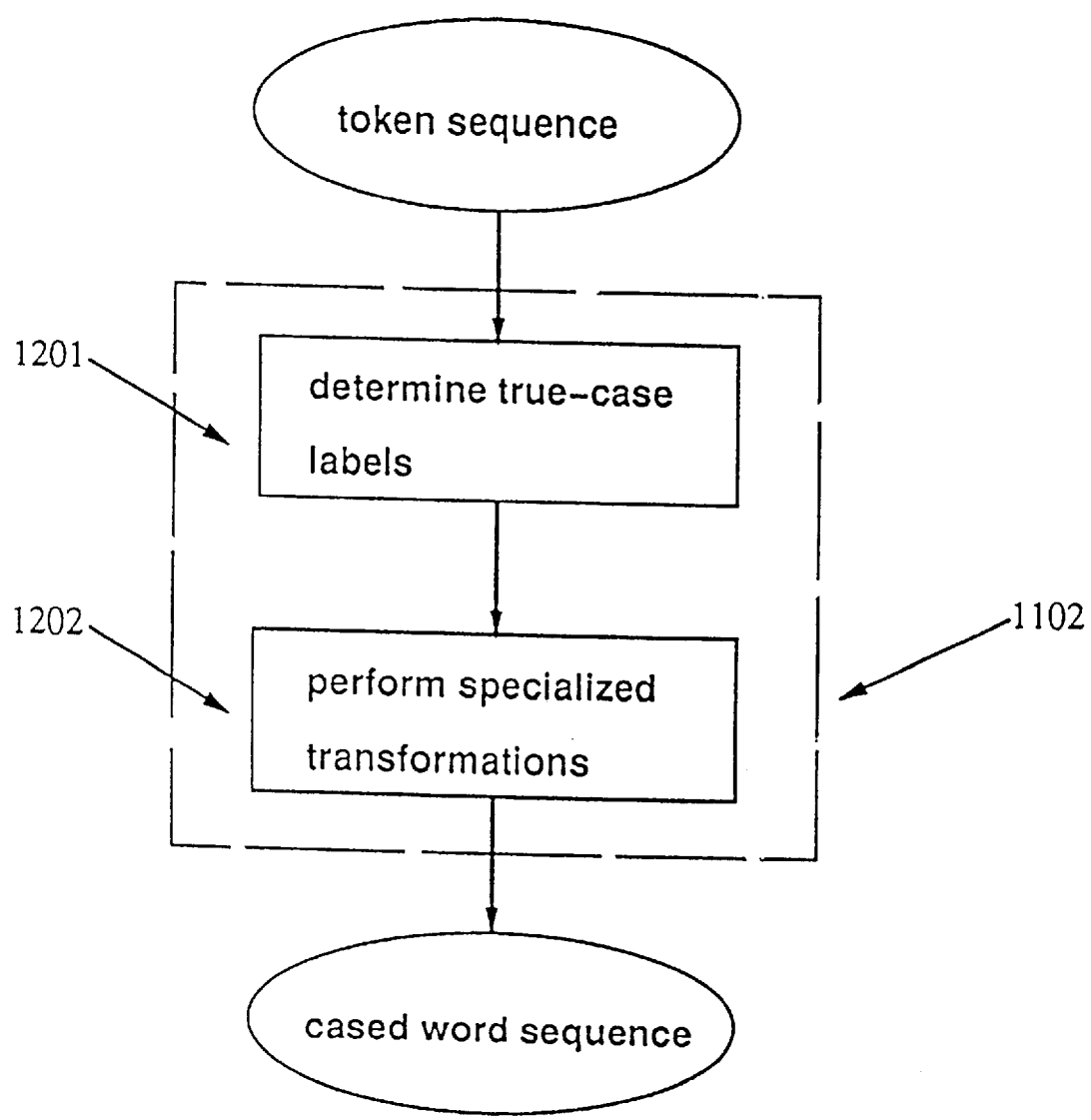
FIG. 12 is a schematic flow diagram of a token-to-word transducer.

The next transducer 1102 determines a sequence of words from a sequence of token spellings. In some embodiments, this transducer comprises two transducers as depicted in FIG. 12. The first of these transducers 1201 determines an underlying case pattern for each token in the sequence. The second of these transducers 1202 performs a number of specialized transformations. These embodiments can easily be modified or enhanced by a person skilled in the art.

3.2.3 True-Case Transducers

The purpose of a true-case transducer 1201 is made apparent by another Socratic dialogue:

When do two sequences of characters represent the same word?

When they are the same sequences.

So, "the" and "The" are different words?

Don't be ridiculous. You have to ignore differences in case.

So "Bill" and "bill" are the same word?

No, "Bill" is a name and "bill" is something you pay. With proper names the case matters.

What about the two "May"'s in "May I pay in May?"

The first one is not a proper name. It is capitalized because it is the first word in the sentence.

Then, how do you know when to ignore case and when not to?

If you are human, you just know.

Computers don't know when case matters and when it doesn't. Instead, this determination can be performed by a true-case transducer 1201. The input to this transducer is a sequence of tokens labeled by a case pattern that specifies the case of each letter of the token as it appears in printed text. These case patterns are corrupted versions of true-case patterns that specify what the casing would be in the absence of typographical errors and arbitrary conventions (e.g., capitalization at the beginning of sentences). The task of the true-case transducer is to uncover the true-case patterns.

In some embodiments of the true-case transducer the case and true-case patterns are restricted to eight possibilities

| | | | | | | | |
|---|---|---|---|---|---|---|---|
| L⁺ | U⁺ | UL⁺ | ULUL⁺ | ULLUL⁺ | UUL⁺ | UUUL⁺ | LUL⁺ |

Here U denotes an upper case letter, L a lower case letter, U⁺ a sequence of one or more upper case letters, and L⁺ a sequence of one or more lower case letters. In these embodiments, the true-case transducer can determine a true-case of an occurrence of a token in text using a simple method comprising the following steps:

1. Decide whether the token is part of a name. If so, set the true-case equal to the most probable true-case beginning with a U for that token.
2. If the token is not part of a name, then check if the token is a member of a set of tokens which have only one true-case. If so, set the trule-case appropriately.
3. If the true-case has not been determined by steps 1 or 2, and the token is the first token in a sentence then set the true-case equal to the most probable true-case for that token.
4. Otherwise, set the true-case equal to the case for that token.

In an embodiment of the true-case transducer used for both English and French, names are recognized with a simple finite-state machine. This machine employs a list of 12,937 distinct common last names and 3,717 distinct common first names constructed from a list of 125 million full names obtained from the IBM online phone directory and a list of names purchased from a marketing corporation. It also uses lists of common precvrsors to names (such as Mr., Mrs., Dr., Mlle., etc.) and common followers to names (such as Jr., Sr., III, etc).

The set of tokens with only one true-case consists of all tokens with a case-pattern entropy of less than 1.25 bits, together with 9,506 Number of records in (o+p)8260.lcwtab English and 3,794 records in r8260.coerce(a+b+c) French tokens selected by hand from the tokens of a large bilingual corpus. The most probable case pattern for each English token was determined by counting token-case cooccurences in a 67 million word English corpus, and for each French token by counting cooccurences in a 72 million word French corpus. (In this coimting occurrences at the beginnings of sentences are ignored).

3.2.4 Specialized Transformation Transducers

Referring still to FIG. 12, the transducer 1202 performs a few specialized transformations designed to systematize the tokenizing process. These transformations can include, but are not limited to, the correction of typographical errors, the expansion of contractions, the systematic treatment of possessive, etc. In one embodiment of this transducer for English, contractions such as don't are expanded to do not, and possessives such as John's and nurses' are expanded to John 's and nurses '. In one embodiment of this transducer for French, sequences such as s'il, qu'avez, and j'adore are converted to pairs of tokens such as Si il, que avez, and je adore. In addition, a few thousand sequences such as afin de are contracted to strings such as afin_de. These sequences are obtained from a list compiled by a native French speaker who felt that such sequences should be treated as individual words. Also the four strings au, aux, du, and des are expanded to à le, à les, de le, and de les respectively.

3.2.5 Part-of-Speech Labeling Transducers

Referring again to FIG. 11, the transducer 1103 annotates words with part-of-speech labels. These labels are used by the subsequent transducers depicted the figure. In some embodiments of transducer 1103, part-of-speech labels are assigned to a word sequence using a technique based on hidden Markov models. A word sequence is assigned the most probable part-of-speech sequence according to a statistical model, the parameters of which are estimated from large annotated texts and other even larger un-annotated texts. The technique is fully explained in article by Bernard Merialdo entitled 'Tagging text with a Probabilistic Model' in the *Proceedings of the International Conference on Acoustics, Speech, and Signal Processing,* May 14–17, 1991. This article is incorporated by reference herein.

In an embodiment of the transducer 1103 for tagging of English, a tag set consisting of 163 parts of speech is used. A rough categorization of these parts of speech is given in Table 1.

In an embodiment of this transducer 1103 for the tagging of French, a tag set consisting of 157 parts of speech is used. A rough categorization of these parts of speech is given in Table 2.

TABLE 1

Parts of Speech for English

| |
|---|
| 29 Nouns |
| 27 Verbs |
| 20 Pronouns |
| 17 Determiners |
| 16 Adverbs |
| 12 Punctuation |
| 10 Conjunctions |
| 8 Adjectives |
| 4 Prepositions |
| 20 Other |

TABLE 2

Parts-of-Speech for French

| |
|---|
| 105 Pronouns |
| 26 Verbs |
| 18 Auxiliaries |
| 12 Determiners |
| 7 Nouns |
| 4 Adjectives |
| 4 Adverbs |
| 4 Conjunctions |
| 2 Prepositions |
| 2 Punctuation |
| 12 Other |

3.2.6 Syntactic Transformation Transducers

Referring still to FIG. 11, the transducer 1104, which performs syntactic transformations, will be described.

One function of this transducer is to simplify the subsequent morphological transformations 1105. For example, in morphological transformations, verbs may be analyzed into a morphological unit designating accidence followed by another unit designating the root of the verb. Thus in French, the verb ira might be replaced by 3s_future_indicative alter, indicating that ira is the third person singular of the future tense of alter. The same kind of transformation can be performed in English by replacing the sequence will go by future_indicative to_go. Unfortunately, often the two words in such a sequence are separated by intervening words as in the sentences:

will he go play in the traffic?

he will not go to church.

Similarly, in French the third person of the English verb went is expressed by the two words est allé, and these two words can be separated by intervening words as in the sentences:

est-t-il allé?

Il n'est pas allé.

It is possible to analyze such verbs morphologically with simple string replacement rules if various syntactic transformations that move away intervening words are performed first.

A second function of the syntactic transducer 1104 is to make the task presented to the statistical models which generate intermediate target-structures for an intermediate sourcestructure as easy as possible. This is done by performing transformations that make the forms of these structures more similar. For example, suppose the source language is English and the target language is French. English adjectives typically precede the nouns they modify whereas French adjectives typically follow them. To remove this difference, the syntactic transducer 1104 includes a transducer which moves French words labeled as adjectives to positions proceeding the nouns which they modify.

These transducers only deal with the most rudimentary linguistic phenomena. Inadequacies and systematic problems with the transformations are overcome by the statistical models used later in the target hypothesis-generating module 702 of the invention. It should be understood that in other embodiments of the invention more sophisticated schemes for syntactic transformations with different functions can be used.

The syntactic transformations performed by the transducer 1104 are performed in a series of steps. A sequence of words which has been annotated with parts of speech is fed into the first transducer. This transducer outputs a sequence of words and a sequence of parts of speech which together serve as input to the second transducer in the series, and so forth. The word and part-of-speech sequences produced by the final transducer are the input to the morphological analysis transducer.

3.2.7 Syntactic Transducers for English

Figure 13:
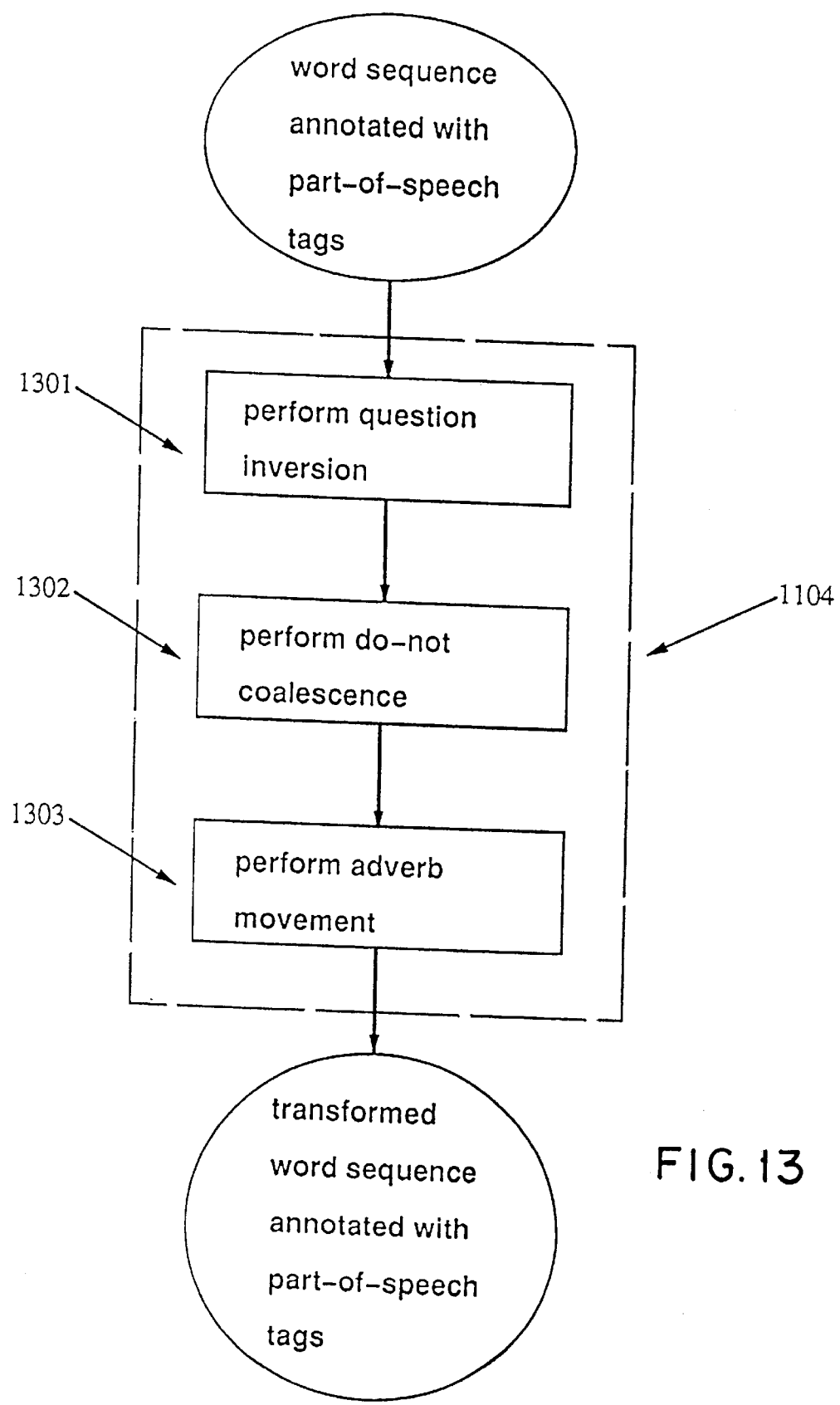
FIG. 13 is a schematic flow diagram of a syntactic transducer for English.

FIG. 13, depicts an embodiment of a syntactic transducer 1104 for English. Although in much of this document, examples are described in which the source language is French and the target language is English, here for reasons of exposition, an example of a source transducer for a source language of English is provided. In the next subsection, another example in which the source language is French is provided. Those with a basic knowledge of linguistics for other languages will be able to construct similar syntactic transducer for those languages.

The syntactic transducer in FIG. 13 is comprised of three transducer that perform question inversion 1301;

perform do-not coalescence 1302;

perform adverb movement 1303.

To understand the function of the transducer 1301 that performs question inversion, note that in English questions the first auxiliary verb is often separated by a noun phrase from the root of the verb as in the sentences:

does that elephant eat?

which car is he driving?

The transducer 1301 inverts the auxiliary verb with the subject of the sentence, and then converts the question mark to a special QINV marker to signal that this inversion has occurred. For example, the two sentences above are converted by this transducer to:

that elephant eats QINV which car he is driving QINV

This transducer also removes supporting do's as illustrated in the first sentence.

To understand the function of the transducer 1302 that performs do-not coalescence, note that in English, negation requires the presence of an auxiliary verb. When one doesn't exist an inflection of to do is used. The transducer 1302 coalesces the form of to do with not into the string do__not. For example, John does not like turnips.
→ John do__not like turnips.

The part of speech assigned to the main verb, like above, is modified by this transducer to record the tense and person of to do in the input. When adverbs intervene in emphatic sentences the do__not is positioned after the intervening adverbs:

John does really not like turnips.
→ John really do__not like turnips.

To understand the function of the final transducer 1303 that performs adverb movement, note that in English, adverbs often intervene between a verb and its auxiliaries. The transducer 1303 moves adverbs which intervene between a verb and its auxiliaries to positions following the verb. The transducer appends a number onto the adverbs it moves to record the positions from which they are moved. For example, Iraq will probably not be completely balkanized.
→ Iraq will__be__en to__balkanize probably__M2 not__M2 completely__M3.

An M2 is appended to both probably and to not to indicate that they originally preceded the second word in the verbal sequence will be balkanzized. Similarly, an M3 is appended to completely to indicate that it preceded the third word in the verbal sequence.

The transducer 1303 also moves adverbs that precede verbal sequences to positions following those sequences:

John really eats like a hog.
→ John eats really__M1 like a hog.

This is done in order to place verbs close to their subjects.

3.2.8 Syntactic Transducers for French

Figure 14:
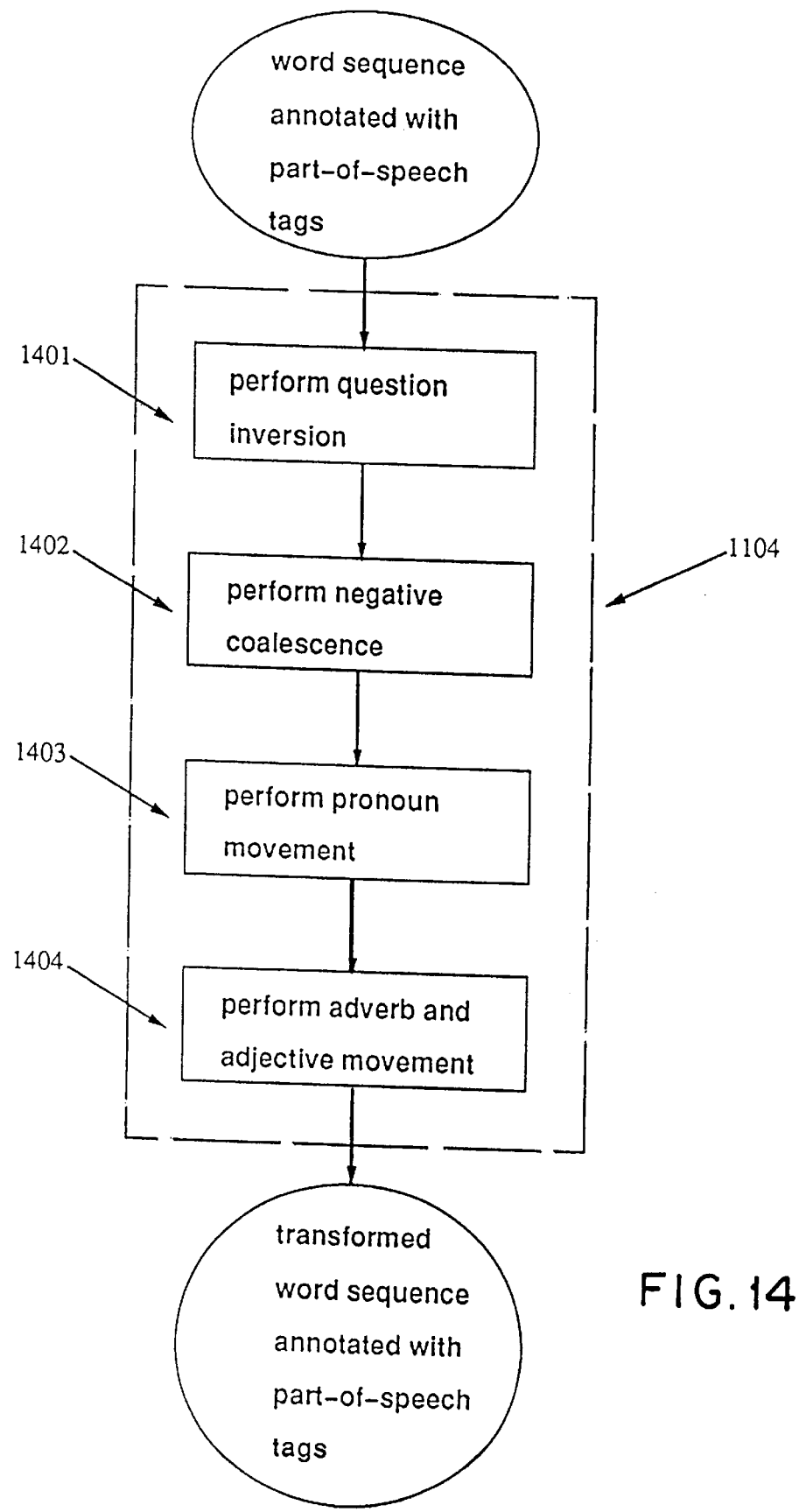
FIG. 14 is a schematic flow diagram of a syntactic transducer for French.

Referring now to FIG. 14, an embodiment of the syntactic transducer 1104 for French is described. This embodiment comprises four transducers that perform question inversion 1401;

perform discontinuous negative coalescence 1402;

perform pronoun movement 1403;

perform adverb and adjective movement 1404.

The question inversion transducer 1401 undoes French question inversion much the same way that the transducer 1301 undoes English question inversion:

mangez-vous des légumes?
→ vous mangez des légumes QINV
où habite-t-il?
→ où il habite QINV -continued

```
le lui avez-vous donné?
 → vous le lui avez donné QINV
```

This transducer 1401 also modifies French est-ce que questions:

```
est-ce qu'il mange comme un cochon?
 → il mange comme un cochon EST-CE_QUE
```

To understand the function of the transducer 1402, which performs negative coalescence, note that propositions in French are typically negated or restricted by a pair of words, ne and some other word, that surround the first word in a verbal sequence. The transducer 1402 moves the ne next to its mate, and then coalesces the two into a new word:

```
je ne sais pas.
 → je sais ne_pas.
Jean n'a jamais mangé comme un cochon.
 → Jean a ne_jamais mangé comme un cochon.
il n'y en a plus.
 → il y en a ne_plus.
```

To understand the function of the transducer 1403, which performs pronoun movement, note that in French, direct-object, indirect-object and reflexive pronouns usually precede verbal sequences. The transducer 1403 moves these pronouns to positions following these sequences. It also maps these pronouns to new words that reflect their roles as direct-object or indirect-object, or reflexive pronouns. So, for example, in the following sentence le is converted to le_DPRO because it functions as a direct object and vous to vous_IPRO because it functions as an indirect object:

```
je vous le donnerai.
 → je donnerai le_DPRO vous_IPRO.
```

In the next sentence, vous is tagged as a reflexive pronoun and therefore converted to

```
vous_RPRO.     vous vous lavez les mains.
 → vous lavez vous_RPRO les mains.
```

The allative pronominal clitic y and the ablative pronominal clitic en are mapped to the two-word tuples à y_PRO and de en_PRO:

```
je y penserai.
 → je penserai à y_PRO.
j'en ai plus.
 → je ai plus de en_PRO.
```

The final transducer 1404 moves adverbs to positions following the verbal sequences in which they occur. It also moves adjectives to positions preceding the nouns they modify. This is a useful step in embodiments of the present invention that translate from French to English, since adjectives typically precede the noun in English.

3.2.9 Morphological Transducers

Referring again to FIG. 11, a transducer 1105, which performs morphological transformations, will be described. One purpose of this transducer is to make manifest in the intermediate source-structure representation the fraternity of different forms of a word. This is useful because it allows for more accurate statistical models of the translation process. For example, a system that translates from French to English but does not use a morphological transducer can not benefit from the fact that sentences in which parle is translated as speaks provide evidence that parlé should be translated as spoken. As a result, parameter estimates for rare words are inaccurate even when estimated from a very large training sample. For example, even in a sample from the Canadian Parlement of nearly 30 million words of French text, only 24 of the 35 different spellings of single-word inflections of the verb parler actually occurred.

A morphological transducer 1104 is designed to ameliorate such problems. The output of this transducer is a sequence of lexical morphemes. These lexical morphemes will sometimes be referred to in this application as morphological units or simply morphs. In an embodiment of transducer 1104 used for English, inflection morphological transformations are performed. that make evident common origins of different conjugations of the same verb; the singular and plural forms of the same noun; and the comparative and superlative forms of adjectives and adverbs. In an embodiment of transducer 1104 used for French, morphological inflectional transformations are performed that make manifest the relationship between conjugations of the same verb; and forms of the same noun or adjective differing in gender and number are performed. These morphological transformations are reflected in the sequence of lexical morphemes produced. The examples below illustrate the level of detail in these embodiments of a morphological transducer 1104:

```
he was eating the peas more quickly than I.
 → he V_past_progressive to_eat the pea N_PLURAL quick
   er_ADV than I.
nous en mangeons rarement.
 → nous V_present_indicative_1p manager rare ment_ADV
   de en_PRO
ils se sont lavés les mains sales.
 → ils v_past_3p laver se_RPRO les sale main N_PLURAL.
```

3.2.10 Sense-Labelling Transducers

Referring again to FIG. 11, the transducer 1106, which annotates a lexical morph sequence produced by the transducer 1105 with part-of-speech labels, will be explained. Much of the allure of the statistical approach to transfer in machine translation is the ability of that approach to formally cope with the problem of lexical ambiguity. Unfortunately, statistical methods are only able to mount a successful attack on this problem when the key to disambiguating the translation of a word falls within the local purview of the models used in transfer.

Consider, for example, the French word prendre. Although prendre is most commonly translated as to take, it has a number of other less common translations. A trigram model oil English can be used to translate Je vais prendre la décision as I will make the decision because the trigram make the decision is much more common than the trigram take the decision. However, a trigram model will not be of much use in translating Je vais prendre ma propre décision as I will make my own decision because in this case take and decision no longer fall within a single trigram.

In the paper, "Word Sense Disambiguation using Statistical Methods" in the proceedings of the 29th Annual Meeting of the Association for Computational Linguistics, published in June of 1991 by the Association of Computational Linguistics and incorporated by reference herein, a description is provided of a method of asking a question about the context in which a word appears to assign that word a sense. The question is constructed to have high mutual information with the translation of that word in its context. By modifying the lexical entries that appear in a sequence of morphemes to reflect the senses assigned to these entries, informative global information can be encoded locally and thereby made available to the statistical models used in transfer.

Although the method described in the aforementioned paper assigns senses to words, the same method applies equally well to the problem of assigning senses to morphemes, and is, used here in that fashion. This transducer 1106, for example maps prendre to prend_1 in the sentence Je vais prendre ma propre voiture.
but to prendre_2 in the sentence Je vais prendre ma propre décision.
It should be understood that other embodiments of the sense-labelling transducer are possible. For example, the sense-labelling can be performed by asking not just a single question, about the context but a sequence of questions arranged in a decision tree.

3.3 Source-Transducers with Constraints

In some embodiments, such as that depicted in FIG. 9, a source-structure transducer, such as that labelled 901, accepts a set of constraints that restricts its transformations source text to an intermediate target structure in source text.

Such constraints include, but are not limited to,

- requiring that a particular phrase be translated as a certain linguistic component of a sentence, such a noun-phrase;
- requiring that a source word be labelled as a certain part-of-speech such as a verb or determiner;
- requiring that a source word be morphologically analyzed a certain way;
- requiring that a source word be annotated with a particular sense label;
- in embodiments in which the intermediate structure encodes parse-tree or case-frame information, requiring a certain parse or case-frame structure for a sentence; morphcologically analyzed in a particular way, or be annotated with a particular sense-label, A source-transducer accepting such constraints in similar to source transducers as described in this section. Based on the descriptions already given, such transducers can be constructed by a person with a computer science background and skilled in the art.

4 Finite-State Transducers

This section provides a description of an embodiment of a mechanism by which the syntactic transductions in step 1104 and the morphological transductions in step 1105 are performed. The mechanism is described in the context of a particular example depicted in 15.. One with a background in computer science and skilled in the art of producing finite-state transducers can understand from this example how to construct syntactic and morphological transducers of the type described above.

The example transducer inverts questions involving do, does, and did. After steps 1101, 1102, and 1103, the source text Why don't You ever succeed? is transduced into parallel word and part-of-speech sequences 1501:

| why | do  | not | you | ever | succeed | ? |
|-----|-----|-----|-----|------|---------|---|
| RRQ | VD0 | XX  | PPY | RR   | VV0     | ? |

Here, RRQ and RR are adverb tags, VD0 and VV0 are verb tags, XX is a special tag for the word not, PPY is a pronoun tag, and ? is a special tag for a question mark.

The example transducer converts these two parallel sequences to the parallel word and part-of-speech sequences 1502:

| why | you | succeed | do_not_M0 | ever_M1 | QINV |
|-----|-----|---------|-----------|---------|------|
| RRQ | PPY | VV0     | XX        | RR      | QINV |

Here, QINV is a marker which records the fact that the original input sentence was question inverted.

Figure 16:
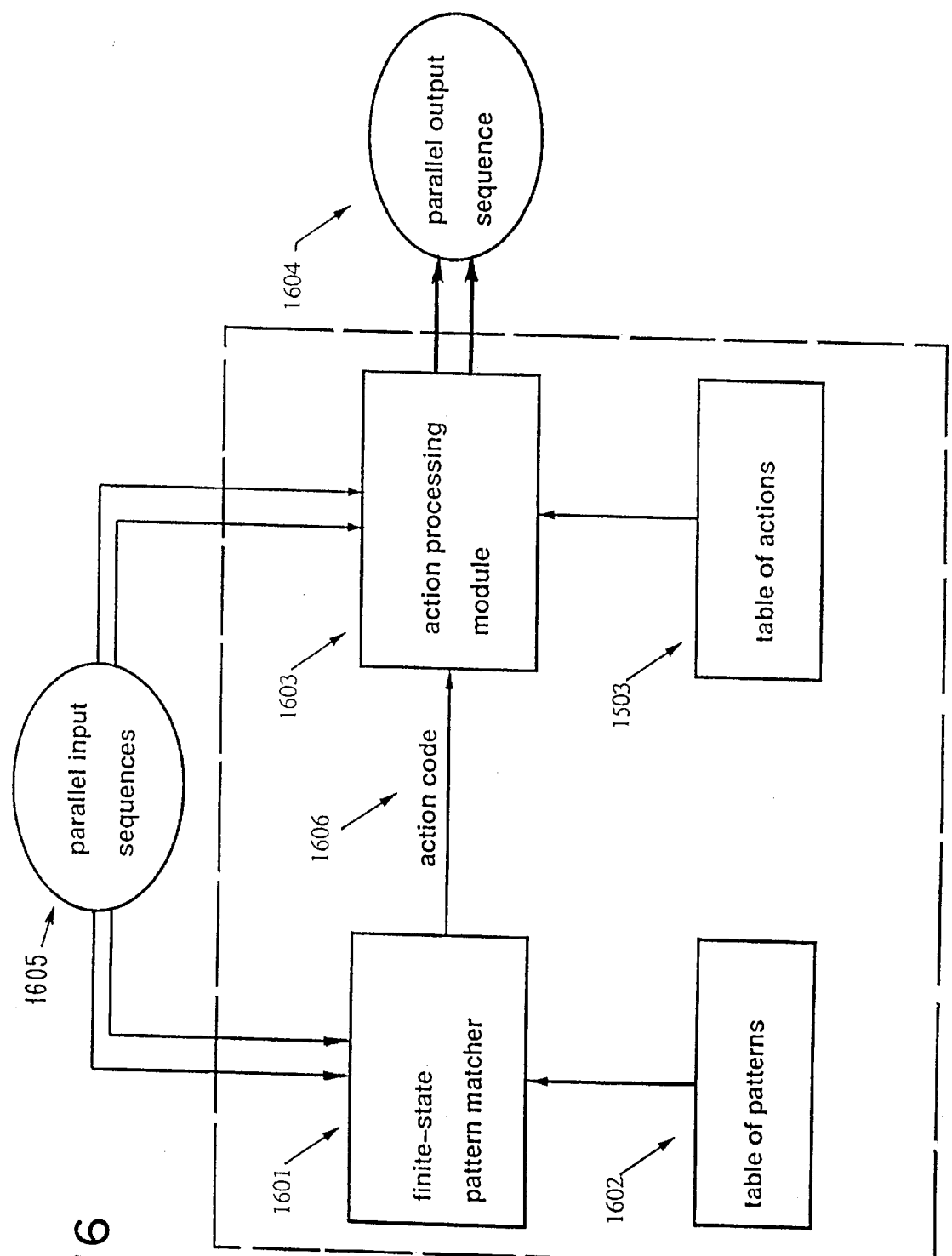
FIG. 16 is a schematic flow diagram illustrating the operation of a finite-state transducer.

A mechanism by which a transducer achieves this transformation is depicted in FIG. 16, and is comprised of four components:

- a finite-state pattern matcher 1601;
- an action processing module 1603;
- a table of patterns 1602;
- a table of action specifications 1503.

The transducer operates in the following way:

1. One or more parallel input sequences 1605 are captured by the finite-state pattern-matcher 1601;
2. The finite-state pattern-matcher compares the input sequences against a table of patterns 1602 of input sequences stored in memory;
3. A particular pattern is identified, and an associated action-code 1606 is transmitted to the action-processing module 1603;
4. The action-processing module obtains a specification of the transformation associated to this action code from a table of actions 1503 stored in memory;
5. The action-processing module applies the transformation to the parallel input streams to produce one or more parallel output sequences 1604;

The parallel input streams captured by the finite-state pattern matcher 1601 are arranged in a sequence of attribute tuples. An example of such a sequence is the input sequence 1501 depicted in FIG. 15. This sequence consists of a sequence of positions together with a set of one or more attributes which take values at the positions. A few examples of such attributes are the token attribute, the word attribute, the case-label attribute, the part-of-speech attribute, the sense-label attribute. The array of attributes for a given position will be called an attribute tuple.

Figure 15:
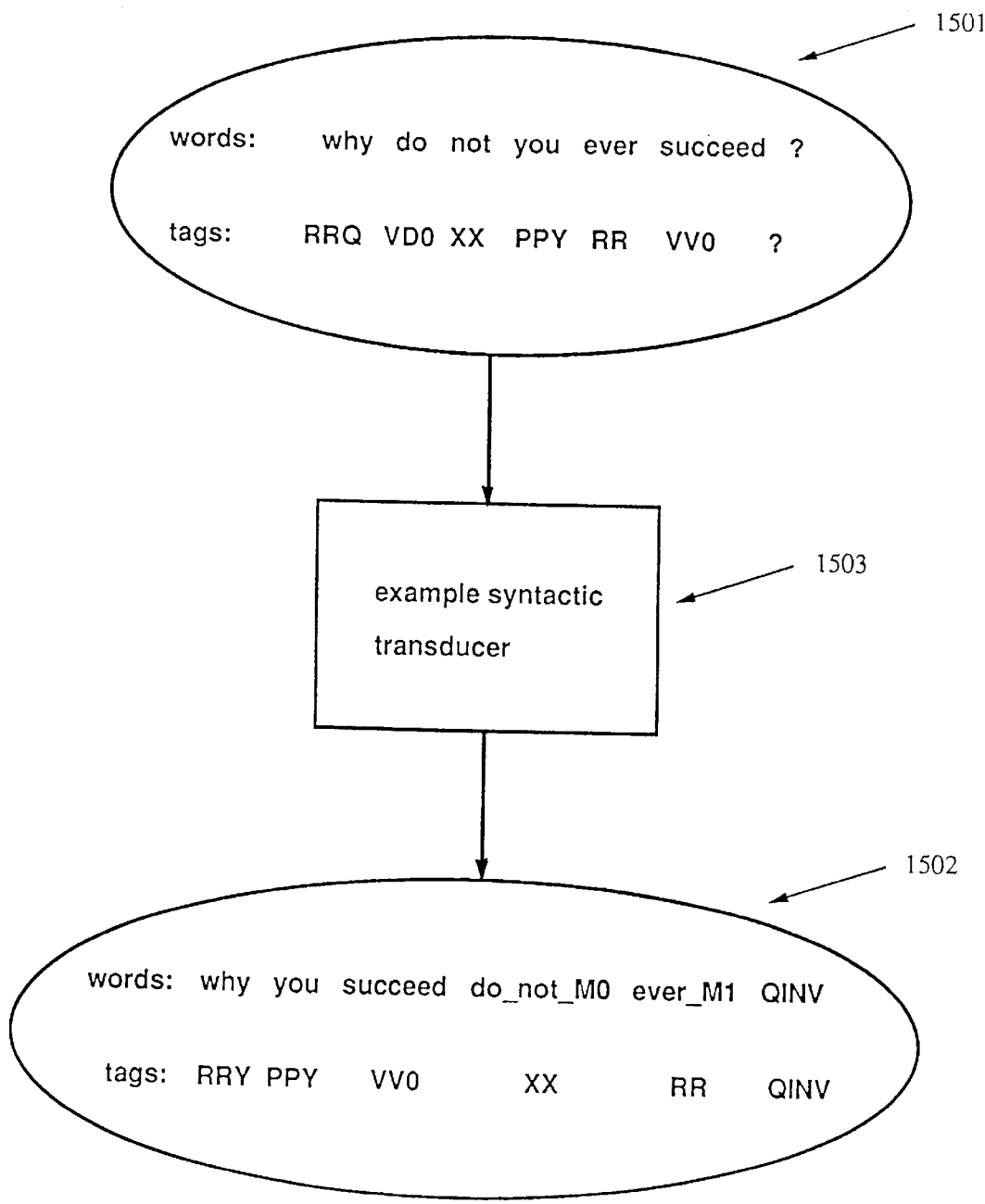
FIG. 15 is an example of a syntactic transduction.

For example, the input attribute tuple sequence 1501 in FIG. 15 is seven positions long and is made up of two dimensional attribute tuples. The first component of an attribute tuple at a given position refers to the word attribute. This attribute specifies the spellings of the words at given positions. For example, the first word in the sequence 1501 is why. The second component of an attribute tuple at a given position for this input sequence refers to a part-of-speech tag for that position. For example, the part of speech at the first position is RRQ. The attribute tuple at position 1 is thus the ordered pair why, RRQ.

The parallel output streams produced by the action processing module 1603 are also arranged as a sequence of attribute tuples. The number of positions in an output sequence may be different from the number of positions in an input sequence.

For example, the output sequence 1502 in FIG. 15, consists of six positions. Associated with each position is a two-dimensional attribute tuple, the first coordinate of which is a word attribute and the second coordinate of which is a part-of-speech attribute.

An example of a table of patterns 1602 is shown in FIG. 17. This table is logically divided into a number of parts or blocks.

Pattern-Action Blocks. The basic definitions of the matches to be made and the actions to be taken are contained in pattern-action blocks. A pattern-action block comprises of a list of patterns together with the name of actions to be invoked when patterns in an input attribute-tuple sequence 1605 are matched.

Auxiliary Pattern Blocks. Patterns that can be used as sub-patterns in the patterns of pattern-action blocks are defined in Auxtiliary Pattern blocks. Such blocks contain lists of labelled patterns of of attributes tuples. These labelled patterns do not have associated actions, but can be referenced by their name in the definitions of other patterns.

In FIG. 17 there is one Auxiliary Pattern block. This block defines four auxiliary patterns. The first of these has a name ADVERB and matches single tuple adverb-type constructions. The second has a name of BARE_NP and matches certain noun-phrase-type constructions. Notice that this auxiliary pattern makes use of the ADVERB pattern in its definition. The third and fourth auxiliary patterns match other types of noun phrases.

Set Blocks. Primary and auxiliary patterns allow for sets of attributes. In FIG. 17, for example, there is a set called DO_SET, of various forms of to_do, and another set PROPER_NOUN_TAG of proper-noun tags.

Patterns are defined in terms of regular expressions of attribute tuples. Any pattern of attribute tuples that can be recognized by a deterministic finite-state automata can be specified by a regular expression. The language of regular expressions and methods for constructing finite-state automata are well known to those skilled in computer science. A method for constructing a finite-state pattern matcher from a set of regular expressions is described in the article "LEX—A Lexical Analyzer Generator," written by Michael E. Lesk, and appearing in the Bell Systems Technical Journal, Computer Science Technical Report, Number. 39, published in Oct. of 1975.

Regular expressions accepted by the pattern matcher 1601 are described below.

Regular Expressions of Attribute Tuples: A regular expression of attribute tuples is a sequence whose elements are either 1. an attribute tuple;
2. the name of an auxiliary regular expression; or
3. a register name.

These elements can be combined using one of the logical operations:

| Operator | Meaning | Usage | Matches |
| --- | --- | --- | --- |
| . | concatenation | A.B | A followed by B |
| \| | union (i.e. or) | A\|B | A or B |
| * | 0 or more | A* | 0 or more A's |
| ? | 0 or 1 | A? | 0 or 1 A's |
| + | 1 or more | A+ | 1 or more A's |

Here A and B denote other regular expressions.

Examples of these logical operations are:

| Expression | Matches |
| --- | --- |
| A?.B.C | 0 or 1 A's followed by B then by C |
| (A*)\|(B+) | 0 or more A's or 1 or more B's |
| (A\|B).C | A or B, followed by C |

Attribute Tuples: The most common type of element in a regular expression is an attribute tuple. An attribute tuple is a vector whose components are either:

1. an attribute (as identified by its spelling);
2. a name of a set of attributes;
3. the mild card attribute.

These elements are combined using the following operators:

| Operator | Meaning | Usage |
| --- | --- | --- |
| , | Delimiter between coordinates of an attribute tuple | a,b |
| ^ | Negation | ^a |
| # | Wild Card | # |

(Here a and b denote attribute spellings or attribute set names).

The meanings of these operators are best illustrated by example. Let a, b, and c denote either attribute spellings or set names. Assume the dimension of the attribute tuples is 3. Then:

| Attribute Tuple | Matches |
| --- | --- |
| a, b, c | First attribute matches a, second match b, third matches c |
| , b, c | First attribute elided (matches anything), Second attribute matches b, third matches c |
| , b, | First and third attribute elided (match anything) Second attribute matches b |
| a | Second and third attributes elided (Match anything) First matches a |
| #, b, | First attribute wild-card (i.e matches anything) Second attribute matches b. Third attribute elided |
| â, b̂, c | Second attribute matches anything EXCEPT b. Third matches anything EXCEPT c. |

Auxiliary Regular Expressions: A second type of element in a regular expression is an auxiliary regular expression. An auxiliary regular expression is a labelled regular expression which is used as a component of a larger regular expression. Logically, a regular expression involving auxiliary regular expressions is equivalent to the regular expression obtained by resolving the reference to the auxiliary pattern. For example, suppose an auxiliary regular expression named D has been defined by:

$$D = A.B^+.A^*$$

where A,B denote attribute tuples (or other auxiliary patterns). Then:

| Expression | is equivalent to |
| --- | --- |
| C.D | C.A.B+.A* |
| D+.C.D | (A.B+.A*)+.A.B+.A*.C.A*.B+.A* |

Registers: Just knowing that a regular expression matches an input attribute tuple sequence usually does not provide enough information for the construction of an appropriate output attribute tuple sequence. Data is usually also required about the attribute tuples matched by different elements of the regular expression. In ordinary LEX, to extract this type of information often requires the matched input sequence to be parsed again. To avoid this cumbersome approach, the pattern-matcher 1601 marke's details about the positions in the input stream of the matched elements of the regular expression more directly available. From these positions, the identities of the attribute tuples can then be determined.

Positional information is made available through the use of registers. A register in a regular expression does not match any input. Rather, 1. After a match, a register is set equal to the position in the input sequence of the next tuple in the input sequence that is matched by an element of the regular expression to the right of the register.
2. If no further part of the regular expression to the right of the register matches, then the register is set equal to zero.

The operation of registers is best illustrated by some examples. These examples use registers [1] and [2]:

| Expression | Contents of Registers after match | |
|---|---|---|
| A.[1].B.C | Reg 1: First position of B match | |
| A.[2].(C\|D) | Reg 2: First position of either C or D match | |
| A.[1].B*.[2].C | Reg 1: If B matches: | First position of B match |
| | Otherwise: | First position of C match |
| | Reg 2: First position of C match | |
| A.[1].B*.C* | Reg 1: If B matches: | First position of B match |
| | If C matches: | First position of C match |
| | Otherwise: | 0 |
| | Reg 2: If C matches: | First position of C match |
| | Otherwise: | 0 |

A pattern-action block defines a pattern matcher. When an input attribute-tuple sequence is presented to the finite-state pattern matcher a current input position counter is initialized to 1 denoting that the current input position is the first position of the sequence. A match at the current input position is attempted for each pattern. If no pattern matches, an error occurs. If more than one pattern matches, the match of the longest length is selected. If several patterns match of the same longest length, the one appearing first in the definition of the pattern-action block is selected. The action code associated with that pattern is then transmitted to the action processing module 1603.

Transformations by the action processing module are defined in a table of actions 1503 which is stored in memory. The actions can be specified in specified in any one of a number of programming languages such as C, PASCAL, FORTRAN, or the like.

In the question-inversion example, the action specified in the pseudo-code in FIG. 18 is invoked when the pattern defined by the regular expression in lines 3–4 is matched. This action inverts the order of the words in certain questions involving forms of do. An instance of this action is shown in FIG. 15. In the pseudo-code of FIG. 18 for this action, the symbol @reg(i) denotes the contents of register i. In line 6 of this pseudo-code, the output attribute tuple sequence is set to null.

A question matched by the regular expression in lines 3–4 may or may not begin with a (so-called) wh- word in the set WH_NP. If it does match, the appropriate action is to append the input tuple in the first position to the output sequence. This is (lone in lines 8–9).

After the wh-word, the next words of the output sequence should be the subject noun phrase of the input sequence. This is made so in line 11–12 that appends all tuples matching the regular expression SUBJECT_NP to the output sequence.

For negative questions involving forms of do, the part-of-speech tag of the output verb and of the output adverbs are the same as those of the input verb and adverbs. Thus the entire input tuple sequences corresponding to these words can be appended to the output. This is done in lines 15–18.

For positive questions the tag attribute of the output verb may be different than that of the input verb. This is handled in lines 25–37. The input word attribute for the verb is appended to the output word attribute in lines 26 and 31 and 35. The output tag attribute is selected based on the form of do in the input sequence. Explicit tag values are appended to the output sequence in lines 32 and 37.

The remaining input words and tags other than the question mark are written to the output sequence in lines 43–44. The input sequence is completed in line 46 by the marker QINV signalling question inversion, together with the appropriate tag.

5 Target Transducers

In this section, some embodiments of the the target-structure transducer 704 will be explained. The role of this transducer is to produce portions of text in the target language from one or more intermediate target-structures.

5.1 Overview

Figure 19:
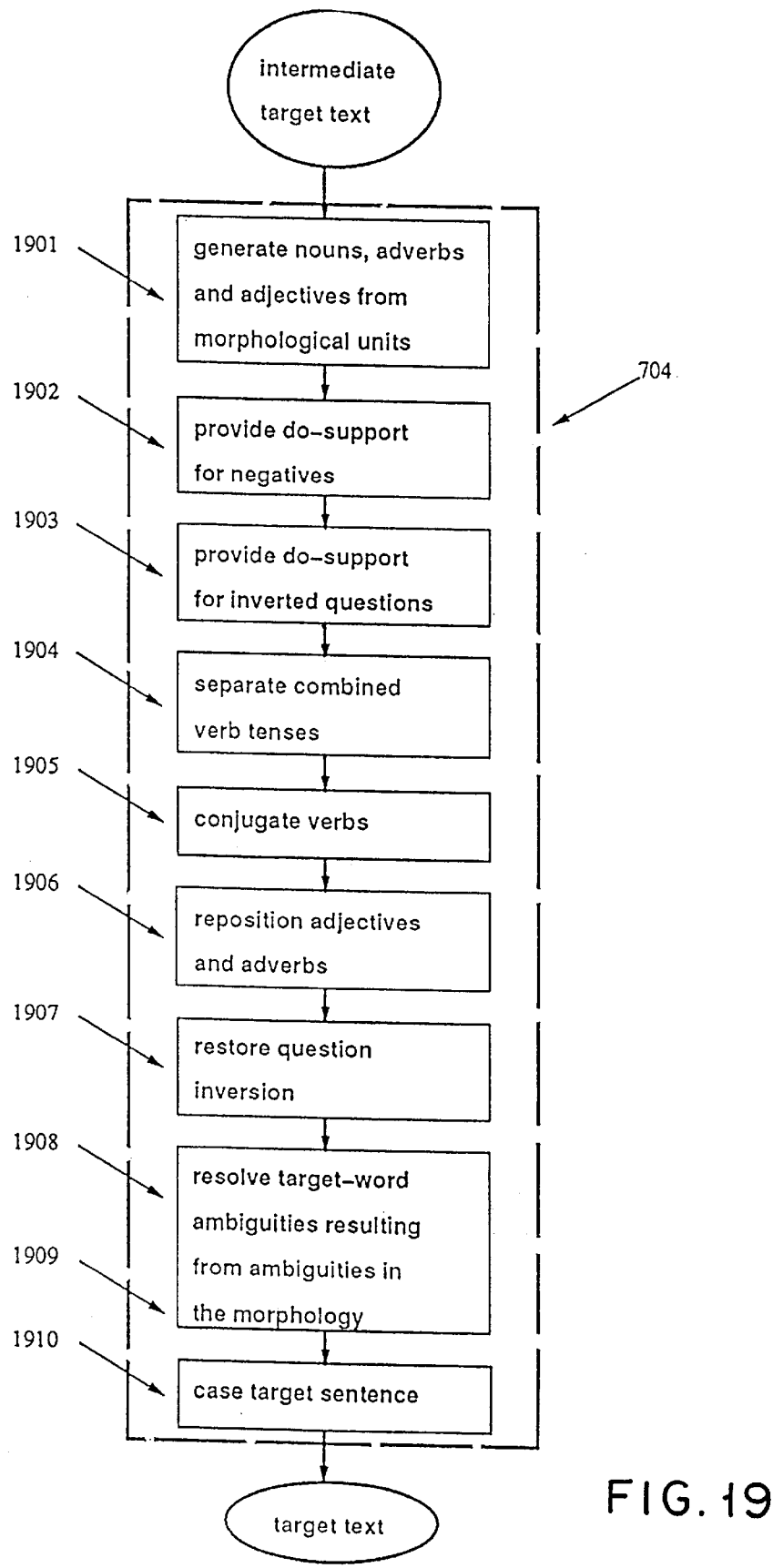
FIG. 19 is a schematic flow diagram of a target transducer.

An embodiment of a target-structure transducer 704 for English is shown in FIG. 19. In this embodiment, the transducer 704 converts an intermediate target-structure for English. consisting of a sequence of linguistic morphs into a single English sentence. This embodiment performs the inverse transformations of those performed by the source transducer 702 depicted in FIG. 13. That is, if the transducer 702 is applied to an English sentence, and then the transducer 704 is applied to the sequence of linguistic morphs produced by the transducer 702 the original English sentence is recovered.

This embodiment of the target-transducer 704 comprises a sequence of transducers which:

generate nouns, adverbs and adjectives from morphological units 1901;

provide do-support for negatives 1902;

separate compound verb tenses 1903;

provide do-support for inverted questions 1904;

conjugate verbs 1905;

reposition adverbs and adjectives 1906;

restore question inversion 1907;

resolve ambiguities in the choice of target words resulting from ambiguities in the morphology 1908; and case the target sentence 1909.

It should be understood that FIG. 19 represents only one possible embodiment of the target-transducer 704. Many variations are possible. For example, in other embodiments, rather than a single target sentence being produced for each intermediate target-structure, a set of several target sentences together with probabilities or scores may be produced. In such embodiments, the transducers depicted in FIG. 19 can be replaced by transducers which produce at each stage several target sentences with probabilities or scores. Moreover, in embodiments of the present invention in which the intermediate target-structures are more sophisticated than lexical morph sequences, the target-structure transducer is also more involved. For example, if the intermediate target-structure consists of a parse tree of a sentence or case frames for a sentence, then the target-structure transducer converts these to the target language.

5.2 Components

The transducers depicted in FIG. 19 will now be explained. The first seven of these transducers 1901 1902 1903 1904 1905 1906 1907 and the last transducer 1909 are implemented using a mechanism similar to that depicted in FIG. 12 and described in subsection Finite-State Transducers. This is the same mechanism that is used by the syntactic transducers 1104 and the morphological transducers 1105 that are part of the source-transducer 701. Such transducer can be constructed by a person with a background in computer science and skilled in the art. The construction of the transducer 1908 will be explained below.

The first transducer 1901 begins the process of combining lexical morphs into words. It generates nouns, adverbs and adjectives from their morphological constituents. For example, this transducer performs the conversions:

```
    the ADJ_er big boy N_plural V_bare to_eat rapid ADV_ly.
→   the bigger boys V_bare to_eat rapidly.
    he V_present_3s to_eat the pea N_PLURAL quick ADV_er
    than I.
→   he V_present_3s to_eat the peas more quickly than I.
```

(The final sentences here are The bigger boys eat rapidly and He eats the peas more quickly than I.)

There are sometimes ambiguities in generating adverbs and adjectives from their morphological units. For example, the lexical morph sequence quick ADV_ly can be converted to either quick or quickly, as for example in either how quick can you run? or how quickly can you run?. This ambiguity is encoded by the transducer 1901 by combining the different possibilities into a single unit. Thus, for example, the transducer 1901 performs the conversion:

```
    how can quick ADV_ly M1 you V_bare to_run?
→   how can quick_quickly M1 you V_bare to _run?
```

The second transducer 1902 provides do-support for negatives in English by undoing the do-not coalescences in the lexical morph sequence. Thus, for example it converts:

```
    John V_present_3s to_eat do_not M1 reall_M1 a lot.
→   John V_present_3s to_do eat not M2 really M2 a lot.
``` by splitting do from not and inserting to_do at the head of the verb phrase. (The final sentence here is John does not really eat a lot.) The move-markers _M1, _M2, etc, measure the position of the adverb (or adjective) from the head of the verb phrase. These markers are correctly updated by the transformation.

The next transducer 1903 provides do-support for inverted questions by inserting the appropriate missing form of the to do into lexical morph sequences corresponding to inverted questions. This is typically inserted between the verb tense marker and the verb. Thus, for example, it converts:

```
    John V_present_3s to_like to_eat QINV
→   John V_present_3s to_do like to_eat QINV
```

The next transducer 1904 prepares the stage for verb-conjugation by breaking up complicated verb tenses into simpler pieces.

```
    John V_has_been_ing to_eat a lot recently
→   John V_header has been V_ing to_eat a lot recently.
```

This transducer also inserts a verb phrase header marker V_header for use by later transducers. In particular the verb phrase header marker is used by the transducer 1907 that repositions adjective and adverb.

The next transducer 1905 conjugates verbs by combining the root of the verb and the tense of the verb into a single word. This process is facilitated by the fact that complicated verb tenses have already been broken up into simpler pieces. For example, the previous sentence is transduced to:

```
→   John V_header has been eating a lot recently.
```

The next transducer 1906 repositions adverbs and adjectives to their appropriate places in the target sentence. This is done using the move-markers _M1, _M2, etc., that axe attached to adjectives. Thus for example, this transducer converts:

```
    Iraq V_header will be Balkanized probably M2 not M2.
→   Iraq V_header will probably not be Balkanized
```

The verb phrase header marker V_header is kept for use by the next transducer 1907.

The transducer 1907 restores the original order of the noun and verb in inverted questions.

These questions are identified by the question inversion marker QINV. In most cases, to restore the inverted question order, the modal or verb at the head of the verb phrase is moved to the beginning of the sentence:

```
    Joh V_header was here yesterday QINV
→   was John here yesterday?
```

If the sentence begins with one of the words what, who, where, why, whom, how, when, which the modal or verb is moved to the second position in the sentence:

```
    where John V_header was yesterday QINV
→   where was John yesterday?
```

A special provision is made for moving the word not in inverted questions. The need to do this is signaled by a special marker M0 in the lexical morph sequence. The not preceding the M0 marker is moved to the position following the modal or verb:

```
    he V_header can swim not M0 QINV
→   can not he swim?
    Joh V_header does eat not M0 potatoes?
→   Does not John eat potatoes?
```

After the inverted question order has been restored, the question inversion marker QINV is removed and replaced by a question mark at the end of the sentence.

The next transducer 1909 resolves ambiguities in the choice of words for the target sentence arising from ambiguities in the process 1901 of generating adverbs and adjectives from their morphological units.

For example, the transducer 1909 converts the sentence how qtiick-quickly can you, run?

which contains the ambiguity in resolving quick ADV_ly into a single adverb, into the sentence how quickly can you run?

To perform such conversions, the transducer 1909 uses a target-language model to assign a probability or score to each of the different possible sentences corresponding to an input sentence with a morphological ambiguity. The sentence with the highest probability or score is selected. In the above example, the sentence how quickly can you run? is selected because it has a higher target-language model probability or score than how quick can you run? In some embodiments of the transducer 1909 the target-language model is a trigram model similar to the target-structure language model 706. Such a transducer can be constructed by a person skilled in the art. The last transducer 1910 assigns a case to the words of a target sentence based on the casing rules for English. Principally this involves capitalizing the words at the beginning of sentences. Such a transducer can easily be constructed by a person skilled in the art.

5.3 Target Transducers with Constraints

In some embodiments, such as that depicted in FIG. 9, a target-structure transducer, such as that labelled 904, accepts a set of constraints that restricts its transformations of an intermediate target structure to target text.

Such constraints include, but are not limited to, requiring that a particular target word appear in the final target text. For example, because of ambiguities in a morphology, a target trannducer may not be able to distinguish between electric and electrical. Thus the output of a target transducer might include the phrase electrical blanket in a situation where electric blanket is preferred. A constraint such as The word "electric" must appear in the target sentence would correct this shortcoming.

A target-transducer accepting such constraints in similar to target trainsdulcers as described in this section. Based on the descriptions already given, such transducers can be constructed by a person with a computer science background and skilled in the art.

6 Target Language Model

The inventions described in this specification employ probabilistic models of the target language in a number of places. These include the target structure language model 705, and the class language model used by the decoder 404. As depicted in FIG. 20, the role of a language model is to compute an a priori probability or score of a target structure.

Language models are well known in the speech recognition art. They are described in the article "Self-Organized Language Modeling for Speech Recognition", by F. Jelinek, appearing in the book Readings in Speech Recognition edited by A. Waibel and K. F. Lee and published by Morgan Kaufmann Publishers, Inc., San Mateo, Calif. in 1990. They are also described in the article "A Tree-Based Statistical Model for Natural Language Speech Recognition", by L. Bahl, et al., appearing in the July 1989 Volume 37 of the IEEE Transactions on Acoustics, Speech and Signal Processing. These articles are included by reference herein. They are further described in the paper "Trainable Grammars for Speech Recognition", by J. Baker, appearing in the 1979 Proceedings of the Spring Conference of the Acoustical Society of America.

In some embodiments of the present inventions, the target structure consists of a sequence of morphs. In these embodiments, n-gram language models, as described in the aforementioned article by F. Jelinek, can be used. In other embodiments, the target structure comprises parse trees of the target language. In these embodiments, language models based on stochastic context-free grammars, as described in the aforementioned articles by F. Jelinek and the aforementioned paper by J. Baker, can be used.

In addition, decision tree language models, as described in the aforementioned paper by L. Bahl, et al. can be adapted by one skilled in the art to model a wide variety of target structures.

6.1 Perplexity

The performance of a language model in a complete system depends on a delicate interplay between the language model and other components of the system. One language model may surpass another as part of a speech recognition system but perform less well in a translation system.

Since it is expensive to evaluate a language model in the context of a complete system, it is useful to have an intrinsic measure of the quality of a language model. One such measure is the probability that the model assigns to the large sample of target structures. One judges as better the language model which yields the greater probability. When the target structure is a sequence of words or morphs, this measure can be adjusted so that it takes account of the length of the structures. This leads to the notion of the perplexity of a language model with respect to a sample of text S:

$$\text{perplexity} = Pr(S)^{-\frac{1}{|S|}} \quad (3)$$

where $|S|$ is the number of morphs of S. Roughly speaking, the perplexity is the average number of morphs which the model cannot distinguish between, in predicting a morph of S. The language model with the smaller perplexity will be the one which assigns the larger probability to S.

Because perplexity depends not only on the language model but also on the sample of text, it is important that the text be representative of that for which the language model is intended. Because perplexity is subject to sampling error, making fine distinctions between language models may require that the perplexity be measured with respect to a large sample.

6.2 n-gram Language models n-gram language models will now be described. For these models, the target structure consists of a sequence of morphs.

Suppose $m_1 m_2 m_3 \ldots m_k$ be a sequence of k morphs $m_j$. For $1 \leq i \leq j \leq k$, let $m_i^j$ denote the subsequence $m_i^j \equiv m_i m_{i+1} \ldots m_j$. For any sequence, the probability of a $m_1^k \equiv$ is ink is equal to the product of the conditional probabilities of each morph $m_i$ given the previous morphs $m_1^{i-1}$:

$$Pr(m_1^k) = \quad (4)$$

$$Pr(m_1)Pr(m_2|m_1)Pr(m_3|m_1 m_2) \ldots Pr(m_i|m_1^{i-1}) \ldots Pr(m_k|m_1^{k-1}).$$

The sequence $m_1^{i-1}$ is called the history of the morph $m_i$ in the sequence.

For an n-gram model, the conditional probability of a morph in a sequence is assumed to depend on its history only through the previous n−1 morphs:

$$Pr(m_i|m_1^{i-1}) \approx Pr(m_i|m_{i-n+1}^{i-1}) \quad (5)$$

For a vocabulary of size V, a 1-gram model is determined by V−1 independent numbers, one probability Pr(m) for each morph m in the vocabulary, minus one for the constraint that all of the probabilities add up to 1. A 2-gram model is determined by $V^2$−1 independent numbers, V(V−1)

conditional probabilities of the form $Pr(m_2|m_1)$ amd $V-1$ of the form $Pr(m)$. In general, an n-gram model is determined by $V^n-1$ independent numbers, $V^{n-1}(V-1)$ conditional probabilities of the form $Pr(m_n|m_1^{n-1})$, called the order-n conditional probabilities, plus $V^{n-1}-1$ numbers which determine an (n–1)-gram model.

The order-n conditional probabilities of an n-gram model form the transition matrix of an associated Markov model. The states of this Markov model are sequences of n–1 morphs, and the probability of a transition from the state $m_1 m_2 \ldots m_{n-1}$ to the state $m_2 m_3 \ldots m_n$ is $Pr(m_n|m_1 m_2 \ldots m_{n-1})$. An n-gram language model is called consistent if, for each string $m_1^{n-1}$, the probability that the model assigns to $m_1^{n-1}$ is the steady state probability for the state $m_1^{n-1}$ of the associated Markov model.

6.3 Simple n-gram models

The simplest form of an n-gram model is obtained by assuming that all the independent conditional probabilities are independent parameters. For such a model, values for the parameters can be determined from a large sample of training text by sequential maximum likelihood training. The order n-probabilities are given by $$Pr(m_n|m_1^{n-1}) = \frac{f(m_1^{n-1}m_n)}{\Sigma_m f(m_1^{n-1}m)} \qquad (6)$$

where $f(m_1^i)$ is the number of times the string of morphs $m_1^i$ appears in the training text. The remaining parameters are determined inductively by an analogous formula applied to the corresponding n–1-gram model. Sequential maximum likelihood training does not produce a consistent model, although for a large amount of training text, it produces a model that is very nearly consistent.

Unfortunately, many of the parameters of a simple n-gram model will not be reliably estimated by this method. The problem is illustrated in Table 3, which shows the number of 1-, 2-, and 3-grams appearing with various frequencies in a sample of 365,893,263 words oil English text from a variety of sources. The vocabulary consists of the 260,740 different words; plus a special unknown word into which all other words are mapped. Of the $6.799 \times 10^{10}$ 2-grams that might have occurred in the data, only 14,494,217 actually did occur and of these, 8,045,024 occurred only once each. Similarly, of the $1.773 \times 10^{16}$ 3-grams that might have occurred, only 75,349,888 actually did occur and of these, 53,737,350 occurred only once each. These data and Turing's formula imply that 14.7 percent of the 3-grams and for 2.2 percent of the 2-grams in a new sample of English text will not appear in the original

| Count | 1-grams | 2-grams | 3-grams |
|---|---|---|---|
| 1 | 36,789 | 8,045,024 | 53,737,350 |
| 2 | 20,269 | 2,065,469 | 9,229,958 |
| 3 | 13,123 | 970,434 | 3,653,791 |
| >3 | 135,335 | 3,413,290 | 8,728,789 |
| >0 | 205,516 | 14,494,217 | 75,349,888 |
| ≧0 | 260,741 | 6.799 × $10^{10}$ | 1.773 × $10^{16}$ | sample. Thus although any 3-gram that does not appear in the original sample is rare, there are so many of them that their aggregate probability is substantial.

Thus, as n increases, the accuracy of a simple n-gram model increases, but the reliability of the estimates for its parameters decreases.

6.4 Smoothing

A solution to this difficulty is provided by interpolated estimation, which is described in detail in the paper "Interpolated estimation of Markov source parameters from sparse data", by F. Jelinek and R. Mercer and appearing in Proceeding of the Workshop on Pattern Recognition in Practice, published by North-Holland, Amsterdam, The Netherlands, in May 1980. Interpolated estimation combines several models into a smoothed model which uses the probabilities of the more accurate models where they are reliable and, where they are unreliable, falls back on the more reliable probabilities of less accurate models. If $Pr^{(j)}(m_i|m_1^{i-1})$ is the jth language model, the smoothed model, $\hat{P}r(m_i|m_1^{i-1})$, is given by $$\hat{Pr}(m_i|m_1^{i-1}) = \sum_j \lambda_j(m_1^{i-1}) Pr^{(j)}(m_i|m_1^{i-1}). \qquad (7)$$

The values of the $\lambda_j(m_1^{i-1})$ are determined using the EM method, so as to maximize the probability of some additional sample of training text called held-out data. When interpolated estimation is used to combine simple 1-, 2-, and 3-gram models, the $\lambda$'s can be chosen to depend on $m_1^{i-1}$ only through the count of $m_{i-2}m_{i-1}$. Where this count is high, the simple 3-gram model will be reliable, and, where this count is low, the simple 3-gram model will be unreliable.

The inventors constructed an interpolated 3-gram model in which the $\lambda$'s were divided into 1782 different sets according to the 2-gram counts, and determined from a held-out sample of 4,630,934 million words. The power of the model was tested using the 1,014,312 word Brown corpus. This well known corpus, which contains a wide variety of English text, is described in the book Computational Analysis of Present-Day American English, by H. Kucera and W. Francis, published by Brown University Press, Providence, R.I., 1967. The Brown corpus was not included in either the training or held-out data used to construct the model. The perplexity of the interpolated model with respect to the Brown corpus was 244.

6.5 n-gram Class Models

Clearly, some words are similar to other words in their meaning and syntactic function. For example, the probability distribution of words in the vicinity of Thursday is very much like that for words in the vicinity of Friday. Of course, they will not be identical: people rarely say Thank God it's Thursday! or worry about Thursday the 13$^{th}$.

In class language models, morphs are grouped into classes, and morphs in the same class are viewed as similar. Suppose that ĉ is a map that partitions the vocabulary of V morphs into C classes by assigning each morph m to a class ĉ(m). An n-gram class model based on ĉ is an n-gram language model for which $$Pr(m_k|m_1^{k-1}) = Pr(m_k|c_k)Pr(c_k|c_1^{k-1}) \qquad (8)$$

where $c_i = ĉ(m_i)$. An n-gram class model is determined by $C^n-1+V-C$ independent numbers, $V-C$ of the form $Pr(m_i|c_i)$, plus $C^n-1$ independent numbers which determine an n-gram language model for a vocabulary of size C. If C is much smaller than V, these are many fewer numbers than are required to specify a general n-gram language model.

In a simple n-gram class model, the $C^n-1+V-C$ independent probabilities are treated as independent parameters. For such a model, values for the parameters can be determined by sequential maximum likelihood training. The order n probabilities are given by $$Pr(c_n|c_1^{n-1}) = \frac{f(c_1^{n-1}c_n)}{\Sigma_c f(c_1^{n-1}c)} \qquad (9)$$

where $f(c_1^i)$ is the number of times that the sequence of classes $c_1^i$ appears in the training text. (More precisely, $f(c_1^i)$ is the number of distinct occurrences in the training text of a consecutive sequence of morphs $m_1^i$ for which $C_k=\hat{c}(m_k)$ for $1 \leq k \leq i$.)

7 Classes

The inventions described in this specification employ classes of morphs or words in a number of places. These include the class language model used by the decoder 702 and described in Section 14, and some embodiments of the target structure language model 705.

The inventors have devised a mnmber of methods for automatically partitioning a vocabulary into classes based upon frequency or coocurrence statistics or other information extracted from textual corpora or other sources. In this section, some of these methods will be explained. An application to construction of syntactic classes of words will be described. A person skilled in the art can easily adapt the methods to other situations. For example, the methods can be used to construct classes of morphs instead of classes of words. Similarly, they can be used to construct classes based upon cooccurrence statistics or statistics of word alignments in bilingual corpora.

7.1 Maximum Mutual Information Clustering

Figure 31:
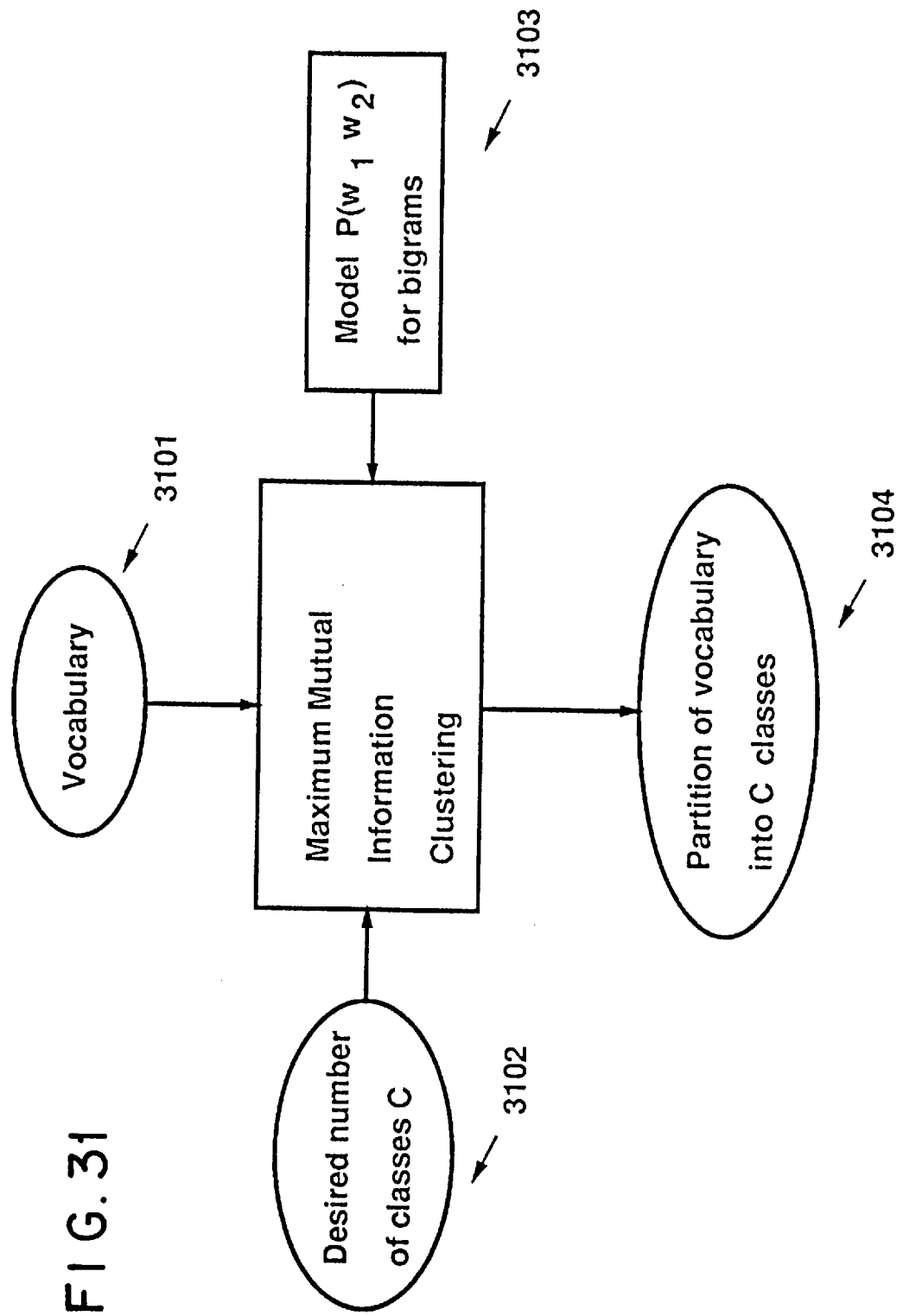
FIG. 31 is a schematic block diagram of a method for partitioning a vocabulary into classes.

A general scheme for clustering a vocabulary into classes is depicted schematically in FIG. 31. It takes as input a desired number of classes C 3101, a vocabulary 3102 of size V, and a model 3103 for a probability distribution $P(w_1,w_2)$ over bigrams from the vocabulary. It produces as output a partition 3104 of the vocabulary into C classes. In one application, the model 3103 can be a 2-gram language model as described in Section 6, in which case $P(w_1, w_2)$ would be proportional to the number of times that the bigram $w_1 w_2$ appears in a large corpus of training text.

Let the score $\psi(\hat{C})$ of a partition $\hat{C}$ be the average mutual information between the classes of $\hat{C}$ with respect to the probability distribution $P(w_1,w_2)$:

$$\psi(\hat{C}) = \sum_{c_1, c_2} P(c_1, c_2) \log \frac{P(c_1, c_2)}{P(c_1)P(c_2)} \quad (10)$$

In this sum, $c_1$ and $c_2$ each run over the classes of the partition $\hat{C}$, and $$P(c_1, c_2) = \sum_{w_1 \in c_1, w_2 \in c_2} P(w_1, w_2) \quad (11)$$

$$P(c_1) = \sum_{c_2} P(c_1, c_2) \quad (12)$$

$$P(c_2) = \sum_{c_1} P(c_1, c_2) \quad (13)$$

The scheme of FIG. 31 chooses a partition $\hat{C}$ for which the score average mutual information $\psi(\hat{C})$ is large.

7.2 A Clustering Method

Figure 32:
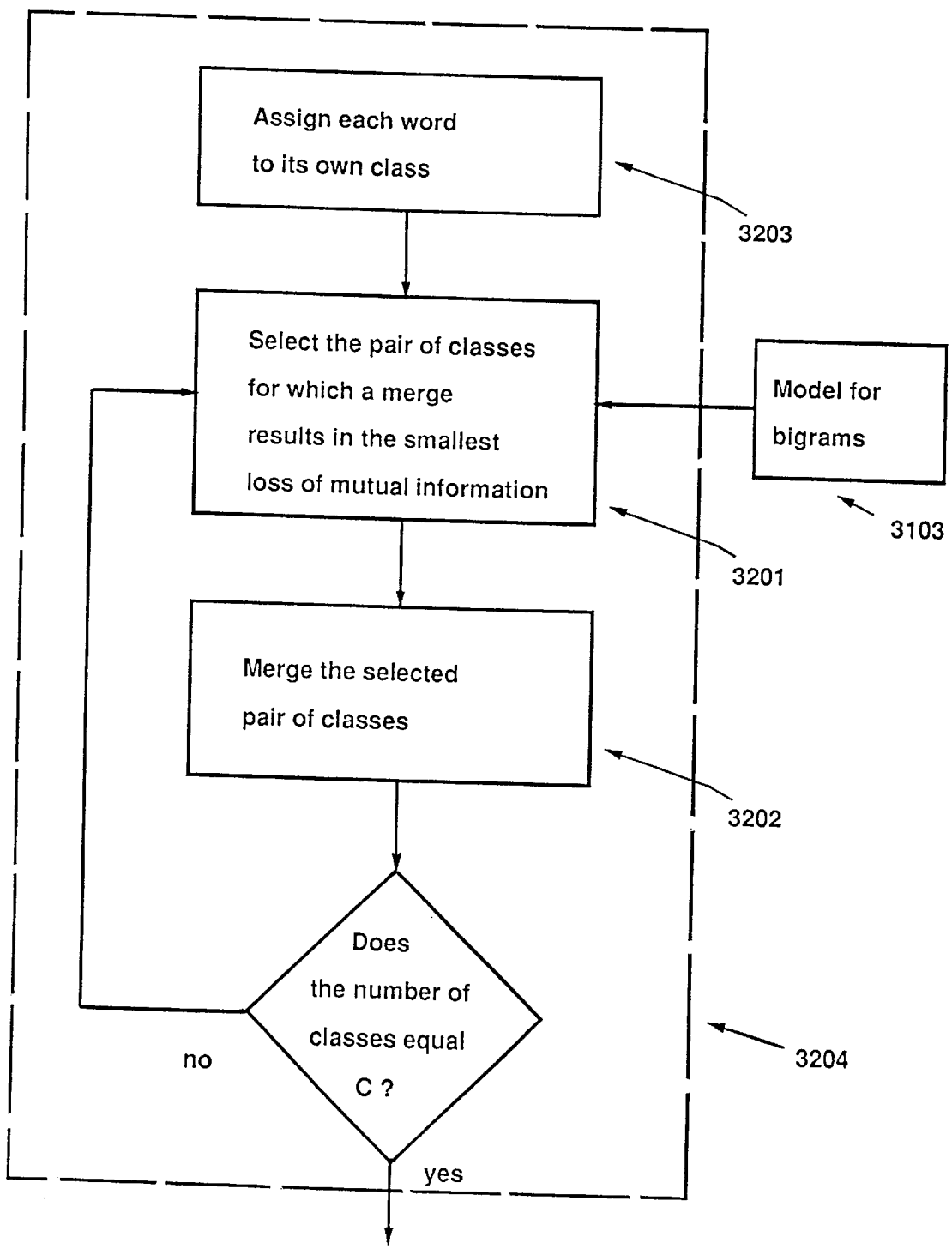
FIG. 32 is a schematic flow diagram of a method for partitioning a vocabulary into classes.

One method 3204 for carrying out this scheme is depicted in FIG. 32. The method proceeds iteratively. It begins (step 3203) with a partition of size V in wvhiclh each word is assigned to a distinct class. At each stage of the iteration (Steps 3201 and 3202), the current partition, is replaced by a new partition which is obtained by merging a pair of classes into a single class. The pair of classes to be merged is chosen so that the score of the new partition is as large as possible. The method terminates after V–C iterations, at which point the current partition contains C classes.

In order that it be practical, the method 3204 must be implemented carefully. At the $i^{th}$ iteration, a pair of classes to be merged must be selected from amongst approximately $(V-i)^2/2$ pairs. The score of the partition obtained by merging any particular pair is the sum of $(V-i)^2$ terms, each of which involves a logarithm. Since altogether there are V–C merges, this straight-forward approach to the computation is of order $V^5$. This is infeasible, except for very small values of V. A more frugal organization of the computation must take advantage of the redundancy in this straight-forward calculation.

An implementation will now be described in which the method 3204 executes in time of order $V^3$. In this implementation, the change in score due to a merge is computed in constant time, independent of V.

Let $\hat{C}_k$ denote the partition after V–k merges. Let $\hat{C}_k(1)$, $\hat{C}_k(2), \ldots \hat{C}_k(k)$ denote the k classes of $\hat{C}_k$. Let $p_k(l,m)=P(\hat{C}_k(l),\hat{C}_k(m))$ and let $$pl_k(l) = \sum_m p_k(l, m) \quad (14)$$

$$pr_k(m) = \sum_l p_k(l, m) \quad (15)$$

$$q_k(l, m) = p_k(l, m) \log \frac{p_k(l, m)}{pl_k(l) pr_k(m)} \quad (16)$$

Let $I_k=\psi(\hat{C}_k)$ be the score of $\hat{C}_k$, so that $$I_k = \sum_{l,m} q_k(l, m) \quad (17)$$

Let $I_k(i,j)$ be the score of the partition obtained from $\hat{C}_k$ by merging classes $\hat{C}_k(i)$ and $\hat{C}_k(j)$, and let $L_k(i,j)=I_k-I_k(i,j)$ be the change in score as a result of this merge. Then $$L_k(i, j) = s_k(i) + s_k(j) - q_k(i, j) - q_k(j, i) - \quad (18)$$

$$q_k(i \cup j, i \cup j) - \sum_{l \neq i,j} q_k(l, i \cup j) - \sum_{m \neq i,j} q_k(i \cup j, m),$$

where $$s_k(i) = \sum_l q_k(l, i) + \sum_m q_k(i, m) - q_k(i, i). \quad (19)$$

In these and subsequent formulae, $i \cup j$ denotes the result of the merge, so that, for example $$p_k(i \cup j, m) = p_k(i, m) + p_k(j, m) \quad (20)$$

$$q_k(i \cup j, m) = p_k(i \cup j, m) \log \frac{p_k(i \cup j, m)}{pl_k(i \cup j) pr_k(m)} \quad (21)$$

The key to the implementation is to store and inductively update the quantities $$p_k(l, m) \ pl_k(l) \ pr_k(m) \ q_k(l, m) \quad (22)$$

$$I_k \ s_k(i) \ L_k(i, j)$$

Note that if $I_k$, $s_k(i)$, and $s_k(j)$, are known, then the majority of the time involved in computing $I_k(i,j)$ is devoted to computing the sums on the second line of equation 18. Each of these sums has approximately V–k terms and so this reduces the problem of evaluating $I_k(i,j)$ from one of order $V^2$ to one of order V.

Suppose that the quantities shown in Equation 22 are known at the beginning of an iteration. Then the new partition $\hat{C}_{k-1}$ is obtained by merging the pair of classes $\hat{C}_k(i)$ and $\hat{C}_k(j)$, $i<j$, for which $L_k(i,j)$ is smallest. The k–1 classes of the new partition are $\hat{C}_{k-1}(1),\hat{C}_{k-1}(2),\ldots,\hat{C}_{k-1}(k-1)$ with $\hat{C}_{k-1}(l)=\hat{C}_k(l)$ if $l \neq i,j$ $\hat{C}_{k-1}(i)=\hat{C}_k(i) \cup \hat{C}_k(j)$ $\hat{C}_{k-1}(j)=\hat{C}_k(k)$ if $j<k$ Obviously, $I_{k-1}=I_k(i,j)$. The values of $p_{k-1}$, $pl_{k-1}$, $pr_{k-1}$, and $q_{k-1}$ can be obtained easily from $p_k$, $pl_k$, $pr_k$, and $q_k$. If l and m denote indices neither of which is equal to either i or j, then $$\begin{aligned}
s_{k-1}(l) &= s_k(l) - q_k(l,i) - q_k(i,l) - q_k(l,j) - q_k(j,l) - q_{k-1}(l,i) + q_{k-1}(i,l) \\
s_{k-1}(j) &= s_k(k) - q_k(k,i) - q_k(i,k) - q_k(k,j) - q_k(j,k) + q_{k-1}(j,i) + q_{k-1}(i,j) \\
L_{k-1}(l,m) &= L_k(l,m) - q_k(l \cap m, i) - q_k(i, l \cap m) - q_k(l \cap m, j) - q_k(j, l \cap m) + \\
& \quad q_{k-1}(l \cap m, i) + q_{k-1}(i, l \cap m) \\
L_{k-1}(l,j) &= L_k(l,k) - q_k(l \cap k, i) - q_k(i, l \cap k) - q_k(l \cap k, j) - q_k(j, l \cap k) + \\
& \quad q_{k-1}(l \cap j, i) + q_{k-1}(i, l \cap j) \\
L_{k-1}(j,l) &= L_{k-1}(l,j)
\end{aligned} \quad (23)$$

Finally, $s_{k-1}(i)$ and $L_{k-1}(l,i)$ are determined from equations 18 and 19.

This update process requires order $V^2$ computations. Thus, by this implementation, each iteration of the method requires order $V^2$ time, and the complete method requires order $V^3$ time.

The implementation can improved further by keeping track of those pairs l,m for which $p_k(l,m)$ is different from zero. For example, suppose that P is given by a simple bigram model trained on the data described in Table 3 of Section 6. In this case, of the $6.799 \times 10^{10}$ possible word 2-grams $w_1, w_2$, only 14,494,217 have non-zero probability. Thus, in this case, the sums required in equation 18 have, on average, only about 56 non-zero terms instead of 260,741 as might be expected from the size of the vocabulary.

7.3 An Alternate Clustering Method

For very large vocabularies, the method 3204 may be too computationally costly. The following alternate method can be used. First, the hie words of the vocabulary are arranged in order of frequency with the most frequent words first. Each of the first C words is assigned to its own distinct class. The method then proceeds iteratively through V–C steps. At the $k^{th}$ step the $(C+k)^{st}$ most probable word is assigned to a new class. Then, two of the resulting C+1 classes are merged into a single class. The pair of classes that is merged is the one for which the loss in average mutual information is least. After V–C steps, each of the words in the vocabulary will have been assigned to one of C classes.

7.4 Improving Classes

The classes constructed by the clustering method 3204 or the alternate clustering method described above can often be improved. One method of doing this is to repeatedly cycle through the vocabulary, moving each word to the class for which the resulting partition has the highest average mutual information score. Eventually, no word will move and the method finishes. It may be possible to further improve the classes by simultaneously moving two or more words, but for large vocabularies, such a search is too costly to be feasible.

7.5 Examples

The methods described above were used divide the 260,741-word vocabulary of Table 3, Section 6, into 1000 classes. Table 4 shows some of the classes that are particularly interesting, and Table 5 shows classes that were selected at random. Each of the lines in the tables contains members of a different class. The average class has 260 words. The table shows only those words that occur at least ten times, and only the ten most frequent words of arny class. (The other two months would appear with the class of months if this limit had bcen extended to twelve). The degree to which the classes capture both syntactic and semantic aspects of English is quite surprising given that they were constructed from nothing more than counts of bigrams. The class {that tha theat} is interesting because although tha and theat are English words, the method has discovered that in the training data each of them is most often a mistyped that.

7.6 A Method for Constructing Similarity Trees

The clustering method 3204 can also be used to construct a similarity tree over the vocabulary. Suppose the merging steps 3201 and 3202 of method 3204 are iterated V–1 times, resulting in a single class consisting of the entire vocabulary. The order in which the classes are merged determines a binary tree, the root of which corresponds to this single class and the leaves of which correspond to the words in the vocabulary. Intermediate nodes of the tree correspond to groupings of words intermediate between single words and the entire vocabulary. Words that are statistically similar with respect to the model $P(w_1, w_2)$ will be close together in the tree.

Figure 30:
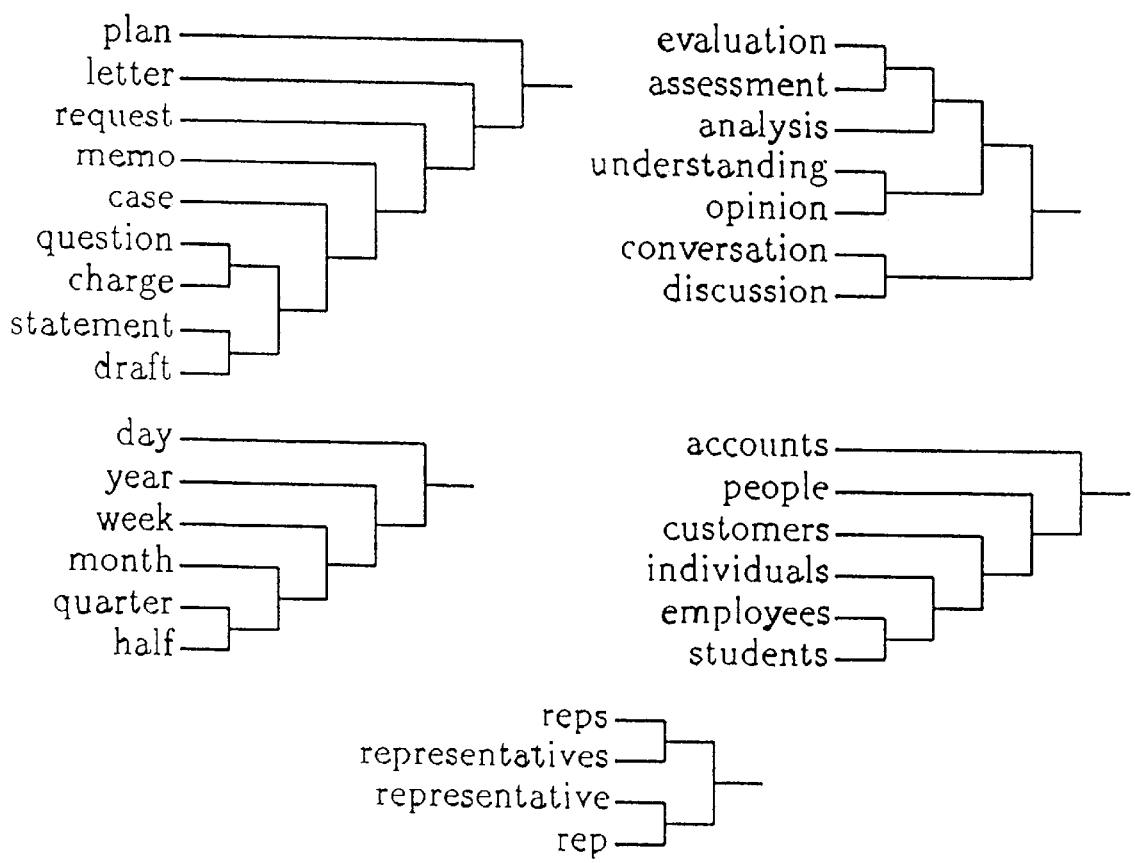
FIG. 30 shows some sample subtrees from a tree constructed using a clustering method.

FIG. 30 shows some of the substructures in a tree constructed in this manner using a simple 2-gram model for the 1000 most frequent words in a collection of office correspondence.

8 Overview of Translation Models and Parameter Estimation

This section is an introduction to translation models and methods for estimating the parameters of such models. A more detailed discussion of these topics will be given in Section 9.

TABLE 4

Classes from a 260,741-word vocabulary

Friday Monday Thursday Wednesday Tuesday Saturday Sunday weekends Sundays Saturdays
June March July April January December October November September August
people guys folks fellows CEOs chaps doubters commies unfortunates blokes
down backwards ashore sideways southward northward overboard aloft downwards adrift
water gas coal liquid acid sand carbon steam shale iron.
great big vast sudden mere sheer gigantic lifelong scant colossal
man woman boy girl lawyer doctor guy farmer teacher citizen
American Indian European Japanese German African Catholic Israeli Italian Arab
pressure temperature permeability density porosity stress velocity viscosity gravity tension
mother wife father son husband brother daughter sister boss uncle
machine device controller processor CPU printer spindle subsystem compiler plotter
John George James Bob Robert Paul William Jim David Mike
anyone someone anybody somebody
feet miles pounds degrees inches barrels tons acres meters bytes
director chief professor commissioner commander treasurer
founder superintendent dean custodian TABLE 4-continued Classes from a 260,741-word vocabulary liberal conservative parliamentary royal progressive Tory provisional separatist federalist PQ
had hadn't hath would've could've should've must've might've
asking telling wondering instructing informing kidding reminding bothering thanking deposing
that tha theat
head body hands eyes voice arm seat eye hair mouth

TABLE 5

Randomly selected word classes little prima moment's trifle tad Litle minute's tinker's hornet's teammate's
ask remind instruct urge interrupt invite congratulate commend warn applaud
object apologize apologise avow whish
cost expense risk profitability deferral earmarks
capstone cardinality mintage reseller
B dept. A A Whitey CL pi Namerow PA Mgr. LaRose
Rel rel. #S Shree
S Gens nai Matsuzawa ow Kageyama Nishida Sumit Zollner Mallik
research training education science advertising arts medicine machinery Art AIDS
rise focus depend rely concentrate dwell capitalize embark intrude typewriting
Minister mover Sydneys Minster Miniter
running moving playing setting holding carrying passing
cutting driving fighting
court judge jury slam Edelstein magistrate marshal Abella Scalia larceny
annual regular monthly daily weekly quarterly periodic Good yearly convertible
aware unaware unsure cognizant apprised mindful partakers
force ethic stoppage force's conditioner stoppages conditioners waybill forwarder Atonabee
systems magnetics loggers products' coupler Econ databanks Centre inscriber correctors
industry producers makers fishery Arabia growers addiction medalist inhalation addict
brought moved opened picked caught tied gathered cleared hung lifted 8.1 Tanslation Models As illustrated in FIG. 21, a target structure to source structure translation model $P_\theta 706$ with, parameters $\theta$ is a method for calculating a conditional probability, or likelihood, $P_\theta(f|e)$, for any source structure f given any target structure e. Examples of such structures include, but are not limited to, sequences of words, sequences of linguistic morphs, parse trees, and case frames. The probabilities satisfy:

$$P_\theta(f|e) \geq 0, \quad P_\theta(\text{failure}|e) \geq 0, \tag{24}$$

$$P_\theta(\text{failure}|e) + \sum_f P_\theta(f|e) = 1,$$

where the sum ranges over all structures f, and failure is a special symbol. $P_\theta(f|e)$ can be interpretted as the probability that a translator will produce f when given e, and $P_\theta(\text{failure}|e)$ can be interpreted as the probability that he will produce no translation when given e. A model is called deficient if $P_\theta(\text{failure}|e)$ is greater than zero for some e.

8.1.1 Training

Before a translation model can be used, values must be determined for the parameters $\theta$. This process is called parameter estimation or training.

One training methodology is maximum likelihood traininig, in which the parameter values are chosen so as to maximize the probability that the model assigns to a training sample consisting of a large number S of translations $(f^{(s)}, e^{(s)})$, s=1,2, . . . ,S. This is equivalent to maximizing the log likelihood objective function $$\psi(P_\theta) = S^{-1} \sum_{s=1}^{S} \log P_\theta(f^{(s)}|e^{(s)}) = \sum_{f,e} C(f, e) \log P_\theta(f|e). \tag{25}$$

Here C(f,e) is the empirical distribution of the sample, so that C(f,e) is 1/S times the number of times (usually 0 or 1) that the pair (f,e) occurs in the sample.

8.1.2 Hidden Alignment Models

In some embodiments, translation models are based on the notion of an alignment between a target structure and a source structure. An alignment is a set of connections between the entries of the two structures.

Figure 22:
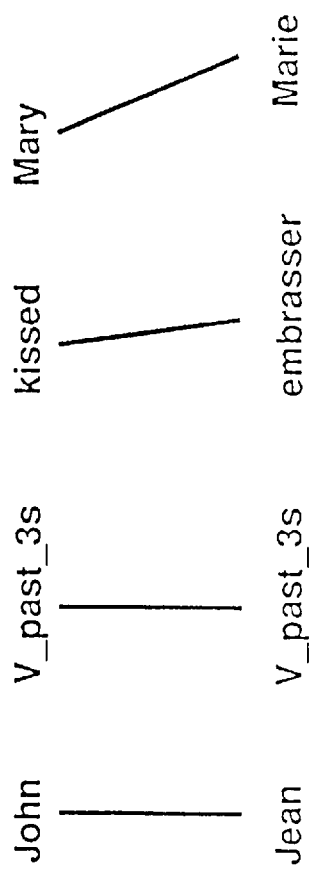
FIG. 22 is a simple example of an alignment between a source structure and a target structure.
Figure 23:
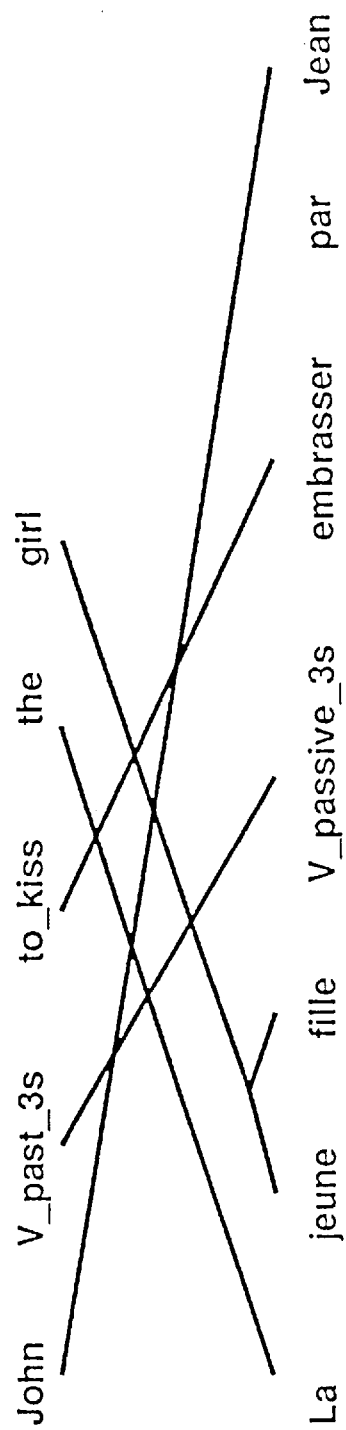
FIG. 23 is another example of an alignment.

FIG. 22 shows an alignment between the target structure John V__past__3s to__kiss Mary and the source structure Jean V__past__3s embrasser Marie. (These structures are transduced versions of the sentences John kissed Mary and Jean a embrassé Marie respectively.) In this alignment, the entry John is connected with the entry Jean, the entry V__past__3s is connected wvith the entry V__past__3s, the entry to__kiss is connected with the entry embrasser, and the entry Mary is connected with the entry Marie. FIG. 23 shows an alignment between the target structure John V__past__3s to__kiss the girl and the source structure Le jeune fille V__passive__3s embrasser par Jean. (These structures are transduced versions of the sentences John kissed the girl and Le jeune fille a été embrassée par Jean respectively.)

Figure 24:
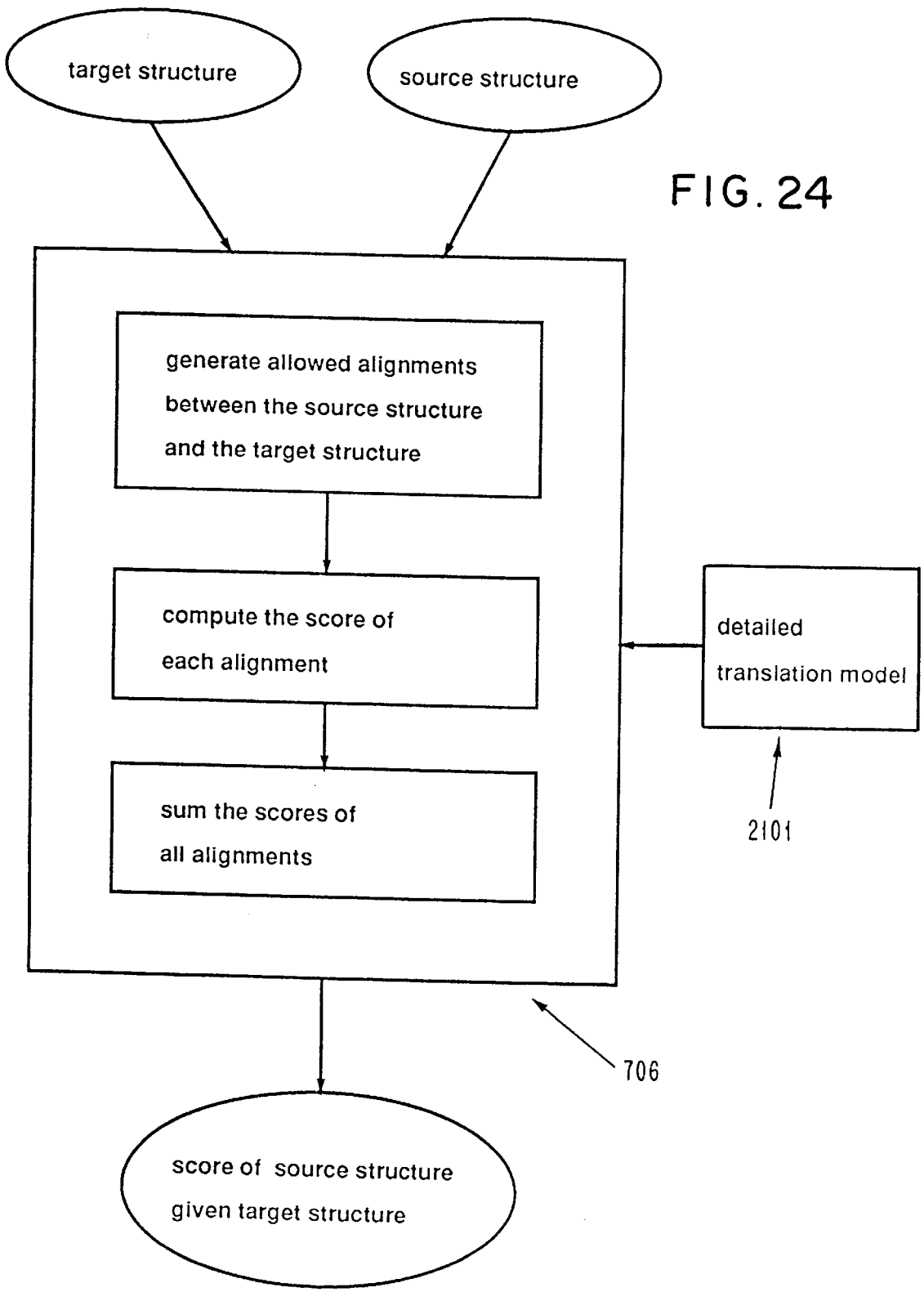
FIG. 24 is a schematic flow diagram of showing an embodiment of a target structure to source structure translation model.

In some embodiments, illustrated in FIG. 24, a translation model 706 computes the probability of a source structure given a target structure as the sum of the probabilities of all alignments between these structures:

$$P_\theta(f|e) = \sum_a P_\theta(f, a|e). \tag{26}$$

In other embodiments, a translation model 706 can compute the probability of a source structure given a target structure as the maximum of the probabilities of all alignments between these structures:

$$P_\theta(f|e) = \max_a P_\theta(f, a|e). \tag{27}$$

Figure 25:
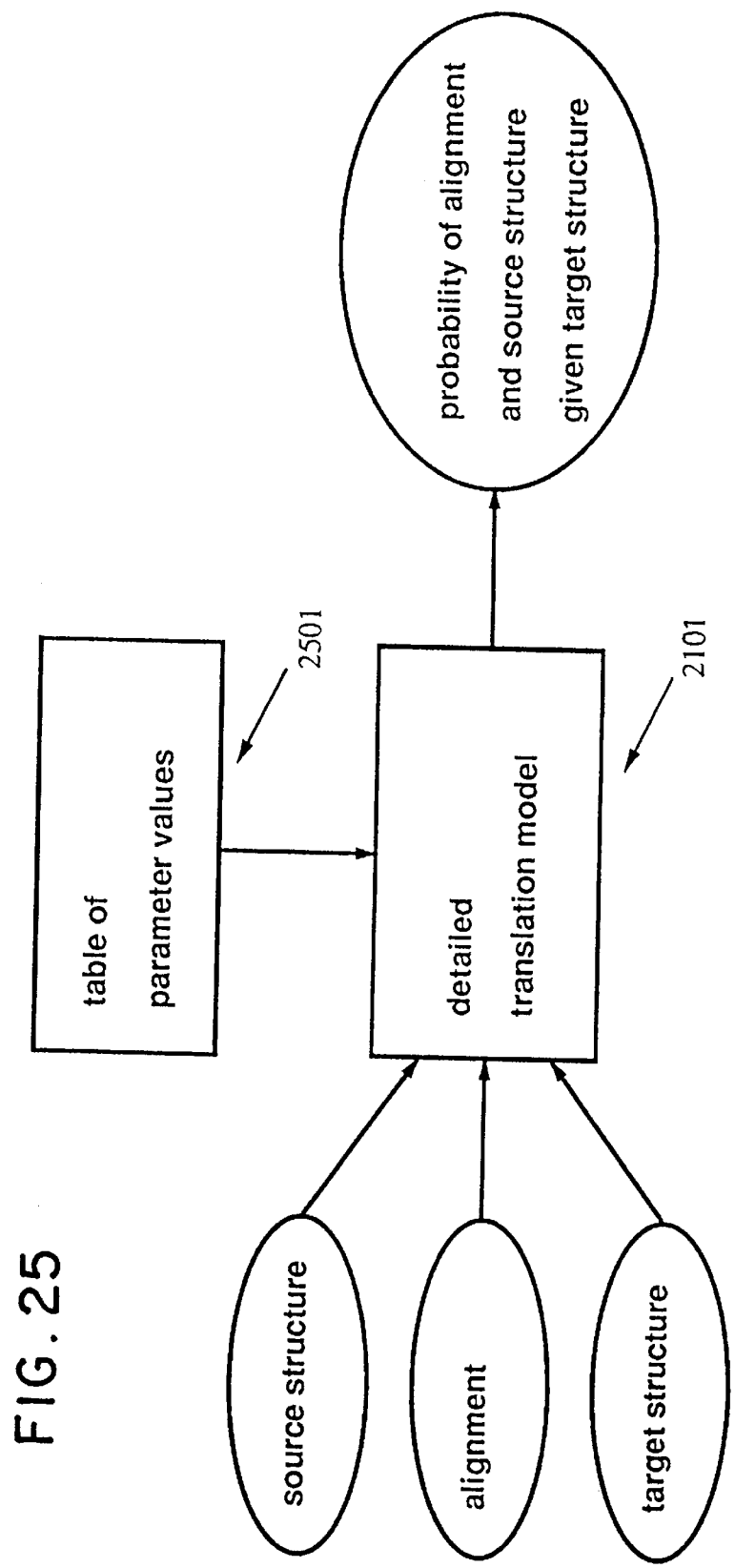
FIG. 25 is a schematic block diagram of a detailed translation model.

As depicted in FIG. 25, the probability $P_\theta(f|e)$ of a single alignment is computed by a detailed translation model 2101. The detailed translation model 2101 employs a table 2501 of values for the parameters $\theta$.

8.2 An example of a detailed translation model

Figure 26:
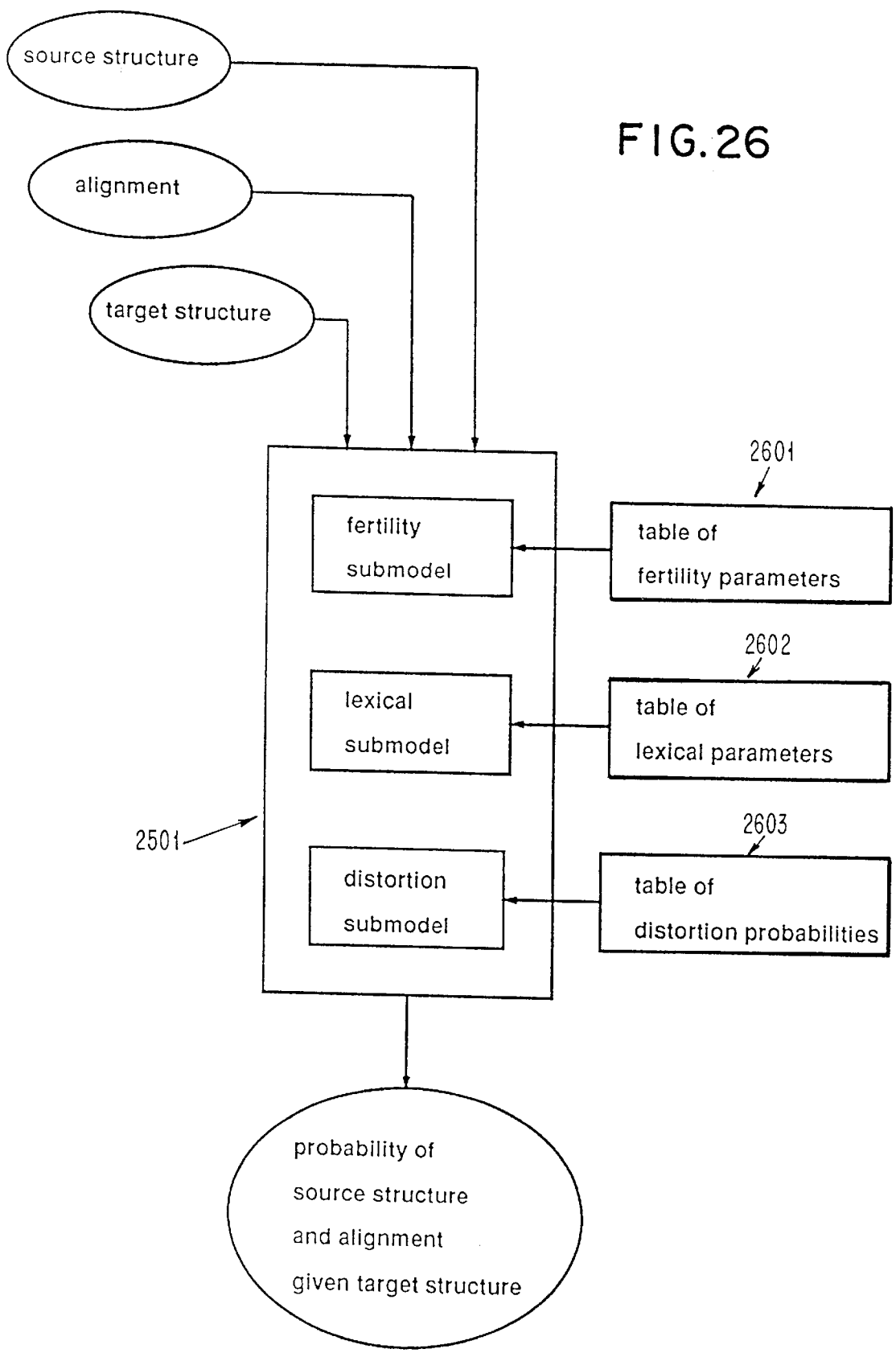
FIG. 26 is a schematic flow diagram of an embodiment of a detailed translation model.

A simple embodiment of a detailed translation model is depicted in FIG. 26. This embodiment will now be described. Other, more sophisticated, embodiments will be described in in Section 9.

For the simple embodiment of a detailed translation model depicted in FIG. 26, the source and target structures are sequences of linguistic morphs. This embodiment comprises three components:

1. a fertility sub-model 2601;
2. a lexical sub-model 2602;
3. a distortion sub-model 2603.

The probability of an alignment and source structure given a target structure is obtained by combining the probabilities computed by each of these sub-models. Corresponding to these sub-models, the table of parameter values 2501 comprises:

1a. fertility probabilities n(φ|e), where φ is any non-negative integer and e is any target morph;

b. null fertility probabilities $n_0(\phi|m')$, where $\phi$ is any non-negative integer and m' is any positive integer;

2a. lexical probabilities $t(f|e)$, where f is any source morph, and e is any target morph;

b. lexical probabilities $t(f|*null*)$, where f is any source morph, and *null* is a special symbol;

3. distortion probabilities $a(j|i,m)$, where m is any positive integer, i is any positive integer, and j is any positive integer between 1 and m.

This embodiment of the detailed translation model 2101 computes the probability $P_\theta(f,a|e)$ of an alignment a and a source structure f given a target structure e as follows. If any source entry is connected to more than one target entry, then the probability is zero. Otherwise, the probability is computed by the formula $$P_\theta(f,a|e) = \text{combinatorial\_factor} \times \text{fertility\_prob} \times \text{lexical\_prob} \times \text{distortion\_prob} \quad (28)$$

where $$\text{combinatorial\_factor} = \prod_{i=0}^{l}(\phi_i!) \quad (29)$$

$$\text{fertility\_prob} = n_0\left(\phi_0 \Big| \sum_{i=1}^{l} \phi_i\right) \prod_{i=1}^{l} n(\phi_i|e_i) \quad (30)$$

$$\text{lexical\_prob} = \prod_{j=0}^{m} t(f_j|e_{a_j}) \quad (31)$$

$$\text{distortion\_prob} = \frac{1}{\phi_0!} \prod_{j:a_j\neq 0} a(j|a_j, m) \quad (32)$$

Here l is the number of morphs in the target structure;

$e_i$ for i=1,2, ..., is the $i^{th}$ morph of the target structure;

$e_0$ is the special symbol *null*;

m is the number of morphs in the source structure;

$f_j$ for j=1,2, ..., m is the $j^{th}$ morph of the source structure;

$\phi_0$ is the number of morphs of the target structure that are not connected with any morphs of the source structure;

$\phi_i$ for i=1,2, ..., l is the number of morphs of the target structure that are connected with the $i^{th}$ morph of the source structure;

$a_j$ for j=1,2, ..., m is 0 if the $j^{th}$ morph of the source structure is not connected to any morph of the target structure;

$a_j$ for j=1,2, ..., m is i if the $j^{th}$ morph of the source structure is connected to the $i^{th}$ morph of the target structure.

These formulae are best illustrated by an example. Consider the source structure, target structure, and alignment depicted in FIG. 23. There are 7 source morphs, so m=7. The first source morph is Le, so $f_1$=Le; the second source morph is jeune, so $f_2$=jeune; etc. There are 5 target morphs so l=5. The first target morph is John, so $e_1$ =John; the second target morph is V_past_3s, so $e_2$=V_past_3s; etc. The first source morph (Le) is connected to the fourth target morph (the), so $a_1$=4. The second source morph (jeune) is connected to the fifth target morph (girl) so $a_2$=5. The complete alignment is $$a_1 = 4 \quad a_2 = 5 \quad a_3 = 5 \quad a_4 = 2 \quad a_5 = 3 \quad a_6 = 0 \quad a_7 = 1$$

All target morphs are connected to at least one source morph, so $\phi_0$=0. The first target morph (John) is connected to exactly one source morph (Jean), so $\phi_1$=1. The second target morph (V_past_3s) is connected to exactly one source morph (V_passive_3s), so $\phi_2$=1. The complete set of fertilities are $$\phi_0 = 0 \quad \phi_1 = 1 \quad \phi_2 = 1 \quad \phi_3 = 1 \quad \phi_4 = 1 \quad \phi_5 = 2$$

The components of the probability $P_\theta(f, a|e)$ are

| | | |
|---|---|---|
| combinatorial_factor | = | 0!1!1!1!1!2!    note: 0! = 1 |
| fertility_prob | = | $n_0(k = 1 \| 5)$ |
| | | $n(1 \| \text{John})n(1 \| V\_past\_3s)$ |
| | | $n(1 \| \text{to\_kiss})n(1 \| \text{the})n(1 \| \text{girl})$ |
| lexical_prob | = | $t(\text{Le} \| \text{the})t(\text{juene} \| \text{girl})t(\text{fille} \| \text{girl})$ |
| | | $t(V\_passive\_3s \| V\_past\_3s)$ |
| | | $t(\text{embrasser} \| \text{to\_kiss})$ |
| | | $t(\text{par} \| *null*)t(\text{Jean} \| \text{John})$ |
| distortion_prob | = | $\frac{1}{0!} a(1\|4,7)a(2\|5,7)a(3\|5,7)$ |
| | | $a(4\|2,7)a(5\|3,7)a(7\|1,7)$ |

Many other embodiments of the detailed translation 2101 are possible. Five different embodiments will be described in Section 9 and Section 10.

8.3 Iterative Improvement

Figure 27:
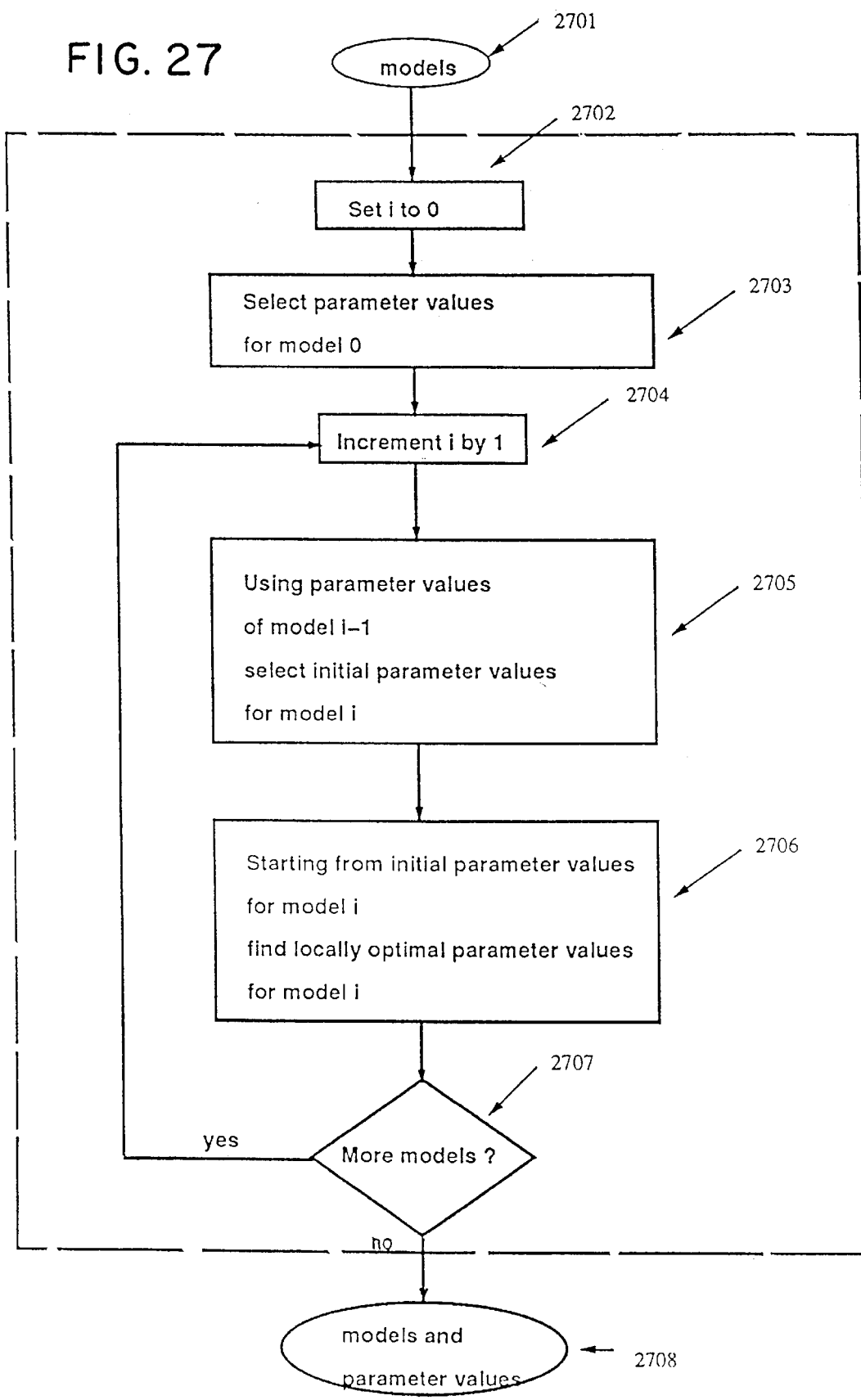
FIG. 27 is a schematic flow diagram of a method for estimating parameters for a progression of gradually more sophisticated translation models.

It is not possible to create of sophisticated model or find good parameter values at a stroke. One aspect of the present invention is a method of model creation and parameter estimation that involves gradual iterative improvement. For a given model, current parameter values are used to find better ones. In this way, starting from initial parameter values, locally optimal values are obtained. Then, good parameter values for one model are used to find initial parameter values for another model. By alternating between these two steps, the method proceeds through a sequence of gradually more sophisticated models. As illustrated in FIG. 27, the method comprises the following steps:

2701. Start with a list of models Model 0, Model 1, Model 2 etc.

2703. Choose parameter values for Model 0.

2702. Let i=0.

2707. Repeat steps 2704, 2705 and 2706 until all models are processed.

2704. Increment i by 1.

2705. Use Models 0 to i−1 together with their parameter values to find initial parameter values for Model i.

2706. Use the initial parameter values for Model i, to find locally optimal parameter values for Model i.

8.3.1 Relative Objective Function

Two hidden alignment models $\tilde{P}_\theta$ and $\bar{P}_\theta$ of the form depicted in FIG. 24 can be compared using the relative objective function[1]

[1] The relative objective function $R(\tilde{P}_\theta, P_\theta)$ is similar in form to the relative entropy $$D(p, q) = \sum_{x} p(x)\log \frac{p(x)}{q(x)} \quad (33)$$

between probability distributions p and q. However, whereas the relative entropy is never negative, R can take any value. The inequality (35) for R is the analog of the inequality $D \geq 0$ for D.

$$R(\tilde{P}_\theta, P_\theta) \equiv \sum_{f,e} C(f, e) \sum_a \tilde{P}_\theta(a|f, e) \log \frac{P_\theta(f, a|e)}{\tilde{P}_\theta(f, a|e)}, \quad (34)$$

where $\tilde{P}_\theta(a|f,e) = \tilde{P}_\theta(a,f|e)/\tilde{P}_\theta(f|e)$. Note that $R(\tilde{P}_\theta, \tilde{P}_\theta) = 0$. R is related to $\psi$ by Jensen's inequality $$\psi(P_\theta) \geq \psi(\tilde{P}_\theta) + R(\tilde{P}_\theta, P_\theta), \quad (35)$$

which follows because the logarithm is concave. In fact, for any e and f, $$\sum_a \tilde{P}_\theta(a|f, e) \log \frac{P_\theta(f, a|e)}{\tilde{P}_\theta(f, a|e)} \leq \log \sum_a \tilde{P}_\theta(a|f, e) \frac{P_\theta(f, a|e)}{\tilde{P}_\theta(f, a|e)} \quad (36)$$

$$= \log \frac{P_\theta(f|e)}{\tilde{P}_\theta(f|e)} = \log P_\theta(f|e) - \log \tilde{P}_\theta(f|e). \quad (37)$$

Summing over e and f and using the Definitions (25) and (34) yields Equation (35).

8.3.2 Improving Parameter Values

From Jensen's inequality (35), it follows that $\psi(P_\theta)$ is greater than $\psi(\tilde{P}_\theta)$ if $R(\tilde{P}_\theta, P_\theta)$ is positive. With $\tilde{P} = P$, this suggests the following iterative procedure, depicted in FIG. 28 and known as the EM Method, for finding locally optimal parameter values θ for a model P:

2801. Choose initial parameter values θ.

2803. Repeat Steps 2802–2805 until convergence.

2802. With θ fixed, find the values $\tilde{\theta}$ which maximize $R(P_{\theta}, P_{\tilde{\theta}})$.

2805. Replace θ by $\tilde{\theta}$.

2804. After convergence, θ will be locally optimal parameter values for model P.

Note that for any θ, $R(P_\theta, P_{\tilde{\theta}})$ is non-negative at its maximum in $\tilde{\theta}$, since it is zero for $\tilde{\theta} = \theta$. Thus $\psi(P_\theta)$ will not decrease from one iteration to the next.

8.3.3 Going From One Model to Another

Jensen's inequality also suggests a method for using parameter values θ for one model $\tilde{P}$ to find initial parameter values θ for another model P:

2804. Start with parameter values θ for $\tilde{P}$

2901. With $\tilde{P}$ and θ fixed, find the values $\tilde{\theta}$ which maximize $R(\tilde{P}_\theta, P_{\tilde{\theta}})$.

2902. $\tilde{\theta}$ will be good initial values for model P.

In contrast to the case where $\tilde{P} = P$, there may not be any θ for which $R(\tilde{P}_\theta, P_\theta)$ is non-negative. Thus, it could be that, even for the best $\tilde{\theta}$, $\psi(P_{\tilde{\theta}})$.

8.3.4 Parameter Reestimation Formulae

To apply these procedures, it is necessary to solve the maximization problems of Steps 2802 and 2901. For the models described below, this can be done explicitly. To see the basic form of the solution, suppose $P_\theta$ is a simple model given by $$P_\theta(f, a|e) = \prod_{\omega \in \Omega} \theta(\omega)^{c(\omega;a,f,e)}, \quad (38)$$

where the $\theta(\omega), \omega \in \Omega$, are real-valued parameters satisfying the constraints $$\theta(\omega) \geq 0, \quad \sum_{\omega \in \Omega} \theta(\omega) = 1, \quad (39)$$

and for each ω and (a,f,e), c(ω;a,f,e) is a non-negative integer.[2] It is natural to interpret θ(ω) as the probability of the event ω and c(ω;a,f,e) as the number of times that this event occurs in (a,f,e). Note that

[2] More generally, we can allow c(ω;a,f,e) to be a non-negative real number.

$$c(\omega; a, f, e) = \theta(\omega) \frac{\partial}{\partial \theta(\omega)} \log P_\theta(f, a|e). \quad (40)$$

The values for θ that maximize the relative objective function $R(\tilde{P}_\theta, P_\theta)$ subject to the contraints (39) are determined by the Kuhn-Tucker conditions $$\frac{\partial}{\partial \theta(\omega)} R(\tilde{P}_\theta, P_\theta) - \lambda = 0, \quad \omega \in \Omega, \quad (41)$$

where λ is a Lagrange multiplier, the value of which is determined by the equality constraint in Equation (39). These conditions are both necessary and sufficient for a maximum since $R(\tilde{P}_\theta, P_\theta)$ is a concave function of the θ(ω). Multiplying Equation (41) by θ(ω) and using Equation (40) and Definition (34) of R, yields the parameter reestimation formulae $$\theta(\omega) = \lambda^{-1} \tilde{c}_\theta(\omega), \quad \lambda = \sum_{\omega \in \Omega} \tilde{c}_\theta(\omega), \quad (42)$$

$$\tilde{c}_\theta(\omega) = \sum_{f,e} C(f, e) \tilde{c}_\theta(\omega; f, e), \quad (43)$$

$$\tilde{c}_\theta(\omega; f, e) = \sum_a \tilde{P}_\theta(a|f, e) c(\omega; a, f, e). \quad (44)$$

$\tilde{c}_\theta(\omega;f,e)$ can be interpreted as the expected number of times, as computed by the model $\tilde{P}_\theta$, that the event ω occurs in the translation of e to f. Thus θ(ω) is the (normalized) expected number of times, as computed by model $\tilde{P}_\theta$, that ω occurs in the translations of the training sample.

These formulae can easily be generalized to models of the form (38) for which the single equality constraint in Equation (39) is replaced by multiple constraints $$\sum_{\omega \in \Omega_\mu} \theta(\omega) = 1, \quad \mu = 1, 2, \ldots, \quad (45)$$

where the subsets $\Omega_\mu, \mu=1,2,\ldots$ form a partition of Ω. Only Equation (42) needs to be modified to include a different $\lambda_\mu$ for each $\mu$: if $\omega \in \Omega_\mu$, then $$\theta(\omega) = \lambda_\mu^{-1} \tilde{c}_\theta(\omega), \quad \lambda_\mu = \sum_{\omega \in \Omega_\mu} \tilde{c}_\theta(\omega). \quad (46)$$

8.3.5 Approximate and Viterbi Parameter Estimation

The computation required for the evaluation of the counts $\tilde{c}$ in Equation 44 increases with the complexity of the model whose parameters are being determined.

For simple models, such as Model 1 and Model 2 described below, it is possible to calculate these counts exactly by including the contribution of each possible alignments. For more sophisticated models, such as Model 3, Model 4, and Model 5 described below, the sum over alignments in Equation 44 is too costly to compute exactly. Rather, only the contributions from a subset of alignments can be practically included. If the alignments in this subset account for most of the probability of a translation, then this truncated sum can still be a good approximation.

Figure 28:
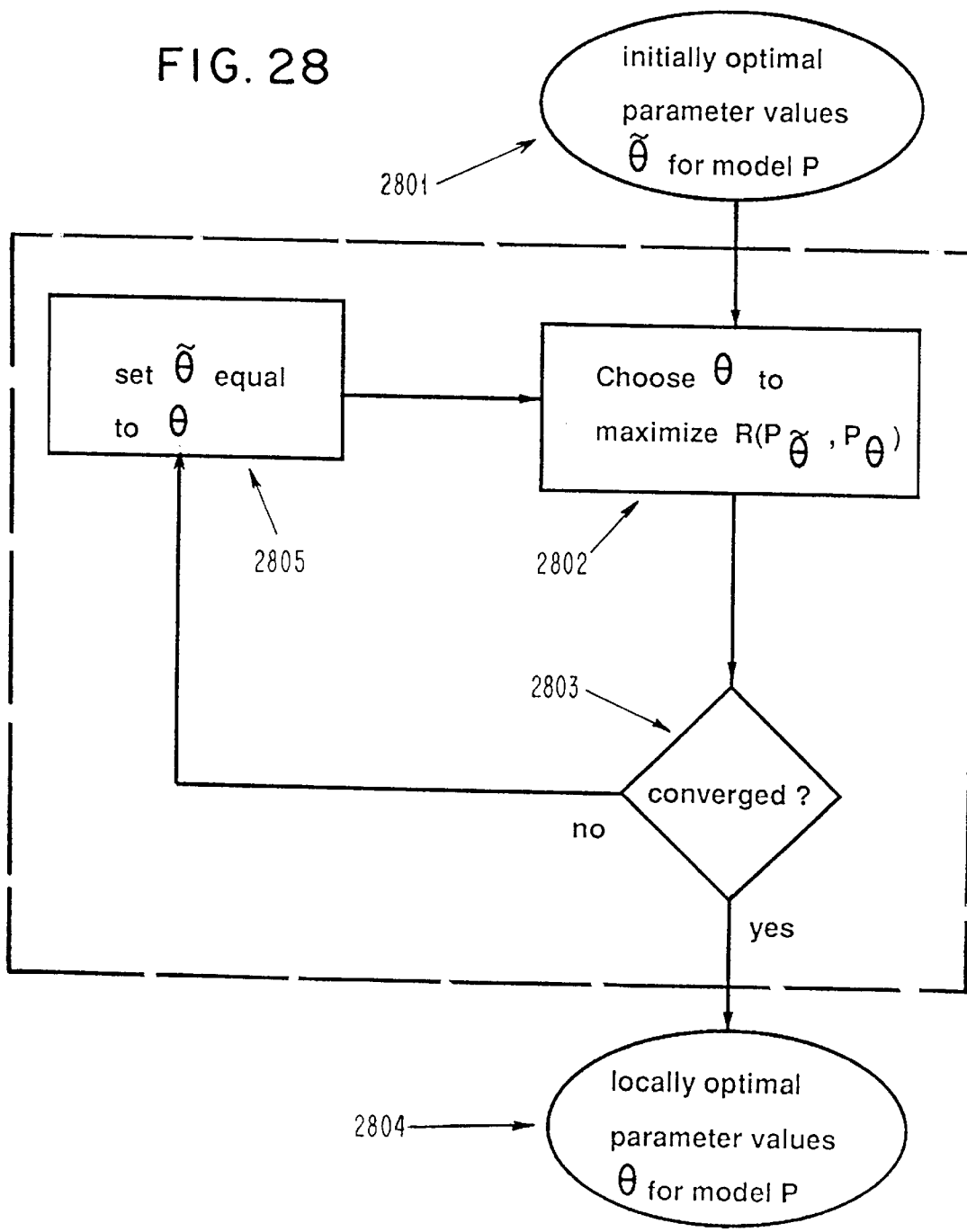
FIG. 28 is a schematic flow diagram of a method for iteratively improving parameter estimates for a model.
Figure 29:
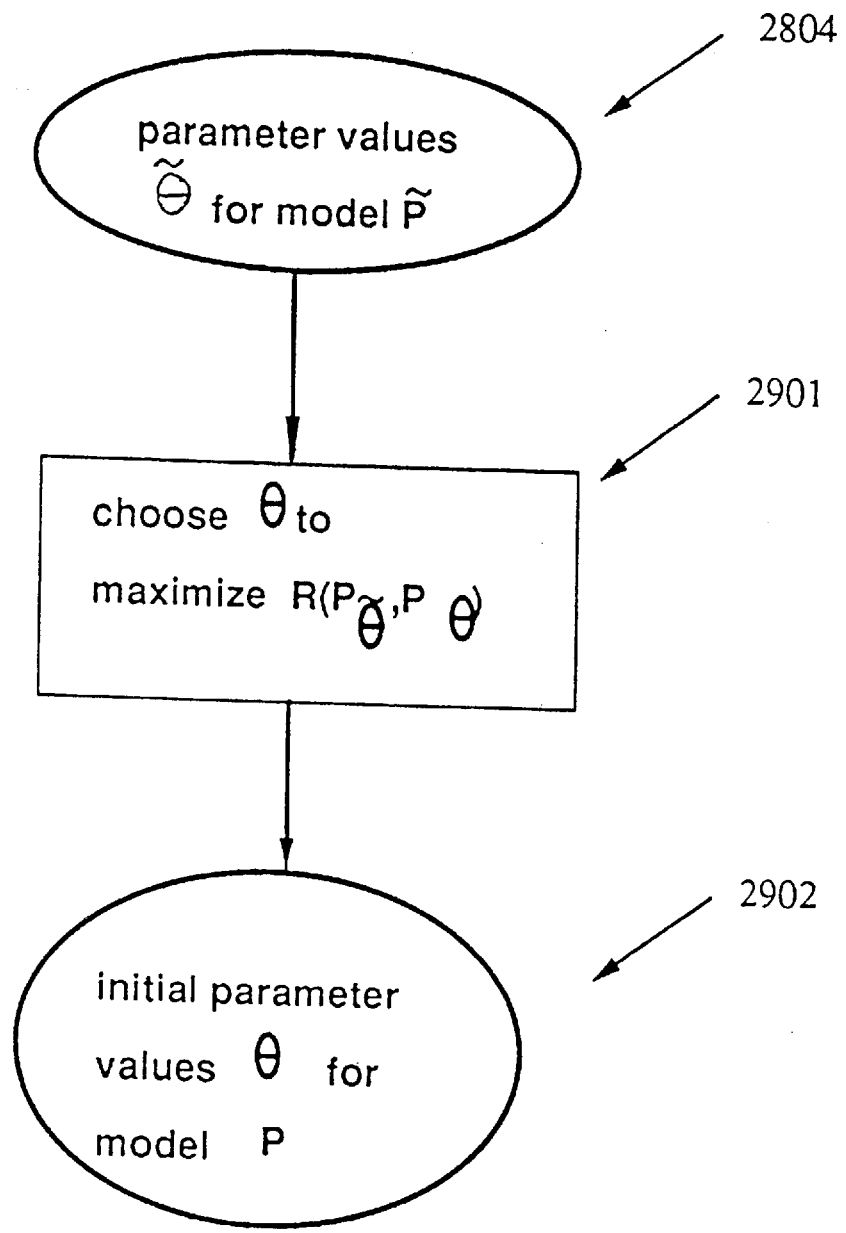
FIG. 29 is a schematic flow diagram of a method for using parameters values for one model to obtain good initial estimates of parameters for another model.

This suggests the following modification to Step 2802 of the iterative procedure of FIG. 28:

In calculating the counts using the update formulae 44, approximate the sum by including only the contributions from some subset of alignments of high probability.

If only the contribution from the single most probable alignment is included, the resulting procedure is called Viterbi Parameter Estination. The most probable alignment between a target structure and a source structure is called the Viterbi alignmtent. The convergence of Viterbi Estimation is easily demonstrated. At each iteration, the parameter values are re-estimated so as to make the current set of Viterbi alignments as probable as possible; when these parameters are used to compute a new set of Viterbi alignments, either the old set is recovered or a set which is yet more probable is found. Since the probability can never be greater than one, this process surely converge. In fact, it converge in a finite, though very large, number of steps because there are only a finite number of possible alignments for any particular translation.

In practice, it is often not possible to find Viterbi alignments exactly. Instead, an approximate Viterbi alignment can be found using a practical search procedure.

8.4 Five Models

Five detailed translation models of increasing sophistication wvill be described in Section 9 and Section 10. These models will be referred to as Model 1, Model 2, Model 3, Model 4, and Model 5.

Model 1 is very simple but it is useful because its likelihood function is concave and consequently has a global maximum which can be found by the EM procedure. Model 2 is a slight generalization of Model 1. For both Model 1 and Model 2, the sum over alignments for the objective function and the relative objective function can be computed very efficiently. This significantly reduces the computational complexity of training. Model 3 is more complicated and is designed to more accurately model the relation between a morph of e and the set of morphs in f to which it is connected. Model 4 is a more sophisticated step in this direction. Both Model 3 and Model 4 are deficient. Model 5 is a generalization of Model 4 in this deficiency is removed at the expense of more increased complexity. For Models 3,4, and 5 the exact sum over alignments can not be computed efficiently. Instead, this sum can be approximated by restricting it to alignments of high probability.

Model 5 is a preferred embodiment of a detailed translation model. It is a powerful but unwieldy ally in the battle to describe translations. It must be led to the battlefield by its weaker but more agile brethren Models 2, 3, and 4. In fact, this is the raison d'être of these models.

9 Detailed Description of Translation Models and Parameter Estimation

In this section embodiments of the statistical translation model that assigns a conditional probability to the event that a sequence of lexical units in the source language is a translation of a sequence of lexical units in the target language will be described. Methods for estimating the parameters of these embodiments will be explained.

For concreteness the discussion will be phrased in terms of a source language of French and a target language of English. The sequences of lexical units will be restricted to sequences of words.

It should be understood that the translation models, and the methods for their training generalize easily to other source and target languages, and to sequences of lexical units comprising lexical morphemes, syntactic markers, sense labels, case frame labels, etc.

9.1 Notation

Random variables will be denoted by upper case letters, and the values of such variables will be denoted by the corresponding lower case letters. For random variables X and Y, the probability $Pr(Y=y|X=x)$ will be denoted by the shorthand $p(y|x)$. Strings or vectors will be denoted by bold face letters, and their entries will be denoted by the corresponding non-bold letters.

In particular, e will denote an English word, e will denote a string of English words, and E will denote a random variable that takes as values strings of English words. The length of an English string will be denoted l, and the corresponding random variable will be denoted L. Similarly, f will denote a French word, f will denote a string of English words, and F will denote a random variable that takes as values strings of French words. The length of a French string will be denoted m, and the corresponding random variable will be denoted At.

A table notation appears in Section 10.

9.2 Translations

A pair of strings that are translations of one another will be called a translation. A translation will be depicted by enclosing the strings that make it up in parentheses and separating them by a vertical bar. Thus, (Qu'aurions-nous pu faire?|What could we have done?) depicts the translation of Qu'aurions-nous pu faire? as What could we have done?. When the strings are sentences, the final stop will be omitted unless it is a question mark or an exclamation point.

9.3 Alignments

Figure 33:
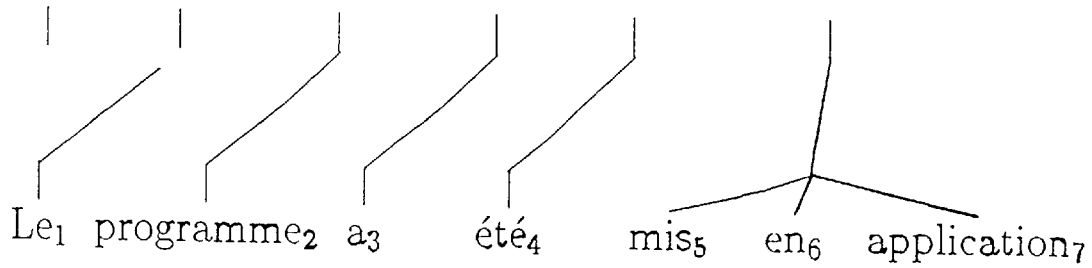
FIG. 33 is an alignment with independent English words.

Some embodiments of the translation model involve the idea, of an alignment between a pair of strings. An alignment consists of a set of connections between words in the French string and words in the English string. An alignment is a random variable, A; a generic value of this variable will be denoted by a.Alignments are shown graphically, as in FIG. 33, by writing the English string above the French string and drawing lines from some of the words in the English string to some of the words in the French string. These lines are called connections. The alignment in FIG. 33 has seven connections, (the, Le), (program, programme), and so on. In the description that follows, such an alignment will be denoted as (Le programme a été mis en application|And the(1) program(2) has(3) been(4) implemented(5,6,7)). The list of numbers following an English word shows the positions in the French string of the words with which it is aligned. Because And is not aligned with any French words here, there is no list of numbers after it. Every alignment is considered to be correct with some probability. Thus (Le perogramme a clé mis en application|And(1,2,3,4,5,6,7) the program has been implemented) is perfectly acceptable. Of course, this is much less probable than the alignment shown in FIG. 33.

Figure 34:
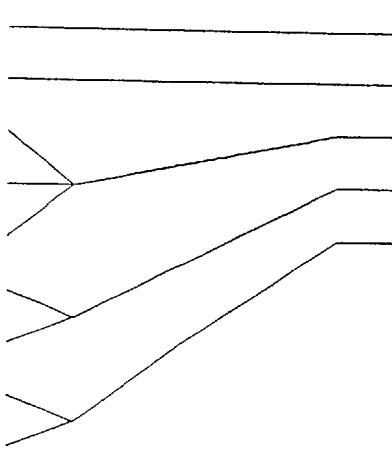
FIG. 34 is an alignment with independent French words.
Figure 35:
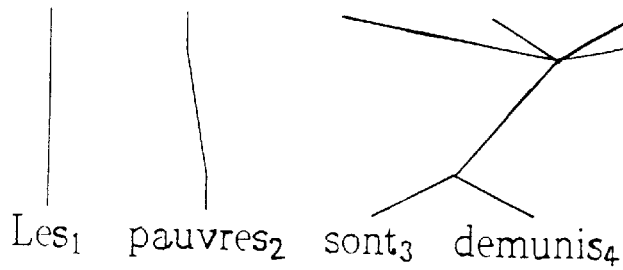
FIG. 35 is a general alignment.

As another example, the alignment (Le reste appartenait aux autochlones|The(1) balance(2) was(3) the(3) territory(3) of(4) the(4) aboriginal(5) people(5)) is shown in FIG. 34. Sometimes, two or more English words may be connected to two or more French words as shown in FIG. 35. This will be denoted as (Les pauvres soni démunis|The(1) poor(2) don't (3,4) have(3,4) any(3,4) money(3,4)). Here, the four English words don't have any money conspire to generate the two French words sont démunis.

The set of English words connected to a French word will be called the notion that generates it. An alignment resolves the English string into a set of possibly overlapping notions that is called a notional scheme. The previous example contains the three notions The, poor, and don't have any money. Formally, a notion is a subset of the positions in the English string together with the words occupying those positions. To avoid confusion in describing such cases, a subscript will be affixed to each word showing its position. The alignment in FIG. 34 includes the notions the$_4$ and of$_6$the$_7$, but not the notions of$_6$the$_4$or the$_7$. In (J'applaudis à la décision|I(1) applaud(2) the(4) decision(5)), à is generated by the empty notion. Although the empty notion has no position and so never requires a clarifying subscript, it will be placed at the beginning of the English string, in position zero, and denoted by $e_0$. At times, therefore, the previous alignment will be denoted as (J'applaudis à la décision$|e_0$(3) l(1) applaud(2) the(4) decision(5)).

The set of all alignments of (f|e) will be written A(e, f). Since e has length l and f has length m, there are lm different connections that can be drawn between them. Since an alignment is determined by the connections that it contains, and since a subset of the possible connections can be chosen in $2^{lm}$ ways, there are $2^{lm}$ alignments in A(e, f).

For the Models 1–5 described below, only alignments without multi-word notions are allowed. Assuming this restriction, a notion can be identified with a position in the English string, with the empty notion identified with position zero. Thus, each position in the French string is connected to one of the positions 0 through l in the English string. The notation $a_j=i$ will be used to indicate that a word in position j of the French string is connected to the word in position i of the English string.

The probability of a French string f and an alignment a given an English string e can be written $$P(f, a|e) = P(m|e) \prod_{j=1}^{m} P(a_j|a_1^{j-1}, f_1^{j-1}, m, e) P(f_j|a_1^j, f_1^{j-1}, m, e). \quad (47)$$

Here, m is the length of f and $a_1^m$ is determined by a.

9.4 Model 1

The conditional probabilities on the right-hand side of Equation (47) cannot all be taken as independent parameters because there are too many of them. In Model 1, the probabilities P(m|e) are taken to be independent of e and m; that $P(a_j|a_1^{j-1},f_1^{j-1},m,e)$, depends only on l, the length of the English string, and therefore must be $(l+1)^{-1}$; and that $P(f_j|a_1^j,f_1^{j-1}, m,e)$ depends only on $f_j$ and $e_{a_j}$. The parameters, then, axe $\epsilon \equiv P(m|e)$, and $t(f_j|e_{a_j}) \equiv P(f_j|a_1^j,f_1^{j-1}, m,e)$, which will be called the tranzslatzion probability of $f_j$ given $e_{a_j}$. The parameter $\epsilon$ is fixed at some small number. The distribution of M is unnormalized but this is a minor technical issue of no significance to the computations. In particular, M can be restricted to some finite range. As long as this range encompasses everything that actually occurs in training data, no problems arise.

A method for estimating the translation probabilities for Model 1 will now be described. The joint likelihood of a French sentence and an alignment is $$P(f, a|e) = \epsilon(l+1)^{-m} \prod_{j=1}^{m} t(f_j|e_{a_j}). \quad (48)$$

The alignment is determined by specifying the values of $a_j$ for j from 1 to m, each of which can take any value from 0 to l. Therefore, $$P(f|e) = \epsilon(l+1)^{-m} \sum_{a_1=0}^{l} \cdots \sum_{a_m=0}^{l} \prod_{j=1}^{m} t(f_j|e_{a_j}). \quad (49)$$

The first goal of the training process is to find the values of the translation probabilities that maximize P(f|e) subject to the constraints that for each e, $$\sum_f t(f|e) = 1. \quad (50)$$

An iterative method for doing so will be described.

The method is motivated by the following consideration. Following standard practice for constrained maximization, a necessary relationship for the parameter values at a local maximum can be found by introducing Lagrange multipliers, $\lambda_e$, and seeking an unconstrained maximum of the auxiliary function $$h(t, \lambda) \equiv \epsilon(l+1)^{-m} \sum_{a_1=0}^{l} \cdots \sum_{a_m=0}^{l} \prod_{j=1}^{m} t(f_j|e_{a_j}) - \sum_e \lambda_e \left( \sum_f t(f|e) - 1 \right). \quad (51)$$

At a local maximum, all of the partial derivatives of h with respect to the components of t and $\lambda$ are zero. That the partial derivatives with respect to the components of $\lambda$ be zero is simply a restatement of the constraints on the translation probabilities. The partial derivative of h with respect to t(f|e) is $$\frac{\partial h}{\partial t(f|e)} = \quad (52)$$

$$\epsilon(l+1)^{-m} \sum_{a_1=0}^{l} \cdots \sum_{a_m=0}^{l} \sum_{j=1}^{m} \delta(f,f_j)\delta(e, e_{a_j}) t(f|e)^{-1} \prod_{k=1}^{m} t(f_k|e_{a_k}) - \lambda_e,$$

where $\delta$ is the Kronecker delta function, equal to one when both of its arguments are the same and equal to zero otherwise. This will be zero provided that $$t(f|e) = \lambda_e^{-1}\epsilon(l+1)^{-m} \sum_{a_1=0}^{l} \cdots \sum_{a_m=0}^{l} \sum_{j=1}^{m} \delta(f, f_j)\delta(e, e_{a_j}) \prod_{k=1}^{m} t(f_k|e_{a_k}). \quad (53)$$

Superficially Equation (53) looks like a solution to the maximization problem, but it is not because the translation probabilities appear on both sides of the equal sign. Nonetheless, it suggests an iterative procedure for finding a solution:

1. Begin with initial guess for the translation probabilities;
2. Evaluate the right-hand side of Equation (53);
3. Use the result as a new estimate for t(f|e).
4. Iterate steps 2 through 4 until converged.

(Here and elsewhere, the Lagrange multipliers simply serve as a reminder that the translation probabilities must be normalized so that they satisfy Equation (50).) This process, when applied repeatedly is called the EM process. That it converges to a stationary point of h in situations like this, as demonstrated in the previous section, was first shown by L. E. Baum in an article entitled, An Inequality and Associated Maximization Technique in Statistical Estimation of Probabilistic Functions of a Markov Process, appearing in the journal Inequalities, Vol.3, in 1972.

With the aid of Equation (48), Equation (53) can be re-expressed as $$t(f|e) = \lambda_e^{-1} \sum_a P(f, a|e) \underbrace{\sum_{j=1}^{m} \delta(f, f_j)\delta(e, e_{a_j})}_{\text{number of times } e \text{ connects to } f \text{ in } a}. \quad (54)$$

The expected number of times that e connects to f in the translation (f|e) will be called the count of f given e for (f|e) and will be denoted by c(f|e;f,e). By definition, $$c(f|e; f, e) = \sum_a P(a|e, f) \sum_{j=1}^{m} \delta(f, f_j)\delta(e, e_{a_j}), \quad (55)$$

where P(a|e,f)=P(f,a|e)/P(f|e). If $\lambda_e$ is replaced by $\lambda_e P(f|e)$, then Equation (54) can be written very compactly as $$t(f|e) = \lambda_e^{-1} c(f|e;f,e). \quad (56)$$

In practice, the training data consists of a set of translations, $(f^{(1)}|e^{(1)})$, $(f^{(2)}|e^{(2)})$, . . . , $(f^{(S)}|e^{(S)})$, so this equation becomes $$t(f|e) = \lambda_e^{-1} \sum_{s=1}^{S} c(f|e; f^{(s)}, e^{(s)}). \tag{57}$$

Here, $\lambda_e$ serves only as a reminder that the translation probabilities must be normalized.

Usually, it is not feasible to evaluate the expectation in Equation (55) exactly. Even if multiword notions are excluded, there are still $(l+1)^m$ alignments possible for $(f|e)$. Model 1, however, is special because by recasting Equation (49), it is possible to obtain an expression that can be evaluated efficiently. The right-hand side of Equation (49) is a sum of terms each of which is a monomial in the translation probabilities. Each monomial contains m translation probabilities, one for each of the words in f. Different monomials correspond to different ways of connecting words in f to notions in e with every way appearing exactly once. By direct evaluation, then $$\sum_{a_1=0}^{l} \ldots \sum_{a_m=0}^{l} \prod_{j=1}^{m} t(f_j|e_{a_j}) = \prod_{j=1}^{m} \sum_{i=0}^{l} t(f_j|e_i). \tag{58}$$

Therefore, the sums in Equation (49) can be interchanted with the product to obtain $$P(f|e) = \epsilon(l+1)^{-m} \prod_{j=1}^{m} \sum_{i=0}^{l} t(f_j|e_i). \tag{59}$$

Using this expression, it follows that $$c(f|e; f, e) = \underbrace{\frac{t(f|e)}{t(f|e_0) + \ldots + t(f|e_l)}}_{} \underbrace{\sum_{j=1}^{m} \delta(f, f_j)}_{\text{count of } f \text{ in } f} \overbrace{\sum_{i=0}^{l} \delta(e, e_i)}^{\text{count of } e \text{ in } e}. \tag{60}$$

Thus, the number of operations necessary to calculate a count is proportional to lm rather than to $(l+1)^m$ as Equation (55) might suggest.

The details of the initial guesses for $t(f|e)$ are unimportant because $P(f|e)$ has a unique local maximum for Model 1, as is shown in Section 10. In practice, the initial probabilities $t(f|e)$ are chosen to be equal, but any other choice that avoids zeros would lead to the same final solution.

9.5 Model 2

Model 1, takes no cognizance of where words appear in either string. The first word in the French string is just as likely to be connected to a word at the end of the English string as to one at the beginning. In contrast, Model 2 makes the same assumptions as in Model 1 except that it assumes that $P(\alpha_j|\alpha_1^{j-1}, f_1^{j-1}, m, e)$ depends on j, $\alpha_j$, and m, as well as on l. This is done using a set of alignment probabilities, $$a(\alpha_j|j,m,l) \equiv P(\alpha_j|\alpha_1^{j-1}, f_1^{j-1}, m, l) \tag{61}$$

which satisfy the constraints $$\sum_{i=0}^{l} a(i|j, m, l) = 1 \tag{62}$$

for each triple jml. Equation (49) is replaced by $$P(f|e) = \epsilon \sum_{a_1=0}^{l} \ldots \sum_{a_m=0}^{l} \prod_{j=1}^{m} t(f_j|e_{a_j}) a(a_j|j, m, l). \tag{63}$$

A relationship among the parameter values for Model 2 that maximize this likelihood is obtained, in analogy with the above discussion by seeking an unconstrained maximum of the auxiliary function $$h(t, a, \lambda, \mu) \equiv \epsilon \sum_{a_1=0}^{l} \ldots \sum_{a_m=0}^{l} \prod_{j=1}^{m} t(f_j|e_{a_j}) s(a_j|j, m, l) - \tag{64}$$

$$\sum_e \lambda_e \left( \sum_f t(f|e) - 1 \right) - \sum_j \mu_{jml} \left( \sum_i a(i|j, m, l) - 1 \right).$$

It is easily verified that Equations (54), (56), and (57) carry over from Model 1 to Model 2 unchanged. In addition, an iterative update formulas for $a(i|j, m, l)$, can be obtained by introducing a new count, $c(i|j, m, l; f, e)$, the expected number of times that the word in position j of f is connected to the word in position i of e. Clearly, $$c(i|j, m, l; f, e) = \sum_a P(a|e, f)\delta(i, a_j). \tag{65}$$

In analogy with Equations (56) and (57), for a single translation, $$a(i|j, m, l) = \mu_{jml}^{-1} c(i|j, m, l; f, e), \tag{66}$$

and, for a set of translations, $$a(i|j, m, l) = \mu_{jml}^{-1} \sum_{s=1}^{S} c(i|j, m, l; f^{(s)}, e^{(s)}). \tag{67}$$

Notice that if $f^{(s)}$ does not have length m or if $e^{(s)}$ does not have length l, then the corresponding count is zero. As with the $\lambda$'s in earlier equations, the $\mu$'s here serve to normalize the alignment probabilities.

Model 2 shares with Model 1 the important property that the sums in Equations (55) and (65) can be obtained efficiently. Equation (63) can be rewritten $$P(f|e) = \epsilon \prod_{j=1}^{m} \sum_{i=0}^{l} t(f_j|e_i) a(i|j, m, l). \tag{68}$$

Using this form for P(f|e), it follows that $$c(f|e; f, e) = \sum_{j=1}^{m} \sum_{i=0}^{l} \frac{t(f|e)a(i|j, m, l)\delta(f, f_j)\delta(e, e_i)}{t(f|e_0)a(0|j, m, l) + \ldots + t(f|e_l)a(l|j, m, l)}, \tag{69}$$

and $$c(i|j, m, l; f, e) = \frac{t(f_j|e_i)a(i|j, m, l)}{t(f_j|e_0)a(0|j, m, l) + \ldots + t(f_j|e_l)a(l|j, m, l)}. \tag{70}$$

Equation (69) has a double sum rather than the product of two single sums, as in Equation (60), because, in Equation (69), i and j are tied together through the alignment probabilities.

Model 1 is a special case of Model 2 in which $a(i|j, m, l)$ is held fixed at $(l+1)^{-1}$. Therefore, any set of parameters for Model 1 can be reinterpreted as a set of parameters for Model 2. Talking as initial estimates of the parameters for Model 2 the parameter values that result from training Model 1 is equivalent to computing the probabilities of all alignments using Model 1, but then collecting the counts appropriate to Model 2. The idea of computing the probabilities of the alignments using one model, but collecting the counts in a way appropriate to a second model is very general and can always be used to transfer a set of parameters from one model to another.

9.6 Intermodel interlude

Models 1 and 2 make various approximations to the conditional probabilities that appear in Equation (47). Although Equation (47) is an exact statement, it is only one of many ways in which the joint likelihood of f and a can be written as a product of conditional probabilities. Each such product corresponds in a natural way to a generative process for developing f and a from e. In the process corresponding to Equation (47), a length for f is chosen first. Next, a position in e is selected and connected to the first position in f. Next, the identity of $f_1$ is selected. Next, another position in e is selected and this is connected to the second word in f, and so on.

Casual inspection of some translations quickly establishes that the is usually translated into a single word (le, la, or l'), but is sometimes omitted; or that only is often translated into one word (for example, seulement), but sometimes into two (for example, ne . . . que), and sometimes into none. The number of French words to which e is connected in an alignment is a random variable, $\Phi_e$, that will be called its fertility. Each choice of the parameters in Model 1 or Model 2 determines a distribution, $\Pr(\Phi_e=\phi)$, for this random variable. But the relationship is remote: just what change will be wrought in the distribution of $\Phi_{the}$ if, say, $\alpha(1|2, 8, 9)$ is adjusted, is not immediately clear. In Models 3, 4, and 5, fertilities are parameterized directly.

As a prolegomenon to a detailed discussion of Models 3, 4, and 5, the generative process upon which they are based will be described. Given an English string, e, a fertility for each word is selected, and a list of French words to connect to it is generated. This list, which may be empty, will be called a tablet. The collection of tablets is a random variable, T, that will be called the tableau of e; the tablet for the $i^{th}$ English word is a random variable, $T_i$; and the $k^{th}$ French word in the $i^{th}$ tablet is a random variable, $T_{ik}$. After choosing the tableau, a permutation of its words is generated, and f is produced. This permutation is a random variable, $\Pi$. The position in f of the $k^{th}$ word in the $i^{th}$ tablet is yet another a random variable, $\Pi_{ik}$.

The joint likelihood for a tableau, $\tau$, and a permutation, $\pi$, is $$P(\tau, \pi|e) = \prod_{i=1}^{l} P(\phi_i|\phi_1^{i-1}, e) P(\phi_0|\phi_1^l, e) \times \quad (71)$$

$$\prod_{i=0}^{l} \prod_{k=1}^{\phi_i} P(\tau_{ik}|\tau_{i1}^{k-1}, \tau_0^{i-1}, \phi_0^l, e) \times$$

$$\prod_{i=1}^{l} \prod_{k=1}^{\phi_i} P(\pi_{ik}|\pi_{i1}^{k-1}, \pi_1^{i-1}, \tau_0^l, \phi_0^l, e) \times$$

$$\prod_{k=1}^{\phi_0} P(\pi_{0k}|\pi_{01}^{k-1}, \pi_1^l, \tau_0^l, \phi_0^l, e).$$

In this equation, $\tau_{il}^{k-1}$ represents the series of values $\tau_{il}$, ..., $\tau_{ik-1}$, $\pi_{il}^{k-1}$ represents the series of values $\pi_{il}$, ..., $\pi_{ik-1}$; and $\phi_i$ is a shorthand for $\phi_{ei}$.

Knowing $\tau$ and $\pi$ determines a French string and an alignment, but in general several different pairs $\tau$, $\pi$ may lead to the same pair f, a. The set of such pairs will be denoted by (f, a). Clearly, then $$P(f, a|e) = \sum_{(\tau,\pi)\in(f,a)} P(\tau, \pi|e). \quad (72)$$

Figure 36:
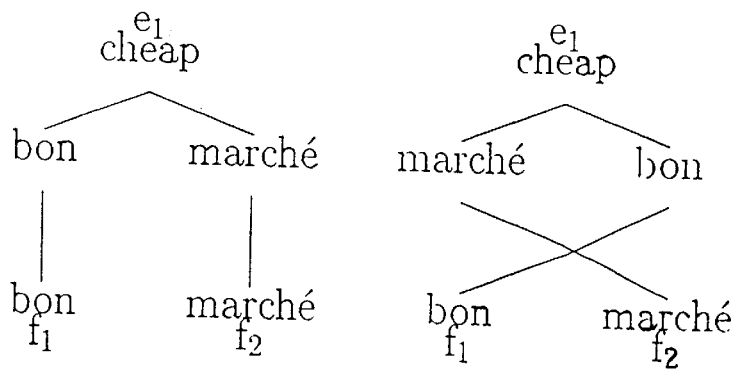
FIG. 36 shows two tableaux for one alignment.

The number of elements in (f, a) is $$\sum_{i=0}^{l} \phi_i!$$

because for each $\tau_i$ there are $\phi_i!$ arrangements that lead to the pair f, a. FIG. 36 shows the two tableaux for (bon march é|cheap(1,2)).

Except for degenerate cases, there is one alignment in A(e, f) for which P(a|e, f) is greatest. This alignment will be called the Viterbi alignment for (f|e) and will be denoted by V(f|e). For Model 2 (and, thus, also for Model 1), finding V(f|e) is straightforward. For each j, $a_j$ is chosen so as to make the product $t(f_j|e_{aj})\alpha(a_j|j, m, 1)$ as large as possible. The Viterbi alignment depends on the model with respect to which it is computed. In what follows, the Viterbi alignments for the different models will be distinguished by writing V(f|e; 1), V(f|e; 2), and so on.

The set of all alignment for which $\alpha_j=i$ will be denoted by $A_{i \leftarrow j}(e, f)$. The pair ij will be said to be pegged for the elements of $A_{i \leftarrow j}(e, f)$. The element of $A_{i \leftarrow j}(e, f)$ for which P(a|e, f) is greatest will be called the pegged Viterbi alignment for ij, and will be denoted by $V_{i \leftarrow j}(f|e)$, Obviously, $V_{i \leftarrow j}(f|e; 1)$ and $V_{i \leftarrow j}(f|e; 2)$ can be found quickly with a straightforward modification of the method described above for finding V(f|e; 1) and V(f|e; 2).

9.7 Model 3

Model 3 is based on Equation (71). It assumes that, for i between 1 and l, $P(\phi_i|\phi_i^{i-1}, e)$ depends only on $\phi_i$ and $e_i$; that, for all i, $P(\tau_{ik}|\tau_{il}^{k-1}, \tau_0^{i-1}, \phi_0^l, e)$ depends only on $\tau_{ik}$ and $e_i$; and that, for i between 1 and l, $P(\pi_{ik}|\pi_{il}^{k-1}, \pi_1^{i-1}, \tau_0^l, \phi_0^l, e)$ depends only on $\pi_{ik}$, i, m, and l. The parameters of Model 3 are thus a set of fertility probabilities, $n(\phi|e_i)=P(\phi|\phi_1^{i-1}, e)$; a set of translation probabilities, $t(f|e_i)=\Pr(T_{ik}=f|\tau_{il}^{k-1}, \tau_0^{i-1}, \phi_0^l, e)$; and a set of distortion probabilities, $d(j|i, m, l)=\Pr(\Pi_{ik}=j|\pi_{il}^{k-1}, \pi_1^{i-1}, \tau_0^l, \phi_0^l, e)$.

The distortion and fertility probabilities for $e_0$ are handled differently. The empty notion conventionally occupies position 0, but actually has no position. Its purpose is to account for those words in the French string that cannot readily be accounted for by other notions in the English string. Because these words are usually spread uniformly throughout the French string, and because they are placed only after all of the other words in the sentence have been placed, the probability $\Pr(\Pi_{0k+1}=j|\pi_{01}^k, \pi_1^l, \tau_0^l, \phi_0^l, e)$ is set to 0 unless position j is vacant in which case it is set $(\phi_0-k)^{-1}$. Therefore, the contribution of the distortion probabilities for all of the words in $\tau_0$ is $1/\phi_0!$.

The value of $\phi_0$ depends on the length of the French sentence since longer sentences have more of these extraneous words. In fact Model 3 assumes that $$P(\phi_0|\phi_1^l, e) = \binom{\phi_1 + \ldots + \phi_l}{\phi_0} p_0^{\phi_1 + \ldots + \phi_l - \phi_0} p_1^{\phi_0} \quad (73)$$

for some pair of auxiliary parameters $\rho_0$ and $\rho_1$. The expression on the left-hand side of this equation depends on $\phi_1^l$ only through the sum $\phi_1 + \ldots + \phi_l$ and defines a probability distribution over $\phi_0$ whenever $\rho_0$ and $\rho_1$ are nonnegative and sum to 1. The probability $P(\phi_0|\phi_1^l, e)$ can be interpreted as follows. Each of the words from $\tau_1^l$ is imagined to require an extraneous word with probability $\rho_1$; this word is required to be connected to the empty notion. The probability that exactly $\phi_0$ of the words from $\tau_1^l$ will require an extraneous word is just the expression given in Equation (73).

As in Models 1 and 2, an alignment of (f|e) in Model 3 is determined by specifying $\alpha_j$ for each position in the French string. The fertilities, $\phi_0$ through $\phi_1$, are functions of the $\alpha_j$'s. Thus, $\phi_i$ is equal to the number of j's for which $\alpha_j$ equals i. Therefore, $$P(f|e) = \sum_{a_1=0}^{l} \ldots \sum_{a_m=0}^{l} P(f, a|e) = \quad (74)$$

$$\sum_{a_1=0}^{l} \ldots \sum_{a_m=0}^{l} \binom{m - \phi_0}{\phi_0} p_0^{m-2\phi_0} p_1^{\phi_0} \prod_{i=1}^{l} \phi_i! n(\phi_i|e_i) \times$$

-continued $$\sum_{j=1}^{m} t(f_j|e_{a_j})d(j|a_j, m, l)$$

with $\Sigma_f t(f|e)=1$, $\Sigma_j d(j|i, m, l)=1$, $\Sigma_\phi n(\phi|e)=1$, and $\rho_0+\rho_1=1$. According to the assumptions of Model 3, each of the pairs $(\tau, \pi)$ in $(f, a)$ makes an identical contribution to the sum in Equation (72). The factorials in Equation (74) come from carrying out this sum explicitly. There is no factorial for the empty notion because it is exactly cancelled by the contribution from the distortion probabilities.

By now, it should be clear how to provide an appropriate auxiliary function for seeking a constrained maximum of the likelihood of a translation with Model 3. A suitable auxiliary function is $$h(t, d, n, p, \lambda, \mu, \nu, \xi) = \qquad (75)$$

$$P(f|e) - \sum_e \lambda_e \left( \sum_f t(f|e) - 1 \right) - \sum_i \mu_{iml} \left( \sum_j d(j|i, m, l) - 1 \right) -$$

$$\sum_e \nu_e \left( \sum_\phi n(\phi|e) - 1 \right) - \xi(p_0 + p_l - 1).$$

As with Models 1 and 2, counts are defined by $$c(f|e; f, e) = \sum_a P(a|e, f) \sum_{j=1}^{m} \delta(f, f_j)\delta(e, e_{a_j}), \qquad (76)$$

$$c(j|i, m, l; f, e) = \sum_a P(a|e, f)\delta(i, a_j), \qquad (77)$$

$$c(\phi|e; f, e) = \sum_a P(a|e, f) \sum_{i=1}^{l} \delta(\phi, \phi_i)\delta(e, e_i), \qquad (78)$$

$$c(0; f, e) = \sum_a P(a|e, f) (m - 2\phi_0) \qquad (79)$$

and $$c(1; f, e) = \sum_a P(a|e, f)\phi_0. \qquad (80)$$

In terms of these counts, the reestimation formulae for Model 3 are $$t(f|e) = \lambda_e^{-1} \sum_{s=1}^{S} c(f|e; f^{(s)}, e^{(s)}), \qquad (81)$$

$$d(j|i, m, l) = \mu_{iml}^{-1} \sum_{s=1}^{S} c(j|i, m, l; f^{(s)}, e^{(s)}), \qquad (82)$$

$$n(\phi|e) = \nu_e^{-1} \sum_{s=1}^{S} c(\phi|e; f^{(s)}, e^{(s)}), \qquad (83)$$

and $$p_k = \xi^{-1} \sum_{s=1}^{S} c(k; f^{(s)}, e^{(s)}). \qquad (84)$$

Equations (76) and (81) are identical to Equations (55) and (57) and are repeated here only for convenience. Equations (77) and (82) are similar to Equations (65) and (67), but $\alpha(i|j, m, l)$ differs from $d(j|i, m, l)$ in that the former sums to unity over all i for fixed j while the latter sums to unity over all j for fixed i. Equations (78), (79), (80), (83) and (84), for the fertility parameters, are new.

The trick that permits the a rapid evaluation of the right-hand sides of Equations (55) and (65) efficiently for Model 2 does not work for Model 3. Because of the fertility parameters, it is not possible to exchange the sums over $\alpha_1$ through $\alpha_m$ with the product over j in Equation (74) as was done for Equations (49) and (63). A method for overcoming this difficulty now will be described. This method relies on the fact that some alignments are much more probable than others. The method is to carry out the sums in Equations (74) and (76) through (80) only over some of the more probable alignments, ignoring the vast sea of much less probable ones.

To define the subset, S, of the elements of A(f|e) over which the sums are evaluated a little more notation is required. Two alignments, a and a' will be said to differ by a move if there is exactly one value of j for which $\alpha_j \ne \alpha_j'$. Alignments will be said to differ by a swap if $\alpha_j = \alpha_j'$ except at two values, $j_1$ and $j_2$, for which $\alpha_{j1} = \alpha_{j2}'$ and $\alpha_{j2} = \alpha_{j1}'$. The two alignments will be said to be neighbors if they are identical or differ by a move or by a swap. The set of all neighbors of a will be denoted by N(a).

Let b(a) be that neighbor of a for which the likelihood is greatest. Suppose that ij is pegged for a. Among the neighbors of a for which ij is also pegged, let $b_{i \leftrightarrow j}(a)$ be that for which the likelihood is greatest. The sequence of alignments a, b(a), $b^2(a) \equiv b(b(a))$, ..., converges in a finite number of steps to an alignment that will be denoted as $b^\infty(a)$. Similarly, if ij is pegged for a, the sequence of alignments a, $b_{i \leftrightarrow j}(a)$, $b_{i \leftrightarrow j}^2(a)$, ..., converges in a finite number of steps to an alignment that will be denoted as $b_{i \leftrightarrow j}^\infty(a)$. The simple form of the distortion probabilities in Model 3 makes it easy to find b(a) and $b_{i \leftrightarrow j}(a)$. If a' is a neighbor of a obtained from it by the move of j from i to i', and if neither i nor $i^{-1}$ is 0, then $$P(a'|e, f) = P(a|e, f) \frac{(\phi_{i'} + 1)}{\phi_i} \frac{n(\phi_{i'} + 1|e_{i'})}{n(\phi_{i'}|e_{i'})} \frac{n(\phi_i - 1|e_i)}{n(\phi_i|e_i)} \frac{t(f_j|e_{i'})}{t(f_j|e_i)} \frac{d(j|i', m, l)}{d(j|i, m, l)}. \qquad (85)$$

Notice that $\phi_i$, is the fertility of the word in position $i^{-1}$ for alignment a. The fertility of this word in alignment a' is $\phi_{i'}+1$. Similar equations can be easily derived when either i or i' is zero, or when a and a' differ by a swap.

Given these preliminaries, S is defined by $$S = N(b^\infty(V(f|e; 2))) \cup \bigcup_{ij} N(b_{i \leftrightarrow j}^\infty (V_{i \leftrightarrow j} (f|e; 2))). \qquad (86)$$

In this equation, $b^\infty(V(f|e; 2))$ and $b_{i \leftrightarrow j}^\infty(V_{i \leftrightarrow j}(f|e; 2))$ are approximations to $V(f|e; 3)$ and $V_{i \leftrightarrow j}(f|e; 3)$ neither of which can be computed efficiently.

In one iteration of the EM process for Model 3, the counts in Equations (76) through (80), are computed by summing only over elements of S. These counts are then used in Equations (81) through (84) to obtain a new set of parameters. If the error made by including only some of the elements of A(e, f) is not too great, this iteration will lead to values of the parameters for which the likelihood of the training data is at least as large as for the first set of parameters.

The initial estimates of the parameters of Model 2 are adapted from the final iteration of the EM process for Model 2. That is, the counts in Equations (76) through (80) are computed using Model 2 to evaluate p(a|e, f). The simple form of Model 2 again makes exact calculation feasible. The Equations (69) and (70) are readily adapted to compute counts for the translation and distortion probabilities; efficient calculation of the fertility counts is more involved. A discussion of how this is done is given in Section 10.

9.8 Deficiency

A problem with the parameterization of the distortion probabilities in Model 3 is this: whereas the sum over all pairs $\tau$, $\pi$ of the expression on the right-hand side of Equation (71) is unity, if $Pr(\Pi_{ik}=j|\pi_{i1}^{k-1}, \pi_1^{i-1}, \tau_0^l, \phi_0^1, e)$ depends only on j, i, m, and l for i>0. Because the distortion probabilities for assigning positions to later words do not depend on the positions assigned to earlier words, Model 3 wastes some of its probability on what will be called generalized strings, i.e., strings that have some positions with several words and others with none. When a model has this property of not concentrating all of its probability on events of interest, it will be said to be deficient. Deficiency is the price for the simplicity that permits Equation (85).

Deficiency poses no serious problem here. Although Models 1 and 2 are not technically deficient, they are surely spiritually deficient. Each assigns the same probability to the alignments (Je n'ai pas de stylo|I(1) do not(2,4) have(3) a(5) pen(6)) and (Je pas ai ne de stylo|I(1) do not(2,4) have(3) a(5) pen(6)), and, therefore, essentially the same probability to the translations (Je n'ai pas de stylo|I do not have a pen) and (Je pas ai ne de stylo|I do not have a pen). In each case, not produces two words, ne and pas, and in each case, one of these words ends up in the second position of the French string and the other in the fourth position. The first translation should be much more probable than the second, but this defect is of little concern because while the system may be required to translate the first string someday, it will almost surely not be required to translate the second. The translation models are not used to predict French given English but rather as a component of a system designed to predict English given French. They need only be accurate to within a constant factor over well-formed strings of French words.

9.9 Model 4

Often the words in an English string constitute phrases that are translated as units into French. Sometimes, a translated phrase may appear at a spot in the French string different from that at which the corresponding English phrase appears in the English string. The distortion probabilities of Model 3 do not account well for this tendency of phrases to move around as units. Movement of a long phrase will be much less likely than movement of a short phrase because each word must be moved independently. In Model 4, the treatment of $Pr(\Pi_{ik}=j|\pi_{i1}^{k-1}, \pi_1^{i-1}, \tau_0^1, \phi_0^1, e)$ is modified so as to alleviate this problem. Words that are connected to the empty notion do not usually form phrases and so Model 4 continues to assume that these words are spread uniformly throughout the French string.

As has been described, an alignment resolves an English string into a notional scheme consisting of a set of possibly overlapping notions. Each of these notions then accounts for one or more French words. In Model 3 the notional scheme for all alignment is determined by the fertilities of the words: a word is a notion if its fertility is greater than zero. The empty notion is a part of the notional scheme if $\phi_0$ is greater than zero. Multi-word notions are excluded. Among the one-word notions, there is a natural order corresponding to the order in which they appear in the English string. Let [i] denote the position in the English string of the $i^{th}$ one-word notion. The center of this notion, $\odot_i$, is defined to be the ceiling of the average value of the positions in the French string of the words from its tablet. The head of the notion is defined to be that word in its tablet for which the position in the French string is smallest.

In Model 4, the probabilities d(j|i, m, l) are replaced by two sets of parameters: one for placing the head of each notion, and one for placing any remaining words. For [i]>0, Model 4 requires that the head for notion i be $\tau_{[i]1}$. It assumes that $$Pr(\Pi_{[i]1}=j|\pi_1^{[i]-1}, \tau_0^l, \phi_0^l, e) = d_1(j-\odot_{i-1}|A(e_{[i-1]}), B(f_i)). \tag{87}$$

Here, A and B are functions of the English and French word that take on a small number of different values as their arguments range over their respective vocabularies. In the Section entitled Classes, a process is described for dividing a vocabulary into classes so as to preserve mutual information between adjacent classes in running text. The classes A and B are constructed as functions with fifty distinct values by dividing the English and French vocabularies each into fifty classes according to this method. The probability is assumed to depend on the previous notion and on the identity of the French word being placed so as to account for such facts as the appearance of adjectives before nouns in English but after them in French. The displacement for the head of notion i is denoted by $j-\odot_{i-1}$. It may be either positive or negative. The probability $d_1(-1|A(e), B(f))$ is expected to be larger than $d_1(+1|A(e), B(f))$ when e is an adjective and f is a noun. Indeed, this is borne out in the trained distortion probabilities for Model 4, where $d_1(-1|A$ (government's), B (développement)) is 0.9269, while $d_1(+1|A$ (government's), B (développement)) is 0.0022.

The placement of the $k^{th}$ word of notion i for [i]>0, k>1 is done as follows. It is assumed that $$Pr(\Pi_{[i]k}=j|\pi_{[i]1}^{k-1}, \pi_1^{[i]-1}, \tau_0^l, \phi_0^l, e) = d_{>1}(j-\pi_{[i]k-1}|B(f_j)). \tag{88}$$

The position $\pi_{[i]k}$ is required to be greater than $\pi_{[i]k-1}$. Some English words tend to produce a series of French words that belong together, while others tend to produce a series of words that should be separate. For example, implemented can produce can produce mis en application, which usually occurs as a unit, but not can produce ne pas, which often occurs with an intervening verb. Thus $d_{>1}(2|B$ (pas)) is expected to be relatively large compared with $d_{>1}(2|B(en))$. After training, it is in fact true that $d_{>1}(2|B$ (pas)) is 0.6936 and $d_{>1}(2|B(en))$ is 0.0522.

It is allowed to place $\tau_{[i]1}$ either before or after any previously positioned words, but subsequent words from $\tau_{[i]}$ are required to be placed in order. This does not mean that they must occupy consecutive positions but only that the second word from $\tau_{[i]}$ must lie to the right of the first, the third to the right of the second, and so on. Because of this, at most one of the $\phi_{[i]}!$ arrangements of $\tau_{[i]}$ is possible.

The count and reestimation formulae for Model 4 are similar to those for the previous Models and will not be given explicitly here. The general formulae in Section 10 are helpful in deriving these formulae. Once again, the several counts for a translation are expectations of various quantities over the possible alignments with the probability of each alignment computed from an earlier estimate of the parameters. As with Model 3, these expectations are computed by sampling some small set, S, of alignments. As described above, the simple form that for the distortion probabilities in Model 3, makes it possible to find $b^\infty(a)$ rapidly for any a The analogue of Equation (85) for Model 4 is complicated by the fact that when a French word is moved from notion to notion, the centers of two notions change, and the contribution of several words is affected. It is nonetheless possible to evaluate the adjusted likelihood incrementally, although it is substantially more time consuming.

Faced with this unpleasant situation, the following method is employed. Let the neighbors of a be ranked so that the first is the neighbor for which $P(a|e, f; 3)$ is greatest, the second the one for which $P(a|e, f; 3)$ is next greatest, and so on. Then $\tilde{b}(a)$ is the highest ranking neighbor of a for which $P(\tilde{b})(a)|e, f; 4)$ is at least as large as $P(a|f, e; 4)$. Define $\tilde{b}_{i \leftarrow j}(a)$ analogously. Here, $P(a|e, f; 3)$ means $P(a|e, f)$ as computed with Model 3, and $P(a|e, f; 4)$ means $P(a|e, f)$ as computed with Model 4. Define S for Model 4 by $$S = N(\tilde{b}^\infty(V(f|e; 2))) \cup \bigcup_{ij} N(\tilde{b}_{i \leftarrow j}^\infty(V_{i \leftarrow j}(f|e; 2))). \tag{89}$$

This equation is identical to Equation (89) except that b has been replaced by $\tilde{b}$.

9.10 Model 5

Like Model 3 before it, Model 4 is deficient. Not only can several words lie on top of one another, but words can be placed before the first position or beyond the last position in the French string. Model 5 removes this deficiency.

After the words for $\tau_1^{[i]-1}$ and $\tau_{[i]1}^{k-1}$ are placed, there will remain some vacant positions in the French string. Obviously, $\tau_{[i]k}$ should be placed in one of these vacancies. Models 3 and 4 are deficient precisely because they fail to enforce this constraint for the one-word notions. Let $v(j, \tau_1^{[i]-1}, \tau_{[i]1}^{k-1})$ be the number of vacancies up to and including position j just before $\tau_{[i]k}$ is placed. This position will be denoted simply as $v_j$. Two sets of distortion parameters are retained as in Model 4; they will again be referred to as $d_1$ and $d_{>1}$. For $[i]>0$, is is required that $$Pr(\Pi_{[i]1}=j|\pi_1^{[i]-1}\tau_0', \phi_0', e) = d_1(v_j|B(f_j), v_{\odot i-1}v_m) (1-\delta(v_j, v_{j-1}))(90)$$

The number of vacancies up to j is the same as the number of vacancies up to j−1 only when j is not, itself, vacant. The last factor, therefore, is 1 when j is vacant and 0 otherwise. As with Model 4, $d_1$ is allowed to depend on the center of the previous notion and on $f_j$, but is not allowed to depend on $e_{[i-1]}$ since doing so would result in too many parameters. For $[i]>0$ and $k>1$, it is assumed that $$Pr(\Pi_{[i]k}=j|\pi_{[i]1}^{k-1}, \pi_1^{[i]-1}, \tau_0', \phi_0', e) = d_{>1}(v_j-v_{\pi_{[i]k-1}}|B(f_j), v_m-v_{\pi_{[i]k-1}})(1-\delta(v_j, v_{j-1})).$$

Again, the final factor enforces the constraint that $\tau_{[i]k}$ land in a vacant position, and, again, it is assumed that the probability depends on $f_j$ only through its class.

The details of the count and reestimation formulae are similar to those for Model 4 and will not be explained explicitly here. Section 10 contains useful equations for deriving these formulae. No incremental evaluation of the likelihood of neighbors is possible with Model 5 because a move or swap may require wholesale recomputation of the likelihood of an alignment. Therefore, when the expectations for Model 5 are evaluated, only the alignments in S as defined in Equation (89) are included. The set of alignments included in the sum is further trimmed by removing any alignment, a, for which $P(a|e, f; 4)$ is too much smaller than $P(\tilde{b}^\infty(V(f|e; 2)|e, f; 4)$.

Model 5 provides a powerful tool for aligning translations. It's parameters are reliably estimated by making use of Models 2, 3 and 4. In fact, this is the raison d'être of these models. To keep them aware of the lay of the land, their parameters are adjusted as the iterations of the EM process for Model 5 are performed. That is, counts for Models 2, 3, and 4 are computed by summing over alignments as determined by the abbreviated S described above, using Model 5 to compute $P(a|e, f)$. Although this appears to increase the storage necessary for maintaining counts as the training is processed, the extra burden is small because the overwhelming majority of the storage is devoted to counts for $t(f|e)$, and these are the same for Models 2, 3, 4, and 5.

9.11 Results

A large collection of training data is used to estimate the parameters of the five models described above. In one embodiment of these models, training data is obtained using the method described in detail in the paper, *Aligning Sentences in Parallel Corpora*, by P. F. Brown, J. C. Lai, and R. L. Mercer, appearing in the Proceedings of the 29th Annual Meeting of the Association for Computational Linguistics, June 1991. This paper is incorporated by reference herein. This method is applied to a large number of translations from several years of the proceedings of the Canadian parliament. From these translations, a training data set is chosen comprising those pairs for which both the English sentence and the French sentence are thirty words or less in length. This is a collection of 1,778,620 translations. In an effort to eliminate some of the typographical errors that abound in the text, a English vocabulary is chosen consisting of all of those words that appear at least twice in English sentences in the data, and as a French vocabulary is chosen consisting of all those words that appear at least twice in French sentences in the data. All other words are replaced with a special unknown English word or unknown French word according as they appear in an English sentence or a French sentence. In this way an English vocabulary of 42,005 words and a French vocabulary of 58,016 words is obtained. Some typographical errors are quite frequent, for example, momento for memento, and so the vocabularies are not completely free of them. At the same time, some words are truly rare, and in some cases, legitimate words are omitted. Adding $e_0$ to the English vocabulary brings it to 42,006 words.

Eleven iterations of the EM process are performed for this data. The process is initialized by setting each of the 2,437,020,096 translation probabilities, $t(f|e)$, to 1/58016. That is, each of the 58,016 words in the French vocabulary is assumed to be equally likely as a translation for each of the 42,006 words in the English vocabulary. For $t(f|e)$ to be greater than zero at the maximum likelihood solution for one of the models, f and e must occur together in at least one of the translations in the training data,. This is the case for only 25,427,016 pairs, or about one percent of all translation probabilities. On the average, then, each English word appears with about 605 French words.

Table 6 summarizes the training computation. At each iteration, the probabilities of the various alignments of each translation using one model are computed, and the counts using a second, possibly different model are accumulated. These are referred to in the table as the In model and the Out model, respectively. After each iteration, individual values are retrained only for those translation probabilities that surpass a threshold; the remainder are set to the small value ($10^{-12}$). This value is so small that it does not affect the normalization conditions, but is large enough that translation probabilities can be resurrected during later

TABLE 6

A summary of the training iterations.

| Iteration | In | → | Out | Survivors | Alignments | Perplexity |
|---|---|---|---|---|---|---|
| | 2 | → | 1 | 12,017,609 | | 71550.56 |
| 2 | 2 | → | 2 | 12,160,475 | | 202.99 |
| 3 | 2 | → | 2 | 9,403,220 | | 89.41 |
| 4 | 2 | → | 2 | 6,837,172 | | 61.59 |
| 5 | 2 | → | 2 | 5,303,312 | | 49.77 |
| 6 | 2 | → | 2 | 4,397,172 | | 46.36 |
| 7 | 2 | → | 3 | 3,841,470 | | 45.15 |
| 8 | 3 | → | 5 | 2,057,033 | 291 | 124.28 |
| 9 | 5 | → | 5 | 1,850,665 | 95 | 39.17 |
| 10 | 5 | → | 5 | 1,763,665 | 48 | 32.91 |
| 11 | 5 | → | 5 | 1,703,393 | 39 | 31.29 |
| 12 | 5 | → | 5 | 1,658,364 | 33 | 30.65 | iterations. As is apparent from columns 4 and 5, even though the threshold is lowered as iterations progress, fewer and fewer probabilities survive. By the final iteration, only 1,620,287 probabilities survive, an average of about thirty-nine French words for each English word.

As has been described, when the In model is neither Model 1 nor Model 2, the counts are computed by summing over only some of the possible alignments. Many of these alignments have a probability much smaller than that of the Viterbi alignment. The column headed Alignments in Table 6 shows the average number of alignments for which the probability is within a factor of 25 of the probability of the Viterbi alignment in each iteration. As this number drops, the model concentrates more and more probability onto fewer and fewer alignments so that the Viterbi alignment becomes ever more dominant.

The last column in the table shows the perplexity of the French text given the English text for the In model of the iteration. The likelihood of the training data is expected to increase with each iteration. This likelihood cain be thought of as arising from a product of factors, one for each French word in the training data. There are 28,850,104 French words in the training data so the $28,850,104^{th}$ root of the likelihood is the average factor by which the likelihood is reduced for each additional French word. The reciprocal of this root is the perplexity shown in the table. As the likelihood increases, the perplexity decreases. A steady decrease in perplexity is observed as the iterations progress except when a switch from Model 2 as the In model to Model 3 is made. This sudden jump is not because Model 3 is a poorer model than Model 2, but because Model 3 is deficient: the great majority of its probability is squandered on objects that are not strings of French words. As has been explained, deficiency is not a problem. In the description of Model 1, the P(m|e) was left unspecified. In quoting perplexities for Models 1 and 2, it is assumed that the length of the French string is Poisson with a mean that is a linear function of the length of the English string. Specifically, it is assumed that $Pr(M=m|e)=(\lambda l)^m e^{-\lambda l}/m!$, with $\lambda$ equal to 1.09.

It is interesting to see how the Viterbi alignments change as the iterations progress. In Table 7, the Viterbi alignment for several sentences after iterations 1, 6, 7, and 11 are displayed. These are the final iterations for Models 1, 2, 3, and 5, respectively. In each example, a subscripted in affixed to each word to help in interpreting the list of numbers after each English word. In the first example, (Il me semble faire signe que oui|It seems to me that he is nodding), two interesting changes evolve over the course of the iterations. In the alignment for Model 1, Il is correctly connected to he, but in all later alignments Il is incorrectly connected to It.

Models 2, 3, and 5 discount a connection of he to Il because it is quite far away. None of the five models is sophisticated enough to make this connection properly. On the other hand, while nodding, is connected only to signe by Models 1, 2, and 3 and oui, it is correctly connected to the entire phrase faire signe que oui by Model 5. In the second example, (Voyez les profits que ils ont réalisés|Look at the profits they have made), Models 1, 2, and 3 incorrectly connect profits$_4$ to both profits$_3$ and réalsés$_7$, but with Model 5, profits$_4$ is correctly connected only to profits$_3$ and made$_7$ is connected to réalisés$_7$. Finally, in (De les promesses, de les promesses!|Promises, promises.), Promises$_1$ is connected to both instances of promesses with Model 1; promises$_3$ is connected to most of the French sentence with Model 2; the final punctuation of the English sentence is connected to both the exclamation point and, curiously, to de$_5$ with Model 3.

Only Model 5 produces a satisfying alignment of the two sentences. The orthography for the French sentence in the second example is Voyez les profits qu'ils ont réalisés and in the third example is Des promesses, des promesses! Notice that the e has been restored to the end of qu' and that des has twice been analyzed into its constituents, de and les. These and other petty pseudographic improprieties are commited in the interest of regularizing the French text. In all cases, orthographic French can be recovered by rule from the corrupted versions.

Tables 8 through 17 show the translation probabilities and fertilities after the final iteration of training for a number of English words. All and only those probabilities that are greater than 0.01 are shown. Some words, like nodding, in Table 8, do not slip gracefully into French. Thus, there are translations like (Il fait signe que oui|He is nodding), (Il fait un signe de la tête|He is nodding), (Il fait un signe de tête affirmatif|He is nodding), or (Il hoche la tête affirmativement|He is nodding). As a result, nodding frequently has a large fertility and spreads its translation probability over a variety of words. In French, what is worth saying is worth saying in many different ways. This is also seen with words like should, in Table 9, which rarely has a fertility greater than one but still produces many different words, among them devrait, devraient, devrions, doit, doivent, devons, and devrais. These are (just a fraction of the many) forms of the French verb devoir. Adjectives fare a little better: national, in Table 10, almost never produces more than one word and confines itself to one of nationale, national, nationaux, and nationales, respectively the feminine, the masculine, the masculine plural, and the feminine plural of the corresponding French adjective. It is clear that the models would benefit from some kind of morphological processing to rein in the lexical exuberance of French.

As seen from Table 11, the produces le, la, les, and l' as is expected. Its fertility is usually 1, but in some situations English prefers an article where French does not and so about 14% of the time its fertility is 0. Sometimes, as with farmers, in Table 12, it is French that prefers the article. When this happens, the English noun trains to produce its translation

TABLE 7

The progress of alignments with iteration.

Il$_1$ me$_2$ semble$_3$ faire$_4$ signe$_5$ que$_6$ oui$_7$

It seems(3) to(4) me(2) that(6) he(1) is nodding(5,7)

TABLE 7-continued

The progress of alignments with iteration.

It(1) seems(3) to me(2) that he is nodding(5,7)
It(1) seems(3) to(4) me(2) that(6) he is nodding(5,7)
It(1) seems(3) to me(2) that he is nodding(4,5,6,7)
Voyez$_1$ les$_2$ profits$_3$ que$_4$ ils$_5$ ont$_6$ realises$_7$ Look(1) at the(2) profits(3,7) they(5) have(6) made
Look(1) at the(2,4) profits(3,7) they(5) have(6) made
Look(1) at the profits(3,7) they(5) have(6) made
Look(1) at the(2) profits(3) they(5) have(6) made(7)
De$_1$ les$_2$ promesses$_3$ $_,4$ de$_5$ les$_6$ promesses$_7$ !$_8$ Promises(3,7),(4) promises.(8)
Promises,(4) promises(2,3,6,7).(8)
Promises(3),(4) promises(7).(5,8)
Promises(2,3),(4) promises(6,7).(8)

TABLE 8

Translation and fertility probabilities for nodding.

nodding

| f | t(f \| e) | φ | n(φ \| e) |
|---|---|---|---|
| signe | 0.164 | 4 | 0.342 |
| la | 0.123 | 3 | 0.293 |
| tête | 0.097 | 2 | 0.167 |
| oui | 0.086 | 1 | 0.163 |
| fait | 0.073 | 0 | 0.023 |
| que | 0.073 | | |
| hoche | 0.054 | | |
| hocher | 0.048 | | |
| faire | 0.030 | | |
| me | 0.024 | | |
| approuve | 0.019 | | |
| qui | 0.019 | | |
| un | 0.012 | | |
| faites | 0.011 | | |

TABLE 9

Translation and fertility probabilities for should.

should

| f | t(f \| e) | φ | n(φ \| e) |
|---|---|---|---|
| devrait | 0.330 | 1 | 0.649 |
| devraient | 0.123 | 0 | 0.336 |
| devions | 0.109 | 2 | 0.014 |
| faudrait | 0.073 | | |
| faut | 0.058 | | |
| doit | 0.058 | | |
| aurait | 0.041 | | |
| doivent | 0.024 | | |
| devons | 0.017 | | |
| devrais | 0.013 | | |

TABLE 10

Translation and fertility probabilities for national.

national

| f | t(f \| e) | φ | n(φ \| e) |
|---|---|---|---|
| nationale | 0.469 | 1 | 0.905 |
| national | 0.418 | 0 | 0.094 |
| nationaux | 0.054 | | |
| nationales | 0.029 | | |

TABLE 11

Translation and fertility probabilities for the.

the

| f | t(f \| e) | φ | n(φ \| e) |
|---|---|---|---|
| le | 0.497 | 1 | 0.746 |
| la | 0.207 | 0 | 0.254 |
| les | 0.155 | | |
| l' | 0.086 | | |
| ce | 0.018 | | |
| cette | 0.011 | | |

TABLE 12

Translation and fertility probabilities for farmers.

farmers

| f | t(f \| e) | φ | n(φ \| e) |
|---|---|---|---|
| agriculteurs | 0.442 | 2 | 0.731 |
| les | 0.418 | 1 | 0.228 |
| cultivateurs | 0.046 | 0 | 0.039 |
| producteurs | 0.021 | | |

TABLE 13

Translation and fertility probabilities for external.

external

| f | t(f \| e) | φ | n(φ \| e) |
|---|---|---|---|
| extérieures | 0.944 | 1 | 0.967 |
| extérieur | 0.015 | 0 | 0.028 |
| externe | 0.011 | | |
| extérieurs | 0.010 | | |

TABLE 14

Translation and fertility probabilities for answer.

answer

| f | t(f \| e) | φ | n(φ \| e) |
|---|---|---|---|
| réponse | 0.442 | 1 | 0.809 |
| répondre | 0.233 | 2 | 0.115 |
| répondu | 0.041 | 0 | 0.074 |
| `a | 0.038 | | |
| solution | 0.027 | | |
| répondez | 0.021 | | |
| répondrai | 0.016 | | |
| réponde | 0.014 | | |
| y | 0.013 | | |
| ma | 0.010 | | |

TABLE 15

Translation and fertility probabilities for oil.

oil

| f | t(f \| e) | φ | n(φ \| e) |
|---|---|---|---|
| pétrole | 0.558 | 1 | 0.760 |
| pétrolières | 0.138 | 0 | 0.181 |
| pétrolière | 0.109 | 2 | 0.057 |
| le | 0.054 | | |
| pétrolier | 0.030 | | |
| pétroliers | 0.024 | | |
| huile | 0.020 | | |
| Oil | 0.013 | | |

TABLE 16

Translation and fertility probabilities for former.

former

| f | t(f \| e) | φ | n(φ \| e) |
|---|---|---|---|
| ancien | 0.592 | 1 | 0.866 |
| anciens | 0.092 | 0 | 0.074 |
| ex | 0.092 | 2 | 0.060 |
| précèdent | 0.054 | | |
| l' | 0.043 | | |
| ancienne | 0.018 | | |
| été | 0.013 | | |

TABLE 17

Translation and fertility probabilities for not.

not

| f | t(f\|e) | φ | n(φ\|e) |
|---|---|---|---|
| ne | 0.497 | 2 | 0.735 |
| pas | 0.442 | 0 | 0.154 |
| non | 0.029 | 1 | 0.107 |
| rien | 0.011 | | | together with an article. Thus, farmers typically has a fertility 2 and usually produces either agriculteurs or les. Additional examples ate in included in Tables 13 through 17, which show the translation and fertility probabilities for external, answer, oil, former, and not.

Figure 37:
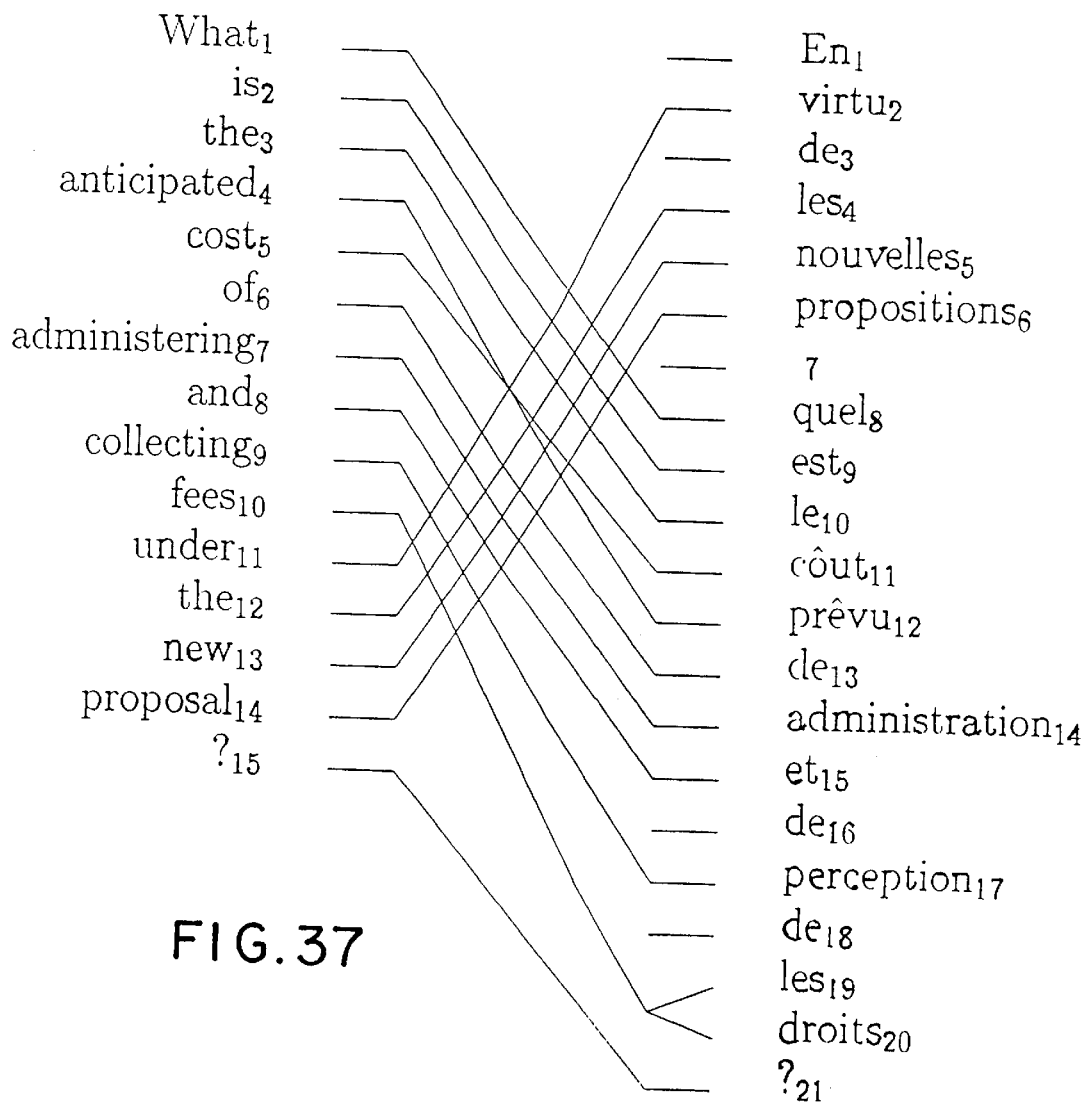
FIG. 37 shows the best alignment out of $1.9 \times 10^{25}$ alignments.
Figure 39:
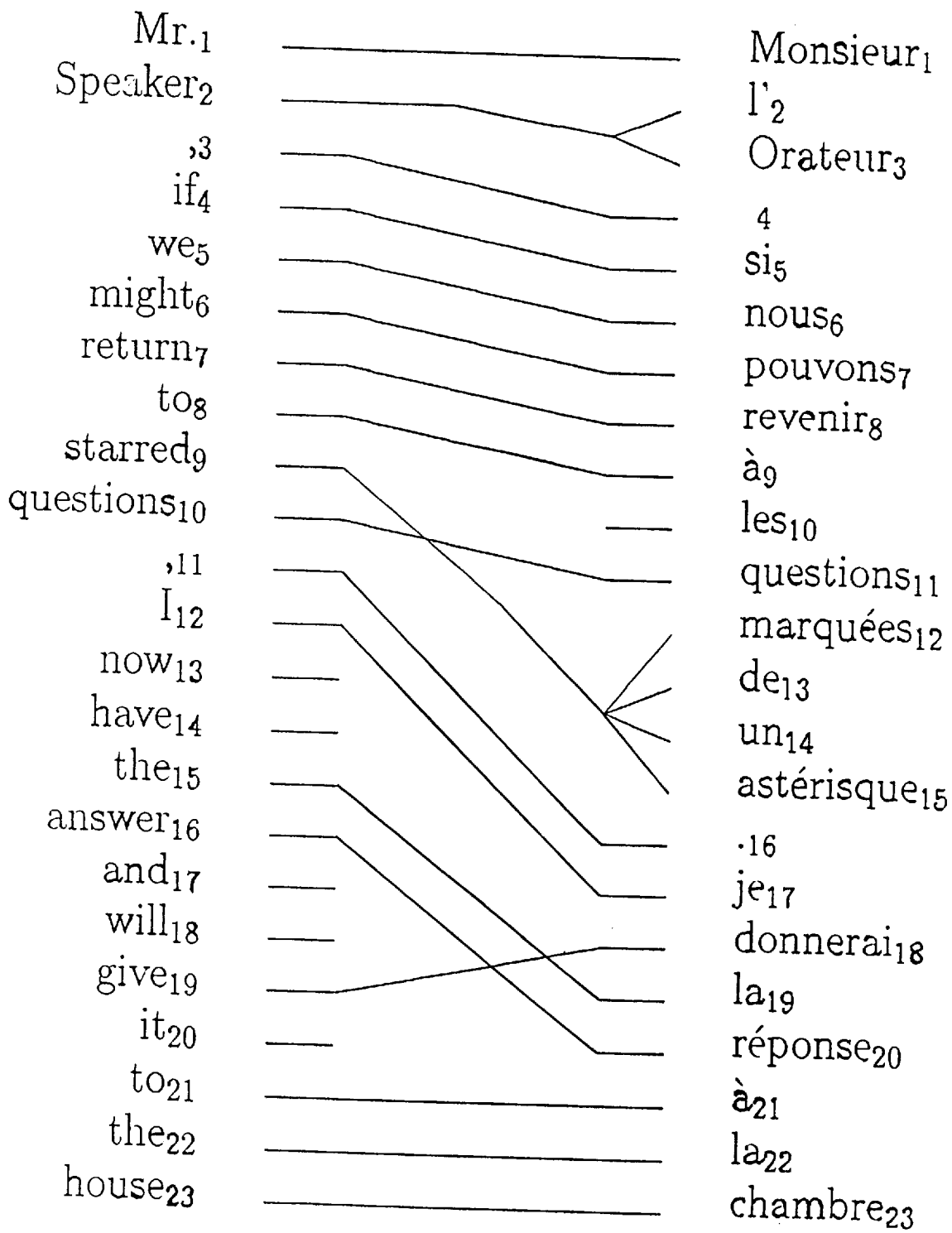
FIG. 39 shows the best of $5.6 \times 10^{31}$ alignments.

FIGS. 37, 38, and 39 show automatically derived alignments for three translations. In the terminology used above, each alignment is $\tilde{b}^\infty(V(f|e; 2))$. It should be understood that these alignments have been found by a process that involves no explicit knowledge of either French or English. Every fact adduced to support them has been discovered automatically from the 1,778,620 translations that constitute the training data. This data, in turn, is the product of a process the sole linguistic input of which is a set of rules explaining how to find sentence boundaries in the two languages. It may justifiably be argued, therefore, that these alignments are inherent in the Canadian Hansard data, itself.

In the alignment shown in FIG. 37, all but one of the English words has fertility 1. The final prepositional phrase has been moved to the front of the French sentence, but otherwise the translation is almost verbatim. Notice, however, that the new proposal has been translated into les nouvelles propositions, demonstrating that number is not an invariant under translation. The empty notion has fertility 5 here. It generates $en_1$, $de_3$, the comma, $de_{16}$, and $de_{18}$.

In FIG. 38, two of the English words have fertility 0, one has fertility 2, and one, embattled, has fertility 5. Embattled is another word, like nodding, that eludes the French grasp and comes with a panoply of multi-word translations.

The final example, in FIG. 39, has several features that bear comment. The second word, Speaker, is connected to the sequence l'Orateur. Like farmers above, it has trained to produce both the word that one naturally thinks of as its translation and the article in front of it. In the Hansard data, Speaker always has fertility 2 and produces equally often l'Orateur and le président. Later in the sentence, starred is connected to the phrase marquées de un astérisque. From an initial situation in which each French word is equally probable as a translation of starred, the system has arrived, through training, at a situation where it is able to connect to just the right string of four words. Near the end of the sentence, give is connected to donnerai, the first person singular future of donner, which means to give. It might be better if both will and give were connected to donnerai, but by limiting notions to no more than one word, Model 5 precludes this possibility. Finally, the last twelve words of the English sentence, I now have the answer and will give it to the House, clearly correspond to the last seven words of the French sentence, je donnerai la réponse àla Chambre, but, literally, the French is I will give the answer to the House. There is nothing about now, have, and, or it, and each of these words has fertility 0. Translations that are as far as this from the literal are rather more the rule than the exception in the training data.

9.12 Better Translation Models

Models 1 through 5 provide an effective means for obtaining word-by-word alignments of translations, but as a means to achieve the real goal of translation, there is room for improvement.

Two shortcomings are immediately evident. Firstly, because they ignore multi-word notions, these models are forced to give a false, or at least an unsatisfactory, account of some features in many translations. Also, these models are deficient, either in fact, as with Models 3 and 4, or in spirit, as with Models 1, 2, and 5.

9.12.1 Deficiency

It has been argued above that neither spiritual nor actual deficiency poses a serious problem, but this is not entirely true. Let w(e) be the sum of P(f|e) over well-formed French strings and let i(e) be the sum over ill-formed French strings. In a deficient model, w(e)+i(e)<1. In this case, the remainder of the probability is concentrated on the event failure and so w(e)+i(e)+P(failure|e)=1. Clearly, a model is deficient precisely when P(failure|e)>0. If P(failure|e)=0, but i(e)>0, then the model is spiritually deficient. If w(e) were independent of e, neither form of deficiency would pose a problem, but because Models 1–5 have no long-term constraints, w(e) decreases exponentially with l. When computing alignments, even this creates no problem because e and f are known. However, for a given f, if the goal is to discover the most probable e, then the product P(e) P(f|e) is too small for long English strings as compared with short ones. As a result, short English strings are improperly favored over longer English strings. This tendency is counteracted in part by the following modification:

Replace P(f|e) with $c^l$P(f|e) for some empirically chosen constant c.

This modification is treatment of the symptom rather than treatment of the disease itself, but it offers some temporary relief. The cure lies in better modelling.

9.12.2 Multi-word Notions

Models 1 through 5 all assign non-zero probability only to alignments with notions containing no more than one word each. Except in Models 4 and 5, the concept of a notion plays little rôle in the development. Even in these models, notions are determined implicitly by the fertilities of the words in the alignment: words for which the fertility is greater than zero make up one-word notions; those for which it is zero do not. It is not hard to give a method for extending the generative process upon which Models 3, 4, and 5 are based to encompass multi-word notions. This method comprises the following enhancements:

Including a step for selecting the notional scheme;
Ascribing fertilities to notions rather than to words;
Requiring that the fertility of each notion be greater than zero.
In Equation (71), replacing the products over words in an English string with products over notions in the notional scheme.

Extensions beyond one-word notions, however, requires some care. In an embodiment as described in the subsection Results, an English string can contain any of 42,005 one-word notions, but there are more than 1.7 billion possible two-word notions, more than 74 trillion three-word notions, and so on. Clearly, it is necessary to be discriminating in choosing potential multi-word notions. The caution displayed by Models 1–5 in limiting consideration to notions with fewer than two words is motivated primarily by respect for the featureless desert that multi-word notions offer a priori. The Viterbi alignments computed with Model 5 give a frame of reference from which to develop methods that expands horizons to multi-word notions. These methods involve:

Promoting a multi-word sequence to notionhood when its translations as a unit, as observed in the Viterbi alignments, differ substantially from what is expected on the basis of its component parts.

In English, for example, either a boat or a person can be left high and dry, but in French, un bateau is not left haut et sec, nor une personne haute et sèche. Rather, a boat is left échoué and a person en plan. High and dry, therefore, is a promising three-word notion because its translation is not compositional.

10 Mathematical Summary of Translation Models

10.1 Summary of Notation

| | |
|---|---|
| $\epsilon$ | English vocabulary |
| $e$ | English word |
| e | English sentence |
| $l$ | length of e |
| $i$ | position in e, $i = 0, 1, \ldots, l$ |
| $e_i$ | word $i$ of e |
| $e_0$ | the empty notion |
| $e_1^i$ | $e_1 e_2 \ldots e_i$ |
| $F$ | French vocabulary |
| $f$ | French word |
| f | French sentence |
| $m$ | length of f |
| $j$ | position in f, $j = 1, 2, \ldots, m$ |
| $f_j$ | word $j$ of f |
| $f_1^j$ | $f_1 f_2 \ldots f_j$ |
| a | alignment |
| $a_j$ | position in e connected to position $j$ of f for alignment a |
| $a_1^j$ | $a_1 a_2 \ldots a_j$ |
| $\phi_i$ | number of positions of f connected to position $i$ of e |
| $\phi_1^i$ | $\phi_1 \phi_2 \ldots \phi_i$ |
| $\tau$ | tableau - a sequence of tablets, where a tablet is a sequence of French words |
| $\tau_i$ | tablet $i$ of $\tau$ |
| $\tau_0^i$ | $\tau_0 \tau_1 \ldots \tau_i$ |
| $\phi_i$ | length of $\tau_i$ |
| $k$ | position within a tablet, $k = 1, 2, \ldots, \phi_i$ |
| $\tau_{ik}$ | word $k$ of $\tau_i$ |
| $\pi$ | a permutation of the positions of a tableau |
| $\pi_{ik}$ | position in f for word $k$ of $\tau_i$ for permutation $\pi$ |
| $\pi_{i1}^k$ | $\pi_{i1} \pi_{i2} \ldots \pi_{ik}$ |
| $V(\mathbf{f}\|\mathbf{e})$ | Viterbi alignment for (f\|e) |
| $V_{i \leftarrow j}(\mathbf{f}\|\mathbf{e})$ | Viterbi alignment for (f\|e) with $ij$ pegged |
| $N(\mathbf{a})$ | neighboring alignments of a |
| $N_{ij}(\mathbf{a})$ | neighboring alignments of a with $ij$ pegged |
| $b(\mathbf{a})$ | alignment in $N(\mathbf{a})$ with greatest probability |
| $b^\infty(\mathbf{a})$ | alignment obtained by applying $b$ repeatedly to a |
| $b_{i \leftarrow j}(\mathbf{a})$ | alignment in $N_{ij}(\mathbf{a})$ with greatest probability |
| $b_{i \leftarrow j}^\infty(\mathbf{a})$ | alignment obtained by applying $b_{i \leftarrow j}$ repeatedly to a |
| $A(e)$ | class of English word $e$ |
| $B(f)$ | class of French word $f$ |
| $\Delta j$ | displacement of a word in f |
| $\upsilon, \upsilon'$ | vacancies in f |
| $\rho_i$ | first position in e to the left of $i$ that has non-zero fertility |
| $c_i$ | average position in f of the words connected to position $i$ of e |
| $[i]$ | position in e of the $i^{th}$ one word notion |
| $\odot_i$ | $c_{[i]}$ |
| $\mathbf{P}_\theta$ | translation model P with parameter values $\theta$ |
| $C(\mathbf{f},\mathbf{e})$ | empirical distribution of a sample |
| $\psi(\mathbf{P}_\theta)$ | log-likelihood objective function |
| $R(\tilde{\mathbf{P}}_\theta, \mathbf{P}_\theta)$ | relative objective function |
| $t(f\|e)$ | translation probabilities (All Models) |
| $\epsilon(m\|l)$ | sentence length probabilities (Models 1 and 2) |
| $n(\phi\|e)$ | fertility probabilities (Models 3, 4, and 5) |
| $p_0, p_1$ | fertility probabilities for $e_0$ (Models 3, 4, and 5) |
| $a(i\|j,l,m)$ | alignment probabilities (Model 2) |
| $d(j\|i,l,m)$ | distortion probabilities (Model 3) |
| $d_1(\Delta j\|A, B)$ | distortion probabilities for the first word of a tablet (Model 4) |
| $d_{>1}(\Delta j\|B)$ | distortion probabilities for the other words of a tablet (Model 4) |
| $d_{LR}(l\_or\_r\|B,\upsilon,\upsilon')$ | distortion probabilities for choosing left or right movement (Model 5) |
| $d_L(\Delta j\|B,\upsilon)$ | distortion probabilities for leftward movement of the first word of a tablet (Model 5) |
| $d_R(\Delta j\|B,\upsilon)$ | distortion probabilities for rightward movement of the first word of a tablet (Model 5) |
| $d_>(\Delta j\|B,\upsilon)$ | distortion probabilities for movement of the other words of a tablet (Model 5) |

10.2 Model 1

Parameters $\epsilon(m\|l)$ string length probabilities
$t(f\|e)$ translation probabilities Here $f \in F$; $e \in E$ or $e = e_0$; $l = 1, 2, \ldots$; and $m = 1, 2, \ldots$.

General Formula $$P_\theta(\mathbf{f}, \mathbf{a}|\mathbf{e}) = P_\theta(m|\mathbf{e}) P_\theta(\mathbf{a}|m, \mathbf{e}) P_\theta(\mathbf{f}|\mathbf{a}, m, \mathbf{e}) \tag{92}$$

Assumptions $$P_\theta(m|\mathbf{e}) = \epsilon(m|l) \tag{93}$$

$$P_\theta(\mathbf{a}|m, \mathbf{e}) = (l+1)^{-m} \tag{94}$$

$$P_\theta(\mathbf{f}|\mathbf{a}, m, \mathbf{e}) = \prod_{j=1}^{m} t(f_j|e_{a_j}) \tag{95}$$

This model is not deficient.

Generation

Equations (92)–(95) describe the following process for producing f from e:

1. Choose a length $m$ for f according to the probability distribution $\epsilon(m|l)$.
2. For each $j=1, 2, \ldots, m$, choose $a_j$ from $0, 1, 2, \ldots l$ according to the uniform distribution.
3. For each $j=1, 2, \ldots, m$, choose a French word $f_j$ according to the distribution $t(f_j|e_{a_j})$.

Useful Formulae

Because of the independence assumptions (93)–(95), the sum over alignments (26) can be calculated in closed form:

$$P_\theta(\mathbf{f}|\mathbf{e}) = \sum_\mathbf{a} P_\theta(\mathbf{f}, \mathbf{a}|\mathbf{e}) \tag{96}$$

$$= \epsilon(m|l)(l+1)^{-m} \sum_{a_1=0}^{l} \ldots \sum_{a_m=0}^{l} \prod_{j=1}^{m} t(f_j|e_{a_j}) \tag{97}$$

$$= \epsilon(m|l)(l+1)^{-m} \prod_{j=1}^{m} \sum_{i=0}^{l} t(f_j|e_i). \tag{98}$$

Equation (98) is useful in computations since it involves only $O(lm)$ arithmetic operations, whereas the original sum over alignments (97) involves $O(l^m)$ operations.

Concavity

The objective function (25) for this model is a strictly concave function of the parameters. In fact, from Equations (25) and (98), $$\psi(P_\theta) = \sum_{f,e} C(f, e) \sum_{j=1}^{m} \log \sum_{i=0}^{l} t(f_j|e_i) + \sum_{f,e} C(f, e) \log \epsilon(m|l) + \text{constant} \quad (99)$$

which is clearly concave in $\epsilon(m|l)$ and $t(f|e)$ since the logarithm of a sum is concave, and the sum of concave functions is concave.

Because $\psi$ is concave, it has a unique local maximum. Moreover, this maximum can be found using the method of FIG. 28, provided that none of the initial parameter values is zero.

10.3 Model 2

Parameters $\epsilon(m|1)$ string length probabilities
$t(f|e)$ translation probabilities
$\alpha(i|j, 1, m)$ alignment probabilities
Here $i=0, \ldots, 1$; and $j=1, \ldots m$.

General Formula $$P_\theta(f, a|e) = P_\theta(m|e)P_\theta(a|m, e)P_\theta(f|a, m, e) \quad (100)$$

Assumptions $$P_\theta(m|e) = \epsilon(m|l) \quad (101)$$

$$P_\theta(a|m, e) = \prod_{j=1}^{m} a(a_j|j, l, m) \quad (102)$$

$$P_\theta(f|a, m, e) = \prod_{j=1}^{m} t(f_j|e_{a_j}) \quad (103)$$

This model is not deficient. Model 1 is the special case of this model in which the alignment probabilities are uniform: $\alpha(i|j, 1, m) = (l+1)^{-1}$ for all $i$.

Generation

Equations (100)–(103) describe the following process for producing f from e:
1. Choose a length m for f according to the distribution $\epsilon(m|l)$.
2. For each $j=1, 2, \ldots, m$, choose $\alpha_j$ from 0, 1, 2, ... 1 according to the distribution $\alpha(\alpha_j|j, 1, m)$.
3. For each j, choose a French word $f_j$ according to the distribution $t(f_j|e_{\alpha_j})$.

Useful Formulae

Just as for Model 1, the independence assumptions allow us to calculate the sum over alignments (26) in closed form:

$$P_\theta(f|e) = \sum_a P_\theta(f, a|e) \quad (104)$$

$$= \epsilon(m|l) \sum_{a_1=0}^{l} \ldots \sum_{a_m=0}^{l} \prod_{j=1}^{m} t(f_j|e_{a_j})a(a_j|j, l, m) \quad (105)$$

$$= \epsilon(m|l) \prod_{j=1}^{m} \sum_{i=0}^{l} t(f_j|e_i)a(i|j, l, m). \quad (106)$$

By assumption (102) the connections of a are independent given the length m of f. From Equation (106) it follows that they are also independent given f:

$$P_\theta(a|f, e) = \prod_{j=1}^{m} p_\theta(a_j|j, f, e), \quad (107)$$

where $$p_\theta(i|j, f, e) = \frac{\gamma(i, j, f, e)}{\sum_{i'} \gamma(i', j, f, e)} \quad (108)$$

with $\gamma(i, j, f, e) = t(f_j|e_i)a(i|j, l, m)$.

Viterbi Alignment

For this model, and thus also for Model 1, the Viterbi alignment V(f|e) between a pair of strings (f, e) can be expressed in closed form:

$$V(f|e)_j = \underset{i}{\operatorname{argmax}}\ t(f_j|e_i)a(i|j, l, m). \quad (109)$$

Parameter Reestimation Formulae

The parameter values $\theta$ that maximize the relative objective function $R(\tilde{P}_\theta, P_\theta)$ can be found by applying the considerations of subsection 8.3.4. The counts $c(\omega; a, f, e)$ of Equation (38) are $$c(f|e; a, f, e) = \sum_{j=1}^{m} \delta(e, e_{a_j})\delta(f, f_j), \quad (110)$$

$$c(i|j, l, m; a, f, e) = \delta(i, a_j). \quad (111)$$

The parameter reestimation formulae for $t(f|e)$ and $\alpha(i|j, 1, m)$ are obtained by using these counts in Equations (42)–(46).

Equation (44) requires a sum over alignments. If $\tilde{P}_\theta$ satisfies $$\tilde{P}_\theta(a|f, e) = \prod_{j=1}^{m} \tilde{p}_\theta(a_j|j, f, e), \quad (112)$$

as is the case for Models 1 and 2 (see Equation (107)), then this sum can be calculated explicitly:

$$\tilde{c}_\theta(f|e; f, e) = \sum_{i=0}^{l} \sum_{j=1}^{m} \tilde{p}_\theta(i|j, f, e)\delta(e, e_i)\delta(f, f_j), \quad (113)$$

$$\tilde{c}_\theta(i|j; f, e) = \tilde{p}_\theta(i|j, f, e). \quad (114)$$

Equations (110)–(114) involve only O(lm) arithmetic operations, whereas the sum over alignments involves O($l^m$) operations.

10.4 Model 3

Parameters $t(f|e)$ translation probabilities
$n(\phi|e)$ fertility probabilities
$p_0, p_1$ fertility probabilities for $e_0$
$d(j|i, 1, m)$ distortion probabilities
Here $\phi=0, 1, 2, \ldots$.

General Formulae $$P_\theta(\tau, \pi|e) = P_\theta(\phi|e)P_\theta(\tau|\phi, e)P_\theta(\pi|\tau, \phi, e) \quad (115)$$

$$P_\theta(f, a|e) = \sum_{(\tau,\pi)\in(f,a)} P_\theta(\tau, \pi|e) \quad (116)$$

Here (f, a) is the set of all ($\tau$, $\pi$) consistent with (f, a):

($\tau$, $\pi$)$\in$(f, a) if for all i=0, 1, ..., l and k=1, 2, ..., $\phi_i$, $f_{\pi_{ik}} = \tau_{ik}$
and $\alpha_{\pi_{ik}} = i$. (117)

Assumptions $$P_\theta(\phi|e) = n_0\left(\phi_0 \Big| \sum_{i=1}^{l} \phi_i\right) \prod_{i=1}^{l} n(\phi_i|e_i) \quad (118)$$

$$P_\theta(\tau|\phi, e) = \prod_{i=0}^{l} \prod_{k=1}^{\phi_i} t(\tau_{ik}|e_i) \quad (119)$$

$$P_\theta(\pi|\tau, \phi, e) = \frac{1}{\phi_0!} \prod_{i=1}^{l} \prod_{k=1}^{\phi_i} d(\pi_{ik}|i, l, m) \quad (120)$$

where $$n_0(\phi_0|m') = \binom{m'}{\phi_0} p_0^{m'-\phi_0} p_1^{\phi_0}. \quad (121)$$

In Equation (120) the factor of $1/\phi_0!$ accounts for the choices of $\pi_{0k}$, $k=1, 2, \ldots, \phi_0$. This model is deficient, since $$P_\theta(\text{failure}|\tau, \phi, e) \equiv 1 - \sum_\pi P_\theta(\pi|\tau, \phi, e) > 0. \quad (122)$$

Generation

Equations (115)–(120) describe the following process for producing f or failure from e:
1. For each $i=1, 2, \ldots, l$, choose a length $\phi_i$ for $\tau_i$ according to the distribution $n(\phi_i|e_i)$.
2. Choose a length $\phi_0$ for $\tau_0$ according to the distribution $n_0(\phi_0|\Sigma_{i=1}^{l}\phi_i)$.
3. Let $m = \phi_0 + \Sigma_{i=1}^{l}\phi_i$.
4. For each $i=0, 1, \ldots, l$ and each $k=1, 2, \ldots, \phi_i$, choose a French word $\tau_{ik}$ according to the distribution $t(\tau_{ik}|e_i)$.
5. For each $i=1, 2, \ldots l$ and each $k=1, 2, \ldots, \phi_i$, choose a position $\tau_{ik}$ from $1, \ldots, m$ according to the distribution $d(\pi_{ik}|i, l, m)$.
6. If any position has been chosen more than once then return failure.
7. For each $k=1, 2, \ldots, \phi_0$, choose a position $\pi_{0k}$ from the $\phi_0 - k + 1$ remaining vacant positions in $1, 2, \ldots, m$ according to the uniform distribution.
8. Let f be the string with $f_{\pi_{ik}} = \tau_{ik}$.

Useful Formulae

From Equations (118)–(120) it follows that if $(\tau, \pi)$ are consistent with $(f, a)$ then $$P_\theta(\tau|\phi, e) = \prod_{j=1}^{m} t(f_j|e_{a_j}), \quad (123)$$

$$P_\theta(\pi|\tau, \phi, e) = \frac{1}{\phi_0!} \prod_{j: a_j \neq 0} d(j|a_j, l, m). \quad (124)$$

In Equation (124), the product runs over all $j=1, 2, \ldots, m$ except those for which $a_j = 0$. By summing over all pairs $(\tau, \pi)$ consistent with $(f, a)$ it follows that $$P_\theta(f, a|e) = \sum_{(\tau,\pi) \in (f,a)} P_\theta(\tau, \pi|e) \quad (125)$$

$$= n_0\left(\phi_0 \Big| \sum_{i=1}^{l} \phi_i\right) \prod_{i=1}^{l} n(\phi_i|e_i)\phi_i! \prod_{j=1}^{m} t(f_j|e_{a_j}) \quad (126)$$

$$\sum_{j: a_j \neq 0} d(j|a_j, l, m).$$

The factors of $\phi_i!$ in Equation (126) arise because there are $\Pi_{i=0}^{l}\phi_i!$ equally probable terms in the sum (125).

Parameter Reestimation Formulae

The parameter values $\theta$ that maximize the relative objective function $R(\tilde{P}_\theta, P_\theta)$ can be found by applying the considerations of Section 8.3.4. The counts $c(\omega; a, f, e)$ of Equation (38) are $$c(f|e; a, f, e) = \sum_{j=1}^{m} \delta(e, e_{a_j})\delta(f, f_j), \quad (127)$$

$$c(j|i, l, m; a, f, e) = \delta(i, a_j), \quad (128)$$

$$c(\phi|e; a, f, e) = \sum_{i=1}^{l} \delta(e, e_i)\delta(\phi, \phi_i). \quad (129)$$

The parameter reestimation formulae for $t(f|e)$, $\alpha(j|i, l, m)$, and $t(\phi|e)$ are obtained by using these counts in Equations (42)–(46).

Equation (44) requires a sum over alignments. If $\tilde{P}_\theta$ satisfies $$\tilde{P}_\theta(a|f, e) = \prod_{j=1}^{m} \tilde{p}_\theta(a_j|j, f, e), \quad (130)$$

as is the case for Models 1 and 2 (see Equation (107)), then this sum can be calculated explicitly for $\tilde{c}_\theta(f|e; f, e)$ and $\tilde{c}_\theta(j|i; f, e)$:

$$\tilde{c}_\theta(f|e; f, e) = \sum_{i=0}^{l} \sum_{j=1}^{m} \tilde{p}_\theta(i|j, f, e)\delta(e, e_i)\delta(f, f_j), \quad (131)$$

$$\tilde{c}_\theta(j|i; f, e) = \tilde{p}_\theta(i|j, f, e). \quad (132)$$

Unfortunately, there is no analogous formula for $\tilde{c}_\theta(\phi|e; f, e)$. Instead, the following formulae hold:

$$\tilde{c}_\theta(\phi|e; f, e) = \sum_{i=1}^{l} \delta(e, e_i) \prod_{j=1}^{m} (1 - \tilde{p}_\theta(i|j, f, e)) \sum_{\gamma \in \Gamma_\phi} \prod_{k=1}^{\phi} \frac{\alpha_{ik}(f, e)^{\gamma_k}}{\gamma_k!}, \quad (133)$$

$$\alpha_{ik}(f, e) = \frac{(-1)^{k+1}}{k!} \frac{1}{k} \sum_{j=1}^{m} \beta_{ij}(f, e)^k, \quad (134)$$

$$\beta_{ij}(f, e) = \frac{\tilde{p}_\theta(i|j, f, e)}{1 - \tilde{p}_\theta(i|j, f, e)}. \quad (135)$$

In Equation (133), $\Gamma_\phi$ denotes the set of all partitions of $\phi$.

Recall that a partition of $\phi$ is a decomposition of $\phi$ as a sum of positive integers. For example, $\phi=5$ has 7 partitions since $1+1+1+1+1=1+1+1+2=1+1+3=1+2+2=1+4=2+3=5$. For a partition $\gamma$, let $\gamma_k$ be the number of times that k appears in the sum, so that $\phi = \Sigma_{k=1}^{\phi} k\gamma_k$. If $\gamma$ is the partition corresponding to $1+1+3$, then $\gamma_1=2$, $\gamma_3=1$, and $\gamma_k=0$ for k other than 1 or 3. Here the convention that $\gamma_0$ consists of the single element $\gamma$ with $\gamma_k=0$ for all k has been adopted.

Equation (133) allows us to compute the counts $\tilde{c}_\theta(\phi|e; f, e)$ in $O(lm + \phi g)$ operations, where g is the number of partitions of $\phi$. Although g grows with $\phi$ like $(4\sqrt{3}\phi))^{-1} \exp \pi\sqrt{2\phi/3}$, it is manageably small for small $\phi$. For example, $\phi=10$ has 42 partitions.

Proof of Formula (133)

Introduce the generating functional $$G(x|e, f, e) = \sum_{\phi=0}^{\infty} \tilde{c}_\theta(\phi|e; f, e)x^\phi, \quad (136)$$

where x is an indeterminant. Then $$G(x|e, f, e) = \sum_{\phi=0}^{\infty} \sum_{a_1=0}^{l} \ldots \sum_{a_m=0}^{l} \prod_{j=1}^{m} \tilde{p}_\theta(a_j|j, f, e) \sum_{i=1}^{l} \delta(e, e_i)\delta(\phi, \phi_i)x^\phi \quad (137)$$

$$= \sum_{i=1}^{l} \delta(e, e_i) \sum_{a_1=0}^{l} \ldots \sum_{a_m=0}^{l} \prod_{j=1}^{m} \tilde{p}_\theta(a_j|j, f, e)x^{\phi_i} \quad (138)$$

-continued $$= \sum_{i=1}^{l} \delta(e, e_i) \sum_{a_1=0}^{l} \cdots \sum_{a_m=0}^{l} \prod_{j=1}^{m} \tilde{p}_\theta(a_j|j, f, e) x^{\delta(i, a_j)} \quad (139)$$

$$= \sum_{i=1}^{l} \delta(e, e_i) \prod_{j=1}^{m} \sum_{a=0}^{l} \tilde{p}_\theta(a|j, f, e) x^{\delta(i, a)} \quad (140)$$

$$= \sum_{i=1}^{l} \delta(e, e_i) \prod_{j=1}^{m} (1 - \tilde{p}_\theta(i|j, f, e) + x\tilde{p}_\theta(i|j, f, e)) \quad (141)$$

$$= \sum_{i=1}^{l} \delta(e, e_i) \prod_{j=1}^{m} (1 - \tilde{p}_\theta(i|j, f, e)) \prod_{j=1}^{m} (1 + \beta_{ij}(f, e)x). \quad (142)$$

To obtain Equation (138), rearrange the order of summation and sum over $\phi$ to eliminate the $\delta$-function of $\phi$. To obtain Equation (139), note that $\phi_i = \sum_{j=1}^{m} \delta(i, \alpha_j)$ and so $x^{\phi_i} = \prod_{j=1}^{m} x^{\delta(i, \alpha_j)}$. To obtain Equation (140), interchange the order of the sums on $\alpha_j$ and the product on j. To obtain Equation (141), note that in the sum on $\alpha$, the only term for which the power of x is nonzero is the one for which $\alpha=i$.

Now note that for any indeterminants x, $y_1$, $y_2$, ... $y_m$, $$\prod_{j=1}^{m} (1 + y_j x) = \sum_{\phi=0}^{m} x^\phi \sum_{\gamma \in \Gamma_\phi} \prod_{k=1}^{\phi} \frac{z_k^{\gamma_k}}{\gamma_k!}, \quad (143)$$

$$\text{where } z_k = \frac{(-1)^{k+1}}{k} \sum_{j=1}^{m} (y_j)^k. \quad (144)$$

This follows from the calculation $$\prod_{j=1}^{m} (1 + y_j x) = \exp \sum_{j=1}^{m} \log(1 + y_j x) = \quad (145)$$

$$\exp \sum_{j=1}^{m} \sum_{k=1}^{\infty} \frac{(-1)^{k+1}(y_j x)^k}{k}$$

$$= \exp \sum_{k=1}^{\infty} z_k x^k = \sum_{n=0}^{\infty} \frac{1}{n!} \left( \sum_{k=1}^{\infty} z_k x^k \right)^n \quad (146)$$

$$= \sum_{n=0}^{\infty} \frac{1}{n!} \sum_{\gamma_1} \sum_{\gamma_2} \cdots \binom{n}{\gamma_1 \gamma_2 \cdots} \quad (147)$$

$$\sum_{k=1}^{\infty} (z_k x^k)^{\gamma_k} =$$

$$\sum_{\phi=0}^{\infty} x^\phi \sum_{\gamma \in \Gamma_\phi} \prod_{k=1}^{\infty} \frac{z_k^{\gamma_k}}{\gamma_k!}.$$

The reader will notice that the left-hand side of Equation (145) involves only powers of x up to m, while the subsequent Equations (146)–(147) involve all powers of x. This is because the $z_k$ are not algebraically independent. In fact, for $\phi>m$, the coefficient of $x^\phi$ on the right-hand side of Equation (147) must be zero. It follows that $z_\phi$ can be expressed as a polynomial in $z_k$, k=1, 2, ..., m.

Equation (143) can be used to identify the coefficient of $x^\phi$ in Equation (142). Equation (133) follows by combining Equations (142), (143), and the Definitions (134)–(136) and (144).

10.5 Model 4

Parameters t(f|e) translation probabilities
n($\phi$|e) fertility probabilities
$p_0$, $p_1$ fertility probabilities for $e_0$
$d_1(\Delta_j|A, B)$ distortion probabilities for movement of the first word of a tablet
$d_{>1}(\Delta_j|B)$ distortion probabilities for movement of other words of a tablet Here $\Delta_j$ is an integer; A is an English class; and B is a French class.

General Formulae $$P_\theta(\tau, \pi|e) = P_\theta(\phi|e) P_\theta(\tau|\phi, e) P_\theta(\pi|\tau, \phi, e) \quad (148)$$

$$P_\theta(f, a|e) = \sum_{(\tau,\pi) \in (f,a)} P_\theta(\tau, \pi|e) \quad (149)$$

Assumptions $$P_\theta(\phi|e) = n_0 \left( \phi_0 \left| \sum_{i=1}^{l} \phi_i \right. \right) \prod_{i=1}^{l} n(\phi_i|e_i) \quad (150)$$

$$P_\theta(\tau|\phi, e) = \prod_{i=0}^{l} \prod_{k=1}^{\phi_i} t(\tau_{ik}|e_i) \quad (151)$$

$$P_\theta(\pi|\tau, \phi, e) = \frac{1}{\phi_0!} \prod_{i=1}^{l} \prod_{k=1}^{\phi_i} p_{ik}(\pi_{ik}) \quad (152)$$

where $$n_0(\phi_0|m') = \binom{m'}{\phi_0} p_0^{m'-\phi_0} p_1^{\phi_0}, \quad (153)$$

$$p_{ik}(j) = \begin{cases} d_1(j - c_{\rho_i}|A(e_{\rho_i}), B(\tau_{i1})) & \text{if } k = 1 \\ d_{>1}(j - \pi_{ik-1}|B(\tau_{ik})) & \text{if } k > 1 \end{cases} \quad (154)$$

In Equation (154), $\rho_i$ is the first position to the left of i for which $\phi_i>0$, and $c_\rho$ is the ceiling of the average position of the words of $\tau_\rho$:

$$\rho_i = \max_{i' < i} \{i': \phi_{i'} > 0\}, \quad c_\rho = \left\lceil \phi_\rho^{-1} \sum_{k=1}^{\phi_\rho} \pi_{\rho k} \right\rceil. \quad (155)$$

This model is deficient, since $$P_\theta(\text{failure}|\tau, \phi, e) \equiv 1 - \sum_\pi P_\theta(\pi|\tau, \phi, e) > 0. \quad (156)$$

Note that Equations (150), (151), and (153) are identical to the corresponding formulae (118), (119), and (121) for Model 3.

Generation

Equations (148)–(152) describe the following process for producing f or failure from e:

1.–4. Choose a tableau $\tau$ by following Steps 1–4 for Model 3.
5. For each i=1, 2, ..., l and each k=1, 2, ..., $\phi_i$ choose a position $\pi_{ik}$ as follows.
   If k=1 then choose $\pi_{il}$ according to the distribution $d_1(\pi_{i1} - c_{\rho_i}|A(e_{\rho_i}), B(\tau_{i1}))$.
   If k>1 then choose $\pi_{ik}$ greater than $\pi_{ik-1}$ according to the distribution $d_{>1}(\pi_{ik} - \pi_{ik-1}|B(\tau_{ik}))$.
6.–8. Finish generating f by following Steps 6–8 for Model 3.

10.6 Model 5

Parameters t(f|e) translation probabilities
n($\phi$|e) fertility probabilities
$p_0$, $p_1$ fertility probabilities for $e_0$
$d_L(\Delta_j|B, \upsilon)$ distortion probabilities for leftward movement of the first word of a tablet
$d_R(\Delta_j|B, \upsilon)$ distortion probabilities for rightward movement of the first word of a tablet
$d_{LR}(\text{l\_or\_r}|B, \upsilon, \upsilon')$ distortion probabilities for choosing left or right movement
$d_{>1}(\Delta_j|B, \upsilon)$ distortion probabilities for movement of other words of a tablet Here $\upsilon$, $\upsilon'$=1, 2, ..., m; and l\_or\_r=left or right.

General Formulae $$P_\theta(\tau, \pi|e) = P_\theta(\phi|e)P_\theta(\tau|\phi, e)P_\theta(\pi|\tau, \phi, e) \quad (157)$$

$$P_\theta(f, a|e) = \sum_{(\tau,\pi)\in(f,a)} P_\theta(\tau, \pi|e) \quad (158)$$

Assumptions $$P_\theta(\phi|e) = n_0\left(\phi_0 \Big| \sum_{i=1}^l \phi_i\right) \prod_{i=1}^l n(\phi_i|e_i) \quad (159)$$

$$P_\theta(\tau|\phi, e) = \prod_{i=0}^l \prod_{k=1}^{\phi_i} t(\tau_{ik}|e_i) \quad (160)$$

$$P_\theta(\pi|\tau, \phi, e) = \frac{1}{\phi_0!} \prod_{i=1}^l \prod_{k=1}^{\phi_i} p_{ik}(\pi_{ik}) \quad (161)$$

where $$n_0(\phi_0|m') = \binom{m'}{\phi_0} p_0^{m'-\phi_0} p_1^{\phi_0}, \quad (162)$$

$$(163)$$

$$p_{ik}(j) = \epsilon_{ik}(j) \begin{cases} d_{LR}(\text{right}|B(\tau_{i1}), v_{i1}(c_{\rho i}), v_{i1}(m)) & \\ d_R(v_{i1}(j) - v_{i1}(c_{\rho i})|B(\tau_{i1}), v_{i1}(m) - v_{i1}(c_{\rho i})) & \\ \quad \text{if } k = 1 \text{ and } j \geq c_{\rho i} & \\ d_{LR}(\text{left}|B(\tau_{i1}), v_{i1}(c_{\rho i}), v_{i1}(m)) & \\ d_L(v_{i1}(c_{\rho i}) - v_{i1}(j)|B(\tau_{i1}), v_{i1}(c_{\rho i})) & \\ \quad \text{if } k = 1 \text{ and } j < c_{\rho i} & \\ d_{>1}(v_{ik}(j) - v_{ik}(\pi_{ik-1})|B(\tau_{ik}), v_{ik}(m) - v_{ik}(\pi_{ik-1})) & \\ \quad \text{if } k > 1 & \end{cases} \quad (164)$$

In Equation (164), $\rho_i$ is the first position to the left of i which has a non-zero fertility; and $c_\rho$ is the ceiling of the average position of the words of tablet $\rho$ (see Equation (155)). Also, $\epsilon_{ik}(j)$ is 1 if position j is vacant after all the words of tablets $i^{-1} < i$ and the first k−1 words of tablet i have been placed, and 0 otherwise. $v_{ik}(j)$ is the number of vacancies not to the right of j at this time: $v_{ik}(j) = \sum_{j'=1}^{j-1} \epsilon_{ik}(j^{-1})$.

This model is not deficient. Note that Equations (159), (160), and (163) are identical to the corresponding formulae for Model 3.

N.B. In the previous section, simplified embodiment of this model in which the probabilities $d_{LR}$ do not appear is described.

Generation

Equations (157)–(161) describe the following process for producing f from e:

1.–4. Choose a tableau τ by following Steps 1–4 for Model 3.

5. For each i=1, 2, . . . , l and each k=1, 2, . . . , $\phi_i$ choose a position $\pi_{ik}$ as follows:

If k=1 then
 (a) Choose left or right according the distribution
 $d_{LR}(l\_or\_r|B(\tau_{i1}), v_{i1}(c_{\rho i}), v_{i1}(m))$.
 (b) If right, then choose a vacant position $\pi_{i1}$ greater than or equal to $c_{\rho i}$ according to the distribution
 $d_R(v_{i1}(\pi_{i1})-v_{i1}(c_{\rho i})|B(\tau_{i1}), v_{i1}(m)-v_{i1}(c_{\rho i}))$.
 (c) Otherwise, choose a vacant position $\pi_{i1}$ less than or equal to $c_{\rho i}$ according to the distribution $d_L(v_{i1}(c_{\rho i})-v_{i1}(\pi_{i1})|B(\tau_{i1}), v_{i1}(c_{\rho i}))$.

If k>1 then choose a vacant position $\pi_{ik-1}$ greater than $\pi_{ik-1}$ according to the distribution $d_{>1}(v_{ik}(\pi_{ik})-v_{ik}(\pi_{ik-1})|B(\tau_{ik}), v_{ik}(m)-v_{ik}(\pi_{ik-1}))$.

6.–8. Finish generating f by following Steps 6–8 for Model 3.

11 Sense Disambiguation

11.1 Introduction

An alluring aspect of the statistical approach to machine translation is the systematic frame-work it provides for attacking the problem of lexical disambiguation. For example, an embodiment of the machine translation system depicted in FIG. 4 translates the French sentence Je vais prendre la décision as I will make the decision, correctly interpreting prendre as make. Its statistical translation model, which supplies English translations of French words, prefers the more common translation take, but its trigram language model recognizes that the three-word sequence make the decision is much more probable than take the decision.

This system is not always so successful. It incorrectly renders Je vais prendre ma propre décision as I will take my own decision. Its language model does not realize that take my own decision is improbable because take and decision no longer fall within a single trigram.

Errors such as this are common because the statistical models of this system only capture local phenomena; if the context necessary to determine a translation falls outside the scope of these models, a word is likely to be translated incorrectly. However, if the relevant context is encoded locally, a word can be translated correctly.

As has been noted in Section 3, such encoding can be performed in the source-transduction phase 701 by a sense-labeling transducer.

In this section, the operation and construction of such a sense-labeling transducer is described. The goal of this transducer is to perform cross-lingual word-sense labeling. That is, this transducer labels words of a sentence in a source language so as to elucidate their translations into a target language. Such a transducer can also be used to label the words of an target sentence so as to elucidate their translations into a source language.

The design of this transducer is motivated by some examples. In some contexts the French verb prendre translates into English as to take, but in other contexts it translates as to make. A sense disambiguation transformation, by examining the contexts, might label occurrences of prendre that likely mean to take with one label, and other occurrences of prendre with another label. Then the uncertainty in the translation of prendre given the label would be less than the uncertainty in the translation of prendre without the label. Although the label does not provide any information that is not already present in the context, it encodes this information locally. Thus a local statistical model for the transfer of labeled sentences should be more accurate than one for the transfer of unlabeled ones.

While the translation of a word depends on many words in its context, it is often possible to obtain information by looking at only a single word. For example, in the sentence Je vais prendre ma propre décision (I will make my own decision), the verb prendre should be translated as make because its object is décision. If décision is replaced by voiture then prendre should be translated as take: Je vais prendre ma propre voiture (I will take my own car). Thus the uncertainty in the translation of prendre is reduced by asking a question about its object, which is often the first noun to its right. A sense can be assigned to prendre based upon the answer to this question.

As another example, in Il doute que les nôtres gagnent (He doubts that we will win), the word il should be translated as he. On the other hand, if doute is replaced by faut then il should be translated as it: Il faut que les nôtres gagnent (It is necessary that we win). Here, a sense label can be assigned to il by asking about the identity of the first verb to its right.

Figure 40:
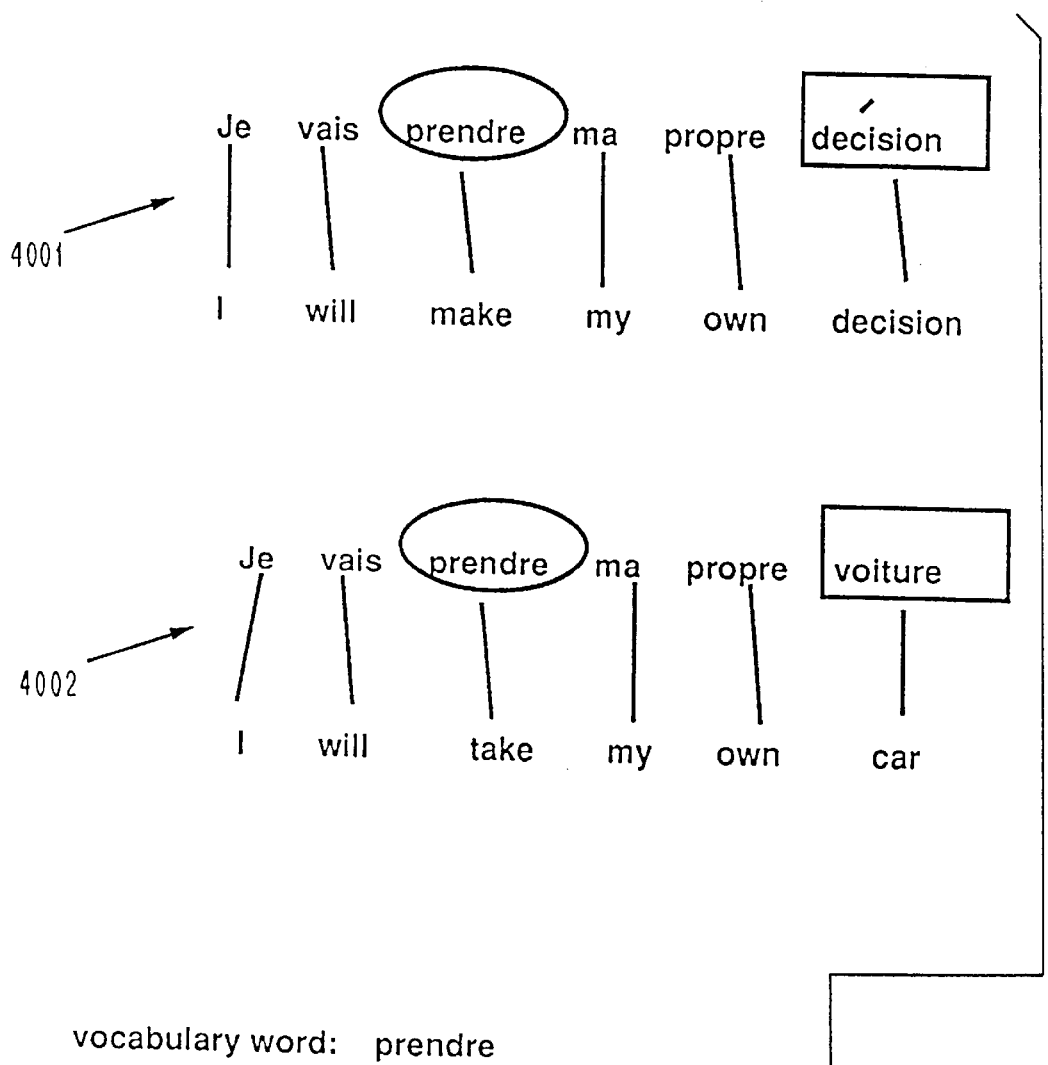
FIG. 40 is an example of informants and informant sites.

These examples motivate a sense-labeling scheme in which the label of a word is determined by a question about an informant word in its context. In the first example, the informant of prendre is the first noun to the right; in the second example, the informant of it is the first verb to the right. The first example is depicted in FIG. 40. The two sequence of this example are labeled 4001 and 4002 in the figure.

If more than two senses are desired for a word, then questions with more than two answers can be considered.

11.2 Design of a Sense-Labeling Transducer

Figure 41:
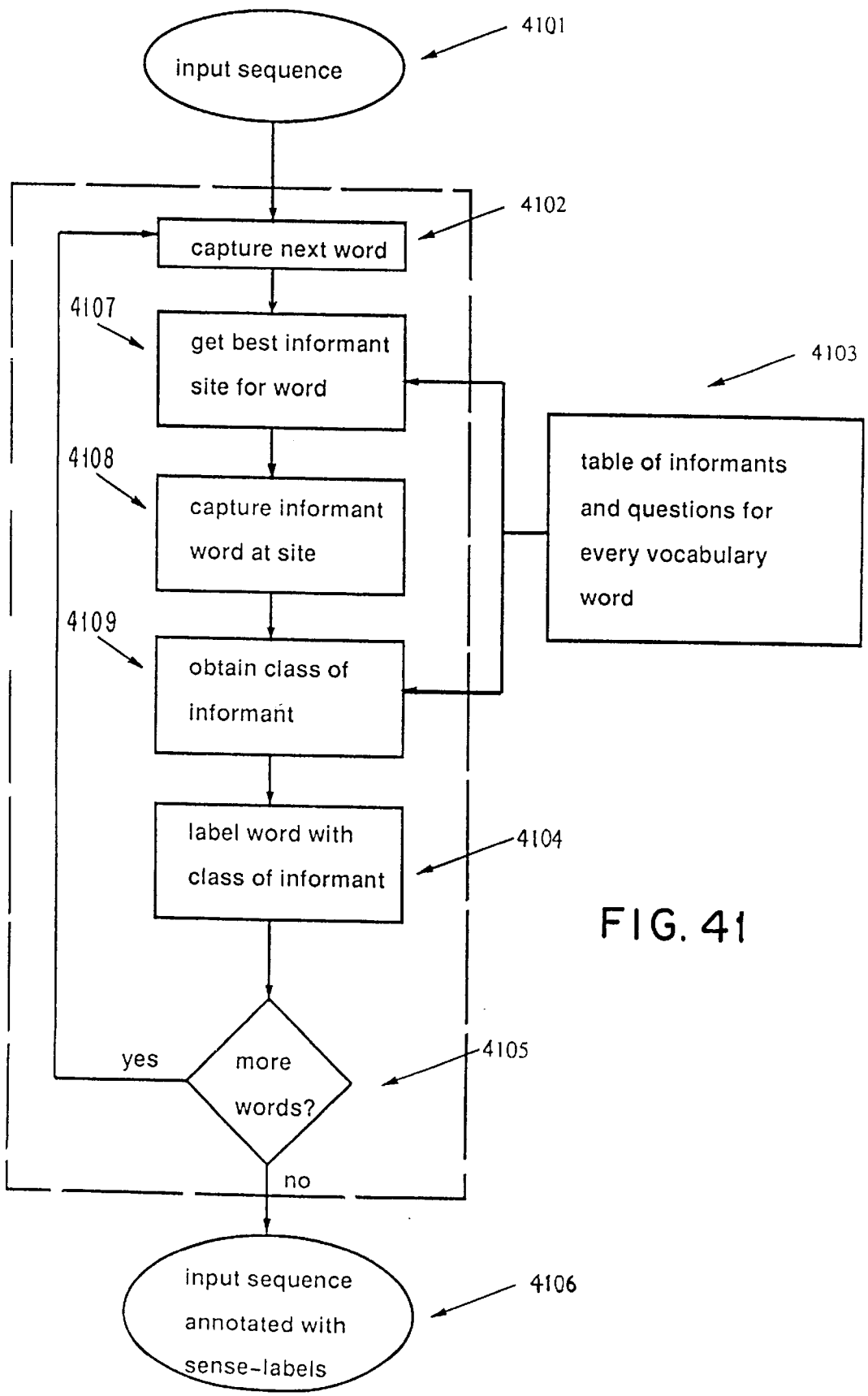
FIG. 41 is a schematic flow diagram illustrating the operation of a sense-labeling transducer.

FIG. 41 depicts an embodiment of a sense-labeling transducer based on this scheme. For expositional purposes, this embodiment will be discussed in the context of labeling words in a source language word sequence. It should be understood that in other embodiments, a sense-labeling transducer can accept as input more involved source-structure representations, including but not limited to, lexical morpheme sequences. In these embodiments, the constituents of a representation of a source word sequence are annotated by the sense-labeling transducer with labels that elucidate their translation into analogous constituents into a similar representation of a target word sequence. It should also be understood that in still other embodiments, a sense-labeling transducer annotates, target-structure representations, (not source-structure representations) with sense labels.

The operation of the embodiment of the sense-labeling transducer depicted in FIG. 41 comprises the steps of:

4101. Capturing an input sequence consisting of a sequence of words in a source language;

4102. For each word in the input sequence performing the Steps 4107, 4108, 4109, 4104 until no more words are available in Step 4105;

4107. For the input word being considered, finding a best informant site such as the noun to the right, the verb to the left, etc. A best informant for a word is obtained using a table 4103 stored in memory of informants and questions about the informants for every word in the source language vocabulary;

4108. Finding the word at the best informant site in the input word sequence;

4109. Obtaining the class of the informant word as given by the answer to a question about the informant word;

4104. Labeling the original input word of the input sequence with the class of the informant word.

For the example depicted in FIG. 40, the informant site determined by Step 4107 is the noun to the right. For the first word sequence 4001 of this example, the informant word determined by Step 4108 is décision; for the second word sequence 4109, the informant word is voiture. In this example, the class of désion determined in Step 4109 is different than the class of voiture. Thus the label attached to prendre by Step 4104 is different for these two contexts of prendre.

11.3 Constructing a table of informants and questions

An important component of the sense-labeler depicted in FIG. 4101 is a table 4103 of informants and questions for every word in a source language vocabulary.

Figure 42:
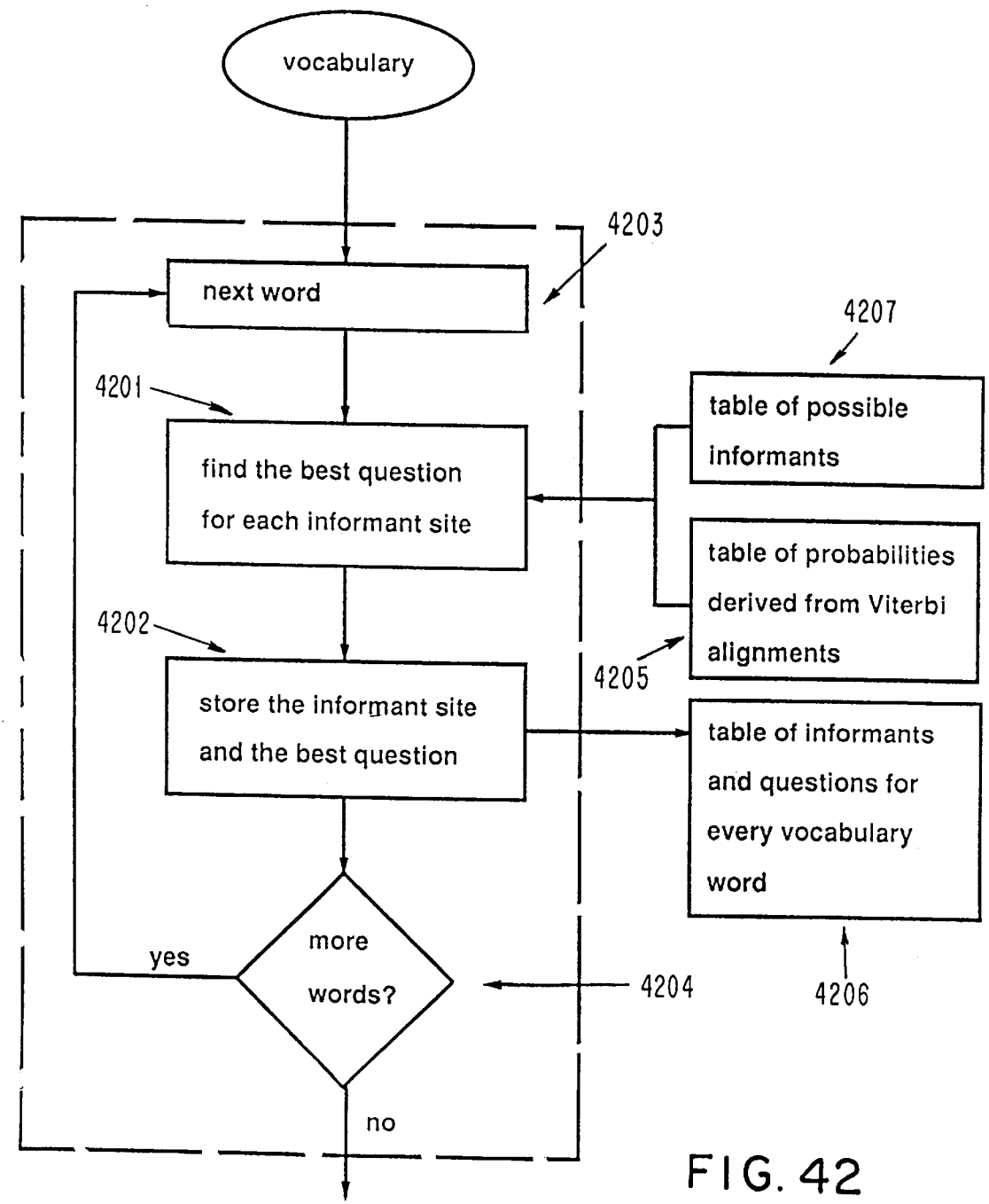
FIG. 42 is a schematic flow diagram of a module that determines good questions about informants for each vocabulary word.

FIG. 42 depicts a method of constructing such a table. This method comprises the steps of:

4203. Performing the Steps 4201 and 4202 for each word in a source language vocabulary.

4201. For the word being considered, finding a good question for each of a plurality of informant sites. These informant sites are obtained from a table 4207 stored in memory of possible informant sites. Possible sites include but are not limited to, the nouns to the right and left, the verbs to the right and left, the words to the right and left, the words two positions to the right or left, etc. A method of finding a good question is described below. This method makes use of a table 4205 stored in memory probabilities derived from Viterbi alignments. These probabilities are also discussed below.

4202. Storing in a table 4206 of informants and questions, the informant site and the good question.

Figure 43:
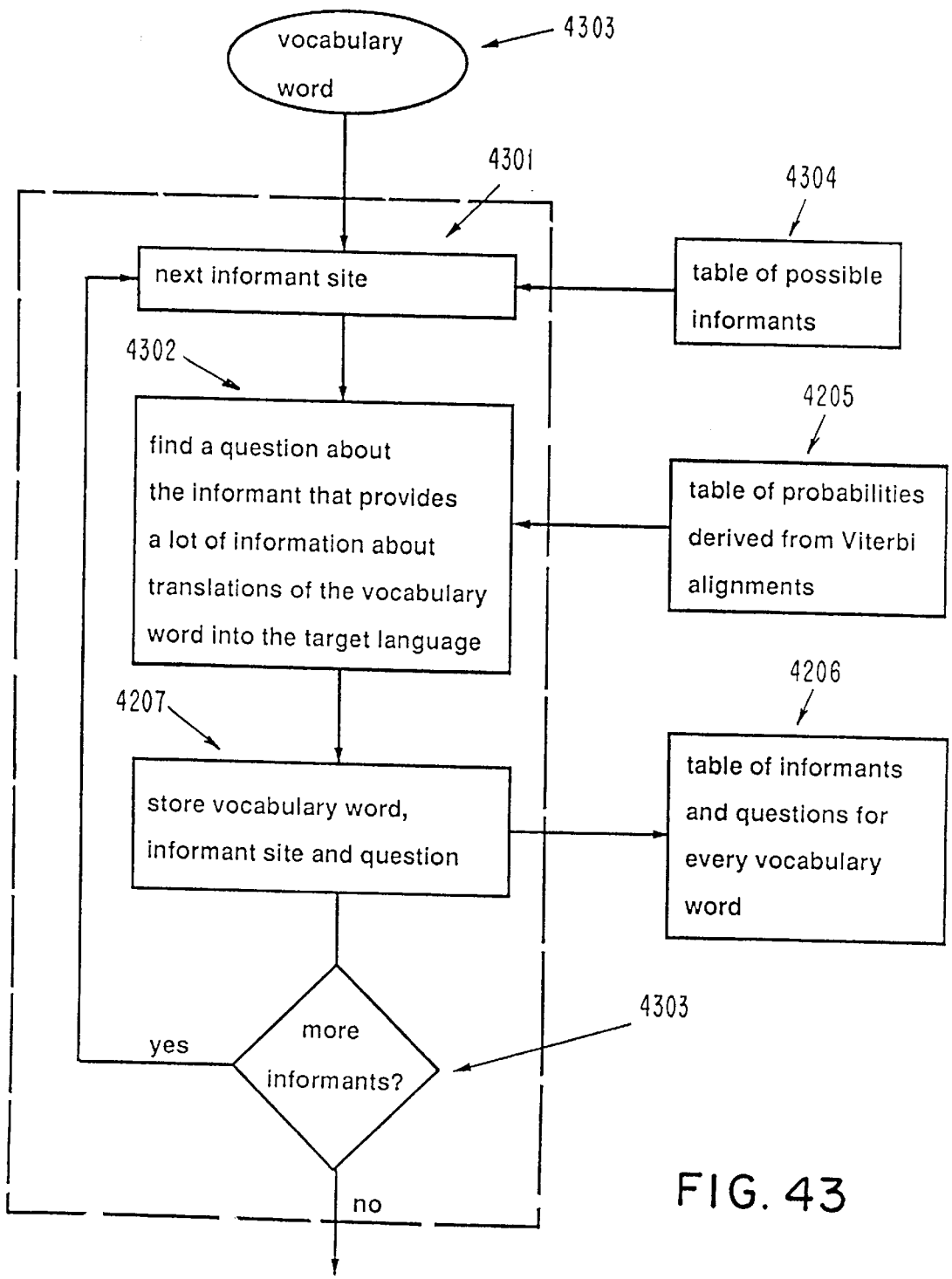
FIG. 43 is a schematic flow diagram of a module that determines a good question about each informant of a vocabulary word.

A method for carrying out the Step 4201 for finding a good question for each informant site of a vocabulary word is depicted in FIG. 43. This method comprises the steps of:

4301. Performing the Steps 4302 and 4207 for each possible informant site. Possible informant sites are obtained from a table 4304 of such sites.

4302. For the informant site being considered, finding a question about informant words at this site that provides a lot of information about translations of the vocabulary word into the target language.

4207. Storing the vocabulary word, the informant site, and the good question in a table 4103.

11.4 Mathematics of Constructing Questions

Figure 44:
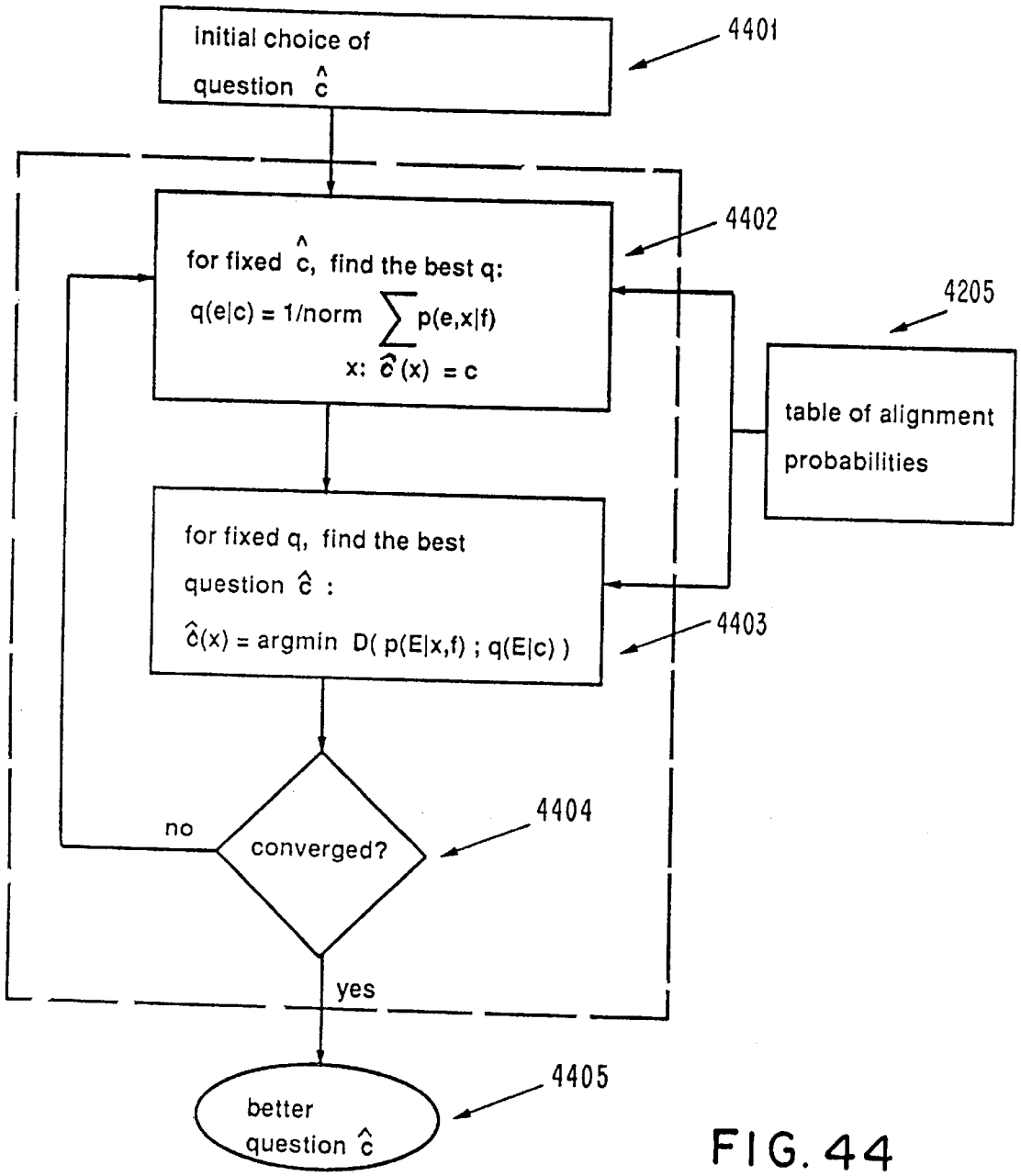
FIG. 44 is a schematic flow diagram of a method for determining a good question about an informant.

A method for carrying out the Step 4302 of finding a question about an informant is depicted in FIG. 44. In this subsection, the some preliminaries for describing this method are given. The notation used here is the same as that used in Sections 8–10.

11.4.1 Statistical Translation with Transductions

Recall the setup depicted in FIG. 2. A system shown there employs

1. A source transducer 201 which encodes a source sentence f into an intermediate structure f'.
2. A statistical translation component 202 which translates f' into a corresponding intermediate target structure e'. This component incorporates a language model, a translation model, and a decoder.
3. A target transducer 203 which reconstructs a target sentence e from e'.

For statistical modeling, the target-transduction transformation 203 e'→e is sometimes required to be invertible. Then e' can be constructed from e and no information is lost in the transformation.

The purpose of source and target transduction is to facilitate the task of the statistical translation. This will be accomplished if the probability distribution Pr(f', e') is easier to model then the original distribution Pr(f, e). In practice this means that e' and f' should encode global linguistic facts about e and f in a local form.

A useful gauge of the success that a statistical model enjoys in modeling translation from sequences of source words represented by a random variable F, to sequences of target words represented by a random variable E, is the cross entropy[3]

[3] In this equation and in the reminder of this section, the convention of using uppercase letters (e.g. E) for random variables and lower case letters (e.g. e) for the values of random variables continues to be used.

$$H(E|F) \equiv -\frac{1}{S} \sum_s \log P(e^{(s)}|f^{(s)}). \tag{165}$$

The cross entropy measures the average uncertainty that the model has about the target language translation e of a source language sequence f. Here P(e|f) is the probability according to the model that e is a translation of f and the sum runs over a collection of all S pairs of sentences in a large corpus comprised of pairs of sentences with each pair consisting of a source and target sentence which are translations of one another (See Sections 8–10).

A better model has less uncertainty and thus a lower cross entropy. The utility of source and target transductions can be measured in terms of this cross entropy. Thus transformations f→f' and e'→e are useful if models P'(f'|e') and P'(e') can be constructed such that H(E'|F')<H(E|F).

11.4.2 Sense-Labeling in Statistical Translation

The remainder of this section is devoted to describing methods for constructing a sense-labeling transducer. In this case the following setup prevails:

The Intermediate Structures. Intermediate structures e' and f' consist of sequences of words labeled by their senses. Thus f' is a sentence over the expanded vocabulary whose 'words' f' are pairs (f, s) where f is a word in the original source vocabulary and s is its sense label. Similarly, e' is a sentence over the expanded vocabulary whose words e' are pairs (e, s) where e is a target word and s is its sense label.

Source and target transductions. For each source word and each target word, an informant site, such as first noun to the left is chosen, and an n-ary question about the value of the informant at that site is also chosen. A source-transduction transformation f→f' and an inverse target-transduction transformation e→e' map a sentence to the intermediate structure in which each word is labeled by a sense, determined by the question about its informant. A target-transduction transformation e'→e maps a labeled sentence to a sentence in which the labels have been removed.

The probability models. A translation model such as one of the models in Sections 8–10 is used for both P'(F'|E') and for P(F|E). A trigram language model such as that discussed in Section 6 is used for both P(E) and P'(E').

11.4.3 The Viterbi Approximation

The probability P(f|e) computed by the translation model requires a sum over alignments as discussed in detail in Sections 8–10. This sum is often too expensive to compute directly since the number of alignments increases exponentially with sentence length. In the mathematical considerations of this Section, this sum will be approximated by the single term corresponding to the alignment, V(f|e), with greatest probability. This is the Viterbi approximation already discussed in Sections 8–10 and V(f|e) is the Viterbi alignment.

Let c(f|e) be the expected number of times that e is aligned with f in the Viterbi alignment of a pair of sentences drawn at random from a large corpus of training data. Let c(φ|e) be the expected number of times that e is aligned with φ words. Then $$c(f|e) = \frac{1}{S} \sum_s c(f|e; V(f^{(s)}|e^{(s)}))  \quad (166)$$

$$c(\phi, e) = \frac{1}{S} \sum_s c(\phi|e; V(f^{(s)}|e^{(s)})).$$

where c(f|e; V) is the number of times that e is aligned with f in the alignment A, and c(φ|e; V) is the number of times that e generates φ target words in A. The counts above are also expressible as averages with respect to the model:

$$c(f|e) = \sum_{f,e} P(f, e) c(f|e; V(f|e))  \quad (167)$$

$$c(\phi|e) = \sum_{f,e} P(f, e) c(\phi|e; V(f|e)).$$

Probability distributions p(e, f) and p(φ, e) are obtained by normalizing the counts c(f|e) and c(φ|e):

$$p(f, e) = \frac{1}{norm} c(f|e) \quad p(\phi, e) = \frac{1}{norm} c(\phi, e) .^4 \quad (168)$$

[4] In these equations and in the remainder of the paper, the generic symbol 1/norm is used to denote a normalizing factor that converts counts to probabilities. The actual value of 1/norm will be implicit from the context. Thus, for example, in the left hand equation of (168), the normalizing factor is norm=$\Sigma_{f,e}$c(f|e) which equals the average length of source sentences. In the right hand equation of (168), the normalizing factor is the average length of target sentences.

(These are the probabilities that are stored in a table of probabilities 4205.) The conditional distributions p(f|e) and p(φ|e) are the Viterbi approximation estimates for the parameters of the model. The marginals satisfy $$\sum_\phi p(\phi, e) = u(e) \quad \sum_e p(f, e) = u(f) \quad (169)$$

$$\sum_f f(f, e) = \frac{1}{norm} \overline{\phi}(e)u(e)$$

where u(e) and u(f) are the unigram distributions of e and f and $\overline{\phi}(e) = \Sigma_\phi p(\phi|e)\phi$ is the average number of source words aligned with e. These formulae reflect the fact that in any alignment each source word is aligned with exactly one target word.

11.4.4 Cross Entropy

In this subsection the cross entropies H(E|F) and H(E'|F') are expressed in terms of the information between source and target words.

In the Viterbi approximation, the cross entropy H(F|E) is given by, $$H(F|E) = m\{H(E|F) + H(\Phi|E)\}, \quad (170)$$

where m is the average length of the source sentences in the training data, and H(F|E) and H(Φ|E) are the conditional entropies for the probability distributions p(f, e) and p(φ, e):

$$H(F|E) = - \sum_{f,e} p(f, e) \log p(f|e) \quad (171)$$

$$H(\Phi|E) = - \sum_{e,\phi} p(\phi, e) \log p(\phi|e).$$

A similar expression for the cross entropy H(E|F) will now be given. Since $$P(f,e) = P(f|e)P(e),$$

this cross entropy depends on both the translation model, P(f|e), and the language model, P(e). With a suitable additional approximation, $$H(E|F) = m\{H(\Phi|E) - I(E, F)\}, + H(E) \quad (172)$$

where H(E) is the cross entropy of P(E) and I(F, E) is the mutual information between f and e for the probability distribution p(f, e).

The additional approximation required is, $$H(F) \approx mH(F) \equiv -m \sum_f p(f) \log p(f), \quad (173)$$

where p(f) is the marginal of p(f, e). This amounts to approximating P(f) by the unigram distribution that is closest to it in cross entropy. Granting this, formula (172) is a consequence of (170) and of the identities $$H(E|F)=H(E|F)-H(F)+H(E), H(F)=H(F|E)+I(F, E). \quad (174)$$

Next consider H(E'|F'). Let e→e' and f→f' be sense labeling transformations of the type discussed above. Assume that these transformations preserve Viterbi alignments; that is, if the words e and f are aligned in the Viterbi alignment for (f, e), then their sensed versions e' and f' are aligned in the Viterbi alignment for (f', e'). It follows that the word translation probabilities obtained from the Viterbi alignments satisfy $p(f, e)=\Sigma_{f'\in f}p(f', e)=\Sigma_{e'\in e}p(f, e')$, where the sums range over the sensed versions f' of f and the sensed versions e' of e.

By applying (172) to the cross entropies H(E|F), H(E|F'), and H(E'|F), it is not hard to verify that $$H(E|F') = H(E|F) - m\sum_{f} p(f)I(E, F'|f), \quad (175)$$

$$H(E'|F) = H(E|F) - m\sum_{e} p(e)\{I(F, E'|e) + I(\Phi, E', |e)\}.$$

Here I(E, F'|f) is the conditional mutual information given a, source word f between its translations E and its sensed versions F'; I(F, E'|e) is the conditional mutual information given a target word e between its translations F and its sensed versions E'; and I(Φ, E'|e) is the conditional mutual information given e between Φ and its sensed versions E'.

11.5 Selecting Questions

The method depicted in 44 for finding good informants and questions for sensing is now described.

11.5.1 Source Questions

For sensing source sentences, a question about an informant is a function ĉ from the source vocabulary into the set of possible senses. If the informant of f is x, then f is assigned the sense ĉ(x). The function ĉ(x) is chosen to minimize the cross entropy H(E|F'). From formula (175), this is equivalent to maximizing the conditional mutual information I(F', E|f) between E and F'

$$I(F', E|f) = \sum_{e,x} p(e, x|f)\log \frac{p(e, \hat{c}(x)|f)}{p(e|f)p(\hat{c}(x)|f)}, \quad (176)$$

where p(f, e, x) is the probability distribution obtained by counting the number of times in the Viterbi alignments that e is aligned with f and the value of the informant of f is x, $$p(f, e, x) = \frac{1}{norm} \sum_{s} c(f|e, x|V(f^f, e^{(f)})) \quad (177)$$

$$p(f, e, c) = \frac{1}{norm} \sum_{x:\hat{c}(x)=c} p(f, e, x).$$

An exhaustive search for the best ĉ requires a computation that is exponential in the number of values of x and is not practical. In the aforementioned paper entitled "Word-Sense Disambiguation using Statistical Methods" by P. F. Brown, et al., a good ĉ is found using the flip-flop method which is only applicable if the number of senses is restricted to two. Here a different method that can be used to find ĉ for any number of senses is described. This method uses the technique of alternating minimization, and is similar to the k-means method for determining pattern clusters and to the generalized Lloyd method for designing vector quantitizers.

The method is based on the fact that, up to a constant independent of ĉ, the mutual information I(F', E|f) can be expressed as an infimum over conditional probability distributions q(E|C), $$I(F', E|f) = \inf_{q} \sum_{x} p(x)D(p(E|x, f); q(E|\hat{c}(x))) + \text{constant} \quad (178)$$

where $$D(p(E); q(E)) = \sum_{e} p(e)\log \frac{p(e)}{q(e)}. \quad (179)$$

The best value of the information is thus an infimum over both the choice for ĉ and the choice for the q. This suggests the iterative method, depicted in 4401 for obtaining a good ĉ. This method comprises the steps of:

4401. Beginning with an initial choice of ĉ;
4404. Performing Steps 4402 and 4403 until no further increase in I(F', E|f) results;
4403. For given q, finding the best ĉ:

$$\hat{c}(x)=\text{argmin}_c D(p(E|x, f); q(E|c));$$

4402. For this ĉ, finding the best q:

$$q(e|c) = \frac{1}{norm} \sum_{x:\hat{c}(x)=c} p(e, x|f).$$

11.5.2 Target Questions

For sensing target sentences, a question about an informant is a function ĉ from the target vocabulary into the set of possible senses. ĉ is chosen to minimize the entropy H(E'|F). From (175) this is equivalent to maximizing the sum $$I(F,E'|e)+I(\Phi, E'|e).$$

In analogy to (179), $$I(F, E'|e) + I(\Phi, E'|e) = \inf_{q_1, q_2} \sum_{x} p(x) \{D(p(F|x, e); q_1(F|\hat{c}(x)) + D(p(\Phi|x, e); q_2(\Phi|\hat{c}(x))\}. \quad (180)$$

Again a good ĉ is obtained alternating minimization.

11.6 Generalizations

The methods of sense-labeling discussed above ask a single question about a single word of context. In other embodiments of the sense labeler, this question is the first question in a decision tree. In still other embodiments, rather than using a single informant site to determine the sense of a word, questions from several different informant sites are combined to determine the sense of a word. In one embodiment, this is done by assuming that the probability of an informant word $x_i$ at informant site i, given a target word e, is independent of an informant word x, at a different informant site j given the target word e. Also, in other embodiments, the intermediate source and target structure representations are more sophisticated than word sequences, including, but not limited to, sequences of lexical morphemes, case frame sequences, and parse tree structures.

12 Aligning Sentences

In this section, a method is described for aligning sentences in parallel corpora, and extracting from parallel corpora pairs of sentences which are translations of one another. These tasks are not trivial because at times a single sentence in one corpora is translated as two or more sentences in the other corpora. At other times a sentence, or even a whole passage, may be missing from one or the other of the corpora.

A number of researchers have developed methods that align sentences according to the words that they contain. (See for example, Deriving translation data from bilingual text, by R. Catizone, G. Russel, and S. Warwick, appearing in Proceedings of the First International Acquisition Workshop, Detroit, Mi., 1989; and "Making Connections", by M. Kay, appearing in ACH/ALLC '91, Tempe, Ariz., 1991.) Unfortunately, these methods are necessarily slow and, despite the potential for high accuracy, may be unsuitable for very large collections of text.

In contrast, the method described here makes no use of lexical details of the corpora. Rather, the only information that it uses, besides optional information concerning anchor points, is the lengths of the sentences of the corpora. As a result, the method is very fast and therefore practical for application to very large collections of text.

The method was used to align several million sentences from parallel French and English corpora derived from the proceedings of the Canadian Parliament. The accuracy of these alignments was in excess of 99% for a randomly selected set of 1000 alignments that were checked by hand. The correlation between the lengths of aligned sentences indicates that the method would achieve an accuracy of between 96% and 97% even without the benefit of anchor points. This suggests that the method is applicable to a very wide variety of parallel corpora for which anchor points are not available.

12.1 Overview

Figure 46:
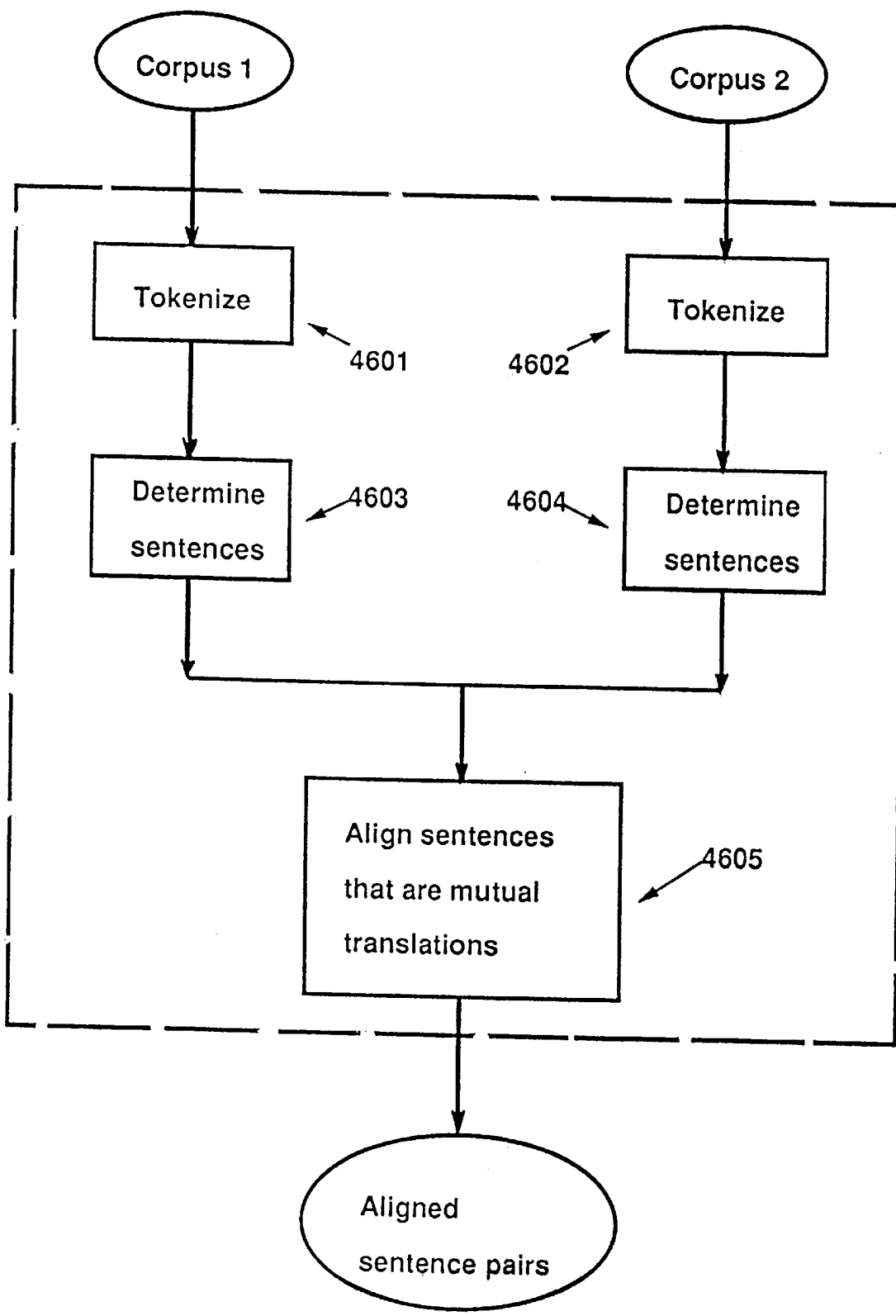
FIG. 46 is a schematic flow diagram of a method for aligning sentences in parallel corpora.

One embodiment of the method is illustrated schematically in FIG. 46. It comprises the steps of:

4601 and 4602. Tokenizing the text of each corpus.

4603 and 4604. Determining sentence boundaries in each corpus.

4605. Determing alignments between the sentences of the two corpora.

Figure 47:
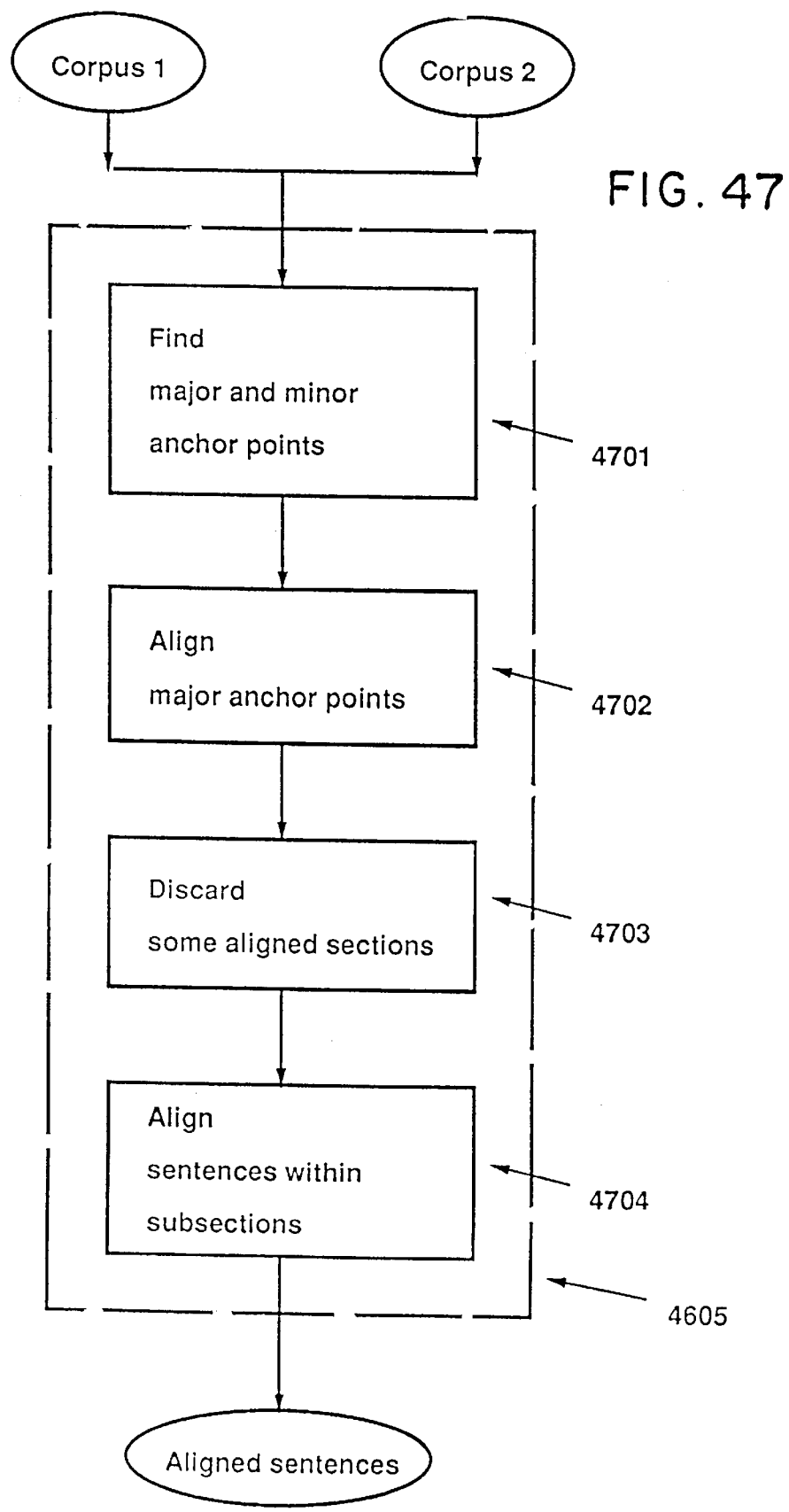
FIG. 47 is a schematic flow diagram of the basic step of a method for aligning sentences.

The basic step 4605 of determining sentence alignments is elaborated further in FIG. 47. It comprises the steps of:

4701. Finding major and minor anchor points in each corpus. This divides each corpus into sections between major anchor points, and subsections between minor anchor points.

4702. Determining alignments between major anchor points.

4703. Retaining only those aligned sections for which the the number of subsections is the same in both corpora.

4704. Determining alignments between sentences within each of the remaining aligned subsections.

One embodiment of the method will now be explained. The various steps will be illustrated using as an example the aforementioned parallel French and English corpora derived from the Canadian Parliamentary proceedings. These proceedings, called the Hansards, are transcribed in both English and French. The corpora of the example consists of the English and French Hansard transcripts for the years 1973 through 1986.

It is understood that the method and techniques illustrated in this embodiment and the Hansard example can easily be extended and adapted to other corpora and other languages.

12.2 Tokenization and Sentence Detection

First, the corpora are tokenized (steps 4601 and 4602) using a finite-state tokenizer of the sort described in Subsection 3.2.1. Next, (steps 4602 and 4603), the corpora are partitioned into sentences using a finite state sentence boundary detector. Such a sentence detector can easily be constructed by one skilled in the art. Generally, the sentences produced by such a sentence detector conform to the grade-school notion of sentence: they begin with a capital letter, contain a verb, and end with some type of sentence-final punctuation. Occasionally, they fall short of this ideal and consist merely of fragments and other groupings of words.

In the Hansard example, the English corpus contains 85,016,286 tokens in 3,510,744 sentences, and the French corpus contains 97,857,452 tokens in 3,690,425 sentences. The average English sentence has 24.2 tokens, while the average French sentence is about 9.5% longer with 26.5 tokens. The left-hand side of FIG. 48 shows the raw data for a portion of the English corpus, and the right-hand side shows the same portion after it was cleaned, tokenized, and divided into sentences. The sentence numbers do not advance regularly because the sample has been edited in order to display a variety of phenomena.

12.3 Selecting Anchor Points

The selection of suitable anchor points (Step 4701) is a corpus-specific task. Some corpora may not contain any reasonable anchors.

In the Hansard example, suitable anchors are supplied by various reference markers that appear in the transcripts. These include session numbers, names of speakers, time stamps, question numbers, and indications of the original language in which each speech was delivered. This auxiliary information is retained in the tokenized corpus in the form of comments sprinkled throughout the text. Each comment has the form \SCM{ }. . . \ECM{ } as shown on the right-hand side of FIG. 48.

To supplement the comments which appear explicitly in the transcripts, a number of additional comments were added. Paragraph comments were inserted as suggested by the space command of the original markup language. An example of this command appears in the eighth line on the left-hand side of FIG. 48. The beginning of a parliamentary session was marked by a Document comment, as illustrated in Sentence 1 on the right-hand side of FIG. 48. Usually, when a member addresses the parliament, his name is recorded, This was encoded as an Author comment, an example of which appears in Sentence 4. If the president speaks, he is referred to in the English corpus as Mr. Speaker and in the French corpus as

TABLE 18

| Examples of comments | |
|---|---|
| English | French |
| Source = English | Source = Traduction |
| Source = Translation | Source = Francais |
| Source = Text | Source = Texte |
| Source = List Item | Source = List Item |
| Source = Question | Source = Question |
| Source = Answer | Source = Response |

M. le Président. If several members speak at once, a shockingly regular occurrence, they are referred to as Some Hon. Members in the English and as Des Voix in the French. Times are recorded either as exact times on a 24-hour basis as in Sentence 81, or as inexact times of which there are two forms: Time=Later, and Time=Recess. These were encoded in the French as Time=Plus Tard and Time=Recess. Other types of comments are shown in Table 18.

The resulting comments laced throughout the text are used as anchor points for the alignment process. The comments Author=Mr. Speaker, Author=M. le Président, Author=Some Hon. Members, and Author=Des Voix are deemed minor anchors. All other comments are deemed major anchors with the exception of the Paragraph comment which was not treated as an anchor at all. The minor anchors are much more common than any particular major anchor, making an alignment based on minor anchors much less robust against deletions than one based on the major anchors.

12.4 Aligning Major Anchors

Major anchors, if they are to be useful, will usually appear in parallel in the two corpora. Sometimes, however, through inattention on the part of translators or other misadventure, an anchor in one corpus may be garbled or omitted in another. In the Hansard example, for instance, this is problem is not uncommon for anchors based upon names of speakers.

The major anchors of two corpora are aligned (Step 4702) by the following method. First, each connection of an alignment is assigned a numerical cost that favors exact matches and penalizes omissions or garbled matches. In the Hansard example, these costs were chosen to be integers between 0 and 10. Connections between corresponding pairs such as Time=Later and Time=Plus Tard, were assigned a cost of 0, while connections between different pairs such as Time=Later and Author=Mr. Bateman were assigned a cost of 10. A deletion is assigned a cost of 5. A connection between two names was assigned a cost proportional to the minimal number of insertions, deletions, and substitutions necessary to transform one name, letter by letter, into the other.

Given these costs, the standard technique of dynamic programming is used to find the alignment between the major anchors with the least total cost. Dynamic programming is described by R. Bellman in the book titled Dynamic Programming, published by Princeton University Press, Princeton, N.J. in 1957. In theory, the time and space required to find this alignment grow as the product of the lengths of the two sequences to be aligned. In practice, however, by using thresholds and the partial traceback technique described by Brown, Spohrer, Hochschild, and Baker in their paper, Partial Traceback and Dynamic Programming, published in the Proceedings of the IEEE International Conference on Acoustics, Speech and Signal Processing, in Paris, France in 1982, the time required can be made linear in the length of the sequences, and the space can be made constant. Even so, the computational demand is severe. In the Hansard example, the two corpora were out of alignment in places by as many as 90,000 sentences owing to mislabelled or missing files.

12.5 Discarding Sections

The alignment of major anchors partitions the corpora into a sequence of aligned sections. Next, (Step 4703), each section is accepted or rejected according to the population of minor anchors that it contains. Specifically, a section is accepted provide that, within the section, both corpora contain the same number of minor anchors in the same order. Otherwise, the section is rejected. Altogether, using this criteria, about 10% of each corpus was rejected. The minor anchors serve to divide the remaining sections into subsections that range in size from one sentence to several thousand sentences and average about ten sentences.

12.6 Aligning Sentences

The sentences within a subsection are aligned (Step 4704) using a simple statistical model for sentence lengths and paragraph markers. Each corpus is viewed as a sequence of sentence lengths punctuated by occasional paragraph markers, as illustrated in FIG. 49. In this figure, the circles around groups of sentence lengths indicate an alignment between the corresponding sentences. Each grouping is called a bead. The example consists of an ef-bead followed by an eff-bead followed by an e-bead followed by a $\P_e\P_f$-bead. From this perspective, an alignment is simply a sequence of beads that accounts for the observed sequences of sentence lengths and paragraph markers. The model assumes that the lengths of sentences have been generated by a pair of random processes, the first producing a sequence of beads and the second choosing the lengths of the sentences in each bead.

The length of a sentence can be expressed in terms of the number of tokens in the sentence, the number of characters in the sentence, or any other reasonable measure. In the Hansard example, lengths were measured as numbers of tokens.

The generation of beads is modelled by the two-state Markov model shown in FIG. 50. The allowed beads are shown in FIG. 51. A single sentence in one corpus is assumed to line up with zero, one, or two sentences in the other corpus. The probabilities of the different cases are assumed to satisfy $Pr(e)=Pr(f)$, $Pr(eff)=Pr(eef)$, and $Pr(\P_e)=Pr(\P_f)$.

The generation of sentence lengths given beads is modeled as follows. The probability of an English sentence of length $l_e$ given an e-bead is assumed to be the same as the probability of an English sentence of length $l_e$ in the text as a whole. This probability is denoted by $Pr(l_e)$. Similarly, the probability of a French sentence of length $l_f$ given an f-bead is assumed to equal $Pr(l_f)$. For an ef-bead, the probability of an English sentence of length $l_e$ is assumed to equal $Pr(l_e)$ and the log of the ratio of length of the French sentence to the length of the English sentence is assumed to be normally distributed with mean $\mu$ and variance $\sigma^2$. Thus, if $r=\log(l_f/l_e)$, then $$Pr(l_f/l_e)=\alpha\exp[-(r-\mu)^2/(2\sigma^2)], \qquad (181)$$

with $\alpha$ chosen so that the sum of $Pr(l_f/l_e)$ over positive values of $l_f$ is equal to unity. For an eef-bead, the English sentence lengths are assumed to be independent with equal marginals $Pr(l_e)$, and the log of the ratio of the length of the French sentence to the sum of the lengths of the English sentences is assumed to be normally distributed with the same mean and variance as for an ef-bead. Finally, for an eff-bead, the probability of an English length $l_e$ is assumed to equal $Pr(l_e)$ and the the log of the ratio of the sum of the lengths of the French sentences to the length of the English sentence is assumed to be normally distributed as before. Then, given the sum of the lengths of the French sentences, the probability of a particular pair of lengths, $l_{f_1}$ and $l_{f_2}$, is assumed to be proportional to $Pr(l_{f_1})Pr(l_{f_2})$.

Together, the model for sequences of beads and the model for sentence lengths given beads define a hidden Markov model for the generation of aligned pairs of sentence lengths. Markov Models are described by L. Baum in the article "An Inequality and associated maximization technique in statistical estimation of probabilistic functions of a Markov process", appearing in Inequalities in 1972.

The distributions $Pr(l_e)$ and $Pr(l_f)$ are determined from the relative frequencies of various sentence lengths in the data. For reasonably small lengths, the relative frequency is a reliable estimate of the corresponding probability. For longer lengths, probabilities are determined by fitting the observed frequencies of longer sentences to the tail of a Poisson distribution. The values of the other parameters of the Markov model can be determined by from a large

TABLE 19

Parameter estimates

| Parameter | Estimate |
|---|---|
| Pr(e),Pr(f) | .007 |
| Pr(ef) | .690 |
| Pr(eef),Pr(eff) | .020 |
| Pr($?_e$) , Pr($?_f$) | .005 |
| Pr($?_e?_f$) | .245 |
| $\mu$ | .072 |
| $\rho^2$ | .043 | sample of text using the EM method. This method is described in the above referenced article by E. Baum.

Figure 52:
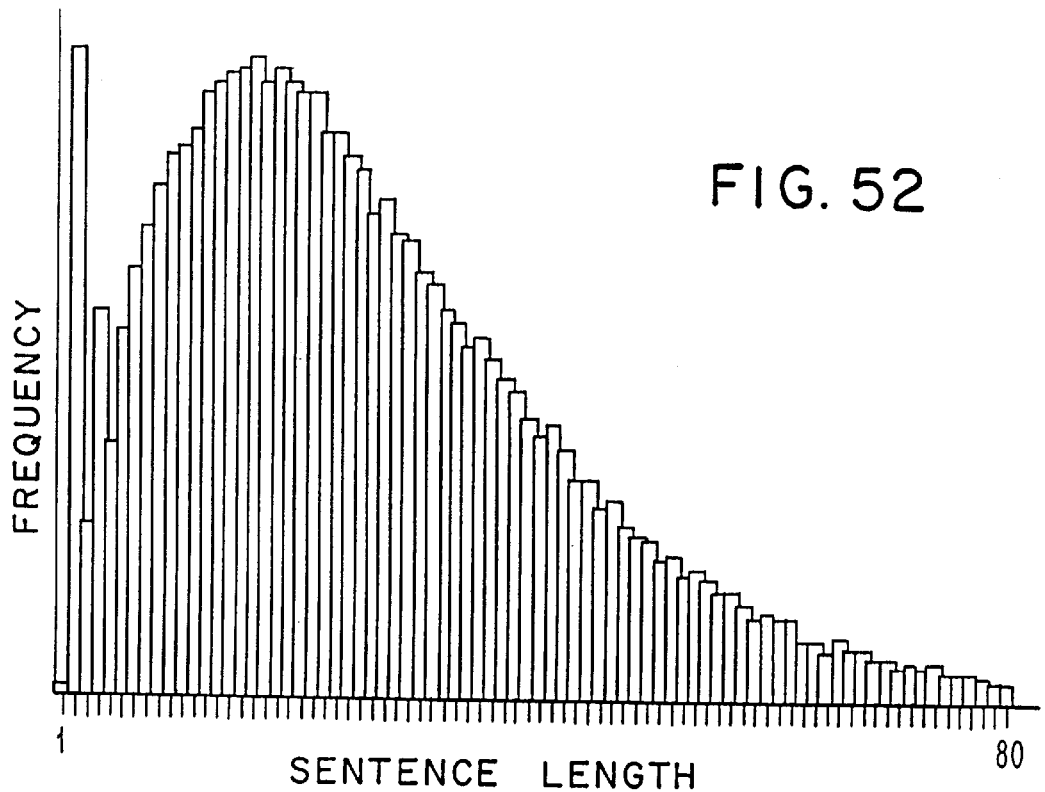
FIG. 52 is a histogram of French sentence lengths.
Figure 53:
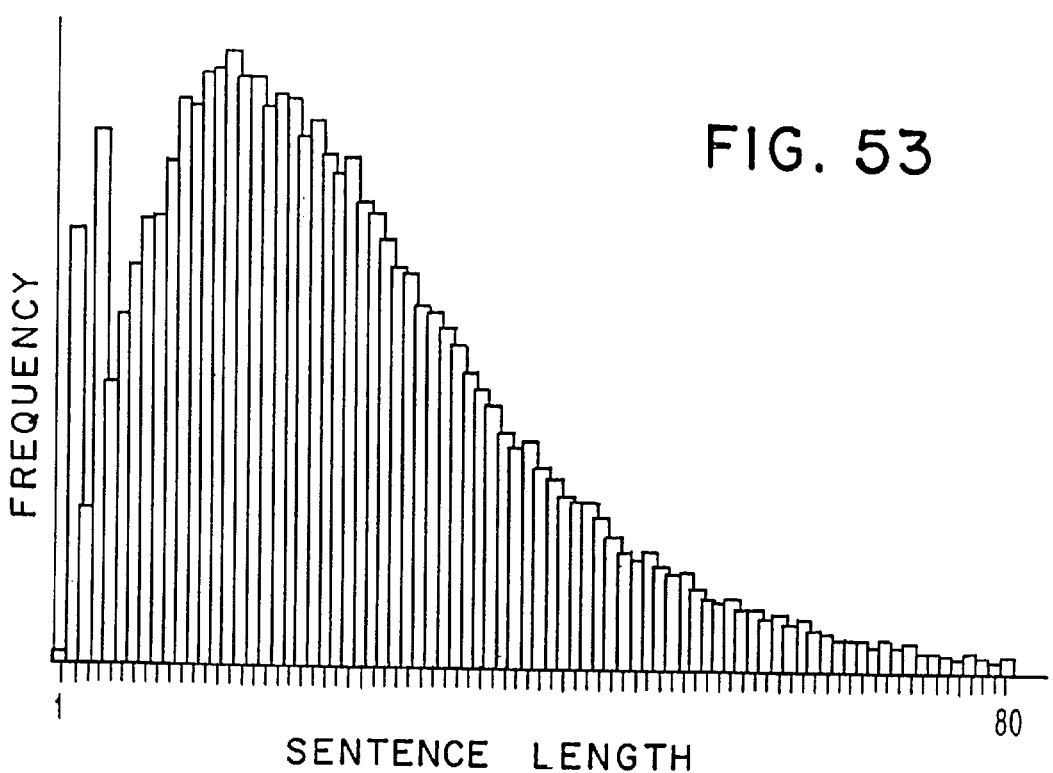
FIG. 53 is a histogram of English sentence lengths.

For the Hansard example, histograms of the sentence length distributions Pr($l_e$) and Pr(flen) for lengths up to 81 are shown in FIGS. 52 and 53 respectively. Except for lengths 2 and 4, which include a large number of formulaic sentences in both the French and the English, the distributions are very smooth.

The parameter values for the Hansard example are shown in Table 19. From these values it follows that 91% of the English sentences and 98% of the English paragraph markers line up one-to-one with their French counterparts. If X is a random variable whose log is normally distributed with mean $\mu$ and variance $\sigma^2$, then the mean of X is $\exp(\mu+\sigma^2/2)$. Thus from the values in the table, it also follows that the total length of the French text in an ef-, eef-, or eff-bead is about 9.8% greater on average than the total length of the corresponding English text. Since most sentences belong to ef-beads, this is close to the value of 9.5% given above for the amount by which the length of the average French sentences exceeds that of the average English sentence.

12.7 Ignoring Anchors

For the Hansard example, the distribution of English sentence lengths shown in FIG. 52 can be combined with the conditional distribution of French sentence lengths given English sentence lengths from Equation (181) to obtain the joint distribution of French and English sentences lengths in ef-, eef-, and eff-beads. For this joint distribution, the mutual information between French and English sentence lengths is 1.85 bits per sentence. It follows that even in the absence of anchor points, the correlation in sentence lengths is strong enough to allow alignment with an error rate that is asymptotically less than 100%.

Numerical estimates for the error rate as a function of the frequency of anchor points can be obtained by Monte Carlo simulation. The empirical distributions Pr($l_e$) and Pr($l_f$) shown in FIGS. 52 and 53, and the parameter values from Table 19 can be used to generated an artificial pair of aligned corpora, and then, the most probable alignment for these corpora can be found. The error rate can be estimated as the fraction of ef-beads in the most probable alignment that did not correspond to ef-beads in the true alignment.

By repeating this process many thousands of times, an expected error rate of about 0.9% was estimated for the actual frequency of anchor points in the Hansard data. By varying the parameters of the hidden Markov model, the effect of anchor points and paragraph markers on error rate can be explored. With paragraph markers but no anchor points, the expected error rate is 2.0%, with anchor points but no paragraph markers, the expected error rate is 2.3%, and with neither anchor points nor paragraph markers, the expected error rate is 3.2%. Thus, while anchor points and paragraph markers are important, alignment is still feasible without them. This is promising since it suggests that the method is applicable to corpora for which frequent anchor points are not available.

TABLE 20

Unusual but correct alignments

| | |
|---|---|
| And love and kisses to you, too. | Pareillement. |
| . . . mugwumps who sit on the fence with their mugs on one side and their wumps on the other side and do not know which side to come down on. | . . . en voulant menagerlachevreetlechous ils n'arrivent pas a prendre parti. |
| At first reading, she may have. | Elle semble en effet avoir un grief tout a fait valable, du moins au premier abord. |

12.8 Results for the Hansard Example

For the Hansard example, the alignment method described above ran for 10 days on an IBM Model 3090 mainframe under an operating system that permitted access to 16 megabytes of virtual memory. The most probable alignment contained 2,869,041 ef-beads. In a random sample of 1000 the aligned sentence pairs, 6 errors were found. This is consistent with the expected error rate of 0.9% mentioned above. In some cases, the method correctly aligned sentences with very different lengths. Examples are shown in Table 20.

13 Aligning Bilingual Corpora

With the growing availability of machine-readable bilingual texts has come a burgeoning interest in methods for extracting linguistically valuable information from such texts. One way of obtaining such information is to construct sentence and word correspondences between the texts in the two languages of such corpora.

Figure 45:
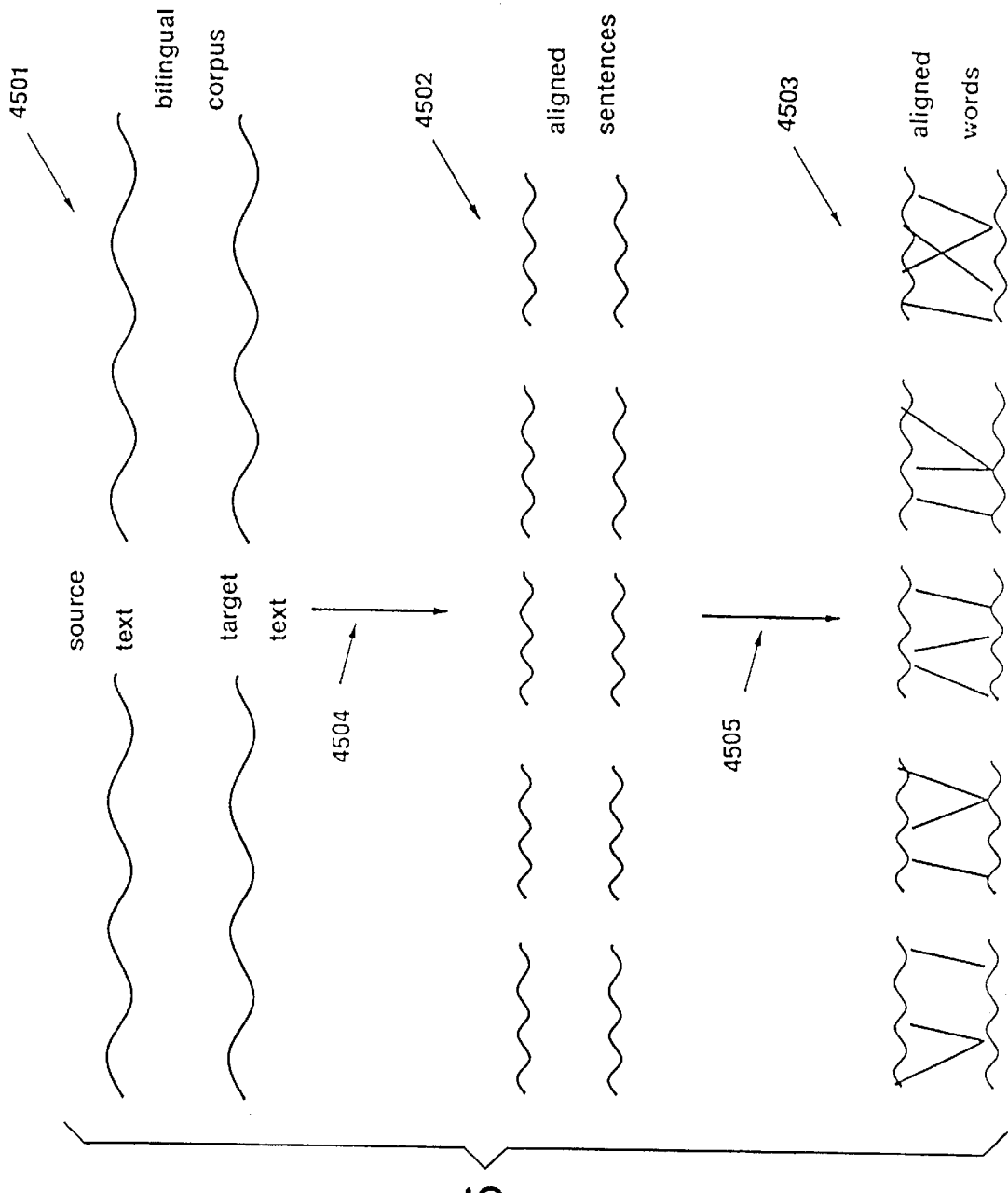
FIG. 45 is a schematic diagram of a process by which word-by-word correspondences are extracted from a bilingual corpus.

A method for doing this is depicted schematically in FIG. 45. This method comprises the steps of

4501. Beginning with a large bilingual corpus;

4504. Extracting pairs of sentences 4502 from this corpus such that each pair consists of a source and target sentence which are translations of each other;

4505. Within each sentence pair, aligning the words of the target sentence with the words in a source sentence, to obtain a bilingual corpus labelled with word-by-word correspondences 4503.

In one embodiment of Step 4504, pairs of aligned sentences are extracted using the method explained in detain in Section 12. The method proceeds without inspecting the identities of the words within sentences, but rather uses only the number of words or number of characters that each sentence contains.

In one embodiment of Step 4505, word-by-word correspondences within a sentence pair are determined by finding the Viterbi alignment or approximate Viterbi alignment for the pair of sentences using a translation model of the sort discussed in Sections 8–10 above. These models constitute a mathematical embodiment of the powerfully compelling intuitive feeling that a word in one language can be translated into a word or phrase in another language.

Word-by-word alignments obtained in this way offer a variable resource for work in bilingual lexicography and machine translation. For example, a method of cross-lingual sense labeling, described in Section 11, and also in the aforementioned paper, "Word Sense Disambiguation using Statistical Methods", uses alignments obtained in this way as data for construction of a statistical sense-labelling module.

14 Hypothesis Search—Steps 702 and 902
14.1 Overview of Hypothesis Search Referring now to FIG. 7, the second step 702 produces a set of hypothesized target structures which correspond to putative translations of the input intermediate source structure produced by step 701. The process by which these target structures are produced is referred to as hypothesis search. In a preferred embodiment target structures correspond to sequences of morphemes. In other embodiments more sophisticated linguistic structures such as parse trees or case frames may be hypothesized.

An hypothesis in this step 702 is comprised of a target structure and an alignment of a target structure with the input source structure. Associated with each hypothesis is a score. In other embodiments a hypothesis may have multiple alignments. In embodiments in which step 701 produces multiple source structures an hypothesis may contain multiple alignments for each source structure. It will be assumed here that the target structure comprised by a hypothesis contains a single instance of the null target morpheme. The null morphemes will not be shown in the Figures pertaining to hypothesis search, but should be understood to be part of the target structures nonetheless. Throughout this section on hypothesis search, partial hypothesis will be used interchangeably with hypothesis, partial alignment with alignment, and partial target structure with target structure.

Figure 54:
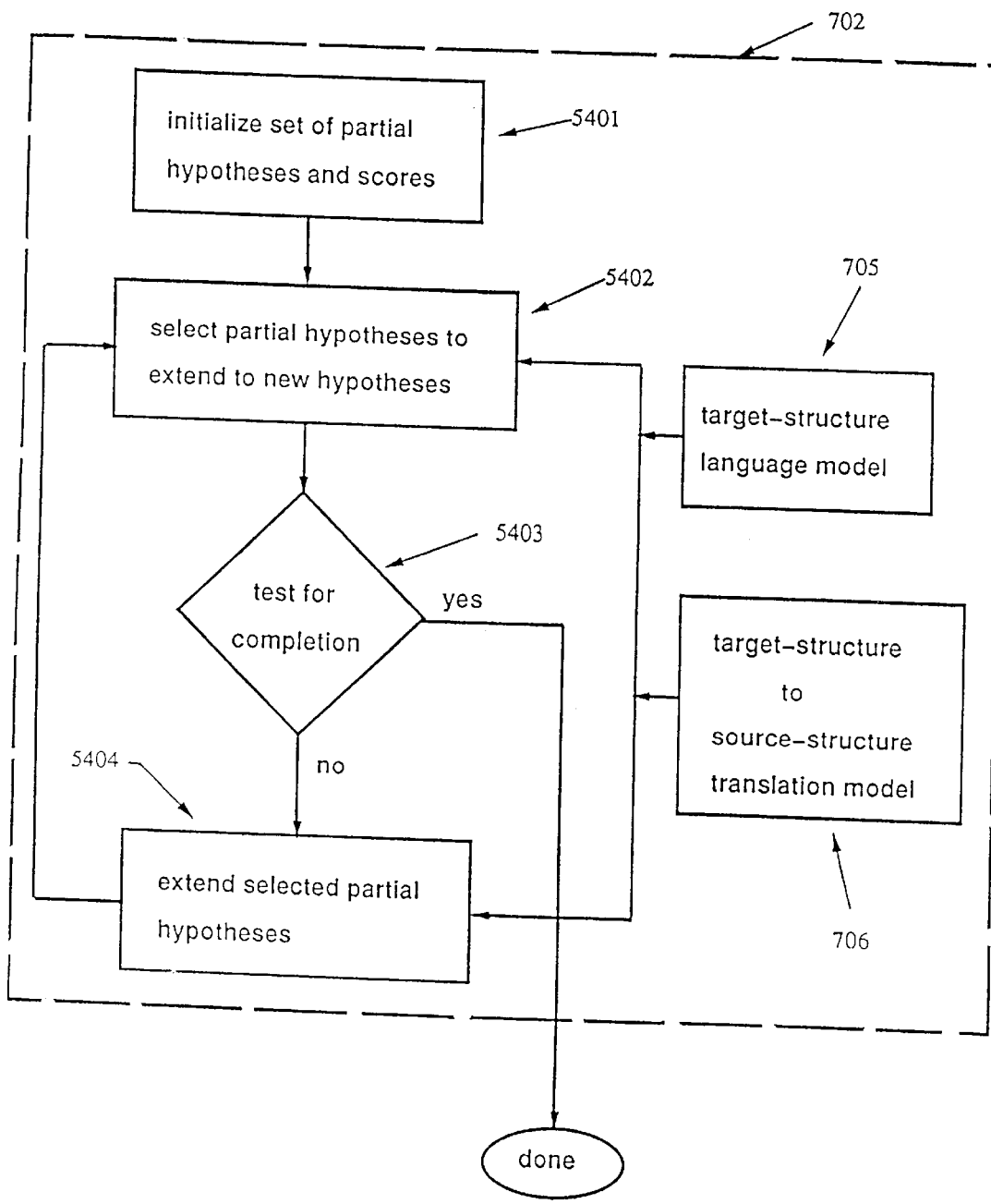
FIG. 54 is a schematic flow diagram of the hypothesis search component of the system.

The target structures generated in this step 702 are produced incrementally. The process by which this is done is depicted in FIG. 54. This process is comprised of five steps.

A set of partial hypotheses is initialized in step 5401. A partial hypothesis is comprised of a target structure and an alignment with some subset of the morphemes in the source structure to be translated. The initial set generated by step 5401 consists of a single partial hypothesis. The partial target structure for this partial hypothesis is just an empty sequence of morphemes. The alignment is the empty alignment in which no morphemes in the source structure to be translated are accounted for.

The system then enters a loop through steps 5402, 5403, and 5404, in which partial hypotheses are iteratively extended until a test for completion is satisfied in step 5403. At the beginning of this loop, in step 5402, the existing set of partial hypotheses is examined and a subset of these hypotheses is selected to be extended in the steps which comprise the remainder of the loop. In step 5402 the score for each partial hypothesis is compared to a threshold (the method used to compute these thresholds is described below). Those partial hypotheses with scores greater than threshold are then placed on a list of partial hypotheses to be extended in step 5404. Each partial hypothesis that is extended in step 5404 contains an alignment which accounts for a subset of the morphemes in the source sentence. The remainder of the morphemes must still be accounted for. Each extension of an hypothesis in step 5404 accounts for one additional morpheme. Typically, there are many tens or hundreds of extensions considered for each partial hypothesis to be extended. For each extension a new score is computed. This score contains a contribution from the language model as well as a contribution from the translation model. The language model score is a measure of the plausibility a priori of the target structure associated with the extension. The translation model score is a measure of the plausibility of the partial alignment associated with the extension. A partial hypothesis is considered to be a full hypothesis when it accounts for the entire source structure to be translated. A full hypothesis contains an alignment in which every morpheme in the source structure is aligned with a morpheme in the hypothesized target structure. The iterative process of extending partial hypotheses terminates when step 5402 produces an empty list of hypotheses to be extended. A test for this situation is made on step 5403.

This method for generating target structure hypotheses can be extended to an embodiment of step 902 of FIG. 9, by modifying the hypothesis extension step 5404 in FIG. 54, with a very similar step that only considers extensions which are consistent with the set of constraints 906. Such a modification is a simple matter for one skilled in the art.

14.2 Hypothesis Extension 5404

This section provides a description of the method by which hypotheses are extended in step 5404 of FIG. 54. Examples will be taken from an embodiment in which the source language is French and the target language is English. It should be understood however that the method described applies to other language pairs.

14.2.1 Types of Hypothesis Extension

There are a number of different ways a partial hypothesis may be extended. Each type of extension is described by working through an appropriate example. For reasons of exposition, the method described in this section assigns scores to partial hypotheses based on Model 3 from the section entitled Translation Models and Parameter Estimation. One skilled in the art will be able to adopt the method described here to other models, such as Model 5, which is used in the best mode of operation.

A partial hypothesis is extended by accounting for one additional previously unaccounted for element of the source structure. When a partial hypothesis $H_1$ is extended to some other hypothesis $H_2$, the score assigned to $H_2$ is a product of the score associated with $H_1$ and a quantity denoted as the extension score. The value of the extension score is determined by the language model, the translation model, the hypothesis being extended and the particular extension that is made. A number of different types of extensions are possible and are scored differently. The possible extension types and the manner in which they are scored is illustrated in the examples below.

Figure 55:
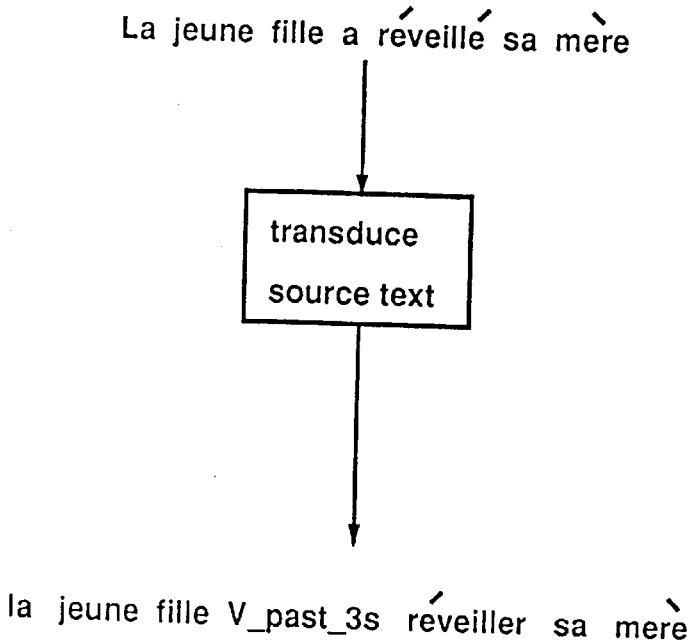
FIG. 55 is an example of a source sentence being transduced to a sequence of morphemes.

As depicted in FIG. 55, in a preferred embodiment, the French sentence La jeune fille a reveillé sa mère is transduced in either step 701 of FIG. 7 or step 901 of FIG. 9 into the morphological sequence la jeune fille V_past_3s sa mère.

Figure 56:
Figure 57:
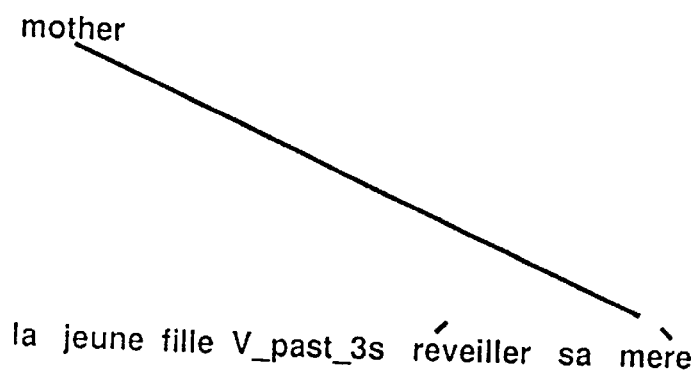
FIG. 57 is an example of a partial hypothesis which results from an extension by the target morpheme mother.

The initial hypothesis accounts for no French morphemes and the score of this hypothesis is set to 1. This hypothesis can be extended in a number of ways. Two sample extensions are shown in FIGS. 56 and 57. In the first example in FIG. 56, the English morpheme the is hypothesized as accounting for the French morpheme la. The component of the score associated with this extension is the equal to $$l(the|*,*)n(1|the)t(la|the)d(1|1). \qquad (182)$$

Here, * is a symbol which denotes a sequence boundary, and the factor $l(the|*,*)$ is the trigram language model parameter that serves as an estimate of the probability that the English morpheme the occurs at the beginning of a sentence. The factor $n(1|the)$ is the translation model parameter that is an estimate of the probability that the English morpheme the has fertility 1, in other words, that the English morpheme the is aligned with only a single French morpheme. The factor $t(la|the)$ is the translation model parameter that serves as an estimate of the lexial probability that the English morpheme the translates to the French morpheme la. Finally, the factor $d(1|1)$ is the translation model parameter that serves as an estimate of the distortion probability that a French morpheme will be placed in position 1 of the French structure given that it is aligned with an English morpheme that is in position 1 of the English structure. In the second example in FIG. 57, the English morpheme mother is hypothesized as accounting for the French morpheme mère. The score for this partial hypothesis is $$l(\text{mother}|*,*)n(1|\text{mother})t(\text{mère}|\text{mother})d(7|1). \qquad (183)$$

Here, the final factor d(7|1) serves as an estimate of the distortion probability that a French morpheme, such as mere, will be place in the 7th position in a source sequence given that it is aligned with an English morpheme such as mother which is in the 1st position in an hypothesized target sequence.

Figure 58:
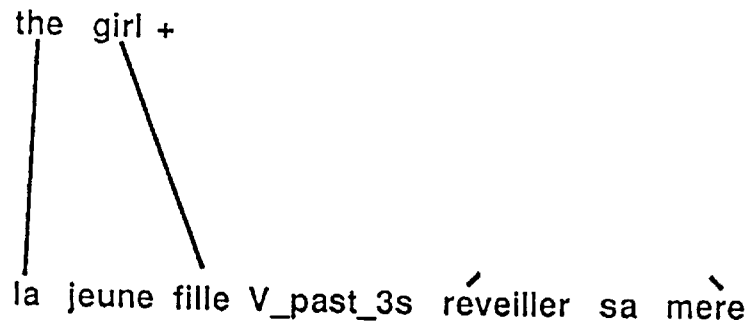
FIG. 58 is an example of a partial hypothesis which results from an extension with an open target morpheme.

Now, suppose the partial hypothesis in FIG. 56 is to be extended on some other invocation of step 5404. A common translation of the pair of French morphemes jeune fille is the English morpheme girl. However, since in a preferred embodiment a partial hypothesis is extended to account for only a single French morpheme at a time, it is not possible to account for both jeune and fille with a single extension. Rather the system first accounts for one of the morphemes, and then on another round of extensions, accounts for the other. This can be done in two ways, either by accounting first for jeune or by accounting first for fille. FIG. 58 depicts the extension that accounts first for fille. The +symbol in FIG. 58 after the the English morpheme girl denotes the fact that in these extensions girl is to be aligned with more French morphemes than it is currently aligned with, in this case, at least two. A morpheme so marked is referred to as open. A morpheme that is not open is said to be closed. A partial hypothesis which contains an open target morpheme is referred to as open, or as an open partial hypothesis. A partial hypothesis which is not open is referred to as closed, or as a closed partial hypothesis. An extension is referred to as either open or closed according to whether or not the resultant partial hypothesis is open or closed. In a preferred embodiment, only the last morpheme in a partial hypothesis can be designated open. The score for the extension in FIG. 58 is $$l(\text{girl}|*,\text{the})2\left(\sum_{i=2}^{25} n(i|\text{girl})\right)t(\text{fille}|\text{girl})d(3|2). \qquad (184)$$

Here, the factor l(girl|*,the) is the language model parameter that serves as an estimate of the probability with which the English morpheme girl is the second morpheme in a source structure in which the first morpheme is the. The next factor of 2 is the combinatorial factor that is discussed in the section entitled Translation Models and Parameter Estimation. It is factored in, in this case, because the open English morpheme girl is to be aligned with at least two French morphemes. The factor n(i|girl) is the translation model parameter that serves as an estimate of the probability that the English morpheme girl will be aligned with exactly i French morphemes, and the sum of these parameters for i between 2 and 25 is an estimate of the probability that girl will be aligned with at least 2 morphemes. It is assumed that the probability that an English morpheme will be aligned with more than 25 French morphemes is 0. Note that in a preferred embodiment of the present invention, this sum can be precomputed and stored in memory as a separate parameter. The factor t (filie|girl) is the translation model parameter that serves as an estimate of the lexical probability that one of the French morphemes aligned with the English morpheme girl will be the French morpheme fille. Finally, the factor d(3|2) is the translation model parameter that serves as an estimate of the distortion probability that a French morpheme will be placed in position 3 of the French structure given that it is aligned with an English morpheme which is in position 2 of the English structure. This extension score in Equation 184 is multiplied by the score in Equation 182 for the partial hypothesis which is being extended to yield a new score for the partial hypothesis in FIG. 56 of $$l(\text{the}|*,*)n(1|\text{the})t(\text{la}|\text{the})d(1|1) \times \qquad (185)$$
$$l(\text{girl}|*,\text{the})2\left(\sum_{i=2}^{25} n(i|\text{girl})\right)t(\text{fille}|\text{girl})d(3|2).$$

Consider now an extension to the partial hypothesis in FIG. 58. If a partial hypothesis that is to be extended contains an open morpheme, then, in a preferred embodiment, that hypothesis can only be extended by aligning another morpheme from the source structure with that open morpheme. When such an extension is made, there are two possibilities: 1) the open morpheme is kept open in the extended partial hypothesis, indicating that more source morphemes are to be aligned with that open target morpheme, or 2) the open morpheme is closed indicating that no more source morphemes are to be aligned with that target morpheme. These two cases are illustrated in FIGS. 59 and 60.

Figure 59:
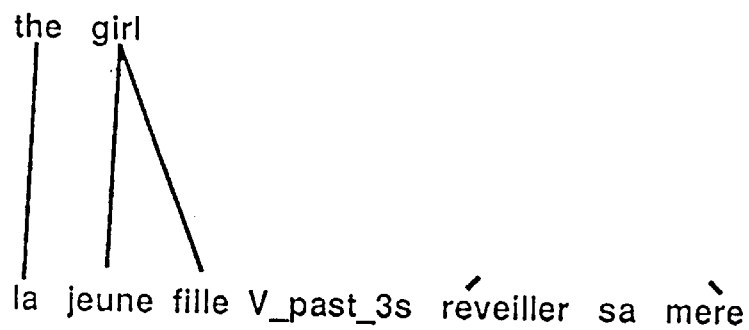
FIG. 59 is an example of a partial hypothesis which results from an extension in which an open morpheme is closed.

In FIG. 59, an extension is made of the partial alignment in FIG. 58 by aligning the additional French morpheme jeune with the English morpheme girl. In this example the English morpheme girl is then closed in the resultant partial hypothesis. The extension score for this example is $$\left(\frac{n(2|\text{girl})}{(\sum_{i=2}^{25} n(i|\text{girl}))}\right)t(\text{jeune}|\text{girl})d(2|2). \qquad (186)$$

Here, the first quotient adjusts the fertility score for the partial hypothesis by dividing out the estimate of the probability that girl is aligned with at least two French morphemes and by multiplying in an estimate of the probability that girl is aligned with exactly two French morphemes. As in the other examples, the second and third factors are estimates of the lexical and distortion probabilities associated with this extension.

Figure 60:
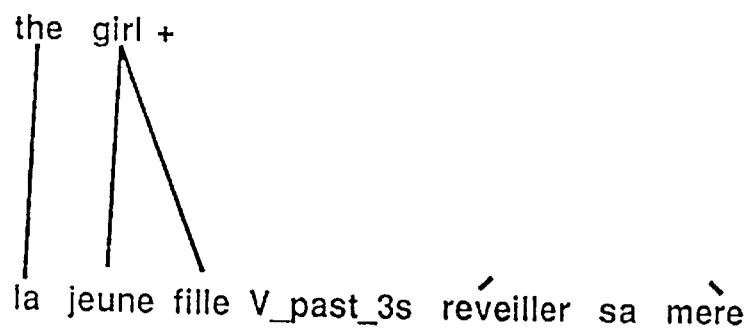
FIG. 60 is an example of a partial hypothesis which results from an extension in which an open morpheme is kept open.

In FIG. 60, the same extension is made as in FIG. 59, except here the English morpheme girl is kept open after the extension, hence the +sign. The extension score for this example is $$3\left(\frac{(\sum_{i=3}^{25} n(i|\text{girl}))}{(\sum_{i=2}^{25} n(i|\text{girl}))}\right)t(\text{jeune}|\text{girl})d(2|2). \qquad (187)$$

Here, the factor of 3 is the adjustment to the combinatorial factor for the partial hypothesis. Since the score for the partial hypothesis in FIG. 59 already has a combinatorial factor of 2, the score for the resultant partial hypothesis in FIG. 60, will have a combinatorial factor of 2×3=3!. The quotient adjusts the fertility score for the partial hypothesis to reflect the fact that in further extensions of this hypothesis girl will be aligned with at least three French morphemes.

Another type of extension performed in the hypothesis search is one in which two additional target morphemes are appended to the partial target structure of the partial hypothesis being extended. In this type of extension, the first of these two morphemes is assigned a fertility of zero and the second is aligned with a, single morpheme from the source structure. This second target morpheme may be either open or closed.

Figure 61:
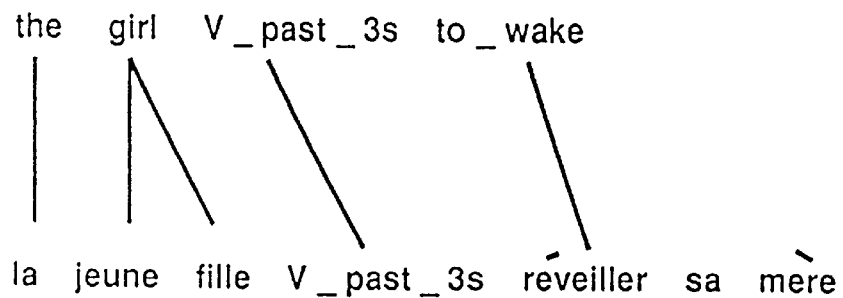
FIG. 61 is an example of a partial hypothesis which results from an extension by the target morpheme to_wake.
Figure 62:
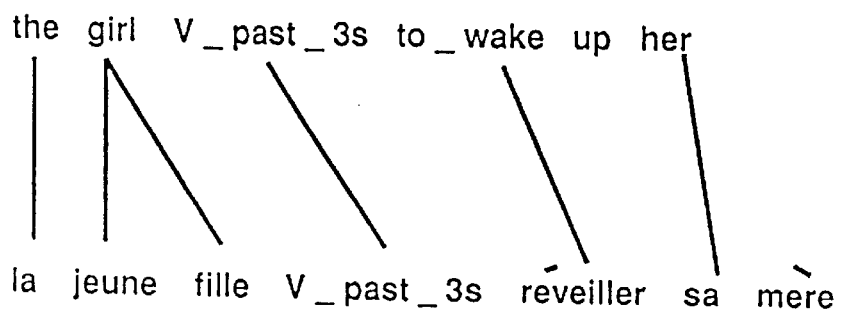
FIG. 62 is an example of a partial hypothesis which results from an extension by the pair of target morphemes up and to_wake.

FIG. 62 shows an extension of the partial hypothesis in FIG. 61 by the two target morphemes up, her, in which her is aligned with the source morpheme sa. The score for this extension is $$l(up|girl, to\_wake)l(her|to\_wake, up)n(0|up)n \\ (1|her)t(sa|her)d(6|6). \qquad (188)$$

Here, the first two factors are the trigram language model estimates of the probabilities with which up follows girl to_wake, and with which her follows to_wake up, respectively. The third factor is the fertility parameter that serves is an estimate of the probability that up is aligned with no source morphemes. The fourth, fifth, and sixth factors are the appropriate fertility, lexical, and distortion parameters associated with the target morpheme her in this partial alignment.

Figure 63:
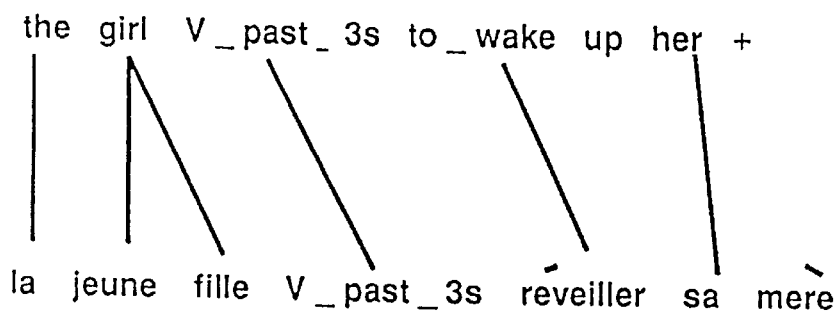
FIG. 63 is an example of a partial hypothesis which results from an extension by the pair of target morphemes up and to_wake in which to_wake is open.

FIG. 63 shows a similar extension by up her. The difference with the extension in FIG. 62 is that in FIG. 63, the source morpheme her is open. The score for this extension is $$l(up|girl, to_wake)l(her|to\_wake, up)n(0|up) \times \qquad (189) \\ 2 \left( \sum_{i=2}^{25} n(i|her) \right) t(sa|her)d(6|6).$$

The score for this extension differs from the score in Equation 188 in that the fertility parameter n(1|her) is replaced by the combinatorial factor 2 and the sum of fertility parameters which provides an estimate of the probability that her will be aligned with at least two source morphemes.

A remaining type of extension is where a partial hypothesis is extended by an additional connection which aligns a source morpheme with the null target morpheme. The score for this type of extension is similar to those described above. No language model score is factored in, and scores from the translation model are factored in, in accordance with the probabilities associated with the null word as described in the section entitled Translation Models and Parameter Estimation.

14.3 Selection of Hypotheses to Extend 5402

Throughout the hypothesis search process, partial hypotheses are maintained in a set of priority queues. In theory, there is a single priority queuele for each subset of positions in the source structure. So, for example, for the source structure oui, oui, three positions: oui is in position 1; a comma is in position 2; and oui is in position 3, and there are therefore $2^3$ subsets of positions: { }, {1}, {2}, {3}, {1, 2}{1, 3}, {2, 3}, and {1, 2, 3}. In practice, these priority queues are initialized only on demand, and many less than the full number of queues possible are used in the hypothesis search. In a preferred embodiment, each partial hypothesis is comprised of a sequence of target morphemes, and these morphemes are aligned with a subset of source morphemes. Corresponding to that subset of source morphemes is a priority queue in which the partial hypothesis is stored. The partial hypotheses within a queue are prioritized according to the scores associated with those hypotheses. In certain preferred embodiments the priority queues are limited in size and only the 1000 hypothesis with the best scores are maintained.

Figure 64:
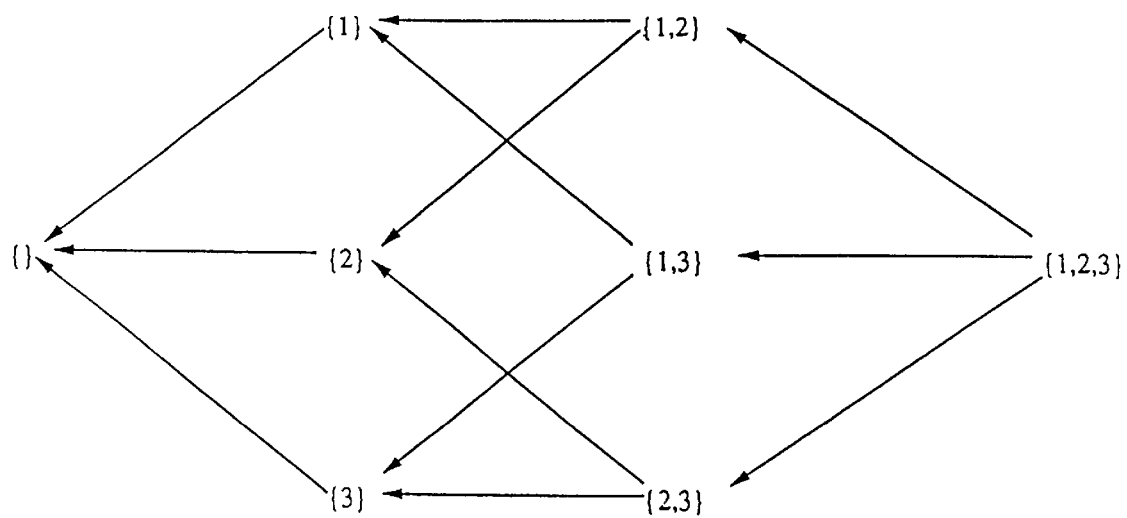
FIG. 64 is an example of a subset lattice.

The set of all subsets of a set of source structure positions can be arranged in a subset lattice. For example, the subset lattice for the set of all sets of the set {1, 2, 3} is shown in FIG. 64. In a subset lattice, a parent of a set S is any which contains one less element than S, and which is also a subset of S. In FIG. 64 arrows have been drawn from each set in the subset lattice to each of its parents. For example, the set {2} is a parent of the set {1, 2}.

A subset lattice defines a natural partial ordering on a set of sets. Since the priority queues used in hypothesis search are associated with subsets, a subset lattice also defines a natural partial ordering on the set of priority queues. Thus in FIG. 64, there are two parents of the priority queue associated with the subset of source structure positions {1, 3}. These two parents are the priority queues associated with the set {1} and {3}. A priority queue $Q_1$ is said to be an ancestor of another priority $Q_2$ if 1) $Q_1$ is not equal to $Q_2$, and 2) $Q_1$ is a subset of $Q_2$. If $Q_1$ is an ancestor of $Q_2$, then $Q_2$ is said to be to be a descendant of $Q_1$.

Figure 65:
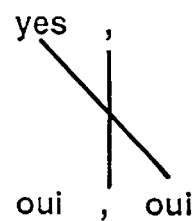
FIG. 65 is an example of a partial hypothesis that is stored in the priority queue {2, 3}.

Considering now the process by which a set of partial hypotheses are selected in step 5402 to be extended in step 5404, when step 5402 is invoked, it is invoked with a list of partial hypotheses that were either 1) created by the initialization step 5401, or 2) created as the result of extensions in step 5404 on a previous pass through the loop comprised of steps 5402, 5403, and 5404. These partial hypotheses are stored in priority queues according to the sets of source morphemes they account for. For example, the partial hypothesis in FIG. 65 would be stored in the priority queue associated with the set {2, 3}, since it accounts for the source morphemes in positions 2 and 3.

A priority queue is said to be active if there are partial hypotheses stored in it. An active priority queue is said to be on the frontier if it has no active descendent. The cardinality of a priority queue is equal to the number of elements in the subset with which it is associated. So, for example, the cardinality of the priority queue which is associated with the set {2, 3} is 2.

Figure 66:
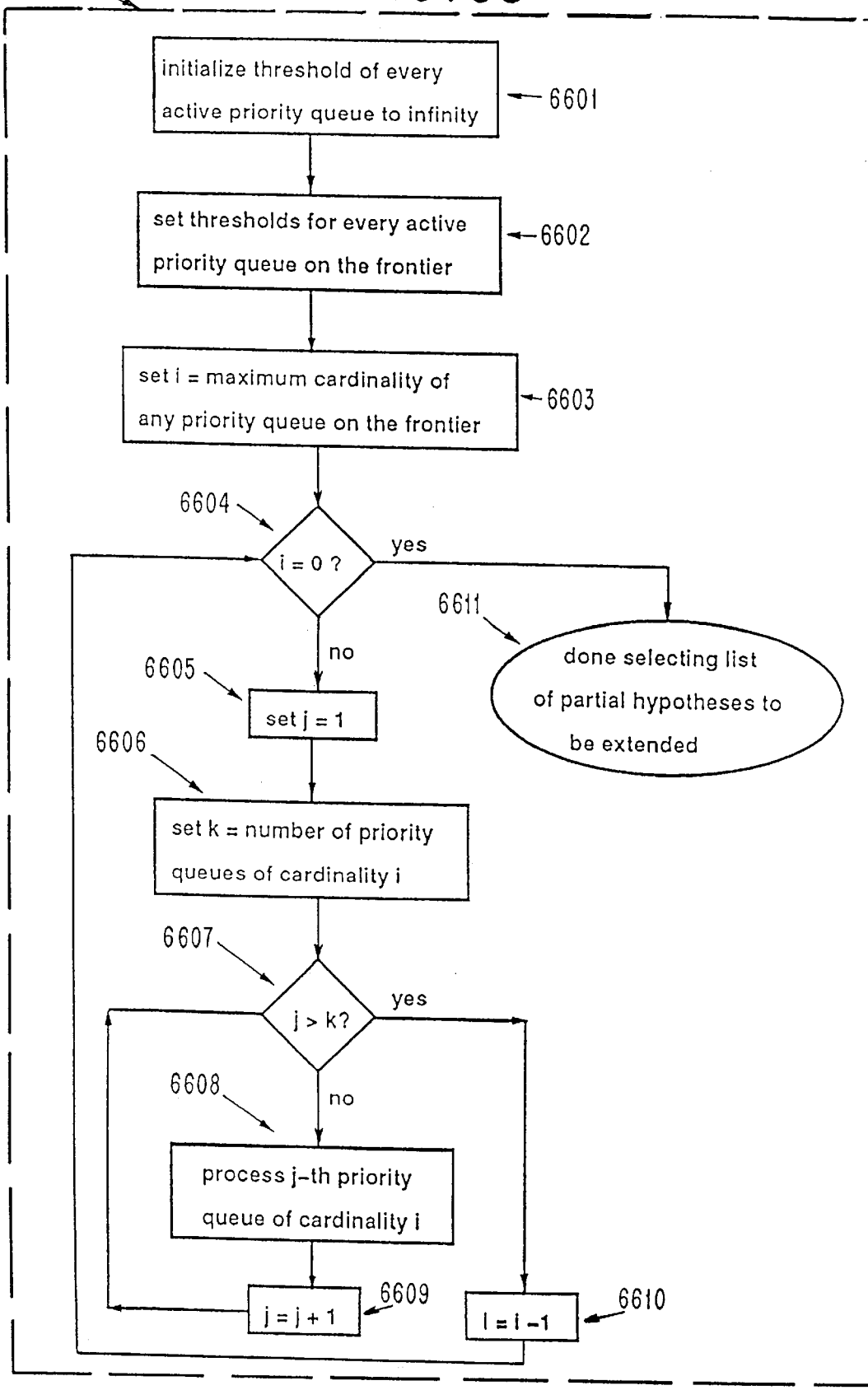
FIG. 66 is a schematic flow diagram of the process by which partial hypotheses are selected for extension.

The process in step 5402 functions by assigning a threshold to every active priority queue and then places on the list of partial hypotheses to be extended every partial hypothesis on an active priority queue that has an a score that is greater than the threshold for that priority queue. This is depicted in FIG. 66. First, in step 6601 the threshold for every active priority queue is initialized to infinity, in practice, some very large number. Second, in step 6602, thresholds are determined for every priority queue on the frontier.

The method by which these thresholds are computed is best described by first describing what the normalizer of a priority queue is. Each priority queue on the frontier corresponds to a set of positions of source morphemes. At each position of these positions is a particular source morpheme. Associated with each morpheme is a number, which in a preferred embodiment is the unigram probability of that source morpheme. These unigram probabilities are estimated by transducing a large body of source text and simply counting the frequency with which the different source morphemes occur. The normalizer for a priority queue is defined to be the product of all the unigram probabilities for the morphemes at the positions in the associated set of source structure positions. For example, the normalizer for the priority queue associated with the set {2, 3} for the source structure la jeune fille V_past_3s réveiller sa mère is:

$$normalizer(\{2,3\})=Pr(jeune)Pr(fille). \qquad (190)$$

For each priority queue Q on the frontier define the normed score of Q to be equal to the score of the partial hypothesis with the greatest score in Q divided by the normalizer for Q. Let Z be equal to the maximum of all normed scores for all priority queues on the frontier. The threshold assigned to a priority queue Q on the frontier is then equal to Z times the normalizer for that priority queue divided by a constant which in a preferred embodiment is 45.

After step 6602, thresholds have been assigned to the priority queues on the frontier, a loop is performed in steps 6604 through 6610. The loop counter i is equal to a different cardinality on each iteration of the loop. The counter i is initialized in step 6604 to the largest cardinality of any active priority queue, in other words, i is initialized to the maximum cardinality of any priority queue on the frontier. On each iteration of the loop the value of i is decreased by 1 until i is equal to 0, at which point the test 6604 is satisfied and the process of selecting partial hypotheses to be extended is terminated.

Inside the loop through cardinalities is another loop in steps 6606 through 6609. This is a loop through all active priority queues of a given cardinality. In this loop each priority queue of cardinality i is processed in step 6608.

Figure 67:
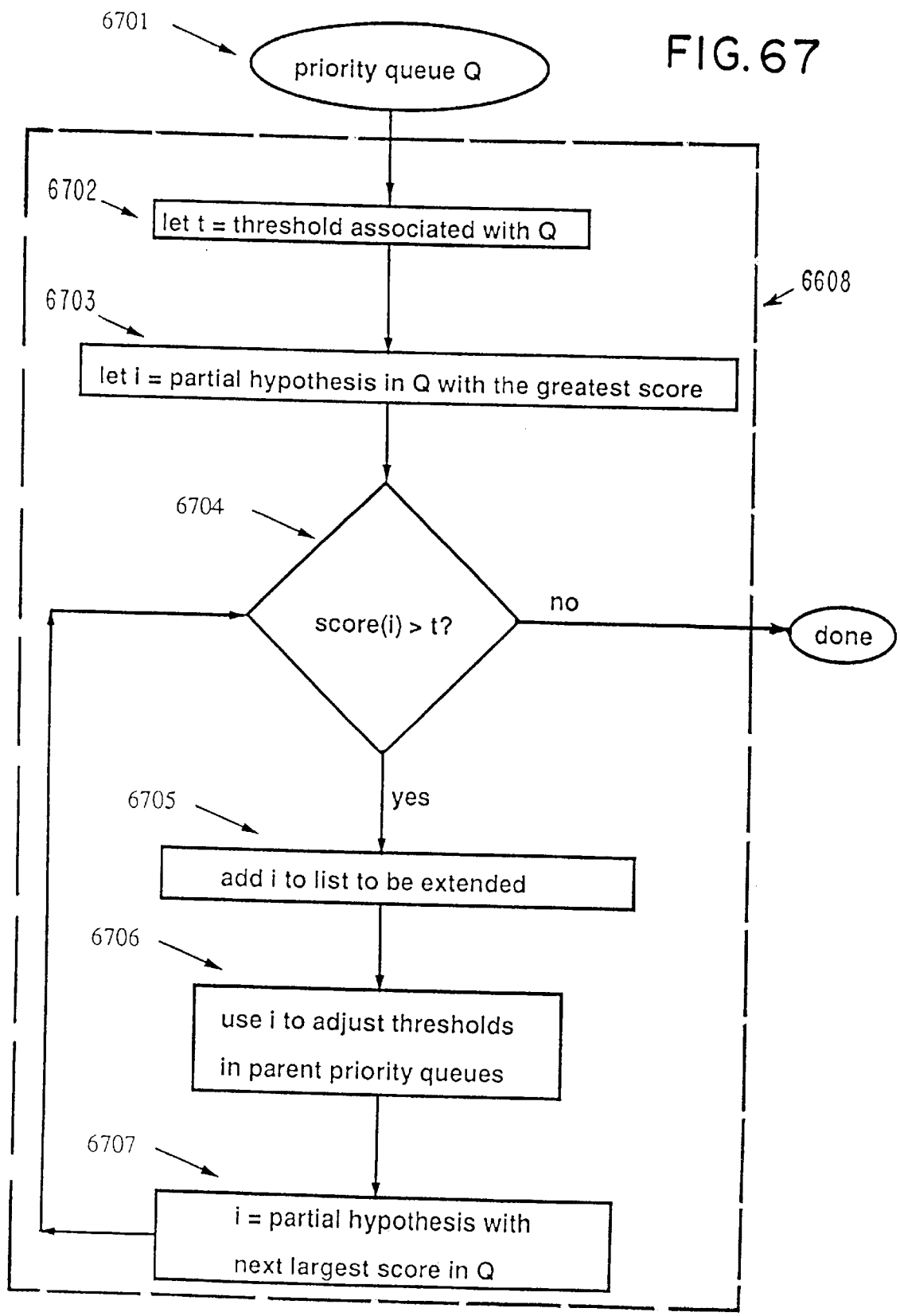
FIG. 67 is a schematic flow diagram of the method by which the partial hypotheses on a priority queue are processed in the selection for extension step.

A schematic flow diagram for this processing step 6608 is shown in FIG. 67. The priority queue Q to be processed enters this step at 6701. Steps 6704 through 6707 perform a loop through all partial hypotheses i in the priority queue Q which are greater than the threshold associated with Q. At step 6705 the partial hypothesis i is added to the list of partial hypotheses to be extended. At step 6706 i is used to adjust the thresholds of all active priority queues which are parents of Q. These thresholds are then used when priority queues of lower priority are processed in the loop beginning at step 6604 in FIG. 66.

Each priority queuie which is a parent of partial hypothesis i at step 6706 contains partial hypotheses which account for one less source morpheme than the partial hypothesis i does. For example, consider the partial hypothesis depicted in FIG. 59. Suppose this is the partial hypothesis i. The two target morphemes the and girl are aligned with the three source morphemes la, jeune, and fille which are in source structure positions 1, 2, and 3 respectively. This hypothesis i is therefore in the priority queue corresponding to the set {1,2,3}. The priority queues that are parents of this hypothesis correspond to the sets {1,2}, {1,3}, and {2,3}. We can use partial hypothesis i to adjust the threshold in each of these priority queues, assuming they are all active, by computing a parent score, $score_p$ from the score $score_i$ associated with the partial hypothesis i. A potentially different parent score is computed for each active parent priority queue. That parent score is then divided by a constant, which in a preferred embodiment is equal to 45. The new threshold for that queue is then set to the minimum of the previous threshold and that parent score.

These parent scores are computed by removing from $score_i$ the contributions for each of the source morphemes la, jeune, and fille. For example, to adjust the threshold for the priority queue {2,3}, it is necessary to remove the contribution to the score associated with the source morpheme in position 1, which is la. This morpheme is the only morpheme aligned with the, so the language model contribution for the must be removed, as well as the translation model contributions associated with la. Therefore:

$$score_p = \frac{score_i}{l(\text{the}|*, \text{boundary})t(\text{la}|\text{the})n(1|\text{the})d(1, 1)} \quad (191)$$

As another example, to adjust the threshold for the priority queue {1,3}, it is necessary to remove the contribution to the $score_i$ associated with the source morpheme in position 2, which is jeune. This morpheme is one of two aligned with the target morpheme girl. If the connection between girl and jeune is removed from the partial alignment in FIG. 59, there is still a connection between girl and fille. In other words, girl is still needed in the partial hypothesis to account for fille. Therefore, no language model component is removed. The parent score in this case is:

$$score_p = score_i \frac{\Sigma_{j=2}^{25} n(j|\text{girl})}{n(2|\text{girl})} \frac{1}{t(\text{jeune}|\text{girl})} \frac{1}{d(2|2)} . \quad (192)$$

Here, the first quotient adjust the fertility score, the second adjusts the lexical score and the third adjusts the distortion score.

With some thought, it will be clear to one skilled in the art how to generalize from these examples to other situations. In general, a parent score is computed by removing a connection from the partial alignment associated with the partial hypothesis i. Such a connection connects a target morpheme t in the partial target structure associated with the partial hypothesis i and a source morpheme s in a source structure. If this connection is the only connection to the target morpheme t, then the language model score for t is divided out, otherwise it is left in. The lexical and distortion scores associated with the source morpheme s are always divided out, as is the fertility score associated with the target morpheme t. If n connections remain to the target morpheme t, since n+1 source morphemes are aligned with t in the partial hypothesis i, then the open fertility score serving as an estimate of the probability that at least n+1 source morphemes will be aligned with i is multiplied in.

When the list of hypotheses to be extended that is created in step 5402 is empty the search terminates.

Refer now to step 5404 in FIG. 54. This step extends a list of partial hypotheses. An embodiment of the method by which this extension takes place is documented in the pseudo code in FIG. 68.

The procedure extend_partial_hypotheses_on_list takes as input a list of hypotheses to be extended. Lines 1 through 8 contain a loop through all the partial hypotheses on the list which are extended in turn. In line 3 the variable h is set to the partial hypothesis being extended on iteration of the loop. For each hypothesis, h, that is extended, it can be extended by aligning an additional source morpheme with a morpheme in an hypothesized target structure. In lines 4 through 7 a loop is made through every position p in the source structure. In certain embodiments, a loop may be made only through the first it source positions that are not already aligned in the partial hypothesis h. In a preferred embodiment n is set to 4. At line 5 a test is made to see if the source morpheme at position p is already aligned by the partial hypothesis with an hypothesized target morpheme. If it is not, then at line 6 a call is made to the procedure extend_h_by_accounting_for_source_morpheme_in_position_p, which creates those extensions of partial hypothesis h which align the source morpheme at position p with an hypothesized target morpheme.

Pseudo code for the procedure extend_h_by_accounting_for_source_morpheme_in_position_p is contained in lines 10 through 31 of Figure. At line 11 a check is made to determine if the partial hypothesis h is open, in other words, if it contains an open target morpheme. If it is open then extensions are made in lines 12 through 14. On line 12, the variable q is set to the position in the hypothesized partial target structure of the open morpheme. Each of these extensions made in lines 12 through 14 are made by adding a connection to the partial alignment of h. Each such connection is a connection from the morpheme at position p in the source structure to the open morpheme at position q in the target structure. On line 13, an extension is created in which a connection from p to q is added to the partial alignment of h and in which the morpheme at position t is kept open. On line 14, an extension is created in which a connection from p to q is added to the partial alignment of h and in which the morpheme at position t is closed.

Extensions of partial hypotheses h which are closed are made in lines 17 through 29. First, in line 17 the variable q is set to the identity of the source morpheme at position p in the source structure. This morpheme will have a number of possible target translations. In terms of the translation model, this means that there will be a number of target morphemes t for which the lexical parameter t (t|s) is greater than a certain threshold, which in an embodiment is set equal to 0.001. The list of such target morphemes for a given source morpheme s can be precomputed. In lines 18 through 29 a loop is made through a list of the target morphemes for the source morpheme s. The variable t is set to the target morpheme being processed in the loop. On line 20, an extension is made in which the target morpheme t is appended to the right end of the partial target structure associated with h and then aligned with the source morpheme at position p, and in which the target morpheme t is open in the resultant partial hypothesis. On line 21, an extension is made in which the target morphesis t is appended to the right end of the partial target structure associated with h and then aligned with the source morpheme at position p, and in which the target morpheme t is closed in the resultant partial hypothesis. On line 22, an extension is made in which the target morpheme t is appended to the null target morpheme in the partial target structure associated with hypothesis h. It is assumed throughout this description of hypothesis search that every partial hypothesis comprises a single null target morpheme.

The remaining types of extensions to be performed are those in which the target structure is extended by two morphemes. In such extensions, the source morpheme at position p is aligned with the second of these two target morphemes. On line 23, a procedure is called which creates a list of target morphemes that can be inserted between the last morpheme on the right of the hypothesis h and the hypothesized target morpheme, t. The lists of target morphemes created by this procedure can be precomputed from language model parameters. In particular, suppose $t_r$ is the last morpheme on the right of the partial target structure comprised by the partial hypothesis h. For any target morpheme $t_1$ the language model provides a score for the three-word sequence $t_r t_1 t$. In one preferred embodiment this score is equal to an estimate of 1-gram probability for the morpheme $t_r$, multiplied by an estimate of the probability with 2-gram conditional probability with which $t_1$ follows $t_r$, multiplied by an estimate of the 3-gram conditional probability with which t follows the pair $t_r t_1$. By computing such a score for each target morpheme $t_1$, the target morphemes can be ordered according to these scores. The list returned by the procedure called on line 23 is comprised of the m best $t_1$'s which have scores greater than a threshold z. In one embodiment, z is equal to 0.001 and m is equal to 100.

The loop on lines 24 through 28 makes extensions for each $t_1$ on the list created on line 23. On lines 26 and 27, extensions are made in which the pair of target morphemes $t_1$, t is appended to the end of the partial target structure comprised by the partial hypothesis h, and in which the source morpheme at position p is aligned with t. The hypotheses which result from extensions made on line 23 are open and the hypotheses which result from extensions made on line 23 are closed.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A text-to-text language translation system, comprising:

a computer processor;

a memory having stored therein a plurality of models, wherein said models are used in text-to-text translation, said plurality of models including:

a parametric translation model for generating a modeled translation probability, wherein said parametric translation model is generated with reference to a translation model source training text and a translation model target training text, said parametric translation model including a first specification of parameters, and a parametric language model for generating a modeled probability, wherein said parametric language model is generated with reference to a language model training text, said parametric language model including a second specification of parameters; and means for performing text-to-text language translation using said parametric translation model and said parametric language model.

2. A system according to claim 1, for training text in two parallel corpora, comprising:

means for grouping said source training text into a first plurality of tokens having sentence-like structures; and means for grouping said target training text into a second plurality of tokens having sentence-like structures; and means for performing sentence alignment by aligning said first and second pluralities of tokens according to their length.

3. A system according to claim 2, further comprising:

means for determining the probability associated with each of said sentence alignments.

4. A system according to claim 2, further comprising:

means for generating bigram statistics for said tokens; and means for generating classes of similar elements based on said bigram statistics.

5. A system according to claim 1, further comprising:

means for determining the sum of probabilities for all alignments of units of linguistic structure for a given pair of source and target sentences.

6. A system according to claim 1, further comprising:

means for determining, for a given pair of source and target sentences, the most probable alignment of units of linguistic structure between the sentences.

7. A system according to claim 1, further comprising:

means for determining, for a given pair of source and target sentences and a given partial alignment of units of linguistic structure between the sentences, the most probable completion of said partial alignment.

8. A system according to claim 7, further comprising:

means for adjusting said most probable completion of said partial alignment by changing said alignment; and means for determining the most probable completion of said new alignment.

9. A system according to claim 8, further comprising:

means for changing said alignment by performing at least one of a swapping and single move operation, said swapping comprising the interchanging of target units of linguistic structure assigned to any two source units of linguistic structure, and said single move comprising the changing of a target unit of linguistic structure assigned to any one source unit of linguistic structure.

10. A system according to claim 1, further comprising:

means for determining, for a given pair of source and target sentences and a completely specified alignment of units of linguistic structure between the sentences, the probability of said alignment.

11. A method for text-to-text language translation, comprising the steps of:

building a parametric translation model to generate a modeled translation probability, comprising the steps of, storing a translation model source training text, storing a translation model target training text, and choosing a first specification of parameters for the translation model so that the modeled translation probability of the source and target training texts is a first unique local maximum value;

building a parametric language model to generate a modeled probability, comprising the steps of, storing a language model raining text, and choosing a second specification of parameters for the language model so that the modeled probability of the given training text is a second unique local maximum value; and performing text-to-text language translation using said parametric translation model and said parametric language model.

12. A method according to claim 11, for training text in two parallel corpora, comprising the steps of:

grouping said translation model source training text into a first plurality of tokens having sentence-like structures;

grouping said translation model target training text into a second plurality of tokens having sentence-like structures;

performing sentence alignment by aligning said first and second pluralities of tokens according to their length.

13. A method according to claim 12, further comprising the step of:

determining a probability associated with each of said sentence alignments.

14. A method according to claim 12, further comprising the steps of:

generating bigram statistics for said tokens; and generating classes of similar elements based on said bigram statistics.

15. A method according to claim 11, wherein said steps of storing said translation model source training text and said translation model target training text store a source language and an artificial language, respectively.

16. A method according to claim 11, further comprising the steps of:

performing alignment of units of linguistic structure of said source training text with unit of linguistic structure of said target training text.

17. A method according to claim 16, further comprising the step of:

determining a probability associated with each of said unit alignments.

18. A method according to claim 16, further comprising the step of:

determining a sum of probabilities for all alignments of units of linguistic structure for a given pair of source and target sentences.

19. A method according to claim 16, further comprising the step of:

determining, for a given pair of source and target sentences, the most probable alignment of units of linguistic structure between the sentences.

20. A method according to claim 16, further comprising the step of:

determining, for a given pair of source and target sentences and a given partial alignment of units of linguistic structure between the sentences, the most probable completion of said partial alignment.

21. A method according to claim 20, further comprising the step of:

adjusting said most probable completion of said partial alignment by changing said alignment; and determining the most probable completion of said new alignment.

22. A method according to claim 21, further comprising the step of:

changing said alignment by performing at least one of a swapping and single move operation, said swapping comprising the interchanging of target units of linguistic structure assigned to any two source units of linguistic structure, and said single move comprising the changing of a target unit assigned to any one source unit.

23. A method according to claim 16, further comprising the step of:

determining, for a given pair of source and target sentences and a completely specified alignment of units of linguistic structure between the sentences, the probability of said alignment.

24. A method for translating a first text in a first language into a second text in a second language using a lexical model, comprising the steps of:

inputting the first text into the lexical model, wherein the lexical model comprises a parametric translation model for generating a first probability and a parametric language model for generating a second probability; and determining, using the lexical model, the second text in the second language that yields a unique local maximum value of a product of the first probability of the parametric translation model and the second probability of the parametric language model.

* * * * *